US006126306A

United States Patent [19]

Ando

[11] Patent Number: 6,126,306

[45] Date of Patent: Oct. 3, 2000

[54] NATURAL LANGUAGE PROCESSING METHOD FOR CONVERTING A FIRST NATURAL LANGUAGE INTO A SECOND NATURAL LANGUAGE USING DATA STRUCTURES

[76] Inventor: Shimon Ando, 1-3-6, Nishinarusawa-cho, Hitachi 316, Japan

[21] Appl. No.: 07/943,401

[22] Filed: Sep. 10, 1992

[30] Foreign Application Priority Data

Sep. 11, 1991 [JP] Japan .................................. .3-310292

[51] Int. Cl.[7] .................................................... G06F 17/28

[52] U.S. Cl. ........................................................ 364/419.02

[58] Field of Search .......................... 364/419.02, 419.08

[56] References Cited

PUBLICATIONS

US–A–4 914 590 (Loatman, et al.) Apr. 3, 1990, col. 2, line 56, col. 3, line 43.

IBM Journal of Research and Development, vol. 32, No. 2, Mar. 1988, New York US p. 251–267, XP000022626, P. Velardi, et al.

Computer Journal, vol. 32, No. 2, Apr. 1989, Cambridge GB pp. 108–121.

Proc4ecedings. The Annual AI Systems in Government Conference. Mar. 27–31, 1989. Washington, D.C., US pp. 234–243.

*Primary Examiner*—Gail O. Hayes

*Attorney, Agent, or Firm*—Antonelli, Terry, Stout & Kraus

[57] ABSTRACT

A method which includes performing a structure analysis on a natural sentence inputted by making use of a word dictionary DIC-WD and a configuration dictionary DIC-KT and converting letter series KNJ of the inputted natural sentence into a language structure information series IMF-LSL. The natural sentence inputted in the form of the language structure information series IMI-LSL is subjected in such a manner to application of meaning analysis grammar IMI-GRM to cause a single or a plurality of meaning frames IMF-FRM to be read out from a meaning frame dictionary DIC-IMI in accordance with commands of the meaning analysis grammar IMI-GRM. When a plurality of meaning frames IMI-FRM are read out a meaning frame which defines an abstract meaning expressed by the inputted natural sentence is synthesized by case coupling and/or logic coupling the meaning frames IMI-FRM. Words WD, particles JO and symbols KI are inserted into the meaning frames IMI-FRM read out or the meaning frame IMI-FRM synthesized to thereby determine and produce data sentence DT-S correctly expressing the meaning of the inputted natural sentence in a computer whereby the language structure information series IMF-LSL is converted into the data sentence DT-S in the form of data structure PSMW with a multi layered case-logic language structure.

17 Claims, 180 Drawing Sheets

Fig.1

```
no .MK  .BK  .LOG .KY  .B .N .L .MW.RP.mw.F.H.jr.jh.WD  .CNC.jt.jpu.jxp.jls.jlg.jgb.jcs.jos.jinx
00 0000 0000 0000 0000 00 00 00 00 00 00 0 0 00 00 0000 000 00 000 000 000 000 000 000 000 0000
```

Fig.2

```
no -MK  -NTN -KY  -L -A -T -S -O -P -X-Y-Z-j1 -jntn-jn-jm-jost-j2-SC
00 0000 0000 0000 00 00 00 00 00 00 0 0 0 0   0000 00 00 00   00 00
```

Fig.6

```
no .MK  .BK  .LOG .KY  .B .N .L .MW.RP.mw.F.H.jr.jh.WD  .CNC.jt.jpu.jxp.jls.jlg.jgb.jcs.jos.jinx
 1 0000 0001 0000 0000 00  2  3 00 00 00 0 0 00 00 0000 000 00 000 000 000 000 000 000 000 0000
 2 0000 0000 0000 0000  1 00 00 00 00 00 0 0 00 00 0000 000 00 000 000 000 000 000 000 000 0000
 3 0000 0010 0000 0000 00 00 00  1 00 00 0 0 00 00 0000 000 00 000 000 000 000 000 000 000 0000
```

Fig.11

(PS module)

```
no -MK  -NTN -KY  -L -A -T -S -O -P -X-Y-Z-j1 -jntn-jn-jm-jost-j2-SC
 1 a00e 0000 0000  7  1  2  3  4  5  6 0 0 0   0000 00 00 00   00 00
```

(MW module)

```
no .MK  .BK  .LOG .KY  .B .N .L .MW.RP.mw.F.H.jr.jh.WD  .CNC.jt.jpu.jxp.jls.jlg.jgb.jcs.jos.jinx
 1 0001 000e 0000 0000 00 00  1 00 00 00 0 0 00 00 0000 000 00 000 000 000 000 000 000 000 0000
 2 0002 000e 0000 0000 00 00  1 00 00 00 0 0 00 00 0000 000 00 000 000 000 000 000 000 000 0000
 3 0003 000e 0000 0000 00 00  1 00 00 00 0 0 00 00 0000 000 00 000 000 000 000 000 000 000 0000
 4 0004 000e 0000 0000 00 00  1 00 00 00 0 0 00 00 0000 000 00 000 000 000 000 000 000 000 0000
 5 0005 000e 0000 0000 00 00  1 00 00 00 0 0 00 00 0000 000 00 000 000 000 000 000 000 000 0000
 6 0006 000e 0000 0000 00 00  1 00 00 00 0 0 00 00 0000 000 00 000 000 000 000 000 000 000 0000
 7 0000 00e0 0000 0000 00 00 00  1 00 00 0 0 00 00 0000 000 00 000 000 000 000 000 000 000 0000
```

Fig.13

(PS module)

```
no -MK  -NTN -KY  -L -A -T -S -O -P -X-Y-Z-j1 -jntn-jn-jm-jost-j2-SC
 1 a000 0010 0000  0  1  2  3  4  5  0 0 0 0   0000 00 00 00   00 00
```

(MW module)

```
no .MK  .BK  .LOG .KY  .B .N .L .MW.RP.mw.F.H.jr.jh.WD  .CNC.jt.jpu.jxp.jls.jlg.jgb.jcs.jos.jinx
 1 0001 000e 0000 0000 00 00  1 00 00 00 0 0ano 00 TARO 000 00 000 000 000 000 000 ga  000 0701
 2 0002 000e 0000 0000 00 00  1 00 00 00 0 0 00 00 KYO  000 00 000 000 000 000 000 000 000 1101
 3 0003 000e 0000 0000 00 00  1 00 00 00 0 0 00 00 GURANDO00 00 000 000 000 000 000 de  000 1501
 4 0004 000e 0000 0000 00 00  1 00 00 00 0 0kono00 BOURU000 00 000 000 000 000 000 wo  000  f01
 5 0005 000e 0000 0000 00 00  1 00 00 00 0 0 00 00 NAGE 000 00 000 000 000 000 ta  000 000 0000
```

Fig.14( a )
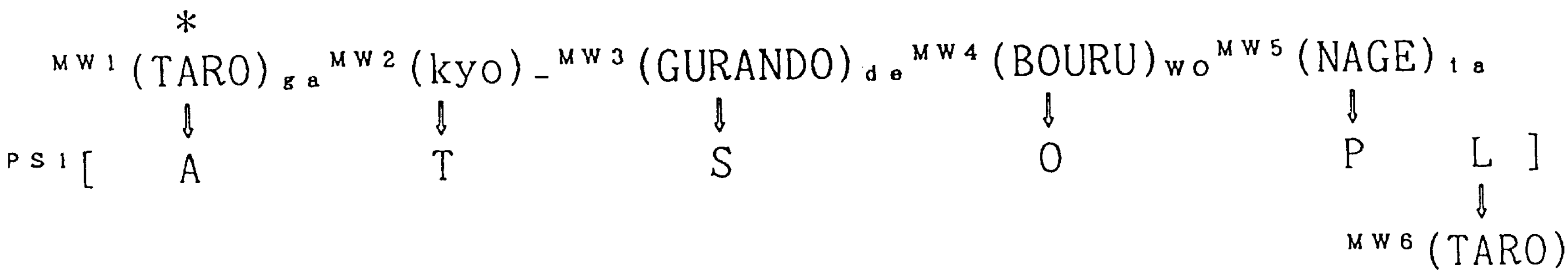
Fig.14( b )
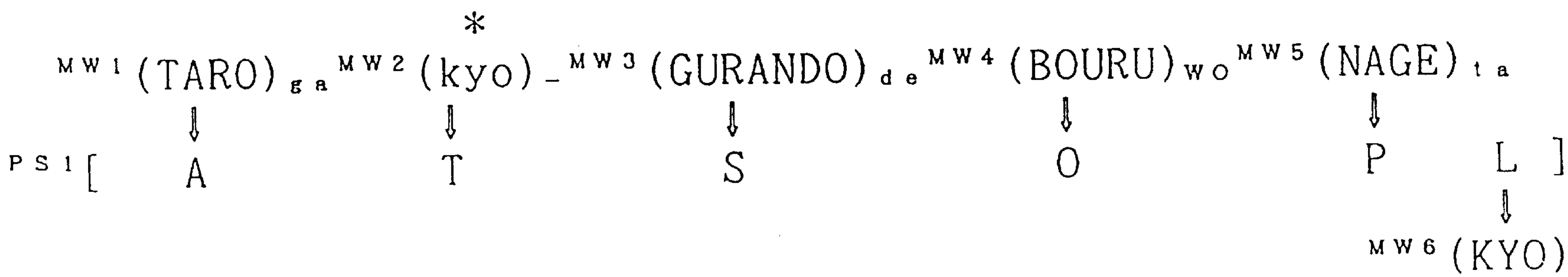

Fig.14( c )
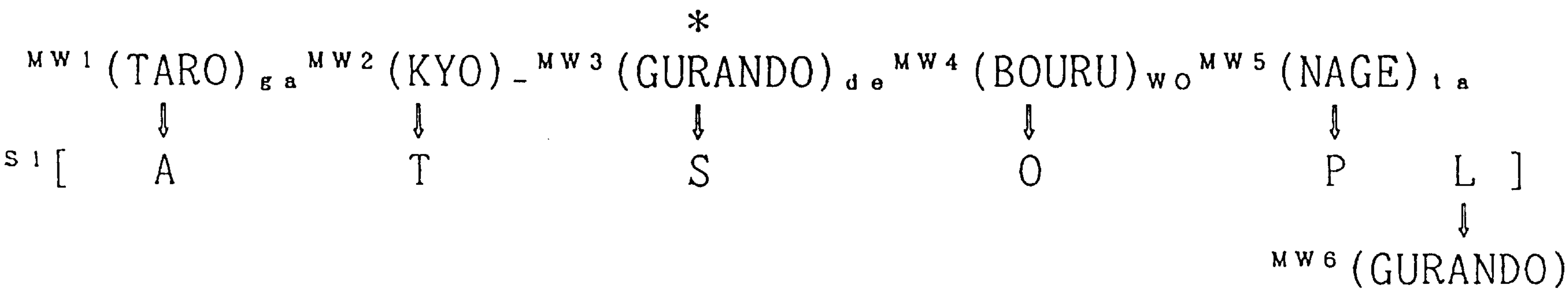
Fig.14( d )
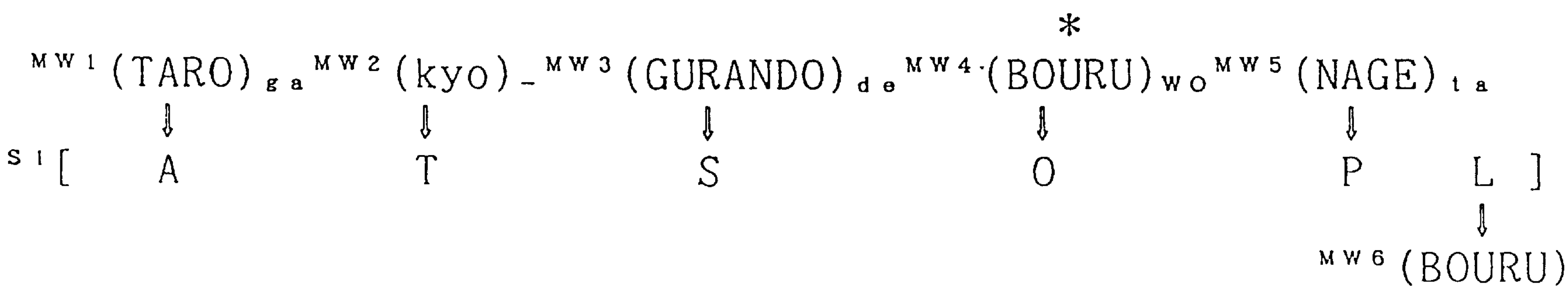

Fig.14( e )
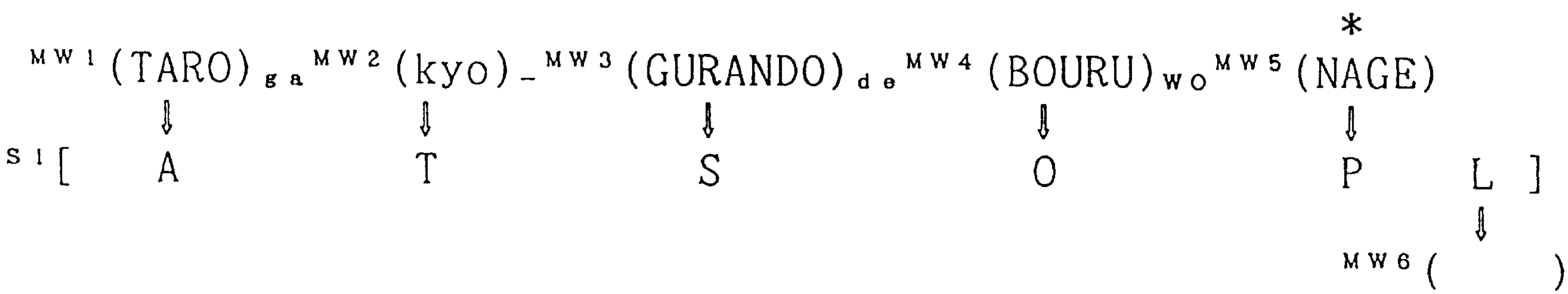
Fig.14( f )
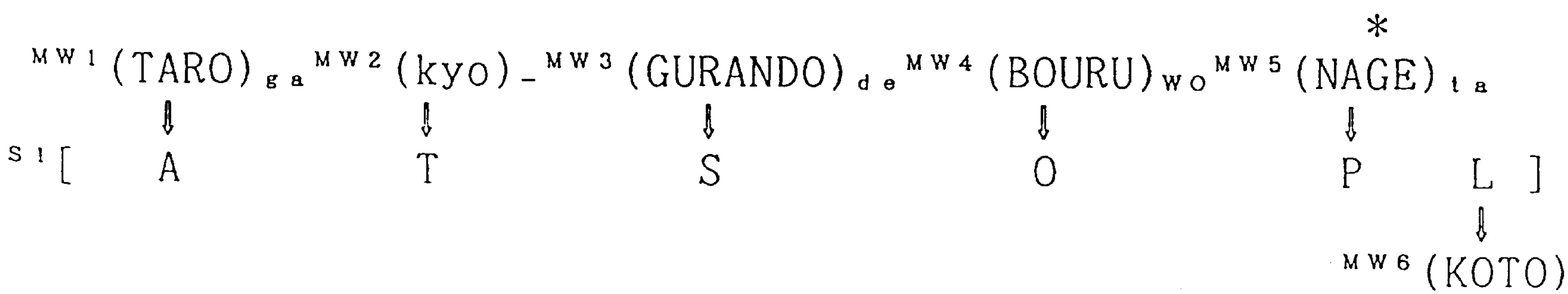

Fig.15

( P S module )

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | a000 | 0010 | 0000 | 6 | 1 | 2 | 3 | 4 | 5 | 0 | 0 | 0 | 0 | 0000 | 00 | 00 | 00 | 00 | 00 |

( M W module )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | e00e | 0000 | 0000 | 00 | 00 | 1 | 00 | 06 | 00 | 0 | 0 | 00 | 00 | TARO | 000 | 00 | 000 | 000 | 000 | 000 | 000 | ga | 000 | 0701 |
| 2 | 0002 | 000e | 0000 | 0000 | 00 | 00 | 1 | 00 | 00 | 00 | 0 | 0 | 00 | 00 | KYO | 000 | 00 | 000 | 000 | 000 | 000 | 000 | 000 | 000 | 1101 |
| 3 | 0003 | 000e | 0000 | 0000 | 00 | 00 | 1 | 00 | 00 | 00 | 0 | 0 | 00 | 00 | GURANDOO | | 00 | 000 | 000 | 000 | 000 | 000 | de | 000 | 1501 |
| 4 | 0004 | 000e | 0000 | 0000 | 00 | 00 | 1 | 00 | 00 | 00 | 0 | 0 | 00 | 00 | BOURU000 | | 00 | 000 | 000 | 000 | 000 | 000 | wo | 000 | d01 |
| 5 | 0005 | 000e | 0000 | 0000 | 00 | 00 | 1 | 00 | 00 | 00 | 0 | 0 | 00 | 00 | NAGE | 000 | 00 | 000 | 000 | 000 | 000 | ta | 000 | 000 | 0000 |
| 6 | 0000 | 00e0 | 0000 | 0000 | 00 | 00 | 0 | 1 | 00 | 01 | 0 | 0 | 00 | 00 | TARO | 000 | 00 | 000 | 000 | 000 | 000 | 000 | 000 | 000 | 0000 |

Fig.16

(HITO) (TOKI) (TOKORO) (MONO) (NAGE)$_{ta}$

*
(TARO)$_{ha}$()()(GENKI)$_{na}$(A)ru
⇓ ⇓ ⇓ ⇓ ⇓
$A_1$ $T_1S_1$ $O_1$ $P_1$]
⇓
*
(TARO)$_{ga}$(KYO)(GURANDO)$_{de}$(BOURU)$_{wo}$(NAGE)$_{ta}$
⇓ ⇓ ⇓ ⇓ ⇓
[ $A_2$ $T_2$ $S_2$ $O_2$ $P_2$]
⇓
*
(BOURU)$_{ha}$( )( )(SHIRO)$_{i}$(DE)$_{su}$
⇓ ⇓ ⇓ ⇓ ⇓
[ $A_3$ $T_3$ $S_3$ $O_3$ $P_3$]

Fig.20( a )

$(A1\ )_{ga}(T1)\ (S1)_{ni}-\ (A)_{ru}$ $\Downarrow \quad \Downarrow \quad \Downarrow \quad \Downarrow$ $[\ A_1\ \ T_1\ \ S_1\ \ O_1\ \ P_1\,]$ --- PS-E

Fig.20( b )

$(A1)_{ha}(T1)\ (S1)_{de}(O1)_{de}(A)_{ru}$ $\Downarrow \quad \Downarrow \quad \Downarrow \quad \Downarrow \quad \Downarrow$ $[\ A_1\ \ T_1\ \ S_1\ \ O_1\ \ P_1\,]$ --- PS-I

Fig.20( c )

$(A1)_{ga}(T1)\ (S1)_{de}(O1)_{wo}(SU)_{ru}$ $\Downarrow \quad \Downarrow \quad \Downarrow \quad \Downarrow \quad \Downarrow$ $[\ A_1\ \ T_1\ \ S_1\ \ O_1\ \ P_1\ ]$ --- PS-D

Fig.21( a )

$(HON)_{ga}(IMA)\ (KOKO)_{ni}\ -\ (A)_{ru}$ $\Downarrow\ \Downarrow\ \Downarrow\ \Downarrow$ $[A_1\ T_1\ S_1\ O_1\ P_1]$ ---- PS-E

Fig.21( b )

$(HANAKO)_{ha}(IMA)(KOKO)_{de}(BIJIN)_{de}(A)_{ru}$ $\Downarrow\ \Downarrow\ \Downarrow\ \Downarrow\ \Downarrow$ $[A_1\ T_1\ S_1\ O_1\ P_1]$ ----- PS-I

Fig.21( c )

$(TARO)_{ga}(IMA)\ (KOKO)_{de}(SORE)_{wo}(SU)_{ru}$ $\Downarrow\ \Downarrow\ \Downarrow\ \Downarrow\ \Downarrow$ $[A_1\ T_1\ S_1\ O_1\ P_1]$ --- PS-D Fig.22( a )
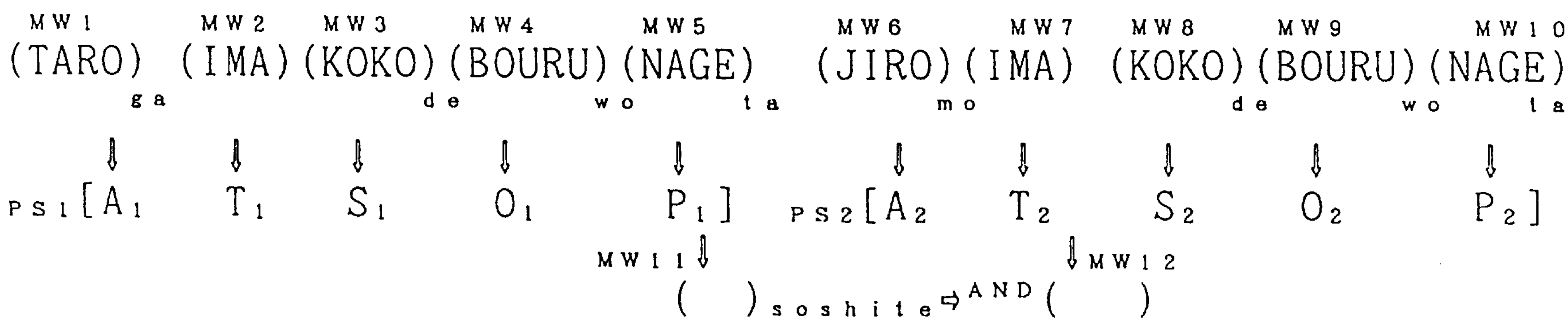

Fig.22(b)

$MW_{11}$ (TARO)$_{to}$ ⇨ AND $MW_{12}$ (JIRO)

$MW_1$ ⇒ ( )$_{ga}$ $MW_2$ (IMA) $MW_3$ (KOKO)$_{de}$ $MW_4$ (BOURU)$_{wo}$ $MW_5$ (NAGE)$_{ta}$

⇒ ⇒ ⇒ ⇒ ⇒

$PS_1$ [$A_1$ $T_1$ $S_1$ $O_1$ $P_1$]

Fig.23( a )
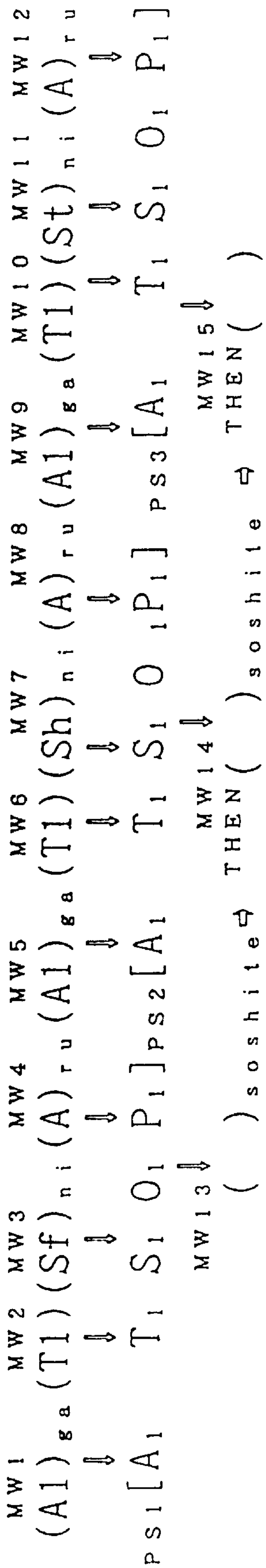

Fig.23( b )
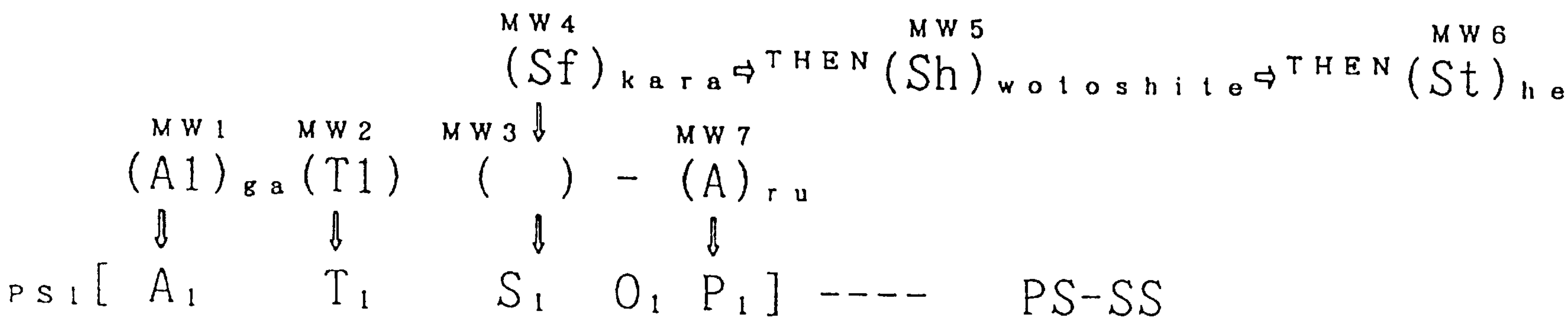

Fig.25( a )
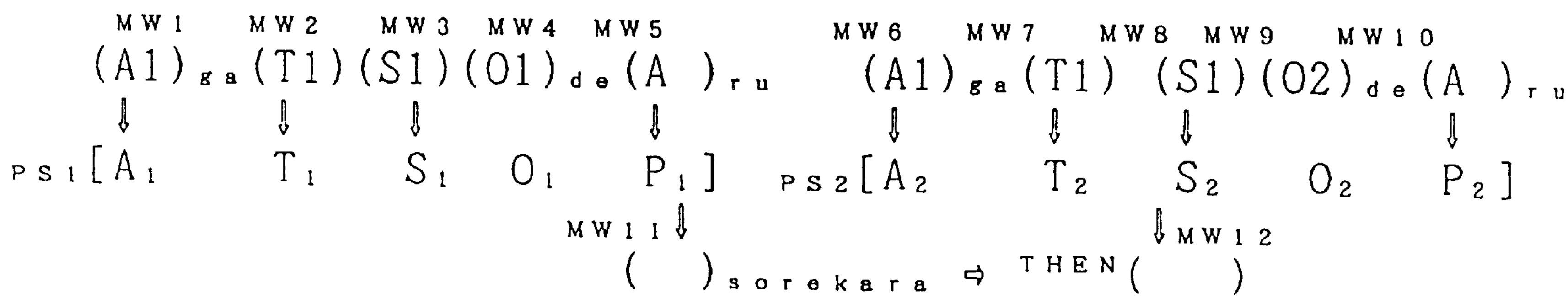

Fig.25( b )
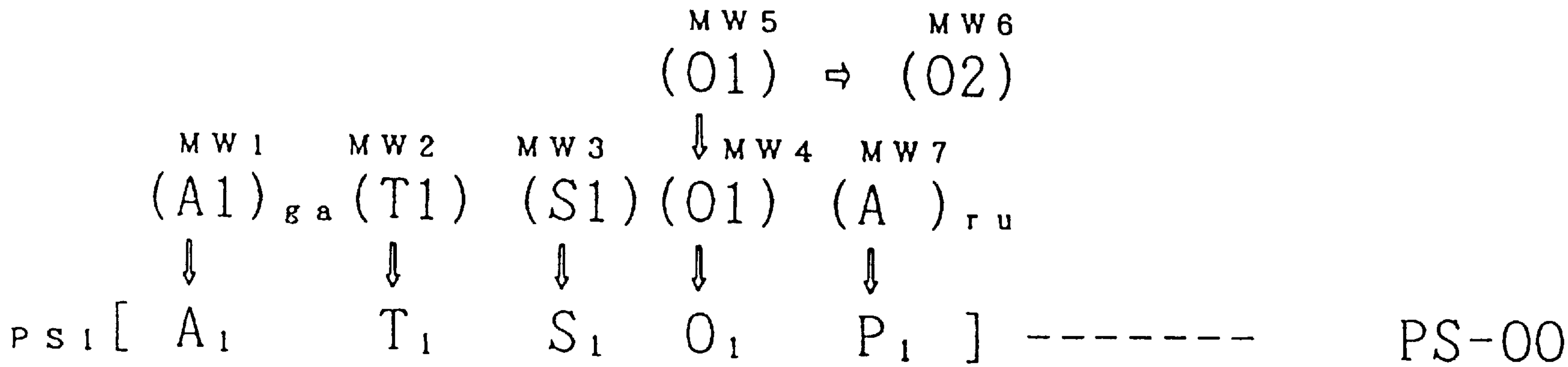

Fig.26( a )
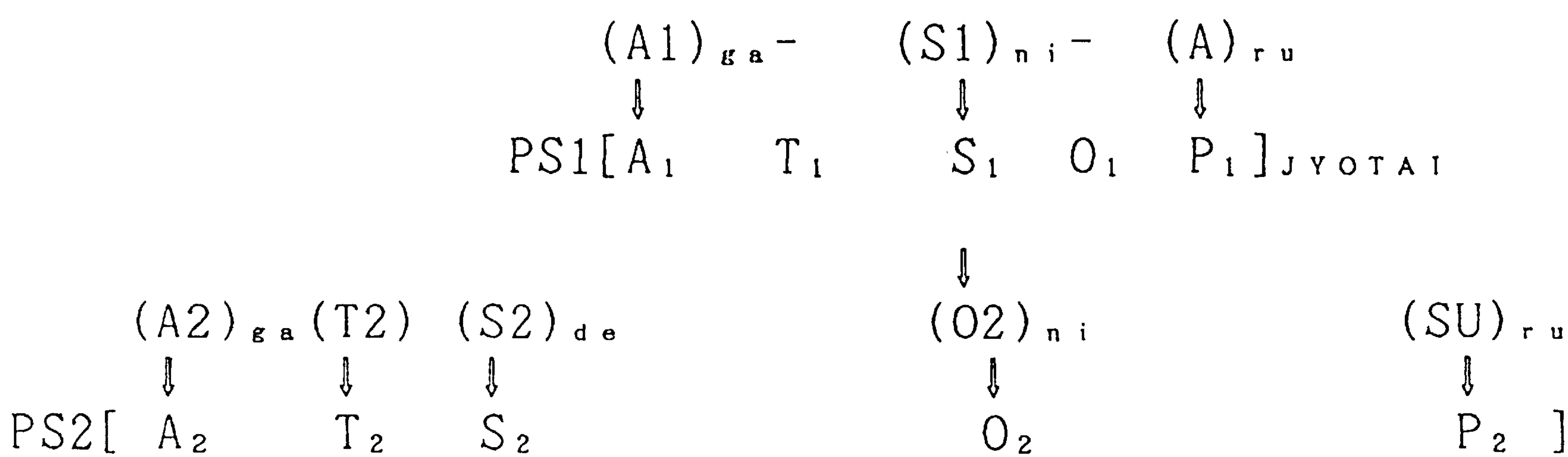

Fig.26( b )
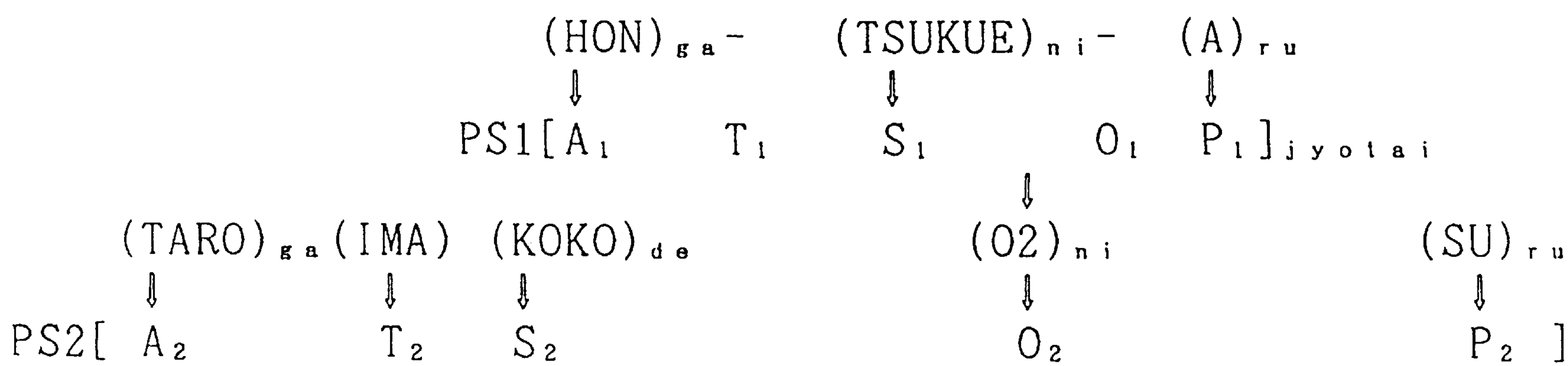

Fig.26( c )
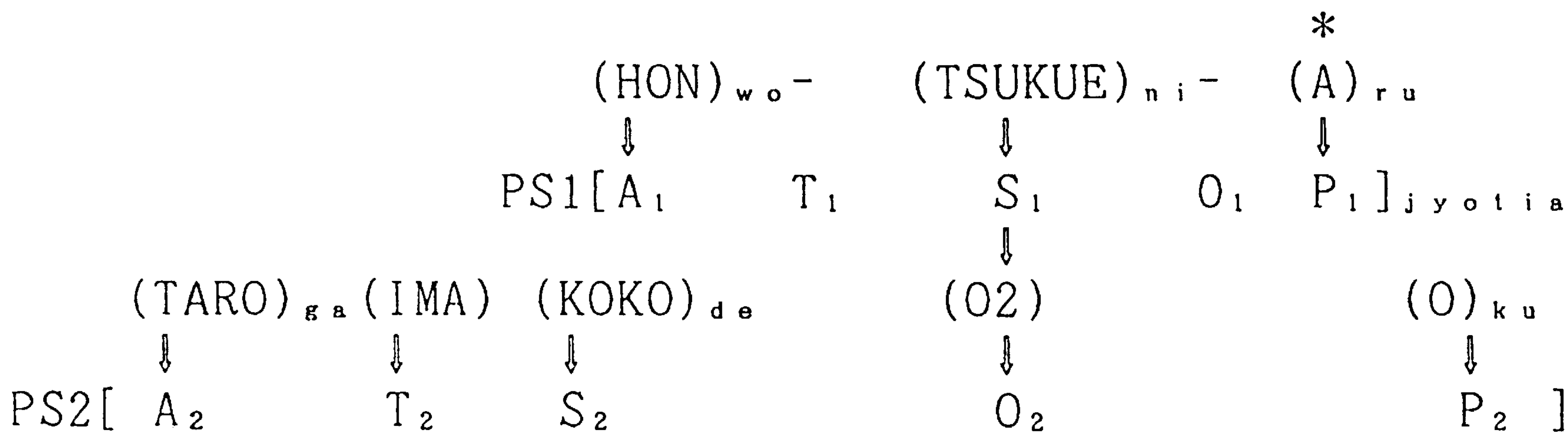

Fig.27( a )
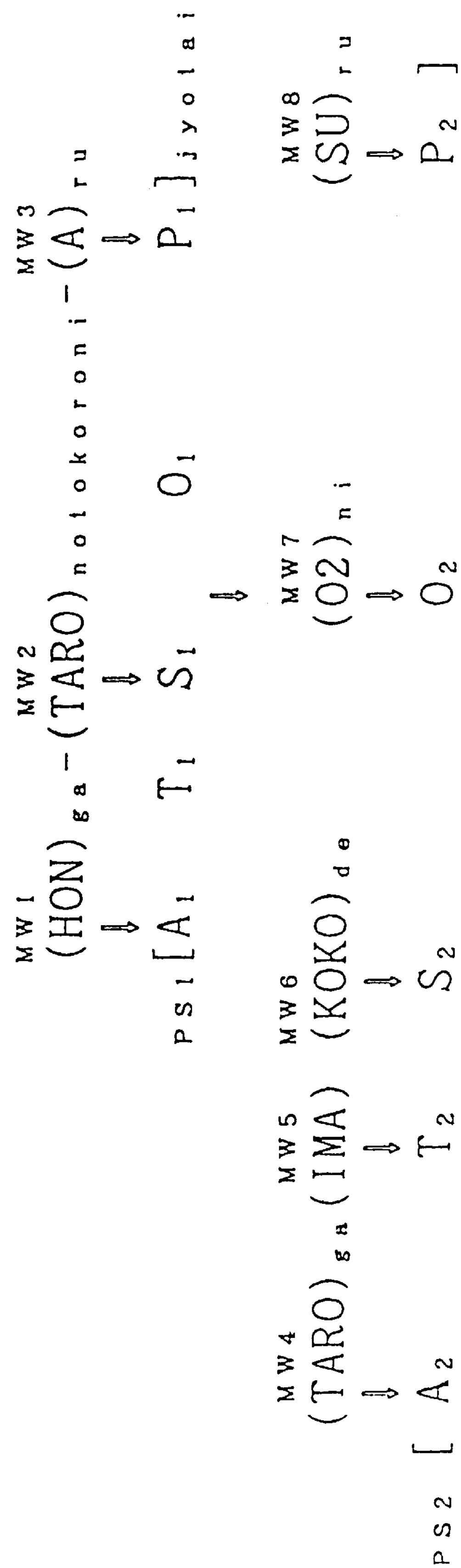

Fig.27( b )
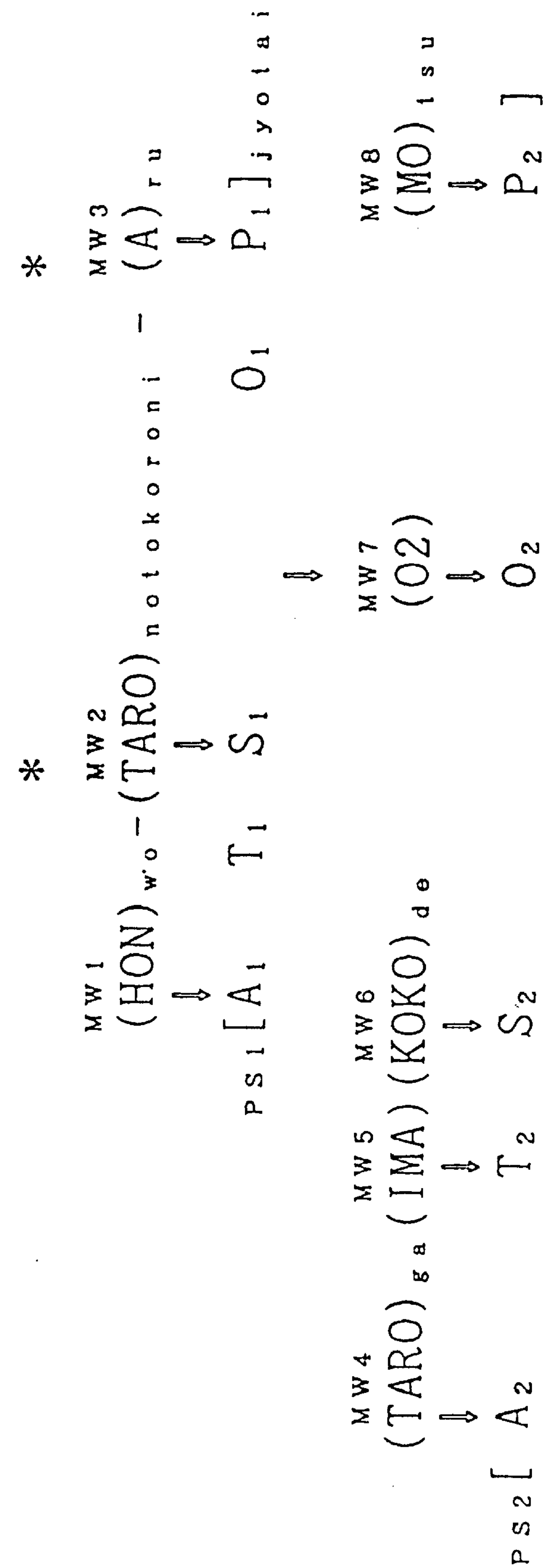

Fig.27( c )
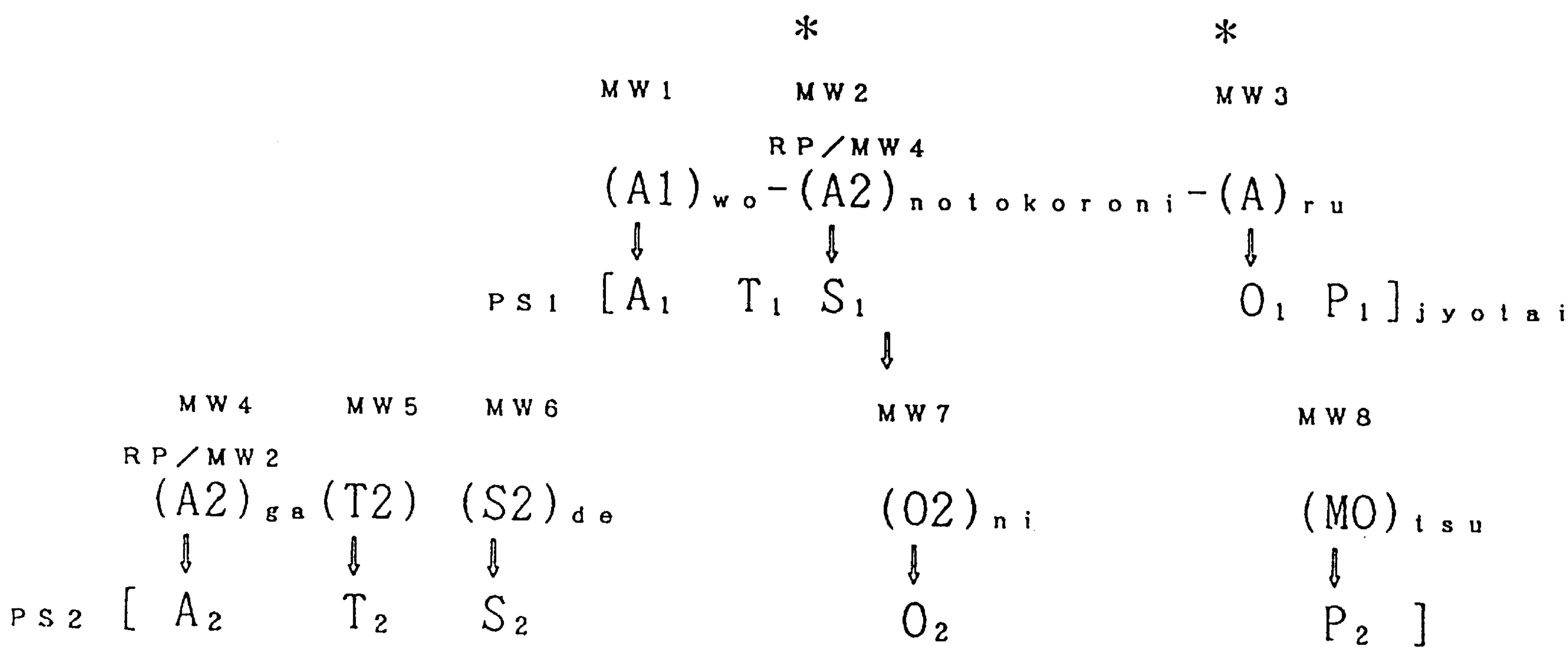

Fig.28( a )
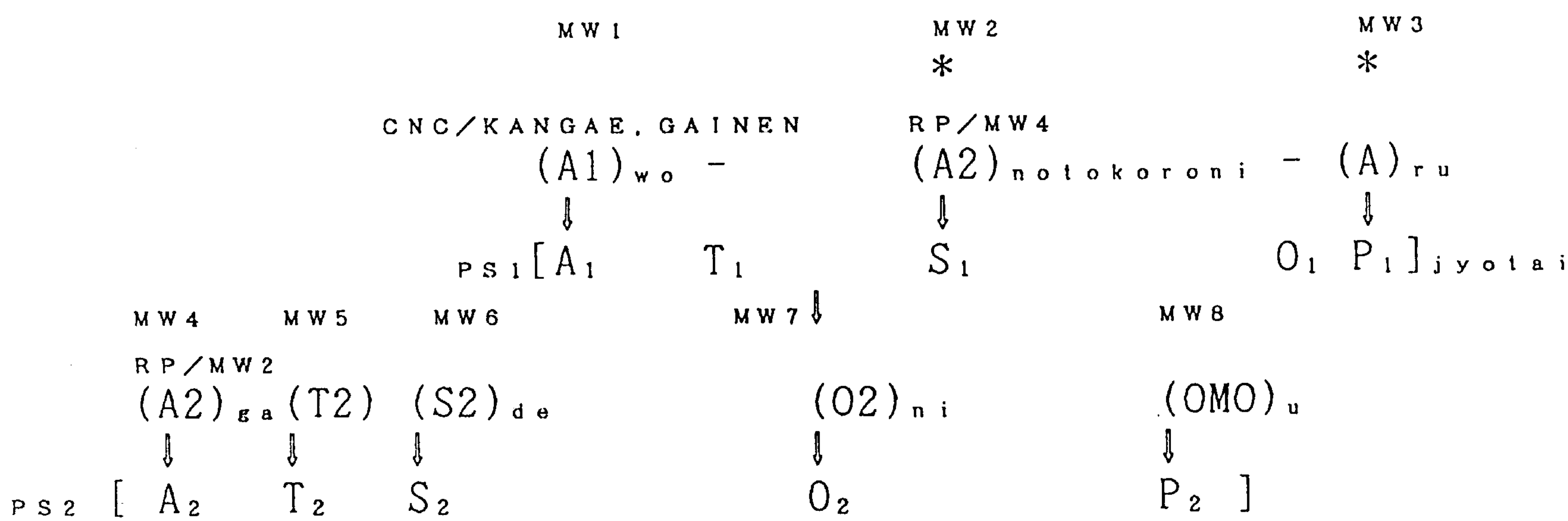

Fig.29( a )
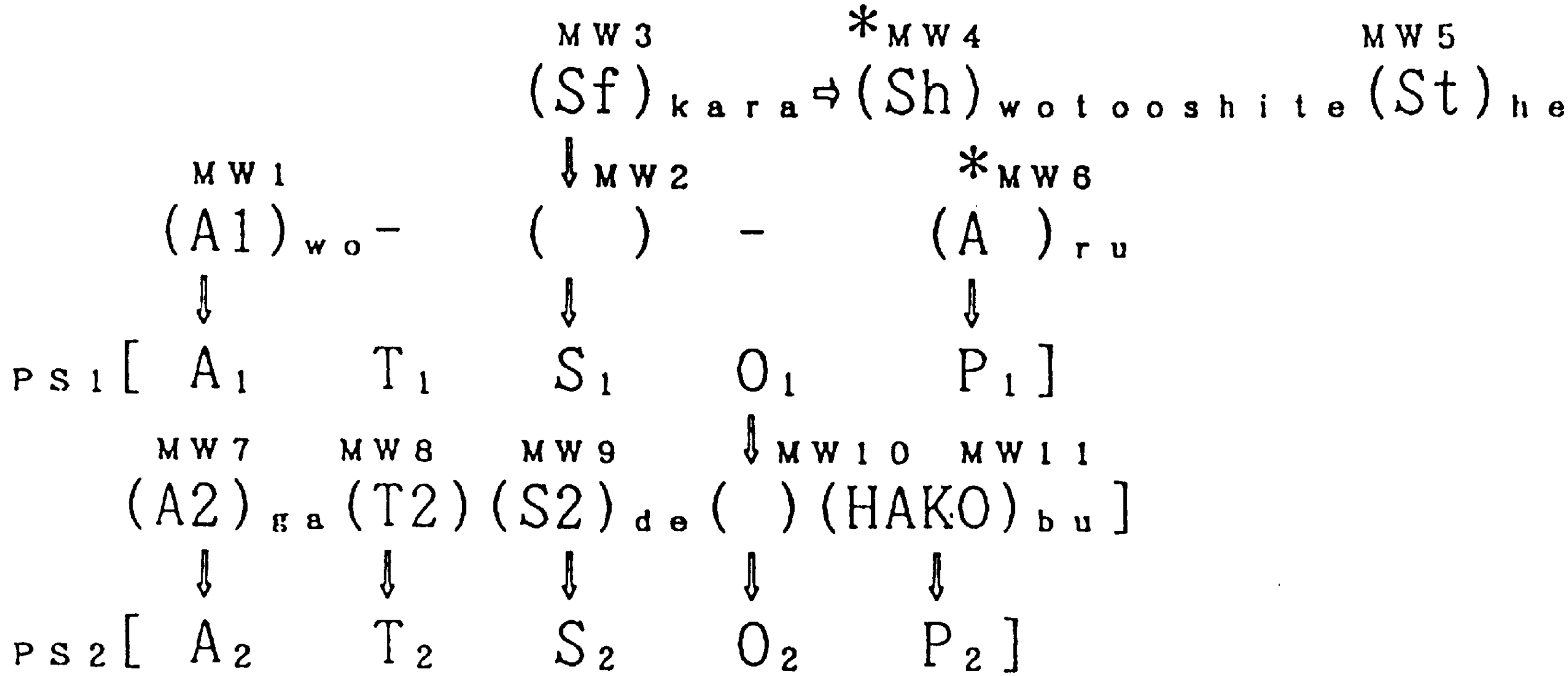

Fig.29( c )
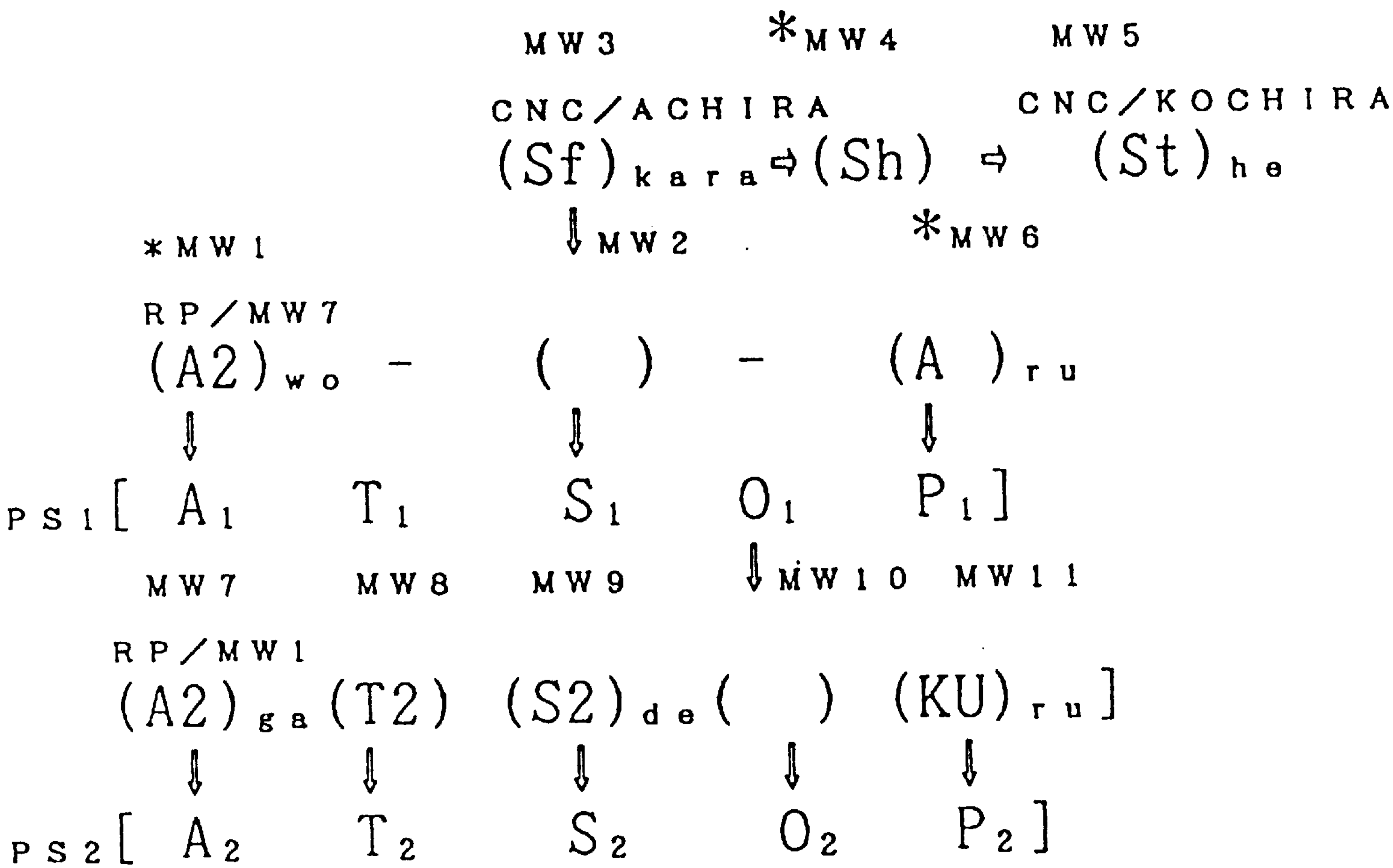

$[A_A \quad T_T \quad S_S \quad O_O \quad P_P]$

Fig.50( a )
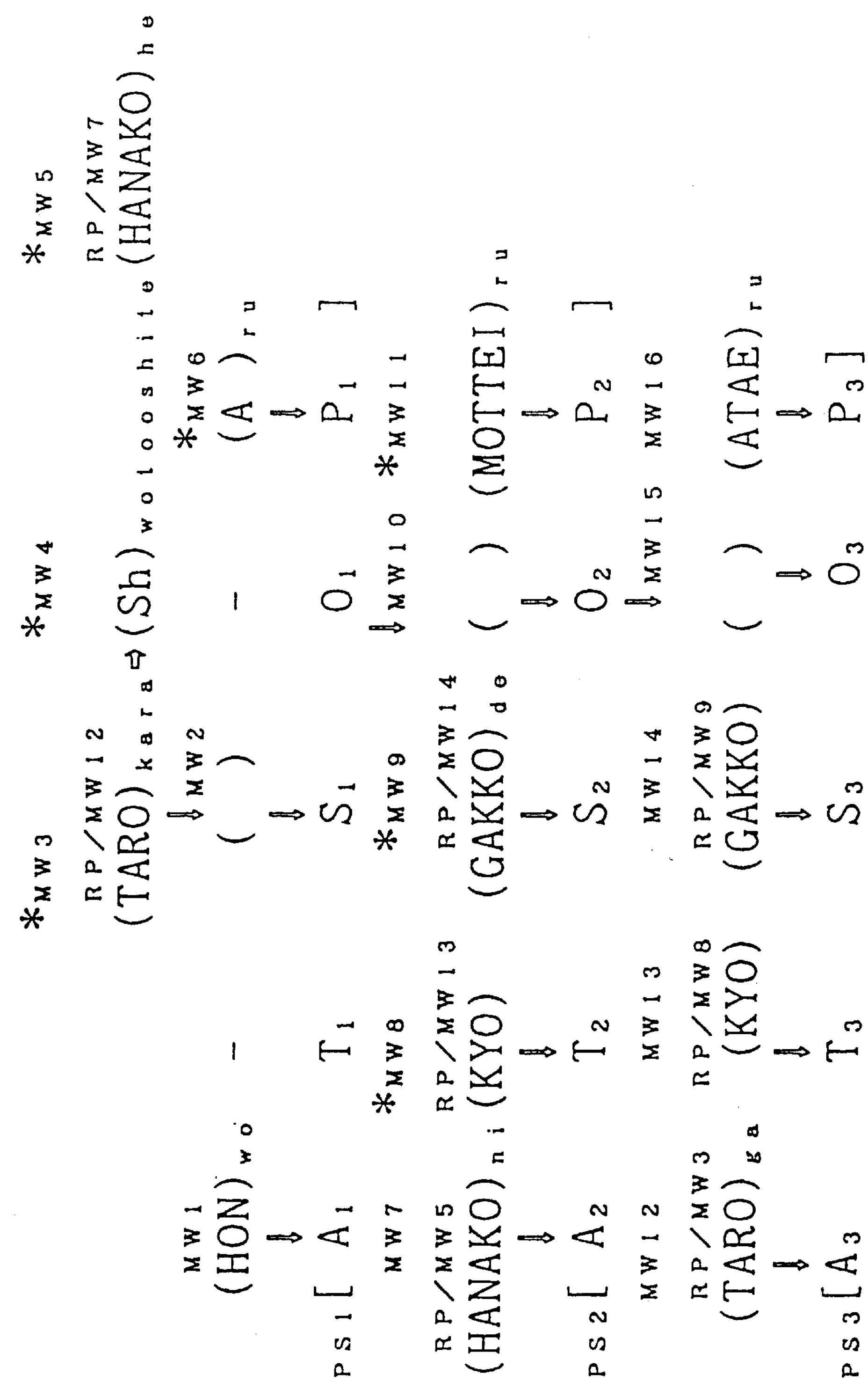

Fig.50( b )
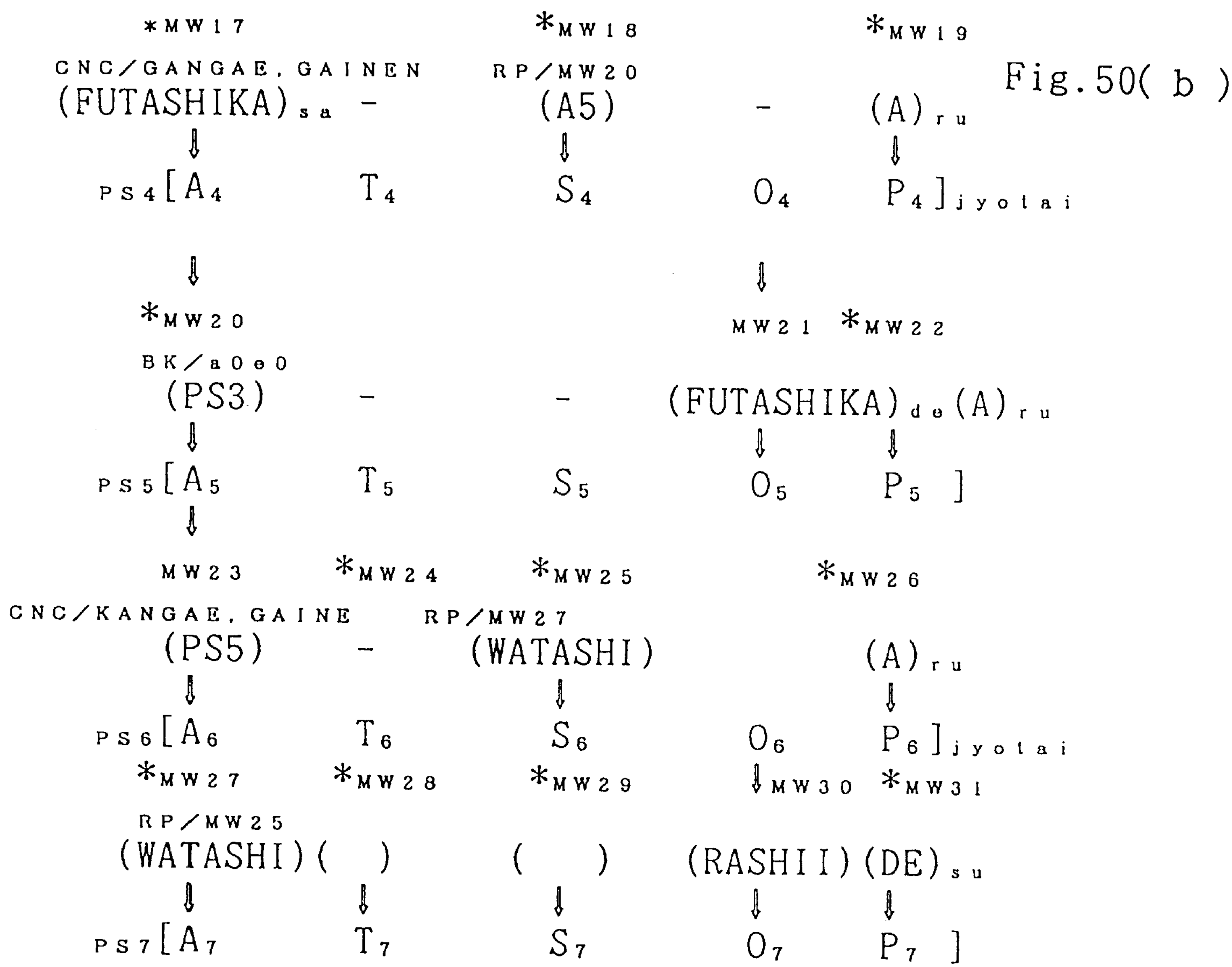

Fig.51( b )
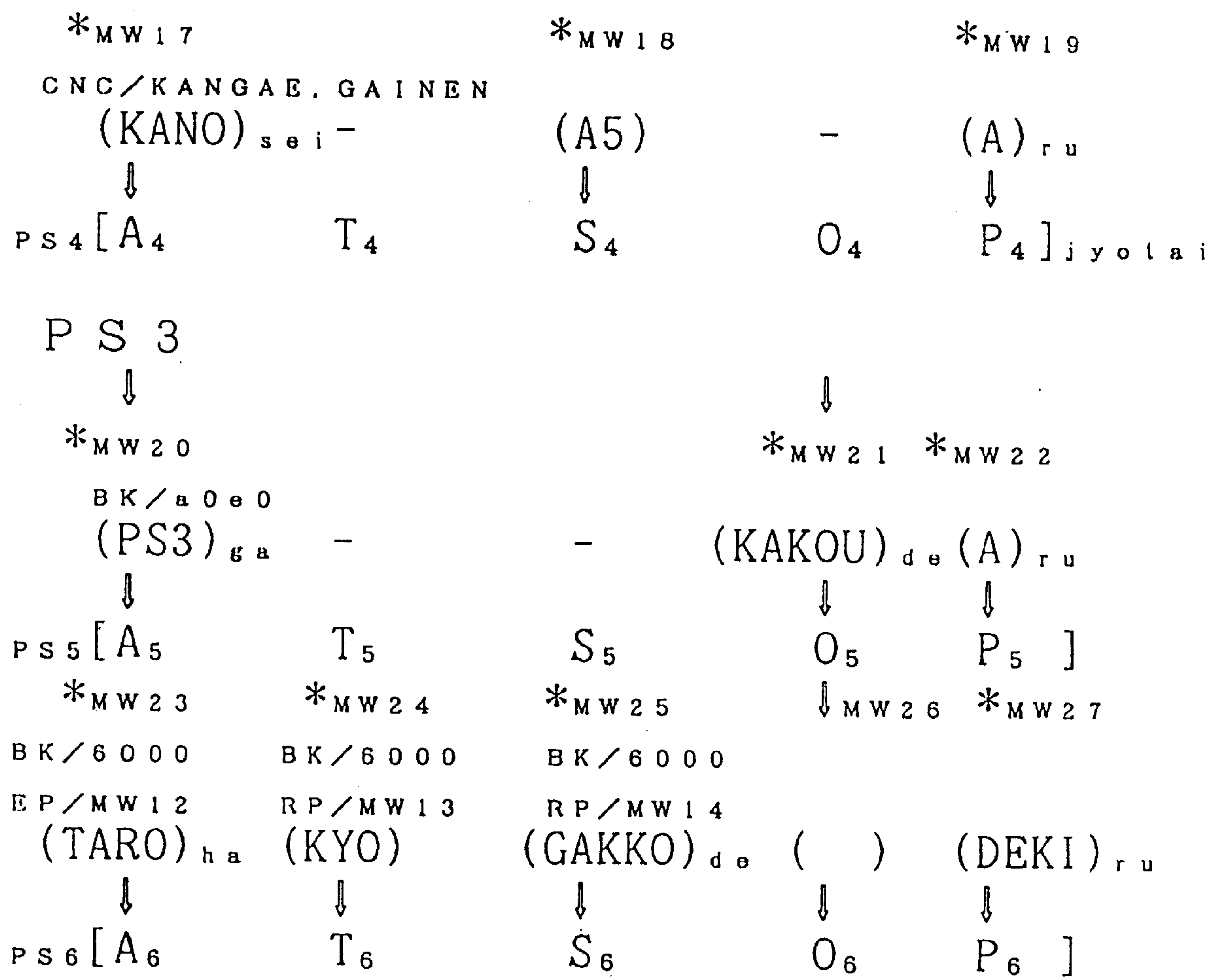

Fig.53( a )
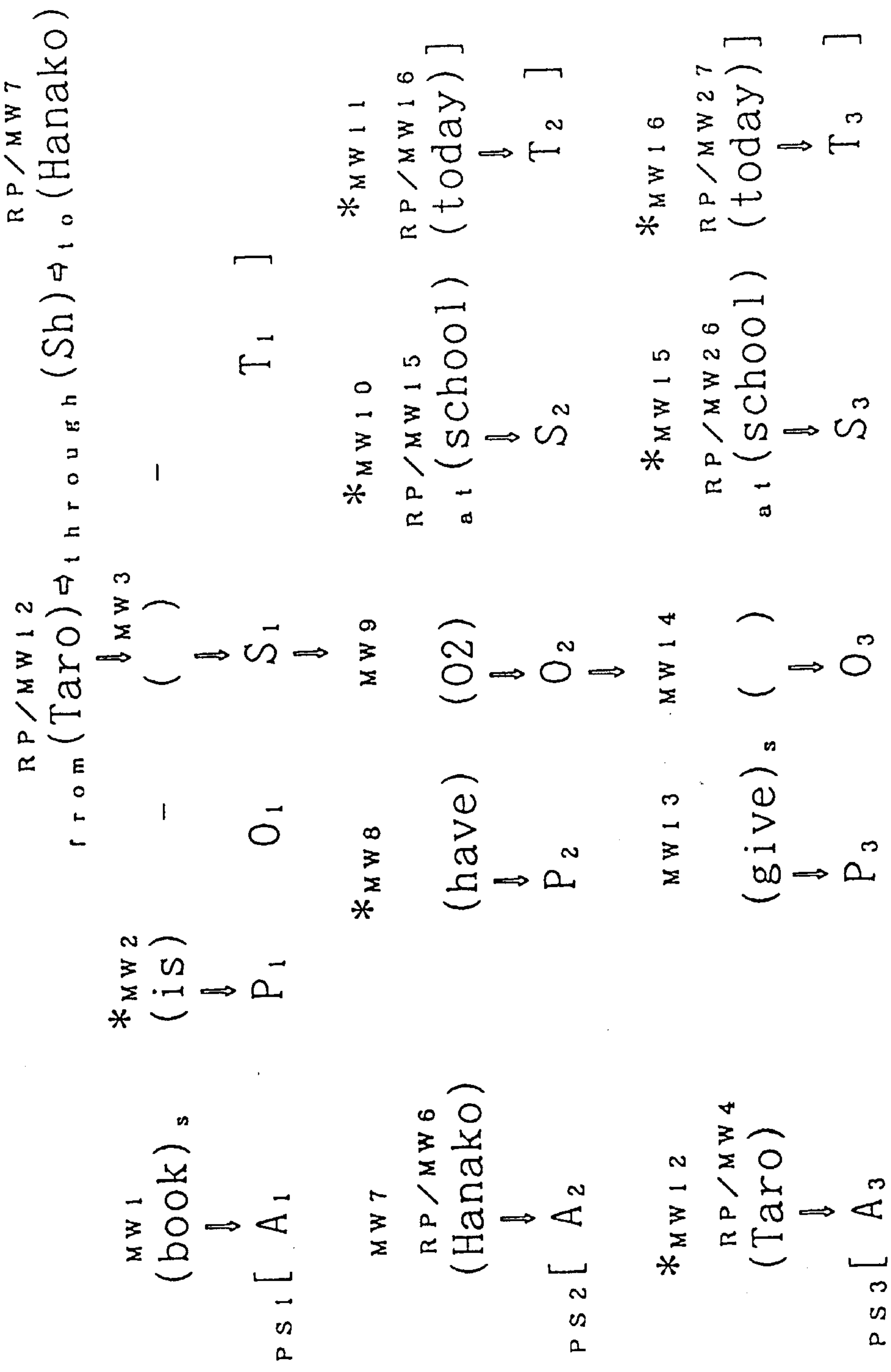

Fig.53( b )
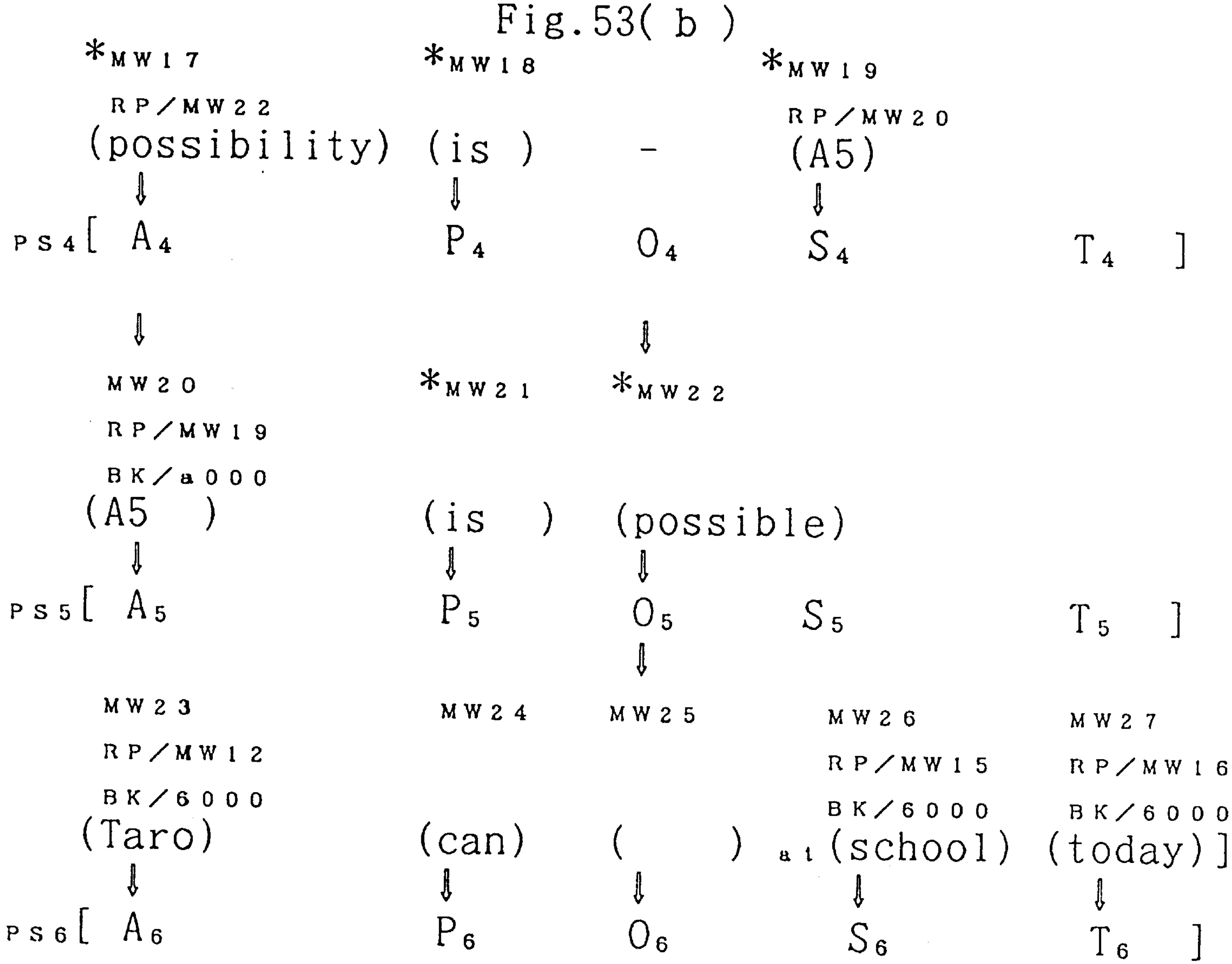

Fig.54( a )
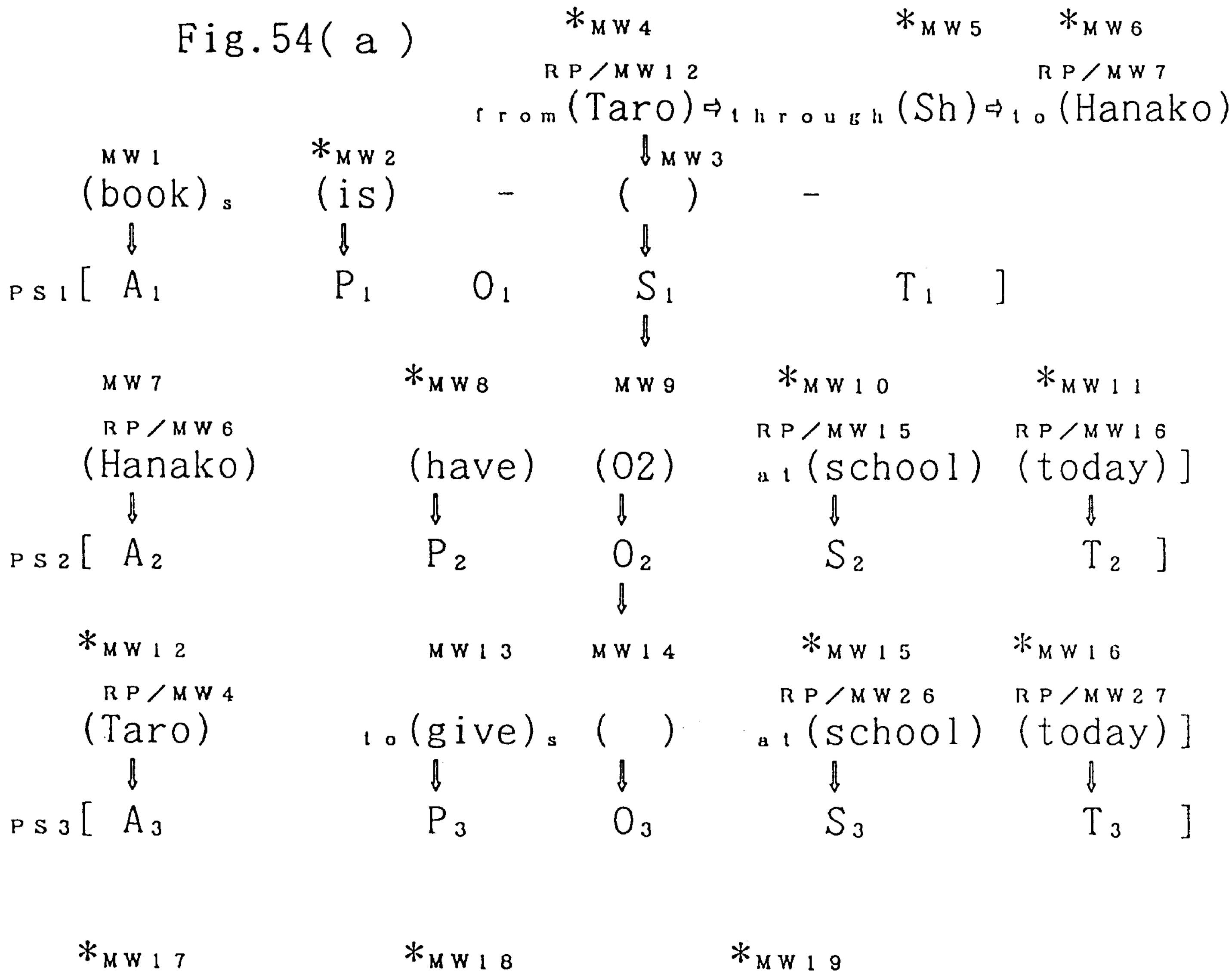

Fig.55( a )
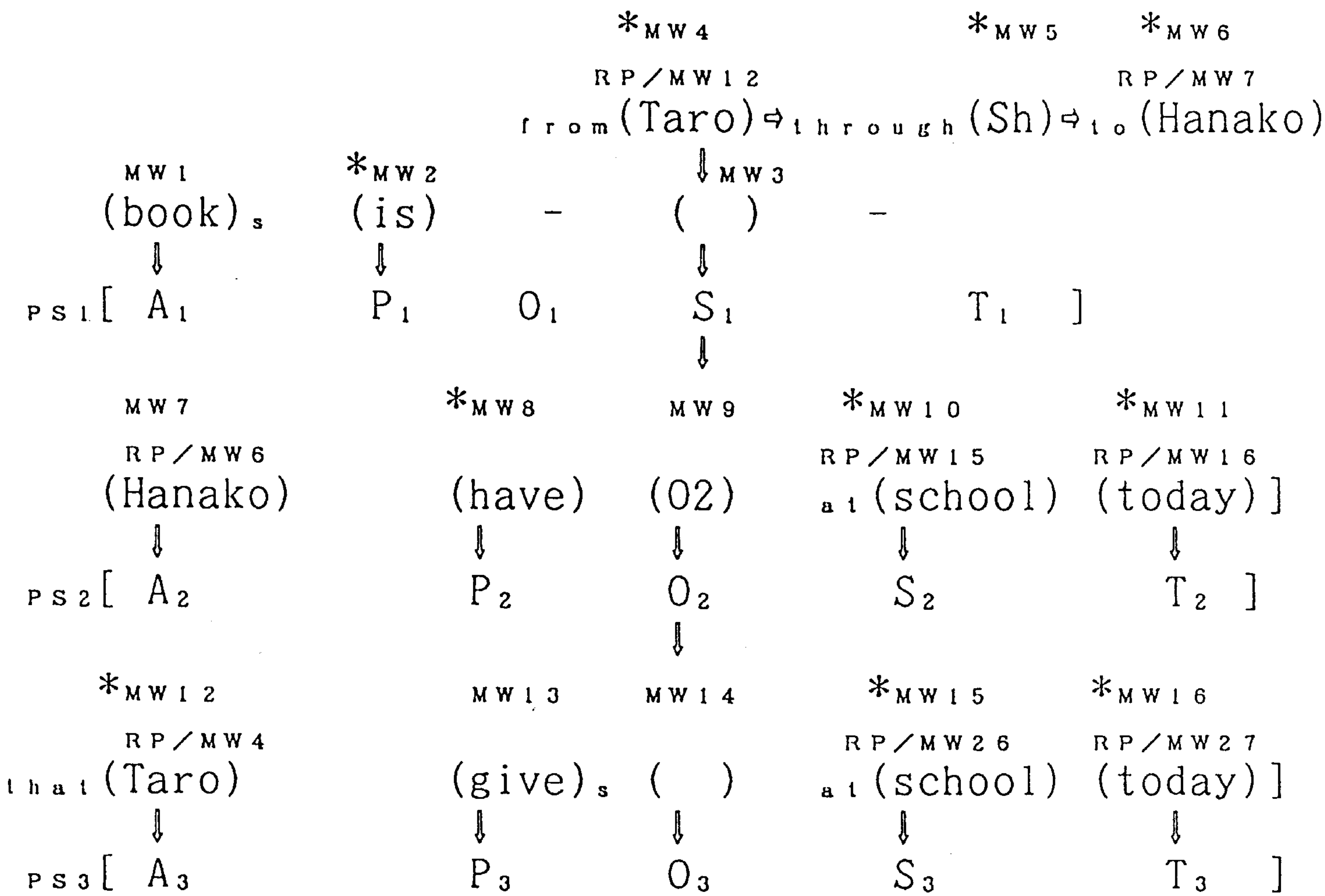

Fig.55( b )
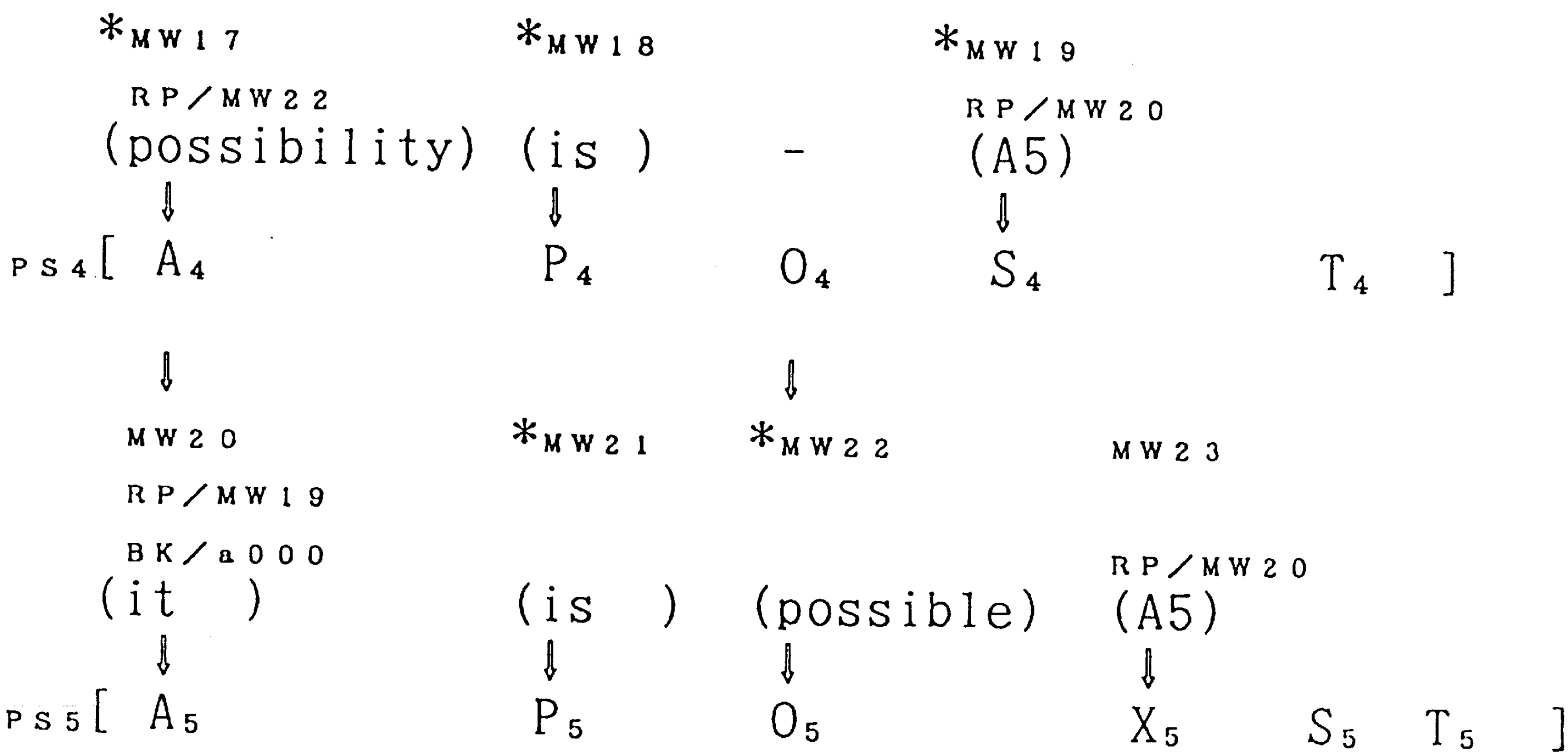

Figure 56:
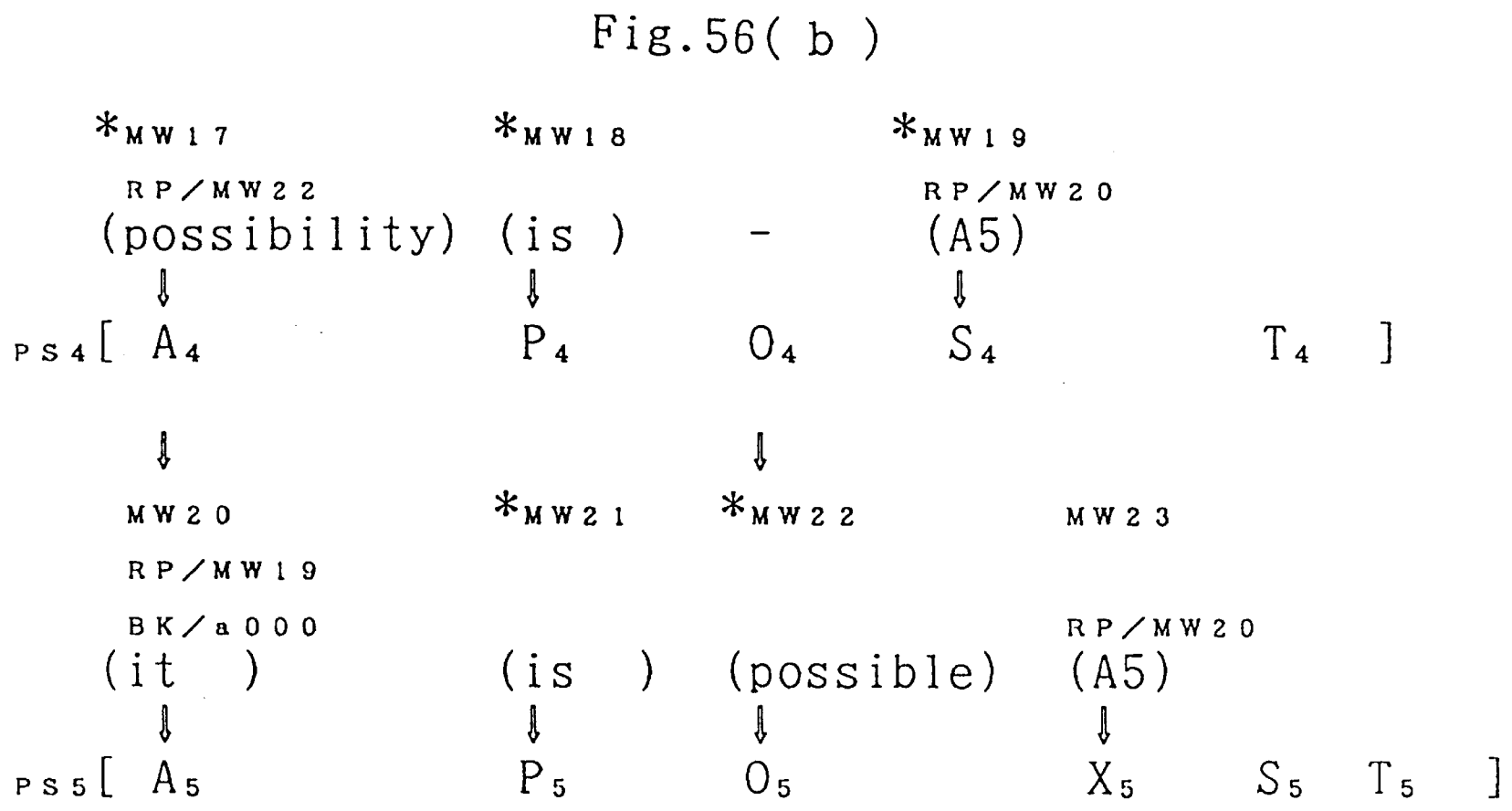

Fig.56( b )

| | | | | | | | |
|---|---|---|---|---|---|---|---|
| | *MW17 | *MW18 | | *MW19 | | | |
| | RP/MW22 | | | RP/MW20 | | | |
| | (possibility) | (is ) | - | (A5) | | | |
| | ⇓ | ⇓ | | ⇓ | | | |
| PS4[ | $A_4$ | $P_4$ | $O_4$ | $S_4$ | | $T_4$ | ] |
| | ⇓ | | ⇓ | | | | |
| | MW20 | *MW21 | *MW22 | MW23 | | | |
| | RP/MW19 | | | | | | |
| | BK/a000 | | | RP/MW20 | | | |
| | (it ) | (is ) | (possible) | (A5) | | | |
| | ⇓ | ⇓ | ⇓ | ⇓ | | | |
| PS5[ | $A_5$ | $P_5$ | $O_5$ | $X_5$ | $S_5$ | $T_5$ | ] |

Fig.60( a )
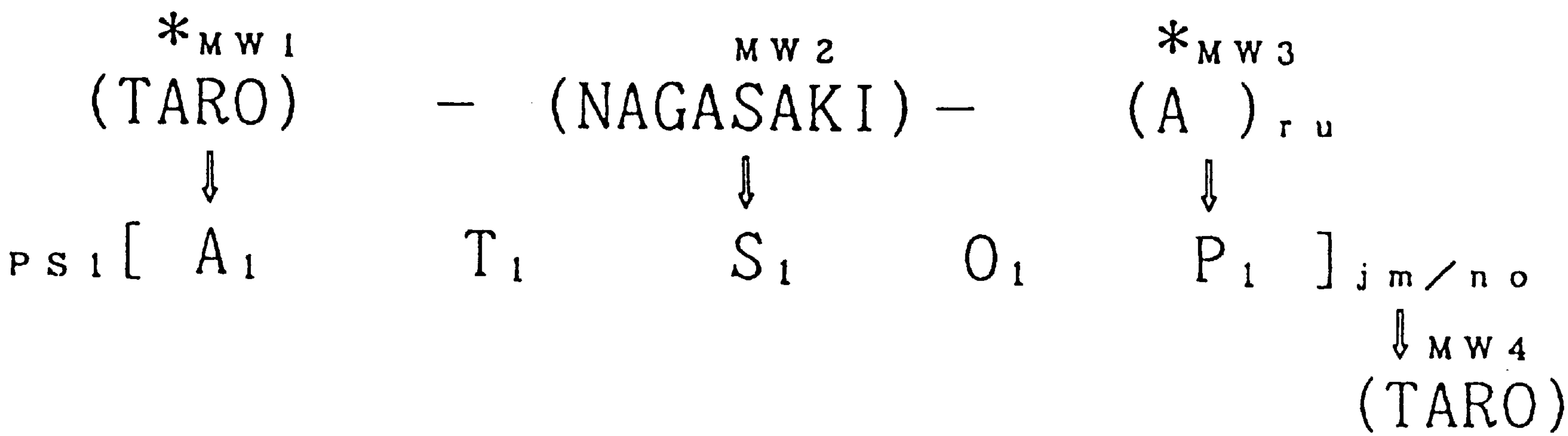

Fig.60( b )

$$
\underset{PS1[\;A_1}{\overset{*_{MW1}}{\text{(OTOUTO)}}\Downarrow} \;-\; T_1 \;\; \underset{S_1}{\overset{MW2}{\text{(TARO)}}\Downarrow} \;-\; O_1 \;\; \underset{P_1}{\overset{*_{MW3}}{(A\;)_{ru}}\Downarrow} \;\; ]_{jm/no} \Downarrow_{MW4} \text{(OTOUTO)}
$$

Fig.60( c )
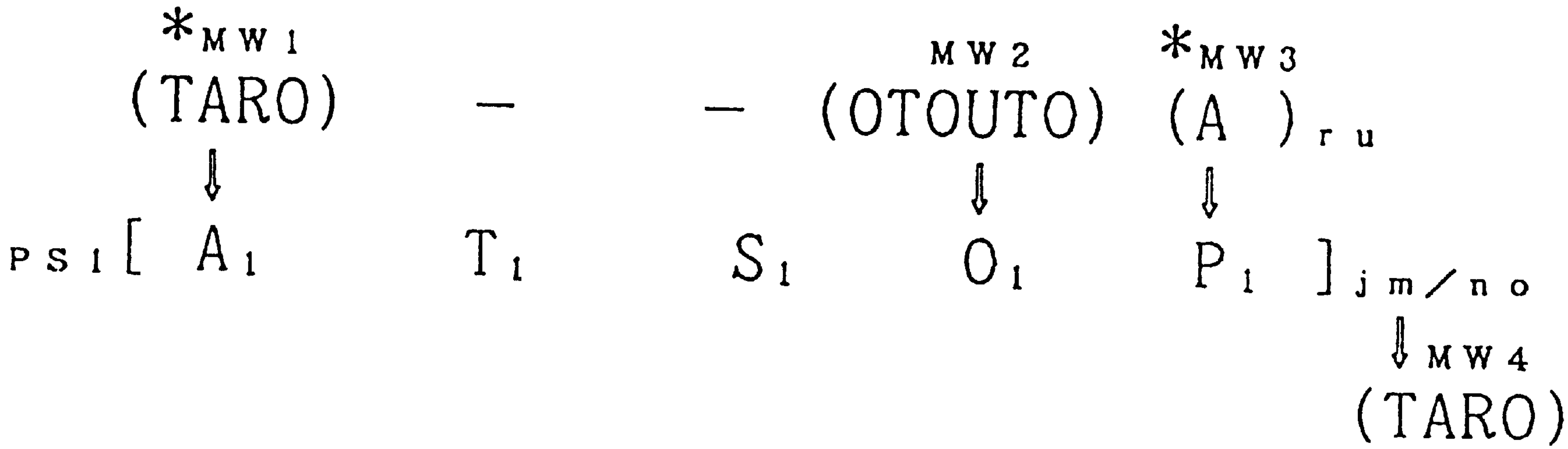

Fig.61

| ptn-no | dps-st | dps-ed | dmw-st | dmw-ed | k n j |
|---|---|---|---|---|---|
| 1 | 1 | 1 | 1 | 4 | GAA.ru |
| 2 | 2 | 2 | 5 | 9 | DEA.ru |
| 3 | 3 | 3 | 10 | 14 | RE.ru |
| 4 | 4 | 4 | 15 | 19 | SU.ru |
| 5 | 5 | 5 | 20 | 24 | SE.ru |
| 6 | 6 | 7 | 25 | 32 | O.ku |
| 7 | 8 | 9 | 33 | 40 | MO.tsu |
| 8 | 10 | 11 | 41 | 48 | OMO.u |
| 9 | 12 | 13 | 49 | 56 | KANJI.ru |
| 10 | 14 | 15 | 57 | 67 | HAKO.bu |
| 11 | 16 | 17 | 68 | 78 | I.ku |
| 12 | 18 | 18 | 79 | 89 | KU.ru |
| 13 | 20 | 21 | 90 | 100 | TO.bu |
| 14 | 22 | 24 | 101 | 116 | ATAE.ru |
| 15 | 25 | 27 | 117 | 132 | OSHIE.ru |
| 16 | 28 | 29 | 133 | 140 | UKA.bu |
| 17 | 30 | 32 | 141 | 153 | UKABA.su |
| 18 | 33 | 34 | 154 | 163 | SHI.nu |
| 19 | 35 | 37 | 164 | 178 | KORO.su |
| 20 | 38 | 41 | 179 | 192 | RASHI.i |
| 21 | 42 | 44 | 193 | 203 | DEKI.ru |
| 22 | 45 | 46 | 204 | 211 | GENNKI |
| 23 | 47 | 48 | 212 | 220 | SHIRO.i |
| 24 | 49 | 51 | 212 | 236 | NAGE.ru |

Fig.62-1

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 01 | a000 | 0000 | 0000 | 1 | 2 | 3 | 00 | 4 | 00 | 0 | 0 | 0 | 0 | 0000 | 00 | 00 | 00 | 00 | 00 |
| 02 | a000 | 0000 | 0000 | 00 | 5 | 6 | 7 | 8 | 9 | 0 | 0 | 0 | 0 | 0000 | 00 | 00 | 00 | 00 | 00 |
| 03 | a000 | 0000 | 0000 | 00 | 10 | 11 | 12 | 13 | 14 | 0 | 0 | 0 | 0 | 0000 | 00 | 00 | 00 | 00 | 00 |
| 04 | 0000 | 0000 | 0000 | 00 | 15 | 16 | 17 | 18 | 19 | 0 | 0 | 0 | 0 | 0000 | 00 | 00 | 00 | 00 | 00 |
| 05 | a000 | 0000 | 0000 | 00 | 20 | 21 | 22 | 23 | 24 | 0 | 0 | 0 | 0 | 0000 | 00 | 00 | 00 | 00 | 00 |
| 06 | 1000 | 0000 | 0000 | 31 | 25 | 00 | 26 | 00 | 27 | 0 | 0 | 0 | 0 | 0000 | 00 | 00 | 00 | 00 | 00 |
| 07 | e000 | 0000 | 0000 | 00 | 28 | 29 | 30 | 31 | 32 | 0 | 0 | 0 | 0 | 0000 | 00 | 00 | 00 | 00 | 00 |
| 08 | 1000 | 0000 | 0000 | 39 | 33 | 00 | 34 | 00 | 35 | 0 | 0 | 0 | 0 | 0000 | 00 | 00 | 00 | 00 | 00 |
| 09 | e000 | 0000 | 0000 | 00 | 36 | 37 | 38 | 39 | 40 | 0 | 0 | 0 | 0 | 0000 | 00 | 00 | 00 | 00 | 00 |
| 10 | 1000 | 0000 | 0000 | 47 | 41 | 00 | 42 | 00 | 43 | 0 | 0 | 0 | 0 | 0000 | 00 | 00 | 00 | 00 | 00 |
| 11 | e000 | 0000 | 0000 | 00 | 44 | 45 | 46 | 47 | 48 | 0 | 0 | 0 | 0 | 0000 | 00 | 00 | 00 | 00 | 00 |
| 12 | 1000 | 0000 | 0000 | 55 | 49 | 00 | 50 | 00 | 51 | 0 | 0 | 0 | 0 | 0000 | 00 | 00 | 00 | 00 | 00 |
| 13 | e000 | 0000 | 0000 | 00 | 52 | 53 | 54 | 55 | 56 | 0 | 0 | 0 | 0 | 0000 | 00 | 00 | 00 | 00 | 00 |
| 14 | 1000 | 0000 | 0000 | 66 | 57 | 00 | 58 | 00 | 62 | 0 | 0 | 0 | 0 | 0000 | 00 | 00 | 00 | 00 | 00 |
| 15 | e000 | 0000 | 0000 | 00 | 63 | 64 | 65 | 66 | 67 | 0 | 0 | 0 | 0 | 0000 | 00 | 00 | 00 | 00 | 00 |
| 16 | 1000 | 0000 | 0000 | 77 | 68 | 00 | 69 | 00 | 73 | 0 | 0 | 0 | 0 | 0000 | 00 | 00 | 00 | 00 | 00 |
| 17 | e000 | 0000 | 0000 | 00 | 74 | 75 | 76 | 77 | 78 | 0 | 0 | 0 | 0 | 0000 | 00 | 00 | 00 | 00 | 00 |
| 18 | 1000 | 0000 | 0000 | 88 | 79 | 00 | 80 | 00 | 84 | 0 | 0 | 0 | 0 | 0000 | 00 | 00 | 00 | 00 | 00 |
| 19 | e000 | 0000 | 0000 | 00 | 85 | 86 | 87 | 88 | 89 | 0 | 0 | 0 | 0 | 0000 | 00 | 00 | 00 | 00 | 00 |
| 20 | 1000 | 0000 | 0000 | 99 | 98 | 00 | 91 | 00 | 95 | 0 | 0 | 0 | 0 | 0000 | 00 | 00 | 00 | 00 | 00 |
| 21 | e000 | 0000 | 0000 | 00 | 96 | 87 | 98 | 99 | 100 | 0 | 0 | 0 | 0 | 0000 | 00 | 00 | 00 | 00 | 00 |
| 22 | 1000 | 0000 | 0000 | 110 | 101 | 00 | 102 | 00 | 106 | 0 | 0 | 0 | 0 | 0000 | 00 | 00 | 00 | 00 | 00 |
| 23 | 0000 | 0000 | 0000 | 115 | 107 | 108 | 109 | 110 | 111 | 0 | 0 | 0 | 0 | 0000 | 00 | 00 | 00 | 00 | 00 |
| 24 | e000 | 0000 | 0000 | 00 | 112 | 113 | 114 | 115 | 116 | 0 | 0 | 0 | 0 | 0000 | 00 | 00 | 00 | 00 | 00 |
| 25 | 1000 | 0000 | 0000 | 126 | 117 | 00 | 118 | 00 | 122 | 0 | 0 | 0 | 0 | 0000 | 00 | 00 | 00 | 00 | 00 |
| 26 | 0000 | 0000 | 0000 | 131 | 123 | 124 | 125 | 126 | 127 | 0 | 0 | 0 | 0 | 0000 | 00 | 00 | 00 | 00 | 00 |
| 27 | e000 | 0000 | 0000 | 00 | 128 | 129 | 130 | 131 | 132 | 0 | 0 | 0 | 0 | 0000 | 00 | 00 | 00 | 00 | 00 |
| 28 | 1000 | 0000 | 0000 | 139 | 133 | 00 | 134 | 00 | 135 | 0 | 0 | 0 | 0 | 0000 | 00 | 00 | 00 | 00 | 00 |
| 29 | e000 | 0000 | 0000 | 00 | 136 | 137 | 138 | 139 | 140 | 0 | 0 | 0 | 0 | 0000 | 00 | 00 | 00 | 00 | 00 |

Fig.62-2

```
no -MK  -NTN -KY  -L -A -T -S -O -P -X-Y-Z-j1 -jntn-jn-jm-jost-j2-SC
30 1000 0000 0000 14714100 14200 1430 0 0 0  0000 00 00 00   00 00
31 0000 0000 0000 152144145146147148O 0 0 0  0000 00 00 00   00 00
32 e000 0000 0000 00 149150151152153O 0 0 0  0000 00 00 00   00 00
33 1000 0000 0000 16215400 15500 1560 0 0 0  0000 00 00 00   00 00
34 e000 0000 0000 00 159160161162163O 0 0 0  0000 00 00 00   00 00
35 1000 0000 0000 17216400 16500 1660 0 0 0  0000 00 00 00   00 00
36 0000 0000 0000 177169170171172173O 0 0 0  0000 00 00 00   00 00
37 e000 0000 0000 00 174175176177178O 0 0 0  0000 00 00 00   00 00
38 1000 0000 0000 18317900 18000 1810 0 0 0  0000 00 00 00   00 00
39 0000 0000 0000 18518200 00 1831840 0 0 0  0000 00 00 00   00 00
40 0000 0000 0000 19118500 18600 1870 0 0 0  0000 00 00 00   00 00
41 e000 0000 0000 00 188189190191192O 0 0 0  0000 00 00 00   00 00
42 1000 0000 0000 19719300 19400 1950 0 0 0  0000 00 00 00   00 00
43 0000 0000 0000 20219600 00 1971980 0 0 0  0000 00 00 00   00 00
44 e000 0000 0000 00 199200201202203O 0 0 0  0000 00 00 00   00 00
45 1000 0000 0000 21020400 20500 2060 0 0 0  0000 00 00 00   00 00
46 e000 0000 0000 00 207208209210211O 0 0 0  0000 00 00 00   00 00
47 1000 0000 0000 21921200 2132142150 0 0 0  0000 00 00 00   00 00
48 e000 0000 0000 00 216217218219220O 0 0 0  0000 00 00 00   00 00
49 1000 0000 0000 23022100 22200 2260 0 0 0  0000 00 00 00   00 00
50 0000 0000 0000 235227228229230231O 0 0 0  0000 00 00 00   00 00
51 e000 0000 0000 00 232233234235236O 0 0 0  0000 00 00 00   00 00
```

Fig.63-1

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 001 | 0001 | 000e | 0000 | 0000 | 00 | 00 | 1 | 00 | 00 | 00 | 0 | 0 | 00 | 00 | 0000 | 000 | 00 | 000 | 000 | 000 | 000 | 000 | 000 | 000 | 101 |
| 002 | 0002 | 000e | 0000 | 0000 | 00 | 00 | 1 | 00 | 00 | 00 | 0 | 0 | 00 | 00 | 0000 | 000 | 00 | 000 | 000 | 000 | 000 | 000 | 000 | 000 | 1101 |
| 003 | 0003 | 000e | 0000 | 0000 | 00 | 00 | 1 | 00 | 00 | 00 | 0 | 0 | 00 | 00 | 0000 | 000 | 00 | 000 | 000 | 000 | 000 | 000 | 000 | 000 | 1501 |
| 004 | 0005 | 000e | 0000 | 0000 | 00 | 00 | 1 | 00 | 00 | 00 | 0 | 0 | 00 | 00 | 0000 | 000 | 00 | 000 | 000 | 000 | 000 | 000 | 000 | 000 | 0000 |
| 005 | 0001 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 401 |
| 006 | 0002 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 1101 |
| 007 | 0003 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 1501 |
| 008 | 0004 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 0000 |
| 009 | 0005 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 0000 |
| 010 | 0001 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 701 |
| 011 | 0002 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1101 |
| 012 | 0003 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1501 |
| 013 | 0004 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 0000 |
| 014 | 0005 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 0000 |
| 015 | 0001 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 701 |
| 016 | 0002 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 1101 |
| 017 | 0003 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 1501 |
| 018 | 0004 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 0000 |
| 019 | 0005 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 0000 |
| 020 | 0001 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 0000 |
| 021 | 0002 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 0000 |
| 022 | 0003 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 0000 |
| 023 | 0004 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 0000 |
| 024 | 0005 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 0000 |
| 025 | 0001 | e00e | 0000 | 0000 | 00 | 00 | 6 | 00 | 28 | 00 | 0 | 0 | 00 | 00 | A | 000 | 00 | 000 | 000 | 000 | 000 | 000 | 000 | 000 | 0000 |
| 026 | 0003 | 000e | 0000 | 0000 | 00 | 00 | 6 | 00 | 00 | 00 | 0 | 0 | 00 | 00 | 0000 | 000 | 00 | 000 | 000 | 000 | 000 | 000 | 000 | 000 | 1601 |
| 027 | 0005 | e00e | 0000 | 0000 | 00 | 00 | 6 | 00 | 00 | 00 | 0 | 0 | 00 | 00 | 0000 | 000 | 00 | 000 | 000 | 000 | 000 | 000 | 000 | 000 | 0000 |
| 028 | 0001 | 000e | 0000 | 0000 | 00 | 00 | 7 | 00 | 00 | 00 | 0 | 0 | 00 | 00 | 0000 | 000 | 00 | 000 | 000 | 000 | 000 | 000 | 000 | 000 | 701 |
| 029 | 0002 | 000e | 0000 | 0000 | 00 | 00 | 7 | 00 | 00 | 00 | 0 | 0 | 00 | 00 | 0000 | 000 | 00 | 000 | 000 | 000 | 000 | 000 | 000 | 000 | 1101 |

Fig.63-2

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 030 | 0003 | 000e | 0000 | 0000 | 00 | 00 | 7 | 00 | 00 | 00 | 0 | 0 | 00 | 00 | 0000 | 000 | 00 | 000 | 000 | 000 | 000 | 000 | 000 | 000 | 1501 |
| 031 | 0004 | 00ee | 0000 | 0000 | 00 | 00 | 7 | 6 | 00 | 00 | 0 | 0 | 00 | 00 | 0000 | 000 | 00 | 000 | 000 | 000 | 000 | 000 | 000 | 000 | 0000 |
| 032 | 0005 | 000e | 0000 | 0000 | 00 | 00 | 7 | 00 | 00 | 00 | 0 | 0 | 00 | 00 | 0000 | 000 | 00 | 000 | 000 | 000 | 000 | 000 | 000 | 000 | c01 |
| 033 | 0001 | 000e | 0000 | 0000 | 00 | 00 | 8 | 00 | 00 | 00 | 0 | 0 | 00 | 00 | 0000 | 000 | 00 | 000 | 000 | 000 | 000 | 000 | 000 | 000 | 0000 |
| 034 | 0003 | e00e | 0000 | 0000 | 00 | 00 | 8 | 00 | 36 | 00 | 0 | 0 | 00 | 00 | 0000 | 000 | 00 | 000 | 000 | 000 | 000 | 000 | 000 | 000 | 0000 |
| 035 | 0005 | e00e | 0000 | 0000 | 00 | 00 | 8 | 00 | 00 | 00 | 0 | 0 | 00 | 00 | A | 000 | 00 | 000 | 000 | 000 | 000 | 000 | 000 | 000 | 0000 |
| 036 | 0001 | 000e | 0000 | 0000 | 00 | 00 | 9 | 00 | 00 | 00 | 0 | 0 | 00 | 00 | 0000 | 000 | 00 | 000 | 000 | 000 | 000 | 000 | 000 | 000 | 701 |
| 037 | 0002 | 000e | 0000 | 0000 | 00 | 00 | 9 | 00 | 00 | 00 | 0 | 0 | 00 | 00 | 0000 | 000 | 00 | 000 | 000 | 000 | 000 | 000 | 000 | 000 | 1101 |
| 038 | 0003 | 000e | 0000 | 0000 | 00 | 00 | 9 | 00 | 00 | 00 | 0 | 0 | 00 | 00 | 0000 | 000 | 00 | 000 | 000 | 000 | 000 | 000 | 000 | 000 | 1501 |
| 039 | 0004 | 00ee | 0000 | 0000 | 00 | 00 | 9 | 8 | 00 | 00 | 0 | 0 | 00 | 00 | 0000 | 000 | 00 | 000 | 000 | 000 | 000 | 000 | 000 | 000 | 0000 |
| 040 | 0005 | 000e | 0000 | 0000 | 00 | 00 | 9 | 00 | 00 | 00 | 0 | 0 | 00 | 00 | 0000 | 000 | 00 | 000 | 000 | 000 | 000 | 000 | 000 | 000 | 0000 |
| 041 | 0001 | 000e | 0000 | 0000 | 00 | 00 | 10 | 00 | 00 | 00 | 0 | 0 | 00 | 00 | 0000 | KANGAE | | 000 | 000 | 000 | 000 | 000 | 000 | 000 | c01 |
| 042 | 0003 | e00e | 0000 | 0000 | 00 | 00 | 10 | 00 | 44 | 00 | 0 | 0 | 00 | 00 | 0000 | 000 | 00 | 000 | 000 | 000 | 000 | 000 | 000 | 000 | 1701 |
| 043 | 0005 | e00e | 0000 | 0000 | 00 | 00 | 10 | 00 | 00 | 00 | 0 | 0 | 00 | 00 | A | 000 | 00 | 000 | 000 | 000 | 000 | 000 | 000 | 000 | 0000 |
| 044 | 0001 | 000e | 0000 | 0000 | 00 | 00 | 11 | 00 | 00 | 00 | 0 | 0 | 00 | 00 | 0000 | 000 | 00 | 000 | 000 | 000 | 000 | 000 | 000 | 000 | 701 |
| 045 | 0002 | 000e | 0000 | 0000 | 00 | 00 | 11 | 00 | 00 | 00 | 0 | 0 | 00 | 00 | 0000 | 000 | 00 | 000 | 000 | 000 | 000 | 000 | 000 | 000 | 1101 |
| 046 | 0003 | 000e | 0000 | 0000 | 00 | 00 | 11 | 00 | 00 | 00 | 0 | 0 | 00 | 00 | 0000 | 000 | 00 | 000 | 000 | 000 | 000 | 000 | 000 | 000 | 1501 |
| 047 | 0004 | 00ee | 0000 | 0000 | 00 | 00 | 11 | 10 | 00 | 00 | 0 | 0 | 00 | 00 | 0000 | 000 | 00 | 000 | 000 | 000 | 000 | 000 | 000 | 000 | 0000 |
| 048 | 0005 | 000e | 0000 | 0000 | 00 | 00 | 11 | 00 | 00 | 00 | 0 | 0 | 00 | 00 | 0000 | 000 | 00 | 000 | 000 | 000 | 000 | 000 | 000 | 000 | 0000 |
| 049 | 0001 | 000e | 0000 | 0000 | 00 | 00 | 12 | 00 | 00 | 00 | 0 | 0 | 00 | 00 | 0000 | KANJYO | | 000 | 000 | 000 | 000 | 000 | 000 | 000 | c01 |
| 050 | 0003 | e00e | 0000 | 0000 | 00 | 00 | 12 | 00 | 52 | 00 | 0 | 0 | 00 | 00 | 0000 | 000 | 00 | 000 | 000 | 000 | 000 | 000 | 000 | 000 | 1701 |
| 051 | 0005 | e00e | 0000 | 0000 | 00 | 00 | 12 | 00 | 00 | 00 | 0 | 0 | 00 | 00 | A | 000 | 00 | 000 | 000 | 000 | 000 | 000 | 000 | 000 | 0000 |
| 052 | 0001 | 000e | 0000 | 0000 | 00 | 00 | 13 | 00 | 00 | 00 | 0 | 0 | 00 | 00 | 0000 | 000 | 00 | 000 | 000 | 000 | 000 | 000 | 000 | 000 | 701 |
| 053 | 0002 | 000e | 0000 | 0000 | 00 | 00 | 13 | 00 | 00 | 00 | 0 | 0 | 00 | 00 | 0000 | 000 | 00 | 000 | 000 | 000 | 000 | 000 | 000 | 000 | 1101 |
| 054 | 0003 | 000e | 0000 | 0000 | 00 | 00 | 13 | 00 | 00 | 00 | 0 | 0 | 00 | 00 | 0000 | 000 | 00 | 000 | 000 | 000 | 000 | 000 | 000 | 000 | 1501 |
| 055 | 0004 | 00ee | 0000 | 0000 | 00 | 00 | 13 | 12 | 00 | 00 | 0 | 0 | 00 | 00 | 0000 | 000 | 00 | 000 | 000 | 000 | 000 | 000 | 000 | 000 | 0000 |
| 056 | 0005 | 000e | 0000 | 0000 | 00 | 00 | 13 | 00 | 00 | 00 | 0 | 0 | 00 | 00 | 0000 | 000 | 00 | 000 | 000 | 000 | 000 | 000 | 000 | 000 | 0000 |
| 057 | 0001 | 000e | 0000 | 0000 | 00 | 00 | 14 | 00 | 00 | 00 | 0 | 0 | 00 | 00 | 0000 | 000 | 00 | 000 | 000 | 000 | 000 | 000 | 000 | 000 | d01 |
| 058 | 0003 | 001e | 0000 | 0000 | 00 | 00 | 14 | 57 | 00 | 00 | 0 | 0 | 00 | 00 | 0000 | 000 | 00 | 000 | 000 | 000 | 000 | 000 | 000 | 000 | 0000 |
| 059 | 0000 | 0001 | 0000 | 0000 | 00 | 60 | 58 | 00 | 00 | 00 | 0 | 0 | 00 | 00 | 0000 | 000 | 00 | 000 | 000 | 000 | 000 | 000 | 000 | 000 | 1801 |

Fig.63-3

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 060 | e000 | 0000 | 0000 | 0000 | 59 | 61 | 00 | 00 | 00 | 00 | 0 | 0 | 00 | 00 | 0000 | 000 | 00 | 000 | 000 | 000 | 000 | 000 | 000 | 000 | 1901 |
| 061 | 0000 | 0000 | 0000 | 0000 | 60 | 00 | 00 | 00 | 00 | 00 | 0 | 0 | 00 | 00 | 0000 | 000 | 00 | 000 | 000 | 000 | 000 | 000 | 000 | 000 | 1a01 |
| 062 | 0005 | e00e | 0000 | 0000 | 00 | 00 | 14 | 00 | 00 | 00 | 0 | 0 | 00 | 00 | A | 000 | 00 | 000 | 000 | 000 | 000 | 000 | 000 | 000 | 0000 |
| 063 | 0001 | 000e | 0000 | 0000 | 00 | 00 | 15 | 00 | 00 | 00 | 0 | 0 | 00 | 00 | 0000 | 000 | 00 | 000 | 000 | 000 | 000 | 000 | 000 | 000 | 701 |
| 064 | 0002 | 000e | 0000 | 0000 | 00 | 00 | 15 | 00 | 00 | 00 | 0 | 0 | 00 | 00 | 0000 | 000 | 00 | 000 | 000 | 000 | 000 | 000 | 000 | 000 | 1101 |
| 065 | 0003 | 000e | 0000 | 0000 | 00 | 00 | 15 | 00 | 00 | 00 | 0 | 0 | 00 | 00 | 0000 | 000 | 00 | 000 | 000 | 000 | 000 | 000 | 000 | 000 | 1501 |
| 066 | 0004 | 00ee | 0000 | 0000 | 00 | 00 | 15 | 14 | 00 | 00 | 0 | 0 | 00 | 00 | 0000 | 000 | 00 | 000 | 000 | 000 | 000 | 000 | 000 | 000 | 0000 |
| 067 | 0005 | 000e | 0000 | 0000 | 00 | 00 | 15 | 00 | 00 | 00 | 0 | 0 | 00 | 00 | 0000 | 000 | 00 | 000 | 000 | 000 | 000 | 000 | 000 | 000 | 0000 |
| 068 | 0001 | e00e | 0000 | 0000 | 00 | 00 | 16 | 00 | 74 | 00 | 0 | 0 | 00 | 00 | 0000 | 000 | 00 | 000 | 000 | 000 | 000 | 000 | 000 | 000 | 0000 |
| 069 | 0003 | 001e | 0000 | 0000 | 00 | 00 | 16 | 70 | 00 | 00 | 0 | 0 | 00 | 00 | 0000 | 000 | 00 | 000 | 000 | 000 | 000 | 000 | 000 | 000 | 0000 |
| 070 | 0000 | 0001 | 0000 | 0000 | 00 | 71 | 69 | 00 | 00 | 00 | 0 | 0 | 00 | 00 | 0000 | KOCHIRA | | 000 | 000 | 000 | 000 | 000 | 000 | 000 | 1801 |
| 071 | 0000 | e000 | 0000 | 0000 | 70 | 72 | 00 | 00 | 00 | 00 | 0 | 0 | 00 | 00 | 0000 | 000 | 00 | 000 | 000 | 000 | 000 | 000 | 000 | 000 | 1901 |
| 072 | 0000 | 0000 | 0000 | 0000 | 71 | 00 | 00 | 00 | 00 | 00 | 0 | 0 | 00 | 00 | 0000 | ACHIRA | | 000 | 000 | 000 | 000 | 000 | 000 | 000 | 1a01 |
| 073 | 0005 | e00e | 0000 | 0000 | 00 | 00 | 16 | 00 | 00 | 00 | 0 | 0 | 00 | 00 | 0000 | 000 | 00 | 000 | 000 | 000 | 000 | 000 | 000 | 000 | 0000 |
| 074 | 0001 | 0000 | 0000 | 0000 | 00 | 00 | 17 | 00 | 00 | 00 | 0 | 0 | 00 | 00 | 0000 | 000 | 00 | 000 | 000 | 000 | 000 | 000 | 000 | 000 | 701 |
| 075 | 0002 | 0000 | 0000 | 0000 | 00 | 00 | 17 | 00 | 00 | 00 | 0 | 0 | 00 | 00 | 0000 | 000 | 00 | 000 | 000 | 000 | 000 | 000 | 000 | 000 | 1101 |
| 076 | 0003 | 0000 | 0000 | 0000 | 00 | 00 | 17 | 00 | 00 | 00 | 0 | 0 | 00 | 00 | 0000 | 000 | 00 | 000 | 000 | 000 | 000 | 000 | 000 | 000 | 1501 |
| 077 | 0004 | 00ee | 0000 | 0000 | 00 | 00 | 17 | 00 | 00 | 00 | 0 | 0 | 00 | 00 | 0000 | 000 | 00 | 000 | 000 | 000 | 000 | 000 | 000 | 000 | 0000 |
| 078 | 0005 | 000e | 0000 | 0000 | 00 | 00 | 17 | 00 | 00 | 00 | 0 | 0 | 00 | 00 | 0000 | 000 | 00 | 000 | 000 | 000 | 000 | 000 | 000 | 000 | 0000 |
| 079 | 0001 | e00e | 0000 | 0000 | 00 | 00 | 18 | 00 | 85 | 00 | 0 | 0 | 00 | 00 | 0000 | 000 | 00 | 000 | 000 | 000 | 000 | 000 | 000 | 000 | 0000 |
| 080 | 0003 | 001e | 0000 | 0000 | 00 | 00 | 18 | 81 | 00 | 00 | 0 | 0 | 00 | 00 | 0000 | 000 | 00 | 000 | 000 | 000 | 000 | 000 | 000 | 000 | 0000 |
| 081 | 0000 | 0001 | 0000 | 0000 | 00 | 82 | 80 | 00 | 00 | 00 | 0 | 0 | 00 | 00 | 0000 | ACHIRA | | 000 | 000 | 000 | 000 | 000 | 000 | 000 | 1801 |
| 082 | 0000 | e000 | 0000 | 0000 | 80 | 83 | 00 | 00 | 00 | 00 | 0 | 0 | 00 | 00 | 0000 | 000 | 00 | 000 | 000 | 000 | 000 | 000 | 000 | 000 | 1901 |
| 083 | 0000 | 0000 | 0000 | 0000 | 82 | 00 | 00 | 00 | 00 | 00 | 0 | 0 | 00 | 00 | 0000 | KOCHIRA | | 000 | 000 | 000 | 000 | 000 | 000 | 000 | 1a01 |
| 084 | 0005 | 0000 | 0000 | 0000 | 00 | 00 | 18 | 00 | 00 | 00 | 0 | 0 | 00 | 00 | 0000 | 000 | 00 | 000 | 000 | 000 | 000 | 000 | 000 | 000 | 0000 |
| 085 | 0001 | 000e | 0000 | 0000 | 00 | 00 | 19 | 00 | 00 | 00 | 0 | 0 | 00 | 00 | 0000 | 000 | 00 | 000 | 000 | 000 | 000 | 000 | 000 | 000 | 701 |
| 086 | 0002 | 000e | 0000 | 0000 | 00 | 00 | 19 | 00 | 00 | 00 | 0 | 0 | 00 | 00 | 0000 | 000 | 00 | 000 | 000 | 000 | 000 | 000 | 000 | 000 | 1101 |
| 087 | 0003 | 000e | 0000 | 0000 | 00 | 00 | 19 | 00 | 00 | 00 | 0 | 0 | 00 | 00 | 0000 | 000 | 00 | 000 | 000 | 000 | 000 | 000 | 000 | 000 | 1501 |
| 088 | 0004 | 00ee | 0000 | 0000 | 00 | 00 | 19 | 18 | 00 | 00 | 0 | 0 | 00 | 00 | 0000 | 000 | 00 | 000 | 000 | 000 | 000 | 000 | 000 | 000 | 0000 |
| 089 | 0005 | 000e | 0000 | 0000 | 00 | 00 | 19 | 00 | 00 | 00 | 0 | 0 | 00 | 00 | 0000 | 000 | 00 | 000 | 000 | 000 | 000 | 000 | 000 | 000 | 0000 |

Fig.63-4

```
no .MK  .BK  .LOG .KY  .B .N .L .MW.RP.mw.F.H.jr.jh.WD  .CNC.jt.jpu.jxp.jls.jlg.jgb.jcs.jos.jinx
090 0001 e00e 0000 0000 00 00 20 00 96 00 0 0 00 00 0000 000 00 000 000 000 000 000 000 000 0000
091 0003 001e 0000 0000 00 00 20 92 00 00 0 0 00 00 0000 000 00 000 000 000 000 000 000 000 0000
092 0000 0001 0000 0000 00 93 91 00 00 00 0 0 00 00 0000 000 00 000 000 000 000 000 000 000 1801
093 0000 e000 0000 0000 92 94 00 00 00 00 0 0 00 00 0000 KUUCYU 000 000 000 000 000 000 000 1901
094 0000 0000 0000 0000 93 00 00 00 00 00 0 0 00 00 0000 000 00 000 000 000 000 000 000 000 1a01
095 0005 e00e 0000 0000 00 00 21 00 00 00 0 0 00 00 0000 A   00 000 000 000 000 000 000 000 0000
096 0001 000e 0000 0000 00 00 21 00 00 00 0 0 00 00 0000 000 00 000 000 000 000 000 000 000  701
097 0002 000e 0000 0000 00 00 21 00 00 00 0 0 00 00 0000 000 00 000 000 000 000 000 000 000 1101
098 0003 000e 0000 0000 00 00 21 00 00 00 0 0 00 00 0000 000 00 000 000 000 000 000 000 000 1501
099 0004 00ee 0000 0000 00 00 21 20 00 00 0 0 00 00 0000 000 00 000 000 000 000 000 000 000 0000
100 0005 000e 0000 0000 00 00 21 00 00 00 0 0 00 00 0000 000 00 000 000 000 000 000 000 000 0000
101 0001 000e 0000 0000 00 00 22 00 00 00 0 0 00 00 0000 000 00 000 000 000 000 000 000 000  d01
102 0003 001e 0000 0000 00 00 22 10300 00 0 0 00 00 0000 000 00 000 000 000 000 000 000 000 0000
103 0000 c011 0000 0000 00 10410200 11200 0 0 00 00 0000 000 00 000 000 000 000 000 000 000 1801
104 0000 e000 0000 0000 10310500 00 00 00 0 0 00 00 0000 000 00 000 000 000 000 000 000 000 1901
105 0000 c000 0000 0000 10400 00 00 10700 0 0 00 00 0000 000 00 000 000 000 000 000 000 000 1a01
106 0005 e00e 0000 0000 00 00 22 00 00 00 0 0 00 00 A    000 00 000 000 000 000 000 000 000 0000
107 0001 000e 0000 0000 00 00 23 00 00 00 0 0 00 00 0000 000 00 000 000 000 000 000 000 000  f01
108 0002 e00e 0000 0000 00 00 23 00 11300 0 0 00 00 0000 000 00 000 000 000 000 000 000 000 1101
109 0003 e00e 0000 0000 00 00 23 00 11400 0 0 00 00 0000 000 00 000 000 000 000 000 000 000 1501
110 0004 00ee 0000 0000 00 00 23 22 00 00 0 0 00 00 0000 000 00 000 000 000 000 000 000 000 0000
111 0005 e00e 0000 0000 00 00 23 00 00 00 0 0 00 00 HOJI 000 00 000 000 000 000 000 000 000 0000
112 0001 000e 0000 0000 00 00 24 00 00 00 0 0 00 00 0000 000 00 000 000 000 000 000 000 000  70a
113 0002 000e 0000 0000 00 00 24 00 00 00 0 0 00 00 0000 000 00 000 000 000 000 000 000 000 1101
114 0003 000e 0000 0000 00 00 24 00 00 00 0 0 00 00 0000 000 00 000 000 000 000 000 000 000 1501
115 0004 00ee 0000 0000 00 00 24 00 00 00 0 0 00 00 0000 000 00 000 000 000 000 000 000 000 0000
116 0005 000e 0000 0000 00 00 24 00 00 00 0 0 00 00 0000 000 00 000 000 000 000 000 000 000 0000
117 0001 000e 0000 0000 00 00 25 00 00 00 0 0 00 00 0000 KANGAE 000 000 000 000 000 000 000  d01
118 0003 001e 0000 0000 00 00 25 11900 00 0 0 00 00 0000 000 00 000 000 000 000 000 000 000 0000
119 0000 0001 0000 0000 00 00 11800 12800 0 0 00 00 0000 000 00 000 000 000 000 000 000 000 1801
```

Fig.63-5

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 120 | 0000 | e000 | 0000 | 0000 | 11912100 | | | 00 | 00 | 00 | 0 | 0 | 00 | 00 | 0000 | 000 | 00 | 000 | 000 | 000 | 000 | 000 | 000 | 000 | 1901 |
| 121 | 0000 | c000 | 0000 | 0000 | 12000 | | 00 | 00 | 12300 | | 0 | 0 | 00 | 00 | 0000 | 000 | 00 | 000 | 000 | 000 | 000 | 000 | 000 | 000 | i101 |
| 122 | 0005 | e00e | 0000 | 0000 | 00 | 00 | 00 | 00 | 00 | 00 | 0 | 0 | 00 | 00 | A | 000 | 00 | 000 | 000 | 000 | 000 | 000 | 000 | 000 | 0000 |
| 123 | 0001 | 000e | 0000 | 0000 | 00 | 00 | 26 | 00 | 00 | 00 | 0 | 0 | 00 | 00 | 0000 | 000 | 00 | 000 | 000 | 000 | 000 | 000 | 000 | 000 | 0000 |
| 124 | 0002 | e00e | 0000 | 0000 | 00 | 00 | 26 | 00 | 12900 | | 0 | 0 | 00 | 00 | 0000 | 000 | 00 | 000 | 000 | 000 | 000 | 000 | 000 | 000 | 0000 |
| 125 | 0003 | e00e | 0000 | 0000 | 00 | 00 | 26 | 00 | 13000 | | 0 | 0 | 00 | 00 | 0000 | 000 | 00 | 000 | 000 | 000 | 000 | 000 | 000 | 000 | 0000 |
| 126 | 0004 | 00ee | 0000 | 0000 | 00 | 00 | 26 | 25 | 00 | 00 | 0 | 0 | 00 | 00 | 0000 | 000 | 00 | 000 | 000 | 000 | 000 | 000 | 000 | 000 | 0000 |
| 127 | 0005 | e00e | 0000 | 0000 | 00 | 00 | 26 | 00 | 00 | 00 | 0 | 0 | 00 | 00 | HOJI | 000 | 00 | 000 | 000 | 000 | 000 | 000 | 000 | 000 | 0000 |
| 128 | 0001 | 000e | 0000 | 0000 | 00 | 00 | 27 | 00 | 00 | 00 | 0 | 0 | 00 | 00 | 0000 | 000 | 00 | 000 | 000 | 000 | 000 | 000 | 000 | 000 | 701 |
| 129 | 0002 | 000e | 0000 | 0000 | 00 | 00 | 27 | 00 | 00 | 00 | 0 | 0 | 00 | 00 | 0000 | 000 | 00 | 000 | 000 | 000 | 000 | 000 | 000 | 000 | 1101 |
| 130 | 0003 | 000e | 0000 | 0000 | 00 | 00 | 27 | 00 | 00 | 00 | 0 | 0 | 00 | 00 | 0000 | 000 | 00 | 000 | 000 | 000 | 000 | 000 | 000 | 000 | 1501 |
| 131 | 0004 | 00ee | 0000 | 0000 | 00 | 00 | 27 | 26 | 00 | 00 | 0 | 0 | 00 | 00 | 0000 | 000 | 00 | 000 | 000 | 000 | 000 | 000 | 000 | 000 | 0000 |
| 132 | 0005 | 000e | 0000 | 0000 | 00 | 00 | 27 | 00 | 00 | 00 | 0 | 0 | 00 | 00 | 0000 | 000 | 00 | 000 | 000 | 000 | 000 | 000 | 000 | 000 | 0000 |
| 133 | 0001 | e00e | 0000 | 0000 | 00 | 00 | 28 | 00 | 13600 | | 0 | 0 | 00 | 00 | 0000 | 000 | 00 | 000 | 000 | 000 | 000 | 000 | 000 | 000 | 0000 |
| 134 | 0003 | 000e | 0000 | 0000 | 00 | 00 | 28 | 00 | 00 | 00 | 0 | 0 | 00 | 00 | 0000 | 000 | 00 | 000 | 000 | 000 | 000 | 000 | 000 | 000 | 1601 |
| 135 | 0005 | e00e | 0000 | 0000 | 00 | 00 | 28 | 00 | 00 | 00 | 0 | 0 | 00 | 00 | A | 000 | 00 | 000 | 000 | 000 | 000 | 000 | 000 | 000 | 0000 |
| 136 | 0001 | 000e | 0000 | 0000 | 00 | 00 | 29 | 00 | 00 | 00 | 0 | 0 | 00 | 00 | 0000 | 000 | 00 | 000 | 000 | 000 | 000 | 000 | 000 | 000 | 701 |
| 137 | 0002 | 000e | 0000 | 0000 | 00 | 00 | 29 | 00 | 00 | 00 | 0 | 0 | 00 | 00 | 0000 | 000 | 00 | 000 | 000 | 000 | 000 | 000 | 000 | 000 | 1101 |
| 138 | 0003 | 000e | 0000 | 0000 | 00 | 00 | 29 | 00 | 00 | 00 | 0 | 0 | 00 | 00 | 0000 | 000 | 00 | 000 | 000 | 000 | 000 | 000 | 000 | 000 | 1501 |
| 139 | 0004 | 00ee | 0000 | 0000 | 00 | 00 | 29 | 28 | 00 | 00 | 0 | 0 | 00 | 00 | 0000 | 000 | 00 | 000 | 000 | 000 | 000 | 000 | 000 | 000 | 0000 |
| 140 | 0005 | 000e | 0000 | 0000 | 00 | 00 | 29 | 00 | 00 | 00 | 0 | 0 | 00 | 00 | 0000 | 000 | 00 | 000 | 000 | 000 | 000 | 000 | 000 | 000 | 0000 |
| 141 | 0001 | e00e | 0000 | 0000 | 00 | 00 | 30 | 00 | 14400 | | 0 | 0 | 00 | 00 | 0000 | 000 | 00 | 000 | 000 | 000 | 000 | 000 | 000 | 000 | 0000 |
| 142 | 0003 | 000e | 0000 | 0000 | 00 | 00 | 30 | 00 | 00 | 00 | 0 | 0 | 00 | 00 | 0000 | 000 | 00 | 000 | 000 | 000 | 000 | 000 | 000 | 000 | 1601 |
| 143 | 0005 | e00e | 0000 | 0000 | 00 | 00 | 30 | 00 | 00 | 00 | 0 | 0 | 00 | 00 | A | 000 | 00 | 000 | 000 | 000 | 000 | 000 | 000 | 000 | 0000 |
| 144 | 0001 | 000e | 0000 | 0000 | 00 | 00 | 31 | 00 | 00 | 00 | 0 | 0 | 00 | 00 | 0000 | 000 | 00 | 000 | 000 | 000 | 000 | 000 | 000 | 000 | 1201 |
| 145 | 0002 | e00e | 0000 | 0000 | 00 | 00 | 31 | 00 | 15000 | | 0 | 0 | 00 | 00 | 0000 | 000 | 00 | 000 | 000 | 000 | 000 | 000 | 000 | 000 | 0000 |
| 146 | 0003 | e00e | 0000 | 0000 | 00 | 00 | 31 | 00 | 15100 | | 0 | 0 | 00 | 00 | 0000 | 000 | 00 | 000 | 000 | 000 | 000 | 000 | 000 | 000 | 0000 |
| 147 | 0004 | 00ee | 0000 | 0000 | 00 | 00 | 31 | 30 | 00 | 00 | 0 | 0 | 00 | 00 | 0000 | 000 | 00 | 000 | 000 | 000 | 000 | 000 | 000 | 000 | 0000 |
| 148 | 0005 | e00e | 0000 | 0000 | 00 | 00 | 31 | 00 | 00 | 00 | 0 | 0 | 00 | 00 | UKA | 000 | 00 | 000 | 000 | 000 | 000 | 000 | [illegible] | 000 | 0000 |
| 149 | 0001 | 000e | 0000 | 0000 | 00 | 00 | 32 | 00 | 00 | 00 | 0 | 0 | 00 | 00 | 0000 | 000 | 00 | 000 | 000 | 000 | 000 | 000 | 000 | 000 | 701 |

Fig.63-6

```
no .MK  .BK  .LOG .KY  .B .N .L .MW.RP.mw.F.H.jr.jh.WD   .CNC.jt.jpu.jxp.jls.jlg.jgb.jcs.jos.jinx
150 0002 000e 0000 0000 00 00 32 00 00 00 0 0 00 00 0000 000 00 000 000 000 000 000 000 000 1101
151 0003 000e 0000 0000 00 00 32 00 00 00 0 0 00 00 0000 000 00 000 000 000 000 000 000 000 1501
152 0004 00ee 0000 0000 00 00 32 31 00 00 0 0 00 00 0000 000 00 000 000 000 000 000 000 000 0000
153 0005 000e 0000 0000 00 00 32 00 00 00 0 0 00 00 SEIMEI00 00 000 000 000 000 000 000 000 0000
154 0001 e00e 0000 0000 00 00 33 00 00 00 0 0 00 00 0000 000 00 000 000 000 000 000 000 000 0000
155 0003 e00e 0000 0000 00 00 33 00 15900 0 0 00 00 0000 000 00 000 000 000 000 000 000 000 0000
156 0005 001e 0000 0000 00 00 33 15700 00 0 0 00 00 0000 000 00 000 000 000 000 000 000 000 0000
157 0000 e001 0000 0000 00 15815600 00 00 0 0 00 00 SONZAI00 00 000 000 000 000 000 000 000 0000
158 0000 e000 f000 0000 15700 00 00 00 00 0 0 00 00 FUSONZAI 00 000 000 000 000 000 000 000 0000
159 0001 000e 0000 0000 00 00 34 00 00 00 0 0 00 00 0000 000 00 000 000 000 000 000 000 000  701
160 0002 000e 0000 0000 00 00 34 00 00 00 0 0 00 00 0000 000 00 000 000 000 000 000 000 000 1101
161 0003 000e 0000 0000 00 00 34 00 00 00 0 0 00 00 0000 000 00 000 000 000 000 000 000 000 1501
162 0004 00ee 0000 0000 00 00 34 33 00 00 0 0 00 00 0000 000 00 000 000 000 000 000 000 000 0000
163 0005 000e 0000 0000 00 00 34 00 00 00 0 0 00 00 0000 000 00 000 000 000 000 000 000 000 0000
164 0001 e00e 0000 0000 00 00 00 00 00 00 0 0 00 00 0000 000 00 000 000 000 000 000 000 000 0000
165 0003 e00e 0000 0000 00 00 00 00 00 00 0 0 00 00 0000 000 00 000 000 000 000 000 000 000 0000
166 0005 000e 0000 0000 00 00 00 16700 00 0 0 00 00 0000 000 00 000 000 000 000 000 000 000 0000
167 0000 e001 0000 0000 00 15815600 00 00 0 0 00 00 SONZAI00 00 000 000 000 000 000 000 000 0000
168 0000 e000 f000 0000 15700 00 00 00 00 0 0 00 00 FUSONZAI 00 000 000 000 000 000 000 000 0000
169 0001 000e 0000 0000 00 00 36 00 00 00 0 0 00 00 0000 000 00 000 000 000 000 000 000 000  201
170 0002 e00e 0000 0000 00 00 36 00 17500 0 0 00 00 0000 000 00 000 000 000 000 000 000 000 0000
171 0003 e00e 0000 0000 00 00 36 00 17600 0 0 00 00 0000 000 00 000 000 000 000 000 000 000 0000
172 0004 00ee 0000 0000 00 00 36 35 00 00 0 0 00 00 0000 000 00 000 000 000 000 000 000 000 0000
173 0005 e00e 0000 0000 00 00 36 00 00 00 0 0 00 00 SHI   00 00 000 000 000 000 000 000 000 0000
174 0001 000e 0000 0000 00 00 37 00 00 00 0 0 00 00 0000 000 00 000 000 000 000 000 000 000  701
175 0002 000e 0000 0000 00 00 37 00 00 00 0 0 00 00 0000 000 00 000 000 000 000 000 000 000 1101
176 0003 000e 0000 0000 00 00 37 00 00 00 0 0 00 00 0000 000 00 000 000 000 000 000 000 000 1501
177 0004 00ee 0000 0000 00 00 37 36 00 00 0 0 00 00 0000 000 00 000 000 000 000 000 000 000 0000
178 0005 000e 0000 0000 00 00 37 00 00 00 0 0 00 00 0000 000 00 000 000 000 000 000 000 000 0000
179 0001 e00e 0000 0000 00 00 00 00 00 00 0 0 00 00 FUKAJITSU00 000 000 000 000 000 SEI 000 0000
```

Fig.63-7

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 180 | 0003 | e00e | 0000 | 0000 | 00 | 00 | 00 | 00 | 18200 | | 0 | 0 | 00 | 00 | 0000 | 000 | 00 | 000 | 000 | 000 | 000 | 000 | 000 | 000 | 0000 |
| 181 | 0005 | e00e | 0000 | 0000 | 00 | 00 | 00 | 00 | 00 | 00 | 0 | 0 | 00 | 00 | A | 000 | 00 | 000 | 000 | 000 | 000 | 000 | 000 | 000 | 0000 |
| 182 | 0001 | a00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 183 | 0004 | 00ee | 0000 | 0000 | 00 | 00 | 00 | 38 | 00 | 00 | 0 | 0 | 00 | 00 | FUTASHIKA | | 00 | 000 | 000 | 000 | 000 | 000 | de | 000 | 1001 |
| 184 | 0005 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 185 | 0001 | 000e | 0000 | 0000 | 00 | 00 | 00 | 00 | 00 | 00 | 0 | 0 | 00 | 00 | 0000 | KANGAE | | 000 | 000 | 000 | 000 | 000 | 000 | 000 | 0000 |
| 186 | 0003 | e00e | 0000 | 0000 | 00 | 00 | 00 | 00 | 18800 | | 0 | 0 | 00 | 00 | WATASHIO | | 00 | 000 | 000 | 000 | 000 | 000 | 000 | 000 | 0000 |
| 187 | 0005 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 188 | 0001 | e00e | 0000 | 0000 | 00 | 00 | 00 | 00 | 00 | 00 | 0 | 0 | 00 | 00 | WATASHIO | | 00 | 000 | 000 | 000 | 000 | 000 | 000 | 000 | 0000 |
| 189 | 0002 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 190 | 0003 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 191 | 0004 | 00ee | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 192 | 0005 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 193 | 0001 | e00e | 0000 | 0000 | 00 | 00 | 00 | 00 | 19700 | | 0 | 0 | 00 | 00 | KANO | 000 | 00 | 000 | 000 | 000 | 000 | 000 | sei | 000 | 0000 |
| 194 | 0003 | e00e | 0000 | 0000 | 00 | 00 | 00 | 00 | 19600 | | 0 | 0 | 00 | 00 | 0000 | 000 | 00 | 000 | 000 | 000 | 000 | 000 | 000 | 000 | 0000 |
| 195 | 0005 | e00e | 0000 | 0000 | 00 | 00 | 00 | 00 | 00 | 00 | 0 | 0 | 00 | 00 | A | 000 | 00 | 000 | 000 | 000 | 000 | 000 | 000 | 000 | 0000 |
| 196 | 0001 | a00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 197 | 0004 | e0ee | 0000 | 0000 | 00 | 00 | 42 | 00 | 00 | 00 | 0 | 0 | 00 | 00 | KANO | 000 | 00 | 000 | 000 | 000 | 000 | 000 | de | 000 | 0000 |
| 198 | 0005 | e00e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |
| 199 | 0001 | 600e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 701 |
| 200 | 0002 | 600e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 1101 |
| 201 | 0003 | 600e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 1501 |
| 202 | 0004 | 00ee | 0000 | 0000 | 00 | 00 | 43 | 00 | 00 | 00 | 0 | 0 | 00 | 00 | 0000 | 000 | 00 | 000 | 000 | 000 | 000 | 000 | 000 | 000 | 0000 |
| 203 | 0005 | 000e | 0000 | 0000 | 00 | 00 | 00 | 00 | 00 | 00 | 0 | 0 | 00 | 00 | 0000 | 000 | 00 | 000 | 000 | 000 | 000 | 000 | 000 | 000 | 0000 |

Fig.63-8

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 204 | 0001 | e00e | 0000 | 0000 | 00 | 00 | 45 | 00 | 00 | 00 | 0 | 0 | 00 | 00 | GENKI | 000 | 00 | 000 | 000 | 000 | 000 | 000 | 000 | 000 | 0000 |
| 205 | 0003 | e00e | 0000 | 0000 | 00 | 00 | 45 | 00 | 207 | 00 | 0 | 0 | 00 | 00 | 0000 | 000 | 00 | 000 | 000 | 000 | 000 | 000 | 000 | 000 | 0000 |
| 206 | 0005 | e00e | 0000 | 0000 | 00 | 00 | 45 | 00 | 00 | 00 | 0 | 0 | 00 | 00 | A | 000 | 00 | 000 | 000 | 000 | 000 | 000 | 000 | 000 | 0000 |
| 207 | 0001 | 000e | 0000 | 0000 | 00 | 00 | 46 | 00 | 00 | 00 | 0 | 0 | 00 | 00 | 0000 | 000 | 00 | 000 | 000 | 000 | 000 | 000 | 000 | 000 | 0000 |
| 208 | 0002 | 000e | 0000 | 0000 | 00 | 00 | 46 | 00 | 00 | 00 | 0 | 0 | 00 | 00 | 0000 | 000 | 00 | 000 | 000 | 000 | 000 | 000 | 000 | 000 | 401 |
| 209 | 0003 | 000e | 0000 | 0000 | 00 | 00 | 46 | 00 | 00 | 00 | 0 | 0 | 00 | 00 | 0000 | 000 | 00 | 000 | 000 | 000 | 000 | 000 | 000 | 000 | 1101 |
| 210 | 0004 | 00ee | 0000 | 0000 | 00 | 00 | 46 | 45 | 00 | 00 | 0 | 0 | 00 | 00 | 0000 | 000 | 00 | 000 | 000 | 000 | 000 | 000 | 000 | 000 | 1501 |
| 211 | 0005 | e00e | 0000 | 0000 | 00 | 00 | 46 | 00 | 00 | 00 | 0 | 0 | 00 | 00 | GENKI | 000 | 00 | 000 | 000 | 000 | 000 | de | 000 | 000 | 0000 |
| 212 | 0001 | e00e | 0000 | 0000 | 00 | 00 | 47 | 00 | 00 | 00 | 0 | 0 | 00 | 00 | A | 000 | 00 | 000 | 000 | 000 | 000 | 000 | 000 | 000 | 0000 |
| 213 | 0003 | e00e | 0000 | 0000 | 00 | 00 | 47 | 00 | 00 | 00 | 0 | 0 | 00 | 00 | IRO | 000 | 00. | 000 | 000 | 000 | 000 | 000 | 000 | 000 | 0000 |
| 214 | 0004 | e00e | 0000 | 0000 | 00 | 00 | 47 | 00 | 216 | 00 | 0 | 0 | 00 | 00 | 0000 | 000 | 00 | 000 | 000 | 000 | 000 | 000 | 000 | 000 | 0000 |
| 215 | 0005 | e00e | 0000 | 0000 | 00 | 00 | 47 | 00 | 00 | 00 | 0 | 0 | 00 | 00 | SHIRO | 000 | 00 | 000 | 000 | 000 | 000 | i | 000 | 000 | 0000 |
| 216 | 0001 | 000e | 0000 | 0000 | 00 | 00 | 48 | 00 | 00 | 00 | 0 | 0 | 00 | 00 | DE | 000 | 00 | 000 | 000 | 000 | 000 | 000 | 000 | 000 | 0000 |
| 217 | 000e | 000e | 0000 | 0000 | 00 | 00 | 48 | 00 | 00 | 00 | 0 | 0 | 00 | 00 | 0000 | 000 | 00 | 000 | 000 | 000 | 000 | 000 | 000 | 000 | 401 |
| 218 | 0003 | 000e | 0000 | 0000 | 00 | 00 | 48 | 00 | 00 | 00 | 0 | 0 | 00 | 00 | 0000 | 000 | 00 | 000 | 000 | 000 | 000 | 000 | 000 | 000 | 1101 |
| 219 | 0004 | 00ee | 0000 | 0000 | 00 | 00 | 48 | 47 | 00 | 00 | 0 | 0 | 00 | 00 | 0000 | 000 | 00 | 000 | 000 | 000 | 000 | 000 | 000 | 000 | 1501 |
| 220 | 0005 | 000e | 0000 | 0000 | 00 | 00 | 48 | 00 | 00 | 00 | 0 | 0 | 00 | 00 | 0000 | 000 | 00 | 000 | 000 | 000 | 000 | i | 000 | 000 | 0000 |

Fig.63-9

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 221 | 0001 | e00e | 0000 | 0000 | 00 | 00 | 00 | 00 | 227 | 00 | 0 | 0 | 00 | 00 | 0000 | 000 | 00 | 000 | 000 | 000 | 000 | 000 | 000 | 000 | 0000 |
| 222 | 0003 | 001e | 0000 | 0000 | 00 | 00 | 49 | 223 | 00 | 00 | 0 | 0 | 00 | 00 | 0000 | 000 | 00 | 000 | 000 | 000 | 000 | 000 | 000 | 000 | 0000 |
| 223 | 0000 | 0001 | 0000 | 0000 | 00 | 224 | 222 | 00 | 00 | 00 | 0 | 0 | 00 | 00 | 0000 | 000 | 00 | 000 | 000 | 000 | 000 | 000 | 000 | 000 | 1801 |
| 224 | 0000 | e000 | 0000 | 0000 | 223 | 225 | 00 | 00 | 00 | 00 | 0 | 0 | 00 | 00 | 0000 | KUUCYU | | 000 | 000 | 000 | 000 | 000 | 000 | 000 | 1901 |
| 225 | 0000 | 0000 | 0000 | 0000 | 224 | 00 | 00 | 00 | 00 | 00 | 0 | 0 | 00 | 00 | 0000 | 000 | 00 | 000 | 000 | 000 | 000 | 000 | 000 | 000 | 1a01 |
| 226 | 0005 | e00e | 0000 | 0000 | 00 | 00 | 00 | 00 | 00 | 00 | 0 | 0 | 00 | 00 | A | 000 | 00 | 000 | 000 | 000 | 000 | 000 | 000 | 000 | 0000 |
| 227 | 0001 | 000e | 0000 | 0000 | 00 | 00 | 50 | 00 | 00 | 00 | 0 | 0 | 00 | 00 | 0000 | 000 | 00 | 000 | 000 | 000 | 000 | 000 | 000 | 000 | 0000 |
| 228 | 0002 | e00e | 0000 | 0000 | 00 | 00 | 50 | 00 | 233 | 00 | 0 | 0 | 00 | 00 | 0000 | 000 | 00 | 000 | 000 | 000 | 000 | 000 | 000 | 000 | 0000 |
| 229 | 0003 | e00e | 0000 | 0000 | 00 | 00 | 50 | 00 | 234 | 00 | 0 | 0 | 00 | 00 | 0000 | 000 | 00 | 000 | 000 | 000 | 000 | 000 | 000 | 000 | 0000 |
| 230 | 0004 | 00ee | 0000 | 0000 | 00 | 00 | 50 | 49 | 00 | 00 | 0 | 0 | 00 | 00 | 0000 | 000 | 00 | 000 | 000 | 000 | 000 | 000 | 000 | 000 | 0000 |
| 231 | 0005 | e00e | 0000 | 0000 | 00 | 00 | 50 | 00 | 00 | 00 | 0 | 0 | 00 | 00 | 0000 | 000 | 00 | 000 | 000 | 000 | 000 | 000 | 000 | 000 | 0000 |
| 232 | 0001 | 000e | 0000 | 0000 | 00 | 00 | 51 | 00 | 00 | 00 | 0 | 0 | 00 | 00 | TO | 000 | 00 | 000 | 000 | 000 | 000 | 000 | bu | 000 | 0000 |
| 233 | 0002 | 000e | 0000 | 0000 | 00 | 00 | 51 | 00 | 00 | 00 | 0 | 0 | 00 | 00 | 0000 | 000 | 00 | 000 | 000 | 000 | 000 | 000 | 000 | 000 | 701 |
| 234 | 0003 | 000e | 0000 | 0000 | 00 | 00 | 51 | 00 | 00 | 00 | 0 | 0 | 00 | 00 | 0000 | 000 | 00 | 000 | 000 | 000 | 000 | 000 | 000 | 000 | 1101 |
| 235 | 0004 | 00ee | 0000 | 0000 | 00 | 00 | 51 | 50 | 00 | 00 | 0 | 0 | 00 | 00 | 0000 | 000 | 00 | 000 | 000 | 000 | 000 | 000 | 000 | 000 | 1501 |
| 236 | 0005 | 000e | 0000 | 0000 | 00 | 00 | 51 | 00 | 00 | 00 | 0 | 0 | 00 | 00 | 0000 | 000 | 00 | 000 | 000 | 000 | 000 | 000 | 000 | 000 | 0000 |

Fig. 64

| st-no | knj | WD-NO |
|---|---|---|
| 1 | TARO | 1 |
| 2 | JIRO | 2 |
| 3 | SABURO | 3 |
| 4 | HANAKO | 4 |
| 5 | HARUKO | 5 |
| 6 | NATSUKO | 6 |
| 7 | AKIKO | 7 |
| 8 | BARA | 8 |
| 9 | YURI | 9 |
| 10 | HON | 10 |
| 11 | OKANE | 11 |
| 12 | BOURU | 12 |
| 13 | KYO | 13 |
| 14 | GURANDO | 14 |
| 15 | GAKKO | 15 |
| 16 | TOKYO | 16 |
| 17 | SHINJYUKU | 17 |
| 18 | FUCYU | 18 |
| 19 | O | 19 |
| 20 | HOJI | 20 |
| 21 | MO | 21 |
| 22 | O | 22 |
| 23 | KANJI | 23 |
| 24 | HAKO | 24 |
| 25 | I | 25 |
| 26 | KU | 26 |
| 27 | TO | 27 |
| 28 | ATAE | 28 |
| 29 | NAGE | 29 |
| 30 | AGE | 30 |
| 31 | PUREZENTO | 31 |
| 32 | OSHIE | 32 |
| 33 | UKA | 33 |
| 34 | UKABA | 34 |
| 35 | SHI | 35 |
| 36 | KORO | 36 |
| 37 | YOROKO | 37 |
| 38 | GENKI | 38 |
| 38 | SHIRO | 38 |

Fig. 65

| WD-NO | CODE | LS | KY | PTN | knj |
|---|---|---|---|---|---|
| 1 | e451 | 1180 | ff20 | 00 | TARO |
| 2 | e431 | 1180 | ff20 | 00 | JIRO |
| 3 | | 1180 | ff20 | 00 | SABURO |
| 4 | | 1180 | ff20 | 00 | HANAKO |
| 5 | | 1180 | ff20 | 00 | HARUKO |
| 6 | | 1180 | ff20 | 00 | NATSUKO |
| 7 | | 1180 | ff20 | 00 | AKIKO |
| 8 | | 1100 | ff20 | 00 | BARA |
| 9 | | 1100 | ff20 | 00 | YURI |
| 10 | | 1100 | ff20 | 00 | HON |
| 11 | | 1100 | ff20 | 00 | OKANE |
| 12 | | 1100 | ff20 | 00 | BOURU |
| 13 | | 1120 | ff20 | 00 | KYO |
| 14 | | 1100 | ff20 | 00 | GURANDO |
| 15 | | 1100 | ff20 | 00 | GAKKO |
| 16 | | 1100 | ff20 | 00 | TOKYO |
| 17 | | 1100 | ff20 | 00 | NINJYUKU |
| 18 | | 1100 | ff20 | 00 | FUCYU |
| 19 | | 1205 | ff02 | 6 | O |
| 20 | | 1205 | ff0c | 7 | HOJI |
| 21 | | 1205 | ff05 | 7 | MO |
| 22 | | 1215 | ff09 | 8 | O |
| 23 | | 1205 | ff0b | 9 | KANJI |
| 24 | | 1205 | ff06 | 10 | HAKO |
| 25 | | 1205 | ff03 | 11 | I |
| 26 | | 1205 | ff0e | 12 | KU |
| 27 | | 1205 | ff0e | 13 | TO |
| 28 | 3102 | 1205 | ff06 | 14 | ATAE |
| 29 | | 1205 | ff0b | 24 | NAGE |
| 30 | | 1205 | ff0b | 14 | AGE |
| 31 | | 1305 | ff0c | 14 | PUREZENTO |
| 32 | | 1200 | ff0b | 15 | OSHIE |
| 33 | | 1200 | ff0b | 16 | UKA |
| 34 | | 1200 | ff0a | 17 | UKABA |
| 35 | | 1200 | ff08 | 18 | SHI |
| 36 | | 1200 | ff0a | 19 | KORO |
| 37 | | 1200 | ff0b | 00 | YOROKO |
| 38 | | 1800 | ff17 | 22 | GENKI |
| 38 | | 1700 | ff16 | 23 | SHIRO |

Fig. 66

| div | KNJ | ndiv | kt-st | kt-ed |
|---|---|---|---|---|
| 9 | wa | 5c | 468 | 468 |
| b | sase | b | 522 | 523 |
| b | rare | 5c | 524 | 525 |
| b | na | 13 | 512 | 512 |
| c | shi | 5a | 549 | 549 |
| 13 | katta | 52 | 710 | 710 |
| 14 | shita | end | 746 | 746 |
| 16 | i | 57 | 103 | 103 |
| 20 | ha | end | 249 | 249 |
| 20 | tachi | 20 | 165 | 165 |
| 20 | dake | 20 | 175 | 175 |
| 20 | ni | end | 254 | 254 |
| 20 | niyott | end | 297 | 297 |
| 20 | to | end | 179 | 179 |
| 20 | ka | end | 185 | 185 |
| 20 | wo | end | 250 | 250 |
| 52 | toha | end | 797 | 797 |
| 55 | rasi | 16 | 81 | 81 |
| 57 | yo | end | 240 | 240 |
| 5a | ma | 14 | 296 | 296 |
| 5c | na | 63 | 294 | 294 |
| 63 | katta | 55 | 710 | 710 |

Fig.67

| ktproc-no | LS | PTN | NTN | LO | KNJ |
|---|---|---|---|---|---|
| 81 | 1604 | 20 | 0 | 0 | rashi |
| 103 | 7100 | 0 | 0 | 0 | i |
| 185 | 5100 | 0 | 0 | 0 | ka |
| 165 | 4210 | 0 | 0 | 10 | tachi |
| 175 | 4300 | 0 | 0 | 200 | dake |
| 179 | 5100 | 0 | 0 | 1000 | to |
| 240 | 7201 | 0 | 0 | 0 | yo |
| 249 | 7300 | 0 | 0 | 0 | ha |
| 250 | 7300 | 0 | 0 | 0 | wo |
| 254 | 7300 | 0 | 0 | 0 | ni |
| 296 | 9100 | 0 | 4 | 0 | ma |
| 297 | 7300 | 0 | 0 | 0 | niyotte |
| 522 | 7100 | 0 | 0 | 0 | sa |
| 523 | 1605 | 5 | 0 | 0 | se |
| 524 | 7100 | 0 | 0 | 0 | ra |
| 525 | 1600 | 3 | 0 | 0 | re |
| 549 | 7100 | 0 | 0 | 0 | shi |
| 710 | 9200 | 0 | 2 | 0 | katta |
| 746 | 9200 | 0 | 2 | 0 | shita |
| 797 | 8100 | 0 | 0 | 0 | to |
| 789 | 7201 | 0 | 0 | 1 | ha |

Fig.68

| WS-NO | LS1 | LS3 | LS4 | PTN | NTN | LO | KNJ |
|---|---|---|---|---|---|---|---|
| 0 | 11 | 8 | 0 | 0 | 0 | 0 | TARO |
| 1 | 51 | 0 | 0 | 0 | 0 | 1000 | to |
| 2 | 11 | 8 | 0 | 0 | 0 | 0 | JIRO |
| 3 | 73 | 0 | 0 | 0 | 0 | 0 | ha |
| 4 | 11 | 8 | 0 | 0 | 0 | 0 | HANAKO |
| 5 | 42 | 1 | 0 | 0 | 0 | 10 | tachi |
| 6 | 73 | 0 | 0 | 0 | 0 | 0 | ni |
| 7 | 11 | 0 | 0 | 0 | 0 | 0 | BARA |
| 8 | 43 | 0 | 0 | 0 | 0 | 200 | dake |
| 9 | 73 | 0 | 0 | 0 | 0 | 0 | wo |
| 10 | 13 | 0 | 5 | 14 | 0 | 0 | PUREZENTO |
| 11 | 71 | 0 | 0 | 0 | 0 | 0 | shi |
| 12 | 91 | 0 | 0 | 0 | 4 | 0 | ma |
| 13 | 92 | 0 | 0 | 0 | 2 | 0 | shita |

Fig.69

| WS-NO | LS1 | LS3 | LS4 | PTN | NTN | LO | WD | KNJ |
|---|---|---|---|---|---|---|---|---|
| 0 | 11 | 8 | 0 | 0 | 0 | 0 | 2 | JIRO |
| 1 | 73 | 0 | 0 | 0 | 0 | 0 | | ha |
| 2 | 11 | 8 | 0 | 0 | 0 | 0 | 1 | TARO |
| 3 | 73 | 0 | 0 | 0 | 0 | 0 | | ga |
| 4 | 11 | 8 | 0 | 0 | 0 | 0 | 4 | HANAKO |
| 5 | 73 | 0 | 0 | 0 | 0 | 0 | | ni |
| 6 | 11 | 8 | 0 | 0 | 0 | 0 | 8 | BARA |
| 7 | 73 | 0 | 0 | 0 | 0 | 0 | | wo |
| 8 | 12 | 0 | 5 | 14 | 0 | 0 | 28 | ATAE |
| 9 | 91 | 0 | 0 | 0 | 1 | 0 | | na |
| 10 | 92 | 0 | 5 | 0 | 2 | 0 | | katta |
| 11 | 81 | 0 | 0 | 0 | 0 | 0 | | to |
| 12 | 72 | 0 | 1 | 0 | 0 | 1 | | ha |
| 13 | 12 | 1 | 5 | 8 | 0 | 0 | 22 | OMO |
| 14 | 71 | 0 | 0 | 0 | 0 | 0 | | wa |
| 15 | 91 | 0 | 0 | 0 | 1 | 0 | | na |
| 16 | 92 | 0 | 0 | 0 | 2 | 0 | | katta |
| 17 | 16 | 0 | 4 | 20 | 0 | 0 | | RASHI |
| 18 | 92 | 0 | 0 | 0 | 2 | 0 | | i |
| 19 | 72 | 0 | 1 | 0 | 2 | 1 | | yo |

Fig.70

| WS-NO | LS1 | LS3 | LS4 | PTN | NTN | LO | WD | KNJ |
|---|---|---|---|---|---|---|---|---|
| 0 | 11 | 0 | 0 | 0 | 0 | 0 | 8 | BARA |
| 1 | 73 | 0 | 0 | 0 | 0 | 0 | | ha |
| 2 | 11 | 8 | 0 | 0 | 0 | 0 | 2 | JIRO |
| 3 | 73 | 0 | 0 | 0 | 0 | 0 | | niyotte |
| 4 | 11 | 8 | 0 | 0 | 0 | 0 | 1 | TARO |
| 5 | 73 | 0 | 0 | 0 | 0 | 0 | | nitaishite |
| 6 | 11 | 8 | 0 | 0 | 0 | 0 | 4 | HANAKO |
| 7 | 73 | 0 | 0 | 0 | 0 | 0 | | ni |
| 8 | 12 | 0 | 5 | 14 | 0 | 0 | 28 | ATAE |
| 9 | 71 | 0 | 0 | 0 | 0 | 0 | | sa |
| 10 | 18 | 0 | 5 | 5 | 0 | 0 | | SE |
| 11 | 71 | 0 | 0 | 0 | 0 | 0 | | ra |
| 12 | 16 | 0 | 5 | 3 | 0 | 0 | | RE |
| 13 | 91 | 0 | 0 | 0 | 1 | 0 | | na |
| 14 | 92 | 0 | 0 | 0 | 2 | 0 | | katta |

Fig.71

| WS-NO | LS1 | LS3 | LS4 | PTN | NTN | LO | WD | KNJ |
|---|---|---|---|---|---|---|---|---|
| 0 | 11 | 8 | 0 | 0 | 0 | 0 | 2 | JIRO |
| 1 | 73 | 0 | 0 | 0 | 0 | 0 | | ha |
| 2 | 11 | 8 | 0 | 0 | 0 | 0 | 1 | TARO |
| 3 | 73 | 0 | 0 | 0 | 0 | 0 | | ga |
| 4 | 11 | 8 | 0 | 0 | 0 | 0 | 4 | HANAKO |
| 5 | 73 | 0 | 0 | 0 | 0 | 0 | | ni |
| 6 | 11 | 0 | 0 | 0 | 0 | 0 | 11 | OKANE |
| 7 | 73 | 0 | 0 | 0 | 0 | 0 | | wo |
| 8 | 12 | 0 | 5 | 14 | 0 | 0 | 36 | AGE |
| 9 | 71 | 0 | 0 | 0 | 0 | 0 | | ta |
| 10 | 91 | 0 | 0 | 0 | 2 | 0 | | ” ” |
| 11 | 53 | 0 | 0 | 0 | 0 | 8000 | | node |
| 12 | 11 | 8 | 0 | 0 | 0 | 0 | 4 | HANAKO |
| 13 | 73 | 0 | 0 | 0 | 0 | 0 | | ga |
| 14 | 11 | 0 | 0 | 0 | 0 | 0 | 16 | TOKYO |
| 15 | 73 | 0 | 0 | 0 | 0 | 0 | | he |
| 16 | 12 | 0 | 0 | 11 | 0 | 0 | 25 | I |
| 17 | 71 | 0 | 0 | 0 | 0 | 0 | | tta |
| 18 | 81 | 0 | 0 | 0 | 0 | 0 | | to |
| 19 | 12 | 1 | 5 | 8 | 5 | 0 | 22 | OMO |
| 20 | 71 | 0 | 0 | 0 | 0 | 0 | | tta |
| 21 | 91 | 0 | 0 | 0 | 2 | 0 | | ” ” |

Fig.72

| WS-NO | LS1 | LS3 | LS4 | PTN | NTN | LO | WD | KNJ |
|---|---|---|---|---|---|---|---|---|
| 0 | 11 | 8 | 0 | 0 | 0 | 0 | 1 | TARO |
| 1 | 73 | 0 | 0 | 0 | 0 | 0 | | no |
| 2 | 11 | 8 | 0 | 0 | 0 | 0 | 5 | HANAKO |
| 3 | 73 | 0 | 0 | 0 | 0 | 0 | | heno |
| 4 | 11 | 0 | 0 | 0 | 0 | 0 | 8 | BARA |
| 5 | 73 | 0 | 0 | 0 | 0 | 0 | | no |
| 6 | 13 | 0 | 5 | 14 | 0 | 0 | 31 | PUREZENTO |
| 7 | 71 | 0 | 0 | 0 | 0 | 0 | | ha |
| 8 | 12 | 0 | 0 | 1 | 0 | 0 | | ” ” |
| 9 | 71 | 0 | 0 | 0 | 0 | 0 | | ari |
| 10 | 91 | 0 | 0 | 0 | 4 | 0 | | ma |
| 11 | 92 | 0 | 0 | 0 | 2 | 0 | | sendeshita |

Fig. 73

| WS-NO | LS1 | LS3 | LS4 | PTN | NTN | LO | WD | KNJ |
|---|---|---|---|---|---|---|---|---|
| 0 | 18 | 0 | 4 | 22 | 0 | 0 | 38 | GENKI |
| 1 | 71 | 0 | 0 | 0 | 0 | 0 | | na |
| 2 | 12 | 0 | 5 | 2 | 0 | 0 | | ” ” |
| 3 | 11 | 8 | 0 | 0 | 0 | 0 | 1 | TARO |
| 4 | 73 | 8 | 0 | 0 | 0 | 0 | | ga |
| 5 | 11 | 2 | 0 | 0 | 0 | 0 | 13 | KYO |
| 6 | 11 | 3 | 0 | 0 | 0 | 0 | 15 | GAKKO |
| 7 | 73 | 0 | 0 | 0 | 0 | 0 | | de |
| 8 | 17 | 0 | 4 | 23 | 0 | 0 | 38 | SHIRO |
| 9 | 71 | 0 | 0 | 0 | 0 | 0 | | i |
| 10 | 11 | 0 | 0 | 0 | 0 | 0 | 12 | BOURU |
| 11 | 73 | 0 | 0 | 0 | 0 | 80000 | | wo |
| 12 | 12 | 0 | 0 | 24 | 0 | 0 | 29 | NAGE |
| 13 | 91 | 0 | 0 | 0 | 4 | 0 | | ma |
| 14 | 92 | 0 | 0 | 0 | 2 | 0 | 16 | shita |

Fig.74

| mk-no | LS1 | LS3 | LS4 | MKK | PSMWK | NO | WSNO | K N J |
|---|---|---|---|---|---|---|---|---|
| 0 | 11 | 8 | 0 | 22 | 0 | 0 | 0 | TARO |
| 1 | 51 | 0 | 0 | 22 | 0 | 0 | 1 | to |
| 2 | 11 | 8 | 0 | 22 | 0 | 0 | 2 | JIRO |
| 3 | 73 | 0 | 0 | 22 | 0 | 0 | 3 | ha |
| 4 | 11 | 8 | 0 | 22 | 0 | 0 | 4 | HANAKO |
| 5 | 42 | 0 | 0 | 22 | 0 | 0 | 5 | tachi |
| 6 | 73 | 0 | 0 | 22 | 0 | 0 | 6 | ni |
| 7 | 11 | 0 | 0 | 22 | 0 | 0 | 7 | BARA |
| 8 | 43 | 0 | 0 | 22 | 0 | 0 | 8 | dake |
| 9 | 73 | 0 | 0 | 22 | 0 | 0 | 9 | wo |
| 10 | 13 | 0 | 5 | 22 | 0 | 0 | 10 | PUREZENTO |
| 11 | 71 | 0 | 0 | 22 | 0 | 0 | 11 | shi |
| 12 | 91 | 0 | 0 | 22 | 0 | 0 | 12 | ma |
| 13 | 92 | 0 | 0 | end | 0 | 0 | 13 | shita |

Fig. 75

```
MEANING ANALYSIS( )
{
  while(1)
  {
    if(AND-OR relationship( )>0)   break;
    if(SINGURAL/PLURAL( ) ( ) )>0) break;
    if(NOMI and SHIKA relationship( )>0)
                                   break;
    if(XP relationship( ) >0)      break;
    if(VERB relationship( ) >0)    break;
    if(ADJECTIVAL VERB retationship-RELATED
          relationship( ) >0)      break;
    if(ADJECTIVE-RELATED relationship()>0)
                                   break;
    if(INSERTION OF EXTRACTED WORD()>0)
                                   break;
    if(p im p p -RELATED
          relationship( )>0)       break;
   return(1);
  }
   REDUCTION OF MK TABLE relationship( );
}
```

Fig. 76

```
AND-OR relationship( )
{
    i=0;
    while(1)
    {
      if(MK[i].LS1==0x11 && MK[i+1].LS1==0x51
          && MK[i+2].LS1==0x11)
      {
          MK[i].PSMWK=MW;
          MK[i].NO=tmw-no;
          MK[i+1].MKK=0;
          mk[i+2].MKK=0;
          AND-OR combination( );
          return(1);
      }
      else i++;
      if( i>mk-max ) return(-1);
    }
}
```

Fig.77( a )
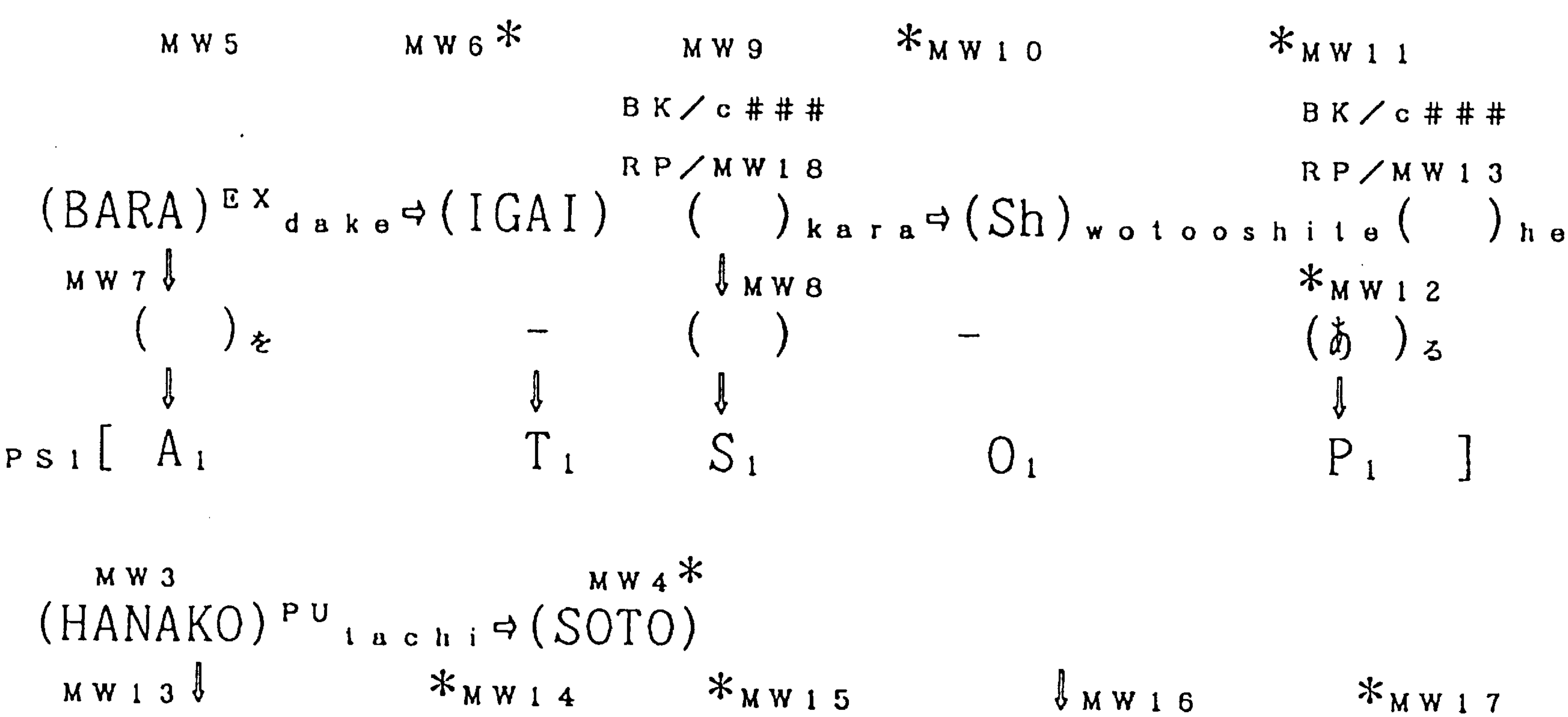

Fig.77( b )
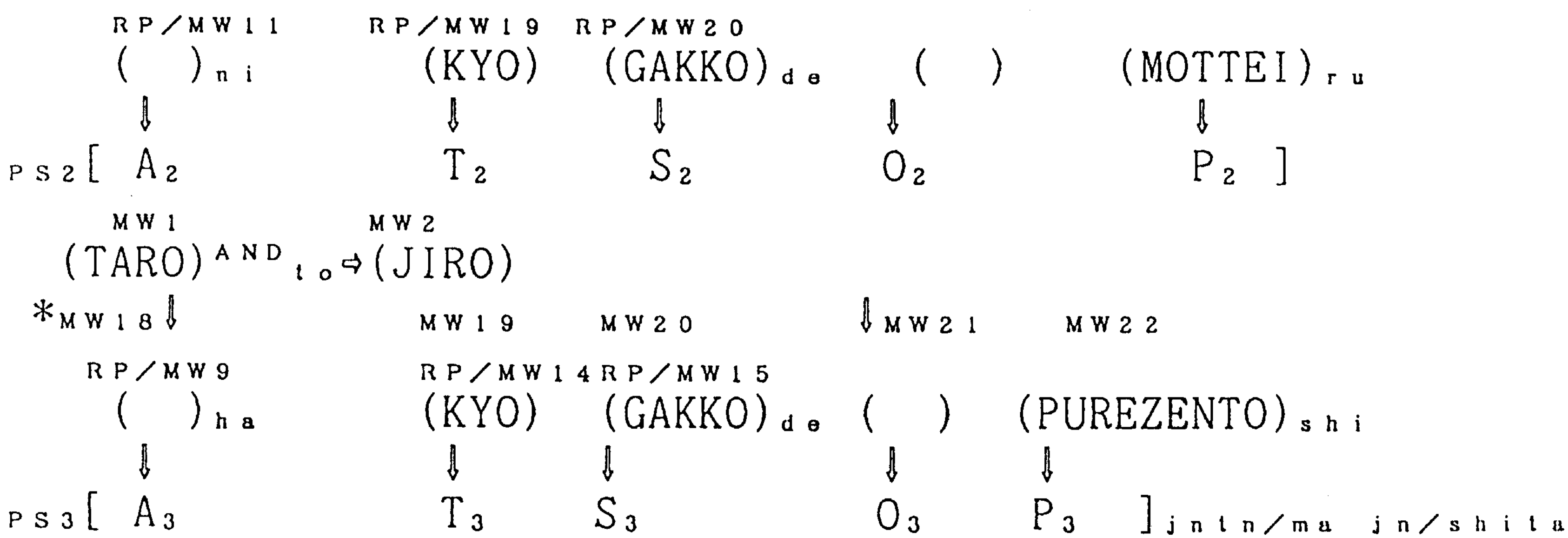

```
no -MK  -NTN -KY  -L -A -T -S -O -P -X-Y-Z-j1 -jntn-jn-jm-jost-j2-SC
 1 100e 0000 0000 16 07 00 08 00 12 0 0 0 0   0000 00 00 00   00 00
 2 0000 0000 0000 21 13 14 15 16 17 0 0 0 0   0000 00 00 00   00 00
 3 e000 0110 0000 00 18 19 20 21 22 0 0 0 0     ma shita 00   00 00
```

( b )

```
no .MK  .BK  .LOG .KY  .B .N .L .MW.RP.mw.F.H.jr.jh.WD  .CNC.jt.jpu.jxp.jls.jlg.jgb.jcs.jos.jinx
 1 0000 0001 1000 0000 00  2 18 00 00 00 0 0 00 00 TARO 000 00 000 000 000 to  000 000 000 0000
 2 0000 0000 0000 0000  1 00 00 00 00 00 0 0 00 00 JIRO 000 00 000 000 000 000 000 000 000 0000
 3 0000 0001   10 0000 00  4 13 00 00 00 0 0 00 00 HANAKO 0 00 tachi 0 000 000 000 000 000 0000
 4 0000 e000 0000 0000  3 00 00 00 00 00 0 0 00 00 SOTO 000 00 000 000 000 000 000 000 000 0000
 5 0000 0001  200 0000 00  6  7 00 00 00 0 0 00 00 BARA 000 00 000 dake 00 000 000 000 000 0000
 6 0000 e000 0000 0000  5 00 00 00 00 00 0 0 00 00 IGAI 000 00 000 000 000 000 000 000 000 0000
 7 0001 001e 0000 0000 00 00  1  5 00 00 0 0 00 00 0000 000 00 000 000 000 000 000 wo  000  d01
 8 0003 001e 0000 0000 00 00  1  9 00 00 0 0 00 00 0000 000 00 000 000 000 000 000 000 000 0000
 9 0005 c001 0000 0000 00 10 00 00 18 00 0 0 00 00 0000 000 00 000 000 000 000 000 kara 00 1801
10 0000 e000 0000 0000  9 11 00 00 00 00 0 0 00 00 0000 000 00 000 000 000 000 000 wotooshite 1
11 0000 c000 0000 0000 10 00 00 00 13 00 0 0 00 00 0000 000 00 000 000 000 000 000 he  000 1a01
12 0005 e00e 0000 0000 00 00  1 00 00 00 0 0 00 00 SONZAI 0 00 000 000 000 000 000 000 000 0000
13 0001 c01e 0000 0000 00 00  2  3 11 00 0 0 00 00 0000 000 00 000 000 000 000 000 ni  000  f01
14 0002 e00e 0000 0000 00 00  2 00 19 00 0 0 00 00 KYO  000 00 000 000 000 000 000 000 000 1101
15 0003 e00e 0000 0000 00 00  2 00 20 00 0 0 00 00 GAKKO 00 00 000 000 000 000 000 de  000 1501
16 0004 00ee 0000 0000 00 00  2  1 00 00 0 0 00 00 0000 000 00 000 000 000 000 000 000 000 0000
17 0005 e00e 0000 0000 00 00  2 00 00 00 0 0 00 00 HOJI 000 00 000 000 000 000 000 000 000 0001
18 0001 c01e 0000 0000 00 00  3  1 09 00 0 0 00 00 0000 000 00 000 000 000 000 000 ha  000  701
19 0002 000e 0000 0000 00 00  3 00 14 00 0 0 00 00 KYO  000 00 000 000 000 000 000 000 000 1101
20 0003 000e 0000 0000 00 00  3 00 15 00 0 0 00 00 GAKKO 00 00 000 000 000 000 000 de  000 1501
21 0004 00ee 0000 0000 00 00  3  2 00 00 0 0 00 00 0000 000 00 000 000 000 000 000 000 000 0000
22 0005 000e 0000 0000 00 00  3 00 00 00 0 0 00 00 PUREZENTO 0 000 000 000 000 shi 000 000 0000
```

Fig.79

| mk-no | LS1 | LS3 | LS4 | MKK | PSMWK | NO | WSNO | K N J |
|---|---|---|---|---|---|---|---|---|
| 0 | 11 | 8 | 0 | 22 | MW | 1 | 0 | M W 1 |
| 1 | 73 | 0 | 0 | 22 | 0 | 0 | 3 | ha |
| 2 | 11 | 8 | 0 | 22 | 0 | 0 | 4 | NATSUKO |
| 3 | 42 | 0 | 0 | 22 | 0 | 0 | 5 | tachi |
| 4 | 73 | 0 | 0 | 22 | 0 | 0 | 6 | ni |
| 5 | 11 | 0 | 0 | 22 | 0 | 0 | 7 | BARA |
| 6 | 43 | 0 | 0 | 22 | 0 | 0 | 8 | dake |
| 7 | 73 | 0 | 0 | 22 | 0 | 0 | 9 | wo |
| 8 | 13 | 0 | 5 | 22 | 0 | 0 | 10 | PUREZENTO |
| 9 | 71 | 0 | 0 | 22 | 0 | 0 | 11 | shi |
| 10 | 91 | 0 | 0 | 22 | 0 | 0 | 12 | ma |
| 11 | 92 | 0 | 0 | end | 0 | 0 | 13 | shita |

Fig.80

| mk-no | LS1 | LS3 | LS4 | MKK | PSMWK | NO | WSNO | K N J | |
|---|---|---|---|---|---|---|---|---|---|
| 0 | 11 | 8 | 0 | 22 | MW | 1 | 0 | M W 1 | kptop |
| 1 | 73 | 0 | 0 | 22 | 0 | 0 | 3 | ha | |
| 2 | 11 | 8 | 0 | 22 | MW | 3 | 4 | M W 3 | |
| 3 | 73 | 0 | 0 | 22 | 0 | 0 | 6 | ni | |
| 4 | 11 | 0 | 0 | 22 | MW | 5 | 7 | M W 5 | |
| 5 | 73 | 0 | 0 | 22 | 0 | 0 | 9 | wo | |
| 6 | 13 | 0 | 5 | 22 | 0 | 0 | 10 | PUREZENTO | kpbot |
| 7 | 71 | 0 | 0 | 22 | 0 | 0 | 11 | shi | |
| 8 | 91 | 0 | 0 | 22 | 0 | 0 | 12 | ma | |
| 9 | 92 | 0 | 0 | end | 0 | 0 | 13 | shita | |

Fig. 81

```
VERB relationship( )
{
   i=0;
   while(1)
   {
      if(MK[i].LS1==0x12||
                MK[i].LS1==0x13  )        /*A*/
      {
         if(MK[i+1].LS1==0x73)
         {
            Change of case particle to
            nominalization( );
         }
         Read out of IMI frame();
         Insertion of PS relationship
         particles();
         MK[jpjm].MKK=0;
         MK[kpjntn].MKK=0;
         MK[kpjn].MKK=0;
         while(1)                          /*B*/
         {
            if(MK[k].LS1==0x16||
                     MK[k].LS1==0x12)
            {
               Read out of IMI frame();
               Combination of IMI frame();
               Change of case particle of
               IMI frame();
               Insertion of PS-related
               particles();
            }
            else  break;
         }
         Insertion of Word into IMI
                                 frame();
         return(1);
      }
      i++;
      if( i>mk-max) return(-1);
  }
}
```

Fig. 82

```
Insertion of word into IMI frame( )
{
    k=kpbot;
    k--;
    while(1){
        if(MK[k].LS1==0x11||MK[k].LS1==0x73||
           MK[k].LS1==0x72)
        {  if(MK[k].LS1==0x72)
                kpjost=k--;
           if(MK[k].LS1==0x11)
                k--;
           if(MK[k].LS1==0x73&&
                    MK[k-1].LS1==0x11)
                kpb1=k;
                kpb2=k-1;
                WAK=MK[kpb1].WA;
                if( Is there only one case
                    particle designated by WAK
                    on IMI frame();
                {   KWDJO[stkp-wdjo].kp1=kpb1;
                    KWDJO[stkp-wdjo].kp2=kpb2;
                    KWDJO[stkp-wdjo].kpjost=
                                              kpjost;
                    MK[kpb1].MKK=0;
                    MK[kpb2].MKK=0;
                    MK[kpjost].MKK=0;
                    k  -=2;
                }
                else{
                    kptop=k;
                    break;
                }
        }
        else break;
    }
    k++;
    do{
        if(MK[k].LS1==noun &&kk !=kpbot
                          &&MK[k].MK !=0)
        {   stp-wd++;
            KWD[stkp-wd].kp2=k;
            kpb1=kpb2=k;
            MK[k].MK=0;
        }
        k++;
    }while( k<kpbot)
    Insertion of words and case particles of
    word-case particle table();
    Insertion of word of the word table();
}
```

Fig.83

| stkp-wdjo | kp2 | kp1 | kpjost |
|---|---|---|---|
| 1 | MW5(BARA) | wo | - |
| 2 | MW3(HANAKO) | ni | - |
| 3 | GAKKO | de | - |
| 4 | MW1(TARO) | ha | - |

Fig.84

| stkp-wd | kp2 |
|---|---|
| 1 | KYO |

Fig.85 jindx-x+1
jnkdx-x

| | | 1 | 2 | 3 | 4 | 5 ↓ (jnkdx-x) | 6 ↓ (jindx-x+1) | 7 | 8 | 9 |
|---|---|---|---|---|---|---|---|---|---|---|
| | 1 | ha | ga | ga | - | ga | - | no | - | - |
| | 2 | wo | - | wo | - | wo | - | - | - | - |
| | 3 | ni | niyotte | ni | niyotte | ni | niyotte | no | - | ha |
| | 4 | ha | ga | ga | ha | - | - | - | - | - |
| | 5 | wo | - | wo | - | - | - | - | - | - |
| | 6 | ga | - | ga | no | - | - | - | - | - |
| | 7 | ha | ga | ga | - | ga | - | no | - | - |
| | 8 | nitaishite | ni | ni | nitaishite | ni | - | nitaishiteno | | ha |
| | 9 | niyotte | ni | ni | niyote | ni | - | niyotteno | - | ha |
| | a | - | - | - | - | - | - | - | - | - |
| jindx-y → | b | - | - | - | - | ( ) | ( ) | - | - | - |
| | c | - | - | - | - | - | - | - | - | - |
| | d | - | - | - | - | - | - | - | - | - |
| | f | ni | - | - | - | - | - | heno | - | - |
| | 11 | ”” | ”” | - | - | - | - | no | - | - |
| | 15 | de | - | - | - | - | - | deno | - | - |
| | 18 | kara | - | - | - | - | - | karano | - | - |
| | 19 | wotooshite | | - | - | - | - | wotooshite | | - |
| | 1a | he | - | - | - | - | - | heno | - | - |

Fig.87-1

```
Insertion of word-case particle of the word
and case partilce table( );
{
    ms=jindx+1;
    do
    {
       if( Case partilce search() > 0)
                    return(1);
       jindx-x++;
    }while(jindx-x <= ms)
}
Case particle search()
{
    x=MK[kpnv}.NO;
    if( Set-up of searching path() >0)
                                return(1);
    else                        return(-1);
}
Set-up of searching path()
{
    nn=TPS[x].A;if(Searching in MW()>0)
                                return(1);
    nn=TPS[x].T;if(Searching in MW()>0)
                                return(1);
    nn=TPS[x].S;if(Searching in MW()>0)
                                return(1);
    nn=TPS[x].O;if(Searching in MW()>0)
                                return(1);
    nn=TPS[x].P;if(Searching in MW()>0)
                                return(1);
    return(-1);
}
Searching in MW()
{
    jindx=TMW[nn].jindx;
    Take out jindx-y from jindx();
    wa=JO[jindx-y][jindx-x];
    designation of case particle();
    if(wa !=0)
    {
        if( word is not inserted yet which is
            allowed to insert()>0)
        {
            if(wa==wak)
            { Inserte word and particle();
                   return(1);
            }
        }
    }
    mw=TMW[nn].MW;
    if(mw!=0)
    {
        if( Judgement of whether branching
            is PS or MW() > 0 )
                return(1);
    }
```

Fig.87-2

```
    nt=TMW[nn].N;
    if(nt!=0)
    {
        nn=nt;
        if( Searching of particle in MW()>0)
                return(1);
    }
    return(-1);
}
Judgement of whether branching is PS or MW()
{
    if(Branching is PS() >0)
    {
         xx=x:
         nnn=nn;
         x=TMW[nn].MW;
        if(Searching in PS ( ) >0)
                return(1);
        else{
                x=xx;
                nn=nnn;
        }
    }
    if( Branching is MW ( ) >0)
    {
          x=xx;
          nn=nnn;
          nn=TMW[nn].MW;
          if(Searching in MW( ) >0)
                return(1w;
          else
          {
                x=xx;nn=nnn;
                return(-1);
          }
    }
    else        return(-1);
}
```

Fig.88

| mk-no | LS1 | LS3 | LS4 | MKK | PSMWK | NO | WSNO | KNJ |
|---|---|---|---|---|---|---|---|---|
| 0 | 18 | 0 | 4 | 22 | 0 | 0 | 0 | GENKI |
| 1 | 71 | 0 | 0 | 22 | 0 | 0 | 1 | na |
| 2 | 12 | 0 | 5 | 22 | 0 | 0 | 2 | ” ” |
| 3 | 11 | 8 | 0 | 22 | 0 | 0 | 3 | TARO |
| 4 | 73 | 0 | 0 | 22 | 0 | 0 | 4 | ga |
| 5 | 11 | 2 | 0 | 22 | 0 | 0 | 5 | KYO |
| 6 | 11 | 3 | 0 | 22 | 0 | 0 | 6 | GAKKO |
| 7 | 73 | 0 | 0 | 22 | 0 | 0 | 7 | de |
| 8 | 17 | 0 | 4 | 22 | 0 | 0 | 8 | SHIRO |
| 9 | 71 | 0 | 0 | 22 | 0 | 0 | 9 | i |
| 10 | 11 | 0 | 0 | 22 | 0 | 0 | 10 | BOURU |
| 11 | 73 | 0 | 0 | 22 | 0 | 0 | 11 | wo |
| 12 | 12 | 8 | 0 | 22 | 0 | 0 | 12 | NAGE |
| 13 | 91 | 0 | 0 | 22 | 4 | 0 | 13 | ma |
| 14 | 92 | 0 | 0 | end | 2 | 0 | 14 | shita |

Fig.89

| mk-no | LS1 | LS3 | LS4 | MKK | PSMWK | NO | WSNO | KNJ |
|---|---|---|---|---|---|---|---|---|
| 0 | 22 | 0 | 4 | 22 | PS | 2 | 0 | PS |
| 1 | 11 | 8 | 0 | 22 | 0 | 0 | 3 | TARO |
| 2 | 73 | 0 | 0 | 22 | 0 | 0 | 4 | ga |
| 3 | 11 | 2 | 0 | 22 | 0 | 0 | 5 | KYO |
| 4 | 11 | 3 | 0 | 22 | 0 | 0 | 6 | GAKKO |
| 5 | 73 | 0 | 0 | 22 | 0 | 0 | 7 | de |
| 6 | 17 | 0 | 4 | 22 | 0 | 0 | 8 | SHIRO |
| 7 | 71 | 0 | 0 | 22 | 0 | 0 | 9 | i |
| 8 | 11 | 0 | 0 | 22 | 0 | 0 | 10 | BOURU |
| 9 | 73 | 0 | 0 | 22 | 0 | 0 | 11 | wo |
| 10 | 12 | 8 | 0 | 22 | 0 | 0 | 12 | NAGE |
| 11 | 91 | 0 | 0 | 22 | 4 | 0 | 13 | ma |
| 12 | 92 | 0 | 0 | end | 2 | 0 | 14 | shita |

Fig.90

| mk-no | LS1 | LS3 | LS4 | MKK | PSMWK | NO | WSNO | KNJ |
|---|---|---|---|---|---|---|---|---|
| 0 | 22 | 0 | 4 | 22 | PS | 2 | 0 | PS |
| 1 | 11 | 8 | 0 | 22 | 0 | 0 | 3 | TARO |
| 2 | 73 | 0 | 0 | 22 | 0 | 0 | 4 | ga |
| 3 | 11 | 2 | 0 | 22 | 0 | 0 | 5 | KYO |
| 4 | 11 | 3 | 0 | 22 | 0 | 0 | 6 | GAKKO |
| 5 | 73 | 0 | 0 | 22 | 0 | 0 | 7 | de |
| 6 | 22 | 0 | 4 | 22 | PS | 4 | 8 | PS |
| 7 | 11 | 0 | 0 | 22 | 0 | 0 | 10 | BOURU |
| 8 | 73 | 0 | 0 | 22 | 0 | 0 | 11 | wo |
| 9 | 12 | 8 | 0 | 22 | 0 | 0 | 12 | NAGE |
| 10 | 91 | 0 | 0 | 22 | 4 | 0 | 13 | ma |
| 11 | 92 | 0 | 0 | end | 2 | 0 | 14 | shita |

Fig.91

```
Adjectival verb relationship()
{
    i = 0;
    while(1)
    {
        if(MK[i].LS1==0x18 && MK[i+1].LS1== 0x71 &&
              MK[i+2].LS1== 0x12)
        {
              Readout of IMI frame();
              Insertion of adjectival verb and suffux particle();
              MK[i+2].PSMWK = PS;
              MK[i+2].NO = tps-ed;
              MK[i+2].LS1 = 0x22;
              MK[i].MKK = 0;
              MK[i+1].MKK = 0;
              retrurn(1);
        }
        i++;
        if( i > mk-max ) return( -1);
    }
}
```

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 100e | 0000 | 0000 | 07 | 01 | 00 | 02 | 00 | 03 | 0 | 0 | 0 | 0 | 0000 | 00 | 00 | 00 | 00 | 00 |
| 2 | e000 | 0000 | 0000 | 29 | 04 | 05 | 06 | 07 | 08 | 0 | 0 | 0 | 0 | 0000 | 00 | 00 | 00 | 00 | 00 |
| 3 | 1000 | 0000 | 0000 | 16 | 09 | 00 | 10 | 11 | 12 | 0 | 0 | 0 | 0 | 0000 | 00 | 00 | 00 | 00 | 00 |
| 4 | e000 | 0000 | 0000 | 24 | 13 | 14 | 15 | 16 | 17 | 0 | 0 | 0 | 0 | 0000 | 00 | 00 | 00 | 00 | 00 |
| 5 | 100e | 0000 | 0000 | 27 | 18 | 00 | 19 | 00 | 23 | 0 | 0 | 0 | 0 | 0000 | 00 | 00 | 00 | 00 | 00 |
| 6 | 0000 | 0000 | 0000 | 32 | 24 | 25 | 26 | 27 | 28 | 0 | 0 | 0 | 0 | 0000 | 00 | 00 | 00 | 00 | 00 |
| 7 | e000 | 0000 | 0000 | 00 | 29 | 30 | 31 | 32 | 33 | 0 | 0 | 0 | 0 | 0000 | 00 | 00 | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | e00e | 0000 | 0000 | 00 | 00 | 1 | 00 | 07 | 00 | 0 | 0 | 00 | 00 | GENKI | 000 | 00 | 000 | 000 | 000 | 000 | 000 | sa | 000 | 0000 |
| 2 | 0003 | e00e | 0000 | 0000 | 00 | 00 | 1 | 00 | 04 | 00 | 0 | 0 | 00 | 00 | TARO | 000 | 00 | 000 | 000 | 000 | 000 | 000 | notokoro | | 1701 |
| 3 | 0005 | e00e | 0000 | 0000 | 00 | 00 | 1 | 00 | 00 | 00 | 0 | 0 | 00 | 00 | A | 000 | 00 | 000 | 000 | 000 | 000 | 000 | 000 | 000 | 0000 |
| 4 | 0001 | e00e | 0000 | 0000 | 00 | 00 | 2 | 00 | 00 | 00 | 0 | 0 | 00 | 00 | TARO | 000 | 00 | 000 | 000 | 000 | 000 | 000 | 000 | 000 | 101 |
| 5 | 0002 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 1101 |
| 6 | 0003 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | 1501 |
| 7 | 0004 | 00ee | 0000 | 0000 | 00 | 00 | 2 | 01 | 00 | 00 | 0 | 0 | 00 | 00 | GENKI | 00 | 00 | 000 | 000 | 000 | 000 | na | 000 | 000 | 0000 |
| 8 | 0005 | e00e | 0000 | 0000 | 00 | 00 | 2 | 00 | 00 | 00 | 0 | 0 | 00 | 00 | て | 000 | 00 | 000 | 000 | 000 | 000 | 000 | 000 | 000 | 0000 |
| 9 | 0001 | e00e | 0000 | 0000 | 00 | 00 | 3 | 00 | 00 | 00 | 0 | 0 | 00 | 00 | IRO | 000 | 00 | 000 | 000 | 000 | 000 | 000 | 000 | 000 | 0000 |
| 10 | 0003 | e00e | 0000 | 0000 | 00 | 00 | 3 | 00 | 13 | 00 | 0 | 0 | 00 | 00 | BOURU | 00 | 00 | 000 | 000 | 000 | 000 | 000 | 000 | 000 | 0000 |
| 11 | 0004 | e00e | 0000 | 0000 | 00 | 00 | 3 | 00 | 16 | 00 | 0 | 0 | 00 | 00 | SHIRO | 00 | 00 | 000 | 000 | 000 | 000 | i | 000 | 000 | 0000 |
| 12 | 0005 | e00e | 0000 | 0000 | 00 | 00 | 3 | 00 | 00 | 00 | 0 | 0 | 00 | 00 | jyotai | 0 | 00 | 000 | 000 | 000 | 000 | 000 | 000 | 000 | 0000 |
| 13 | 0001 | e00e | 0000 | 0000 | 00 | 00 | 4 | 00 | 00 | 00 | 0 | 0 | 00 | 00 | BOURU | 00 | 00 | 000 | 000 | 000 | 000 | 000 | 000 | 000 | 101 |
| 14 | 0002 | 000e | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 1101 |
| 15 | 0003 | 00ee | 0000 | 0000 | 00 | 00 | 4 | 00 | 00 | 00 | 0 | 0 | 00 | 00 | 0000 | 000 | 00 | 000 | 000 | 000 | 000 | 000 | 000 | 000 | 1501 |
| 16 | 0004 | 0000 | 0000 | 0000 | 00 | 00 | 4 | 03 | 00 | 00 | 0 | 0 | 00 | 00 | SHIRO | 00 | 00 | 000 | 000 | 000 | 000 | i | 000 | 000 | 0000 |

Fig.92-2

```
17 0005 e00e 0000 0000 00 00  4 00 00 00 0 0 00 00 de    000 00 000 000 000 000 000 000 000 0000
18 0001 e00e 0000 0000 00 00  5 00 24 00 0 0 00 00 BOURU 00 00 000 000 000 000 000 000 000  101
19 0003 001e 0000 0000 00 00  5 20 00 00 0 0 00 00 0000 000 00 000 000 000 000 000 000 000 0000
20 0000 0001 0000 0000 19 21 19 00 00 00 0 0 00 00 0000 000 00 000 000 000 000 000 kara000 1801
21 0000 0000 0000 0000 20 22 00 00 00 00 0 0 00 00 0000 KUCYU  000 000 000 000 000 wotooshite 1
22 0000 0000 0000 0000 21 00 00 00 00 00 0 0 00 00 0000 000 00 000 000 000 000 000 he  000 1a01
23 0005 000e 0000 0000 00 00  5 00 00 00 0 0 00 00 0000 000 00 000 000 000 000 000 000 000 0000
24 0001 00ee 0000 0000 00 00  6  4 00 13 0 0 00 00 BOURU 00 00 000 000 000 000 000 wo  000  d01
25 0002 e00e 0000 0000 00 00  6 00 30 00 0 0 00 00 KYO  000 00 000 000 000 000 000 000 000 1101
26 0003 e00e 0000 0000 00 00  6 00 31 00 0 0 00 00 GAKKO000 00 000 000 000 000 000 de  000 1501
27 0004 00ee 0000 0000 00 00  6  5 00 00 0 0 00 00 0000 000 00 000 000 000 000 000 000 000 0000
28 0005 e00e 0000 0000 00 00  6 00 00 00 0 0 00 00 TO   000 00 000 000 000 000 000 000 000 0000
29 0001 00ee 0000 0000 00 00  7  2 00  4 0 0 00 00 TARO 000 00 000 000 000 000 000 ga  000  701
30 0002 000e 0000 0000 00 00  7 00 00 00 0 0 00 00 KYO  000 00 000 000 000 000 000 000 000 1101
31 0003 000e 0000 0000 00 00  7 00 00 00 0 0 00 00 GAKKO 00 00 000 000 000 000 000 de  000 1501
32 0004 00ee 0000 0000 00 00  7  6 00 00 0 0 00 00 0000 000 00 000 000 000 000 000 000 000 0000
33 0005 000e 0000 0000 00 00  7 00 00 00 0 0 00 00 NAGE 000 00 000 000 000 000 ru  000 000 0000
```

Fig.93( a )
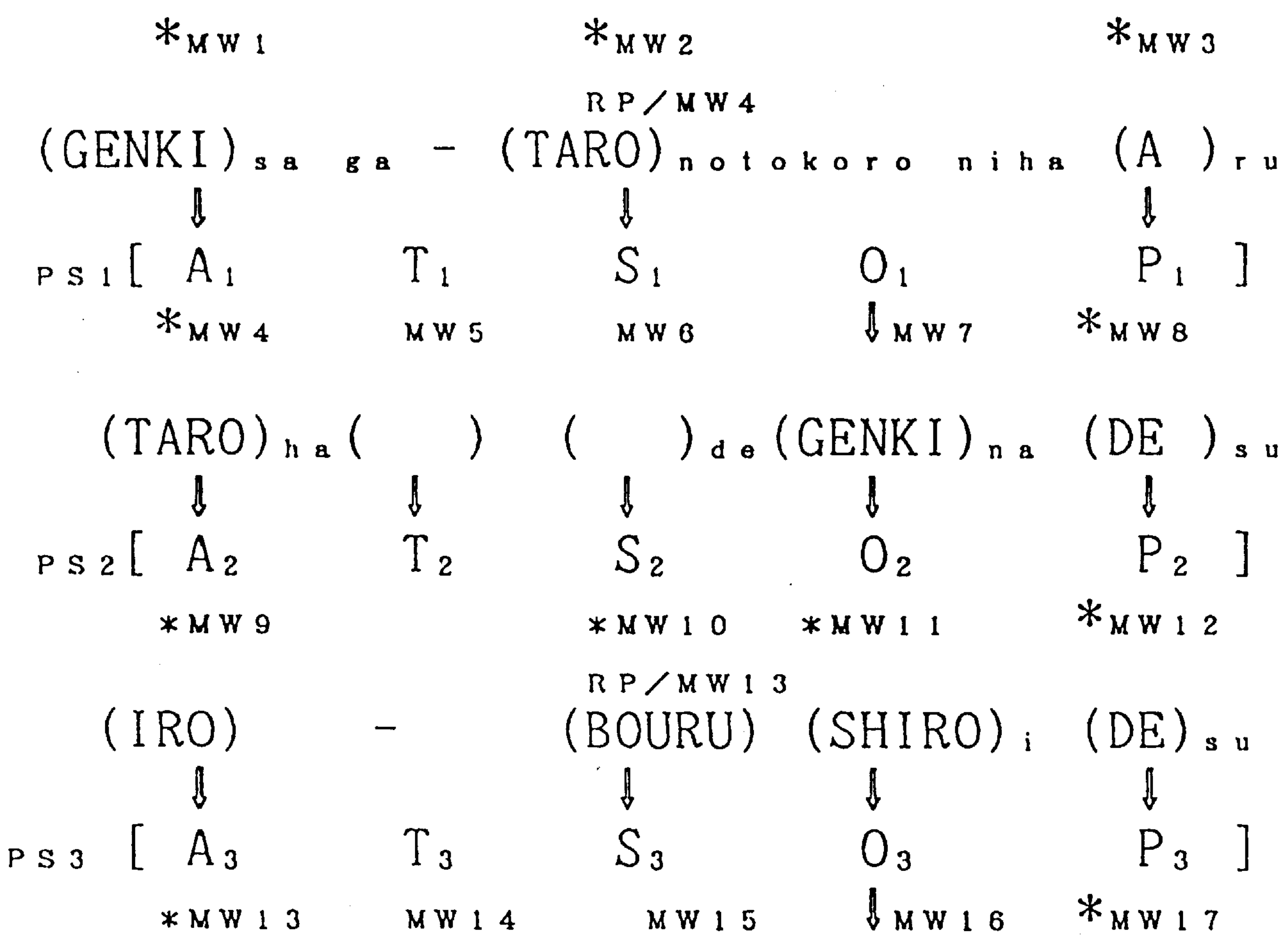

(BOURO)ha ( ) ( ) (SHIRO)i (DE )su
PS4 [ A4 T4 S4 O4 P4 ]
MW20 *MW21 MW22
CNC/KUCYU
( )kara ( ) ( )he
MW18 MW19 *MW23
RP/MW24
(BOURU) — ( ) — (A )ru
PS5[ A5 T5 S5 O5 P5 ]
MW24 *MW25 *MW26 MW27 *MW28
RP/MW30 RP/MW31
(BOURU)wo (KYO) (GAKKO)de ( ) (TO)bu
PS6[ A6 T6 S6 O6 P6 ]
MW29 MW30 MW31 MW32 MW33
(TARO)ga (KYO) (GAKKO)de ( ) (NAGE)ru ]
PS7[ A7 T7 S7 O7 P7 ]

Fig. 94

```
Adjective relationship()
{
    i=0;
    while(1)
    {
        if(MK[i].LS1==0x17&& MK[i+1].LS1
                                              ==0x71)
        {
            Readout of adjective frame();
            Insert of adjective and
                              suffix particle();
            MK[i].PSMWK=PS;
            MK[i].NO=tps-ed;
            MK[i].LS1 = 0x22;
            MK[i+1].MKK=0;
            return(1);
        }
        i++;
        if(i>mk-max) return(-1);
    }
}
```

Fig. 95

```
Relationship of insertion of
                     extracted words()
{
  i=0;
  while(1)
  {
    if(MK[i].LS1==0x22 && MK[i+1].LS1==0x11)
    {
       x=MK[i].NO;
       if( Find out MW which is allowed to
           insert into IMI frame()>0)

       {
         Relationship of insertion of
                   extracted words();
         MK[i].PSMWK =0;
         MK[i].NO=0;
         return(1);
       }
    }
    i++;
    if(i>mk-max) return(1);
  }
}
```

Fig.97-1

| mk-no | LS1 | LS3 | LS4 | MKK | PSMWK | NO | WSNO | KNJ |
|---|---|---|---|---|---|---|---|---|
| 0 | 11 | 8 | 0 | 22 | 0 | 0 | 3 | TARO |
| 1 | 73 | 0 | 0 | 22 | 0 | 0 | 4 | ga |
| 2 | 11 | 2 | 0 | 22 | 0 | 0 | 5 | KYO |
| 3 | 11 | 3 | 0 | 22 | 0 | 0 | 6 | GAKKO |
| 4 | 73 | 0 | 0 | 22 | 0 | 0 | 7 | de |
| 5 | 22 | 0 | 4 | 22 | PS | 4 | 8 | PS4 |
| 6 | 11 | 0 | 0 | 22 | 0 | 0 | 10 | BOURU |
| 7 | 73 | 0 | 0 | 22 | 0 | 0 | 11 | wo |
| 8 | 12 | 8 | 0 | 22 | 0 | 0 | 12 | NAGE |
| 9 | 91 | 0 | 0 | 22 | 4 | 0 | 13 | ma |
| 10 | 92 | 0 | 0 | end | 2 | 0 | 14 | shita |

Fig.97-2

| mk-no | LS1 | LS3 | LS4 | MKK | PSMWK | NO | WSNO | KNJ |
|---|---|---|---|---|---|---|---|---|
| 0 | 11 | 8 | 0 | 22 | 0 | 0 | 3 | TARO |
| 1 | 73 | 0 | 0 | 22 | 0 | 0 | 4 | ga |
| 2 | 11 | 2 | 0 | 22 | 0 | 0 | 5 | KYO |
| 3 | 11 | 3 | 0 | 22 | 0 | 0 | 6 | GAKKO |
| 4 | 73 | 0 | 0 | 22 | 0 | 0 | 7 | de |
| 5 | 11 | 0 | 0 | 22 | 0 | 0 | 10 | BOURU |
| 6 | 73 | 0 | 0 | 22 | 0 | 0 | 11 | wo |
| 7 | 12 | 8 | 0 | 22 | 0 | 0 | 12 | NAGE |
| 8 | 91 | 0 | 0 | 22 | 4 | 0 | 13 | ma |
| 9 | 92 | 0 | 0 | end | 2 | 0 | 14 | shita |

Fig.98

| mk-no | LS1 | LS3 | LS4 | MK | PSMW | NO | WSNO | K N J | |
|---|---|---|---|---|---|---|---|---|---|
| 0 | 11 | 8 | 0 | 22 | 0 | 0 | 0 | JIRO | |
| 1 | 73 | 0 | 0 | 22 | 0 | 0 | 1 | ha | |
| 2 | 11 | 8 | 0 | 22 | 0 | 0 | 2 | TARO | kptop |
| 3 | 73 | 0 | 0 | 22 | 0 | 0 | 3 | ga | |
| 4 | 11 | 8 | 0 | 22 | 0 | 0 | 4 | HANAKO | |
| 5 | 73 | 0 | 0 | 22 | 0 | 0 | 5 | ni | |
| 6 | 11 | 0 | 0 | 22 | 0 | 0 | 6 | BARA | |
| 7 | 73 | 0 | 0 | 22 | 0 | 0 | 7 | wo | |
| 8 | 12 | 0 | 5 | 22 | 0 | 0 | 8 | ATAE | kpbot |
| 9 | 91 | 0 | 0 | 22 | 0 | 0 | 9 | na | |
| 10 | 92 | 0 | 0 | 22 | 0 | 0 | 10 | katta | |
| 11 | 81 | 0 | 0 | 22 | 0 | 0 | 11 | to | |
| 12 | 72 | 0 | 1 | 22 | 0 | 0 | 12 | ha | |
| 13 | 12 | 1 | 5 | 22 | 0 | 0 | 13 | OMO | |
| 14 | 71 | 0 | 0 | 22 | 0 | 0 | 14 | wa | |
| 15 | 91 | 0 | 0 | 22 | 0 | 0 | 15 | na | |
| 16 | 92 | 0 | 0 | 22 | 0 | 0 | 16 | katta | |
| 17 | 16 | 0 | 4 | 22 | 0 | 0 | 17 | RASHI | |
| 18 | 71 | 0 | 0 | 22 | 0 | 0 | 18 | i | |
| 19 | 72 | 0 | 1 | end | 0 | 0 | 19 | yo | |

Fig.99( a )
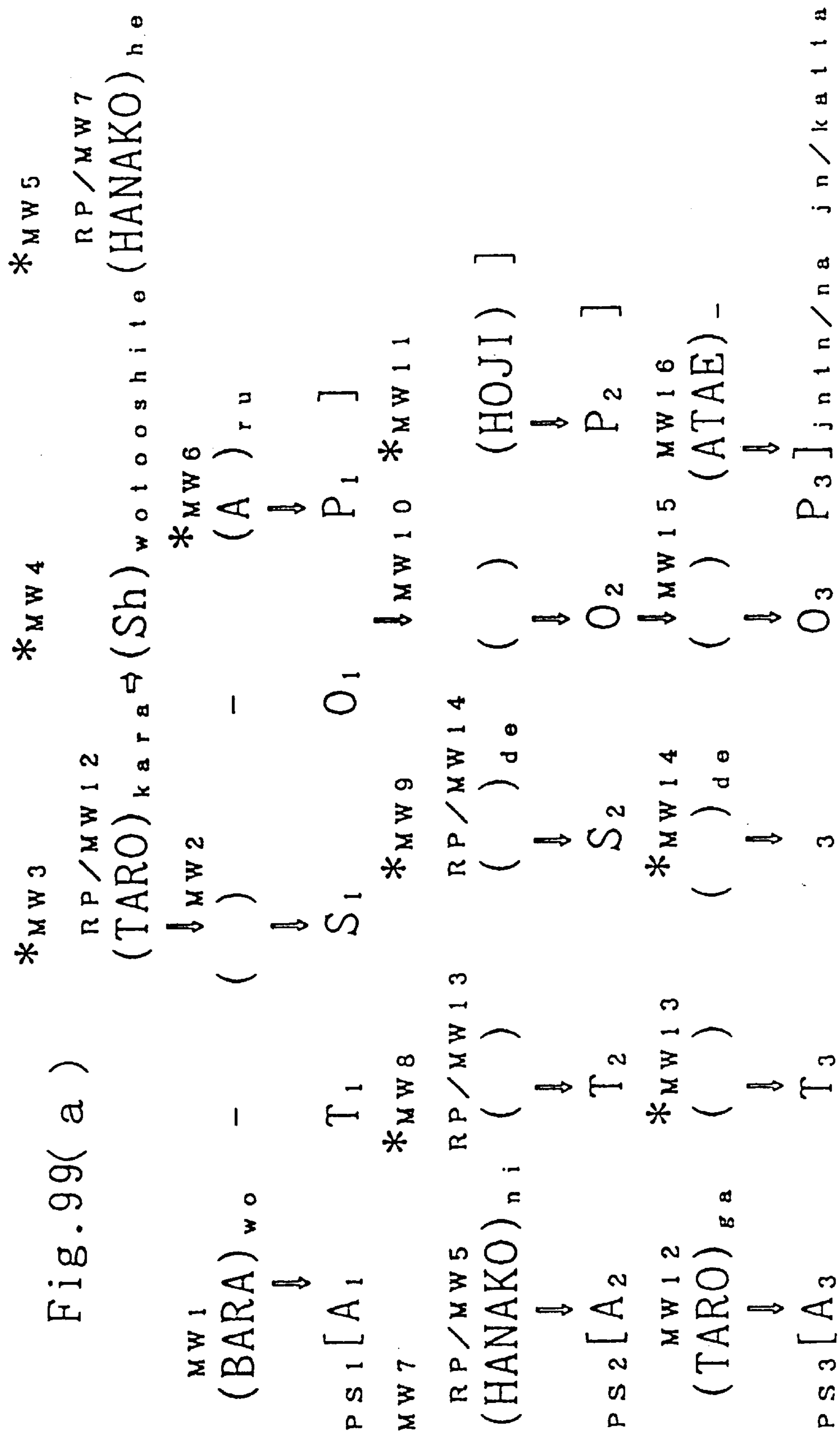

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 100e | 0000 | 0000 | 10 | 1 | 00 | 2 | 00 | 6 | 0 | 0 | 0 | 0 | 0000 | 00 | 00 | 00 | 00 | 00 |
| 2 | 000e | 0000 | 0000 | 15 | 7 | 8 | 9 | 10 | 11 | 0 | 0 | 0 | 0 | 0000 | 00 | 00 | 00 | 00 | 00 |
| 3 | e00e | 0011 | 0000 | 17 | 12 | 13 | 14 | 15 | 16 | 0 | 0 | 0 | 0 | na | kattato | | ha | 00 | 00 |
| 4 | 100e | 0000 | 0000 | 23 | 17 | 00 | 18 | 00 | 19 | 0 | 0 | 0 | 0 | 0000 | 00 | 00 | 00 | 00 | 00 |
| 5 | e00e | 0011 | 0000 | 28 | 20 | 21 | 22 | 23 | 24 | 0 | 0 | 0 | 0 | na | katta00 | | 00 | 00 | 00 |
| 6 | 1000 | 0000 | 0000 | 29 | 25 | 00 | 26 | 00 | 27 | 0 | 0 | 0 | 0 | 0000 | 00 | 00 | 00 | 00 | 00 |
| 7 | 0000 | 0000 | 0000 | 31 | 28 | 00 | 00 | 29 | 30 | 0 | 0 | 0 | 0 | 0000 | 00 | 00 | 00 | 00 | 00 |
| 8 | 0000 | 0000 | 0000 | 37 | 31 | 00 | 32 | 00 | 33 | 0 | 0 | 0 | 0 | 0000 | 00 | 00 | 00 | 00 | 00 |
| 9 | e000 | 0000 | 0000 | 00 | 34 | 35 | 36 | 37 | 38 | 0 | 0 | 0 | 0 | 0000 | 00 | yo | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | 000e | 0000 | 0000 | 00 | 00 | 1 | 00 | 00 | 00 | 0 | 0 | 00 | 00 | BARA | 000 | 00 | 000 | 000 | 000 | 000 | 000 | wo | 000 | d01 |
| 2 | 0003 | 001e | 0000 | 0000 | 00 | 00 | 1 | 3 | 00 | 00 | 0 | 0 | 00 | 00 | 0000 | 000 | 00 | 000 | 000 | 000 | 000 | 000 | 000 | 000 | 0000 |
| 3 | 0000 | c001 | 0000 | 0000 | 00 | 4 | 2 | 00 | 12 | 00 | 0 | 0 | 00 | 00 | TARO | 000 | 00 | 000 | 000 | 000 | 000 | 000 | kara | 00 | 1801 |
| 4 | 0000 | e00e | 0000 | 0000 | 3 | 5 | 00 | 00 | 00 | 00 | 0 | 0 | 00 | 00 | 0000 | 000 | 00 | 000 | 000 | 000 | 000 | 000 | wotooshite | | 1 |
| 5 | 0000 | c00e | 0000 | 0000 | 4 | 00 | 00 | 00 | 7 | 00 | 0 | 0 | 00 | 00 | HANAKO | 0 | 00 | 000 | 000 | 000 | 000 | 000 | he | 000 | 1a01 |
| 6 | 0005 | e00e | 0000 | 0000 | 00 | 00 | 1 | 00 | 00 | 00 | 0 | 0 | 00 | 00 | A | 000 | 00 | 000 | 000 | 000 | 000 | 000 | 000 | 000 | 0000 |
| 7 | 0001 | 000e | 0000 | 0000 | 00 | 00 | 2 | 00 | 00 | 00 | 0 | 0 | 00 | 00 | HANAKO | 0 | 00 | 000 | 000 | 000 | 000 | 000 | ni | 000 | f01 |
| 8 | 0002 | e00e | 0000 | 0000 | 00 | 00 | 2 | 00 | 13 | 00 | 0 | 0 | 00 | 00 | 0000 | 000 | 00 | 000 | 000 | 000 | 000 | 000 | 000 | 000 | 1101 |
| 9 | 0003 | e00e | 0000 | 0000 | 00 | 00 | 2 | 00 | 14 | 00 | 0 | 0 | 00 | 00 | 0000 | 000 | 00 | 000 | 000 | 000 | 000 | 000 | de | 000 | 1501 |
| 10 | 0004 | 00ee | 0000 | 0000 | 00 | 00 | 2 | 1 | 00 | 00 | 0 | 0 | 00 | 00 | 0000 | 000 | 00 | 000 | 000 | 000 | 000 | 000 | 000 | 000 | 0000 |
| 11 | 0005 | e00e | 0000 | 0000 | 00 | 00 | 2 | 00 | 00 | 00 | 0 | 0 | 00 | 00 | HOJI | 000 | 00 | 000 | 000 | 000 | 000 | 000 | 000 | 000 | 0000 |
| 12 | 0001 | 000e | 0000 | 0000 | 00 | 00 | 3 | 00 | 00 | 00 | 0 | 0 | 00 | 00 | TARO | 000 | 00 | 000 | 000 | 000 | 000 | 000 | ga | 000 | 701 |
| 13 | 0002 | e00e | 0000 | 0000 | 00 | 00 | 3 | 00 | 21 | 00 | 0 | 0 | 00 | 00 | 0000 | 000 | 00 | 000 | 000 | 000 | 000 | 000 | 000 | 000 | 1101 |
| 14 | 0003 | e00e | 0000 | 0000 | 00 | 00 | 3 | 00 | 22 | 00 | 0 | 0 | 00 | 00 | 0000 | 000 | 00 | 000 | 000 | 000 | 000 | 000 | 000 | 000 | 1501 |
| 15 | 0000 | 00ee | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 0000 |

Fig.100-2

```
16 0005 0000 0000 0000 00 00  3  0 00 00 0 0 00 00 ATAE 000 00 000 000 000 000 000 000 000 0000
17 0001 a0ee 0000 0000 00 00  4  3 00 00 0 0 00 00 0000 KANGAE 000 000 000 000 000 toha 00  c01
18 0003 e00e 0000 0000 00 00  4 00 20 00 0 0 00 00 0000 000 00 000 000 000 000 notokoro 00 1701
19 0005 e00e 0000 0000 00 00  4 00 00 00 0 0 00 00 A    000 00 000 000 000 000 000 000 000 0000
20 0001 000e 0000 0000 00 00  5 00 00 00 0 0 00 00 JIRO 000 00 000 000 000 000 000 ha  000  701
21 0002 000e 0000 0000 00 00  5 00 00 00 0 0 00 00 0000 000 00 000 000 000 000 000 000 000 1101
22 0003 000e 0000 0000 00 00  5 00 00 00 0 0 00 00 0000 000 00 000 000 000 000 000 de  000 1501
23 0004 00ee 0000 0000 00 00  5  4 00 00 0 0 00 00 0000 000 00 000 000 000 000 000 000 000 0000
24 0005 000e 0000 0000 00 00  5 00 00 00 0 0 00 00 OMO  000 00 000 000 000 000 wa  000 000 0000
25 0001 e00e 0000 0000 00 00  6 00 00 00 0 0  FUTASHIKA KANGAE 000 000 000 000 000 sa  000 0000
26 0003 e00e 0000 0000 00 00  6 00 28 00 0 0 00 00 0000 000 00 000 000 000 000 000 000 000 0000
27 0005 e00e 0000 0000 00 00  6 00 00 00 0 0 00 00 A    000 00 000 000 000 000 000 000 000 0000
28 0001 a0ee 0000 0000 00 00  7  5 00 00 0 0 00 00 0000 000 00 000 000 000 000 000 000 000 0000
29 0004 e00e 0000 0000 00 00  7  6 00 00 0 0  FUTASHIKA 000 00 000 000 000 000 de  000 000 1001
30 0005 e00e 0000 0000 00 00  7 00 00 00 0 0 00 00 A    000 00 000 000 000 000 000 000 000 0000
31 0001 00ee 0000 0000 00 00  8  7 00 00 0 0 00 00 0000 KANGAE 000 000 000 000 000 000 000 0000
32 0003 e00e 0000 0000 00 00  8 00 34 00 0 0 00 00 WATASHI  00 000 000 000 000 000 000 000 0000
33 0005 e00e 0000 0000 00 00  8 00 00 00 0 0 00 00 A    000 00 000 000 000 000 ru  000 000 0000
34 0001 e00e 0000 0000 00 00  9 00 00 00 0 0 00 00 WATASHI  00 000 000 000 000 000 000 000 0000
35 0002 e00e 0000 0000 00 00  9 00 00 00 0 0 00 00 0000 000 00 000 000 000 000 000 000 000 0000
36 0003 e00e 0000 0000 00 00  9 00 00 00 0 0 00 00 0000 000 00 000 000 000 000 000 000 000 0000
37 0004 00ee 0000 0000 00 00  9  8 00 00 0 0 00 00 RASHI 00 00 000 000 000 000 i   000 000 0000
38 0005 e00e 0000 0000 00 00  9 00 00 00 0 0 00 00 DE   000 00 000 000 000 000 su  000 000 0000
```

Fig.102

| stkp-wdjo | k2 | k1 | kpjost |
|---|---|---|---|
| 1 | BARA | wo | - |
| 2 | HANAKO | ni | - |
| 3 | TARO | ga | - |
| 4 | JIRO | ha | - |

Fig.103

| mk-no | LS1 | LS3 | LS4 | MK | PSMW | NO | WSNO | K N J |
|---|---|---|---|---|---|---|---|---|
| 0 | 11 | 0 | 4 | 22 | 0 | 0 | 0 | BARA |
| 1 | 73 | 0 | 0 | 22 | 0 | 0 | 1 | ha |
| 2 | 11 | 8 | 5 | 22 | 0 | 0 | 2 | JIRO |
| 3 | 73 | 0 | 0 | 22 | 0 | 0 | 3 | niyotte |
| 4 | 11 | 8 | 0 | 22 | 0 | 0 | 4 | TARO |
| 5 | 73 | 0 | 0 | 22 | 0 | 0 | 5 | nitaishite |
| 6 | 11 | 8 | 0 | 22 | 0 | 0 | 6 | HANAKO |
| 7 | 73 | 0 | 0 | 22 | 0 | 0 | 7 | ni |
| 8 | 12 | 0 | 5 | 22 | 0 | 0 | 8 | ATAE |
| 9 | 71 | 0 | 0 | 22 | 0 | 0 | 9 | sa |
| 10 | 16 | 0 | 5 | 22 | 0 | 0 | 10 | SE |
| 11 | 71 | 0 | 0 | 22 | 0 | 0 | 11 | ra |
| 12 | 16 | 8 | 0 | 22 | 0 | 0 | 12 | RE |
| 13 | 91 | 0 | 0 | 22 | 4 | 0 | 13 | na |
| 14 | 92 | 0 | 0 | end | 2 | 0 | 14 | katta |

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 1000 | 0000 | 0000 | 10 | 1 | 00 | 2 | 00 | 6 | 0 | 0 | 0 | 0 | 0000 | 00 | 00 | 00 | 00 | 00 |
| 2 | 0000 | 0000 | 0000 | 15 | 7 | 8 | 9 | 10 | 11 | 0 | 0 | 0 | 0 | 0000 | 00 | 00 | 00 | 00 | 00 |
| 3 | e000 | 0000 | 0000 | 20 | 12 | 13 | 14 | 15 | 16 | 0 | 0 | 0 | 0 | 0000 | 00 | 00 | 00 | 00 | 00 |
| 4 | a000 | 0000 | 0000 | 25 | 17 | 18 | 19 | 20 | 21 | 0 | 0 | 0 | 0 | 0000 | 00 | 00 | 00 | 00 | 00 |
| 5 | a000 | 0011 | 0000 | 00 | 22 | 23 | 24 | 25 | 26 | 0 | 0 | 0 | 0 | na | katta | | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | e00e | 0000 | 0000 | 00 | 00 | 1 | 00 | 22 | 00 | 0 | 0 | 00 | 00 | BARA | 000 | 00 | 000 | 000 | 000 | 000 | 000 | wo | 000 | d01 |
| 2 | 0003 | 001e | 0000 | 0000 | 00 | 00 | 1 | 3 | 00 | 00 | 0 | 0 | 00 | 00 | 0000 | 000 | 00 | 000 | 000 | 000 | 000 | 000 | 000 | 000 | 0000 |
| 3 | 0000 | e001 | 0000 | 0000 | 00 | 4 | 2 | 00 | 12 | 00 | 0 | 0 | 00 | 00 | TARO | 000 | 00 | 000 | 000 | 000 | 000 | 000 | kara | 00 | 1801 |
| 4 | 0000 | e000 | 0000 | 0000 | 3 | 5 | 00 | 00 | 00 | 00 | 0 | 0 | 00 | 00 | 0000 | 000 | 00 | 000 | 000 | 000 | 000 | wotooshie | | 0 | 1901 |
| 5 | 0000 | e000 | 0000 | 0000 | 4 | 00 | 00 | 00 | 7 | 00 | 0 | 0 | 00 | 00 | HANAKO | 0 | 00 | 000 | 000 | 000 | 000 | 000 | he | 000 | 1a01 |
| 6 | 0005 | e00e | 0000 | 0000 | 00 | 1 | 00 | 00 | 00 | 00 | 0 | 0 | 00 | 00 | A | 000 | 00 | 000 | 000 | 000 | 000 | 000 | 000 | 000 | 0000 |
| 7 | 0001 | 000e | 0000 | 0000 | 00 | 00 | 2 | 00 | 00 | 00 | 0 | 0 | 00 | 00 | HANAKO | 0 | 00 | 000 | 000 | 000 | 000 | 000 | 000 | 000 | f01 |
| 8 | 0002 | e00e | 0000 | 0000 | 00 | 00 | 2 | 00 | 13 | 00 | 0 | 0 | 00 | 00 | 0000 | 000 | 00 | 000 | 000 | 000 | 000 | 000 | 000 | 000 | 0000 |
| 9 | 0003 | e00e | 0000 | 0000 | 00 | 00 | 2 | 00 | 14 | 00 | 0 | 0 | 00 | 00 | 0000 | 000 | 00 | 000 | 000 | 000 | 000 | 000 | 000 | 000 | 0000 |
| 10 | 0004 | 00ee | 0000 | 0000 | 00 | 00 | 2 | 1 | 00 | 00 | 0 | 0 | 00 | 00 | 0000 | 000 | 00 | 000 | 000 | 000 | 000 | 000 | 000 | 000 | 0000 |
| 11 | 0005 | e00e | 0000 | 0000 | 00 | 00 | 2 | 00 | 00 | 00 | 0 | 0 | 00 | 00 | HOJI | 000 | 00 | 000 | 000 | 000 | 000 | 000 | 000 | 000 | 0000 |
| 12 | 0001 | 000e | 0000 | 0000 | 00 | 00 | 3 | 00 | 00 | 00 | 0 | 0 | 00 | 00 | TARO | 000 | 00 | 000 | 000 | 000 | 000 | nitaishite | | | 801 |
| 13 | 0002 | e00e | 0000 | 0000 | 00 | 00 | 3 | 00 | 18 | 00 | 0 | 0 | 00 | 00 | 0000 | 000 | 00 | 000 | 000 | 000 | 000 | 000 | 000 | 000 | 1101 |
| 14 | 0003 | e00e | 0000 | 0000 | 00 | 00 | 3 | 00 | 19 | 00 | 0 | 0 | 00 | 00 | 0000 | 000 | 00 | 000 | 000 | 000 | 000 | 000 | 000 | 000 | 1501 |
| 15 | 0004 | 00ee | 0000 | 0000 | 00 | 00 | 3 | 2 | 00 | 00 | 0 | 0 | 00 | 00 | 0000 | 000 | 00 | 000 | 000 | 000 | 000 | 000 | 000 | 000 | 0000 |
| 16 | 0005 | 000e | 0000 | 0000 | 00 | 00 | 3 | 00 | 00 | 00 | 0 | 0 | 00 | 00 | ATAE | 000 | 00 | 000 | 000 | 000 | 000 | sa | 000 | 000 | 0000 |
| 17 | 0001 | 000e | 0000 | 0000 | 00 | 00 | 4 | 00 | 00 | 00 | 0 | 0 | 00 | 00 | JIRO | 000 | 00 | 000 | 000 | 000 | 000 | niyotte | | 000 | 901 |

Fig. 104-2

| | | | | | | | | | | | | | | | | | | | | | | | | | |
|---|---|---|---|---|---|---|---|---|---|---|---|---|---|---|---|---|---|---|---|---|---|---|---|---|---|
| 18 | 0002 | e00e | 0000 | 0000 | 00 | 00 | 4 | 00 | 23 | 00 | 0 | 0 | 00 | 00 | 0000 | 000 | 00 | 000 | 000 | 000 | 000 | 000 | 000 | 000 | 1101 |
| 19 | 0003 | e00e | 0000 | 0000 | 00 | 00 | 4 | 00 | 24 | 00 | 0 | 0 | 00 | 00 | 0000 | 000 | 00 | 000 | 000 | 000 | 000 | 000 | 000 | 000 | 1501 |
| 20 | 0004 | 00ee | 0000 | 0000 | 00 | 00 | 4 | 3 | 00 | 00 | 0 | 0 | 00 | 00 | 0000 | 000 | 00 | 000 | 000 | 000 | 000 | 000 | 000 | 000 | 0000 |
| 21 | 0005 | 000e | 0000 | 0000 | 00 | 00 | 4 | 00 | 00 | 00 | 0 | 0 | 00 | 00 | SE | 000 | 00 | 000 | 000 | 000 | 000 | ra | 000 | 000 | 0000 |
| 22 | 0001 | 000e | 0000 | 0000 | 00 | 00 | 5 | 00 | 00 | 00 | 0 | 0 | 00 | 00 | BARA | 000 | 00 | 000 | 000 | 000 | 000 | 000 | ha | 000 | 401 |
| 23 | 0002 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 1101 |
| 24 | 0003 | 000e | 0000 | 0000 | 00 | 00 | 5 | 00 | 00 | 00 | 0 | 0 | 00 | 00 | 0000 | 000 | 00 | 000 | 000 | 000 | 000 | 000 | 000 | 000 | 1501 |
| 25 | 0004 | 00ee | 0000 | 0000 | 00 | 00 | 5 | 4 | 00 | 00 | 0 | 0 | 00 | 00 | 0000 | 000 | 00 | 000 | 000 | 000 | 000 | 000 | 000 | 000 | 0000 |
| 26 | 0005 | 000e | 0000 | 0000 | 00 | 00 | 5 | 00 | 00 | 00 | 0 | 0 | 00 | 00 | RE | 000 | 00 | 000 | 000 | 000 | 000 | 000 | 000 | 000 | 0000 |

Fig.106

| stkp-wd | k2 | k1 | kpjost |
|---|---|---|---|
| 1 | TARO | nitaishite | — |
| 2 | JIRO | niyotte | — |
| 3 | BARA | ha | — |

Fig.107

| mk-no | LS1 | LS3 | LS4 | MK | PSMW | NO | WSNO | KNJJ | |
|---|---|---|---|---|---|---|---|---|---|
| 0 | 11 | 8 | 0 | 22 | 0 | 0 | 0 | JIRO | |
| 1 | 73 | 0 | 0 | 22 | 0 | 0 | 1 | ha | |
| 2 | 11 | 8 | 0 | 22 | 0 | 0 | 2 | TARO | kptop |
| 3 | 73 | 0 | 0 | 22 | 0 | 0 | 3 | ga | |
| 4 | 11 | 8 | 0 | 22 | 0 | 0 | 4 | HANAKO | |
| 5 | 73 | 0 | 0 | 22 | 0 | 0 | 5 | ni | |
| 6 | 11 | 8 | 0 | 22 | 0 | 0 | 6 | OKANE | |
| 7 | 73 | 0 | 0 | 22 | 0 | 0 | 7 | wo | |
| 8 | 12 | 0 | 5 | 22 | 0 | 0 | 8 | AGE | kpbot |
| 9 | 71 | 0 | 0 | 22 | 0 | 0 | 9 | ta | |
| 10 | 91 | 0 | 0 | 22 | 0 | 0 | 10 | " " | |
| 11 | 53 | 0 | 0 | 22 | 0 | 0 | 11 | node | |
| 12 | 13 | 8 | 0 | 22 | 0 | 0 | 12 | HANAKO | |
| 13 | 73 | 0 | 0 | 22 | 0 | 0 | 13 | ga | |
| 14 | 11 | 0 | 0 | 22 | 0 | 0 | 14 | TOKYO | |
| 15 | 73 | 0 | 0 | 22 | 0 | 0 | 15 | he | |
| 16 | 12 | 0 | 0 | 22 | 0 | 0 | 16 | I | |
| 17 | 71 | 0 | 0 | 22 | 0 | 0 | 17 | tta | |
| 18 | 81 | 0 | 0 | 22 | 0 | 0 | 18 | to | |
| 19 | 12 | 1 | 5 | 22 | 0 | 0 | 19 | OMO | |
| 20 | 71 | 0 | 0 | end | 0 | 0 | 20 | tta | |
| 21 | 91 | 0 | 0 | 88 | 0 | 0 | 21 | " " | |

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 1000 | 0000 | 0000 | 10 | 1 | 00 | 2 | 00 | 6 | 0 | 0 | 0 | 0 | 0000 | 00 | 00 | 00 | 00 | 00 |
| 2 | 0000 | 0000 | 0000 | 15 | 7 | 8 | 9 | 10 | 11 | 0 | 0 | 0 | 0 | 0000 | 00 | 00 | 00 | 00 | 00 |
| 3 | e000 | 0010 | 0000 | 28 | 12 | 13 | 14 | 15 | 16 | 0 | 0 | 0 | 0 | 0000 | 00 | 00 | 00 | 00 | 00 |
| 4 | 1000 | 0000 | 0000 | 26 | 17 | 00 | 18 | 00 | 22 | 0 | 0 | 0 | 0 | 0000 | 00 | 00 | 00 | 00 | 00 |
| 5 | e000 | 0010 | 0000 | 29 | 23 | 24 | 25 | 26 | 27 | 0 | 0 | 0 | 0 | 0000 | 00 | 00 | 00 | 00 | 00 |
| 6 | 1000 | 0000 | 0000 | 36 | 30 | 00 | 31 | 00 | 32 | 0 | 0 | 0 | 0 | 0000 | 00 | 00 | 00 | 00 | 00 |
| 7 | e000 | 0010 | 0000 | 00 | 33 | 34 | 35 | 36 | 37 | 0 | 0 | 0 | 0 | 0000 | 00 | 00 | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | 000e | 0000 | 0000 | 00 | 00 | 1 | 00 | 00 | 00 | 0 | 0 | 00 | 00 | OKANE | 0 | 00 | 000 | 000 | 000 | 000 | 000 | wo | 000 | d01 |
| 2 | 0003 | 001e | 0000 | 0000 | 00 | 00 | 1 | 3 | 00 | 00 | 0 | 0 | 00 | 00 | 0000 | 000 | 00 | 000 | 000 | 000 | 000 | 000 | kara | 00 | 0000 |
| 3 | 0000 | c001 | 0000 | 0000 | 00 | 4 | 2 | 00 | 12 | 00 | 0 | 0 | 00 | 00 | TARO | 000 | 00 | 000 | 000 | 000 | | | wotooshite | 000 | 1801 |
| 4 | 0000 | e000 | 0000 | 0000 | 3 | 5 | 00 | 00 | 00 | 00 | 0 | 0 | 00 | 00 | 0000 | 000 | 00 | 000 | 000 | 000 | 000 | 000 | he | 000 | 1901 |
| 5 | 0000 | c000 | 0000 | 0000 | 4 | 00 | 00 | 00 | 7 | 00 | 0 | 0 | 00 | 00 | HANAKO | 0 | 00 | 000 | 000 | 000 | 000 | 000 | ni | 000 | 1a01 |
| 6 | 0005 | e00e | 0000 | 0000 | 00 | 00 | 1 | 00 | 00 | 00 | 0 | 0 | 00 | 00 | SONZAI | 0 | 00 | 000 | 000 | 000 | 000 | 000 | 000 | 000 | 0000 |
| 7 | 0001 | 000e | 0000 | 0000 | 00 | 00 | 2 | 00 | 00 | 00 | 0 | 0 | 00 | 00 | HANAKO | 0 | 00 | 000 | 000 | 000 | 000 | 000 | 000 | 000 | f01 |
| 8 | 0002 | e00e | 0000 | 0000 | 00 | 00 | 2 | 00 | 13 | 00 | 0 | 0 | 00 | 00 | 0000 | 000 | 00 | 000 | 000 | 000 | 000 | 000 | 000 | 000 | 0000 |
| 9 | 0003 | e00e | 0000 | 0000 | 00 | 00 | 2 | 00 | 14 | 00 | 0 | 0 | 00 | 00 | 0000 | 000 | 00 | 000 | 000 | 000 | 000 | 000 | 000 | 000 | 0000 |
| 10 | 0004 | 00ee | 0000 | 0000 | 00 | 00 | 2 | 1 | 00 | 00 | 0 | 0 | 00 | 00 | 0000 | 000 | 00 | 000 | 000 | 000 | 000 | 000 | 000 | 000 | 0000 |
| 11 | 0005 | e00e | 0000 | 0000 | 00 | 00 | 2 | 00 | 00 | 00 | 0 | 0 | 00 | 00 | HOJI | 000 | 00 | 000 | 000 | 000 | 000 | 000 | 000 | 000 | 0000 |
| 12 | 0001 | 000e | 0000 | 0000 | 00 | 00 | 3 | 00 | 00 | 00 | 0 | 0 | 00 | 00 | TARO | 000 | 00 | 000 | 000 | 000 | 000 | 000 | ga | 000 | 701 |
| 13 | 0002 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1101 |
| 14 | 0003 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1501 |
| 15 | 0004 | 00ee | 0000 | 0000 | 00 | 00 | 3 | 2 | 00 | 00 | 0 | 0 | 00 | 00 | 0000 | 000 | 00 | 000 | 000 | 000 | 000 | 000 | 000 | 000 | 0000 |
| 16 | 0005 | 000e | 0000 | 0000 | 00 | 00 | 3 | 00 | 00 | 00 | 0 | 0 | 00 | 00 | AGE | 000 | 00 | 000 | 000 | 000 | 000 | ta | 000 | 000 | 0000 |

Fig.108-2

```
17 0001 e00e 0000 0000 00 00  4 00 00 00 0 0 00 00 HANAKO 0 00 000 000 000 000 000 000 000 0000
18 0003 001e 0000 0000 00 00  4 19 00 00 0 0 00 00 0000 000 00 000 000 000 000 000 000 000 0000
19 0000 0001 0000 0000 00 00 20 18 00 00 0 0 00 00 0000 000 00 000 000 000 000 000 000 000 1801
20 0000 e000 0000 0000 00 19 21 00 00 00 0 0 00 00 0000 000 00 000 000 000 000 000 000 000 1901
21 0000 0000 0000 0000 00 20 00 00 00 00 0 0 00 00 TOKYO 00 00 000 000 000 000 000 000 000 1a01
22 0005 e00e 0000 0000 00 00  4 00 00 00 0 0 00 00 SONZAI 0 00 000 000 000 000 000 000 000 0000
23 0001 000e 0000 0000 00 00  5 00 00 00 0 0 00 00 HANAKO 0 00 000 000 000 000 000 000 000  701
24 0002 000e 0000 0000 00 00  5 00 00 00 0 0 00 00 0000 000 00 000 000 000 000 000 000 000 1101
25 0003 000e 0000 0000 00 00  5 00 00 00 0 0 00 00 0000 000 00 000 000 000 000 000 000 000 1501
26 0004 00ee 0000 0000 00 00  5  4 00 00 0 0 00 00 0000 000 00 000 000 000 000 000 000 000 0000
27 0005 000e 0000 0000 00 00  5 00 00 00 0 0 00 00 I    000 00 000 000 000 000 tta 000 000 0000
28 0000 00e1 8000 0000 00 29 30  3 00 00 0 0 00 00 0000 000 00 000 000 000 node 00 000 000 0000
29 0000 00e0 0000 0000 28 00 00  5 00 00 0 0 00 00 0000 000 00 000 000 000 000 000 000 000 0000
30 0001 001e 0000 0000 00 00  6 00 00 00 0 0 00 00 0000 000 00 000 000 000 000 000 000 000 0000
31 0003 e00e 0000 0000 00 00  6 00 00 00 0 0 00 00 JIRO 000 00 000 000 000 000 000 000 000 0000
32 0005 e00e 0000 0000 00 00  6 00 00 00 0 0 00 00 A    000 00 000 000 000 000 000 000 000 0000
33 0001 000e 0000 0000 00 00  7 00 00 00 0 0 00 00 JIRO 000 00 000 000 000 000 000 ha  000  701
34 0002 000e 0000 0000 00 00  7 00 00 00 0 0 00 00 0000 000 00 000 000 000 000 000 000 000 1101
35 0003 000e 0000 0000 00 00  7 00 00 00 0 0 00 00 0000 000 00 000 000 000 000 000 000 000 1501
36 0004 00ee 0000 0000 00 00  7  6 00 00 0 0 00 00 0000 000 00 000 000 000 000 000 000 000 0000
37 0005 000e 0000 0000 00 00  7 00 00 00 0 0 00 00 OMO  000 00 000 000 000 000 tta 000 000 0000
```

Fig.109( a )
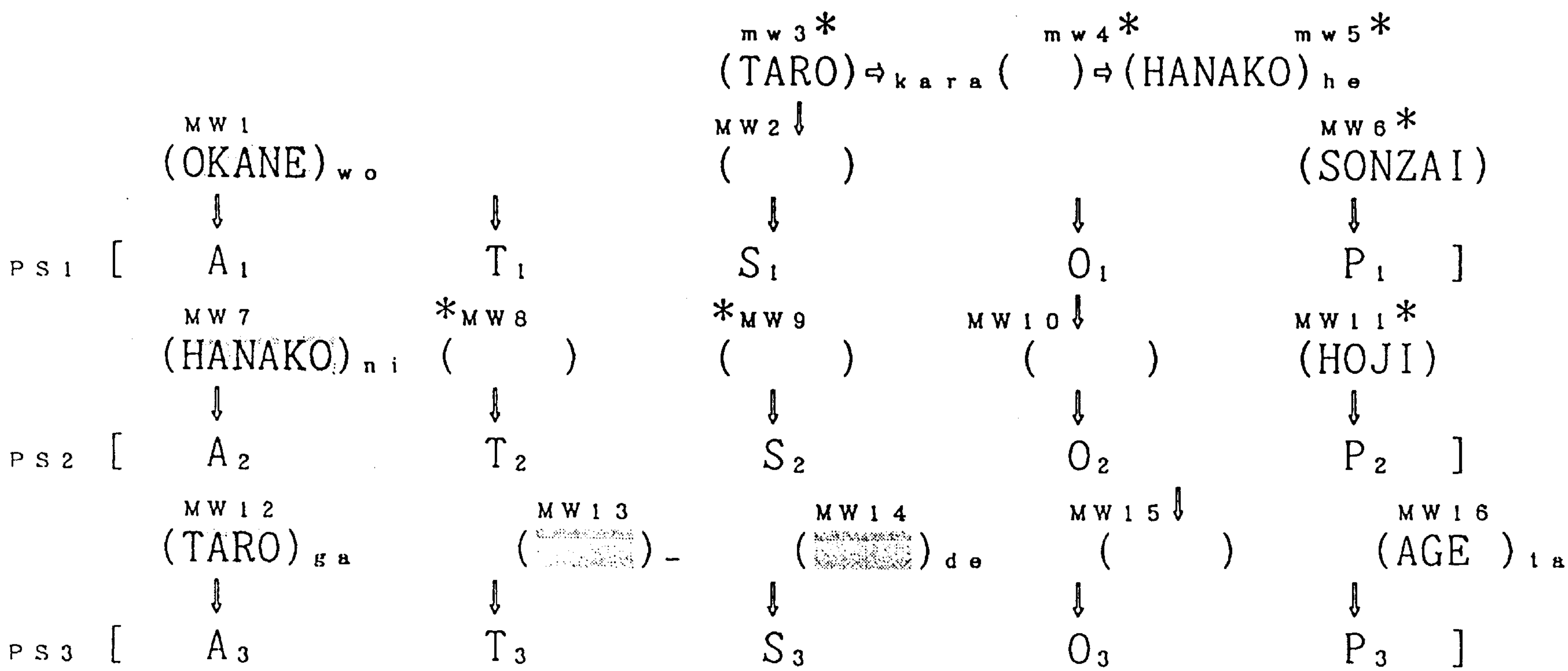

Fig.109( b )
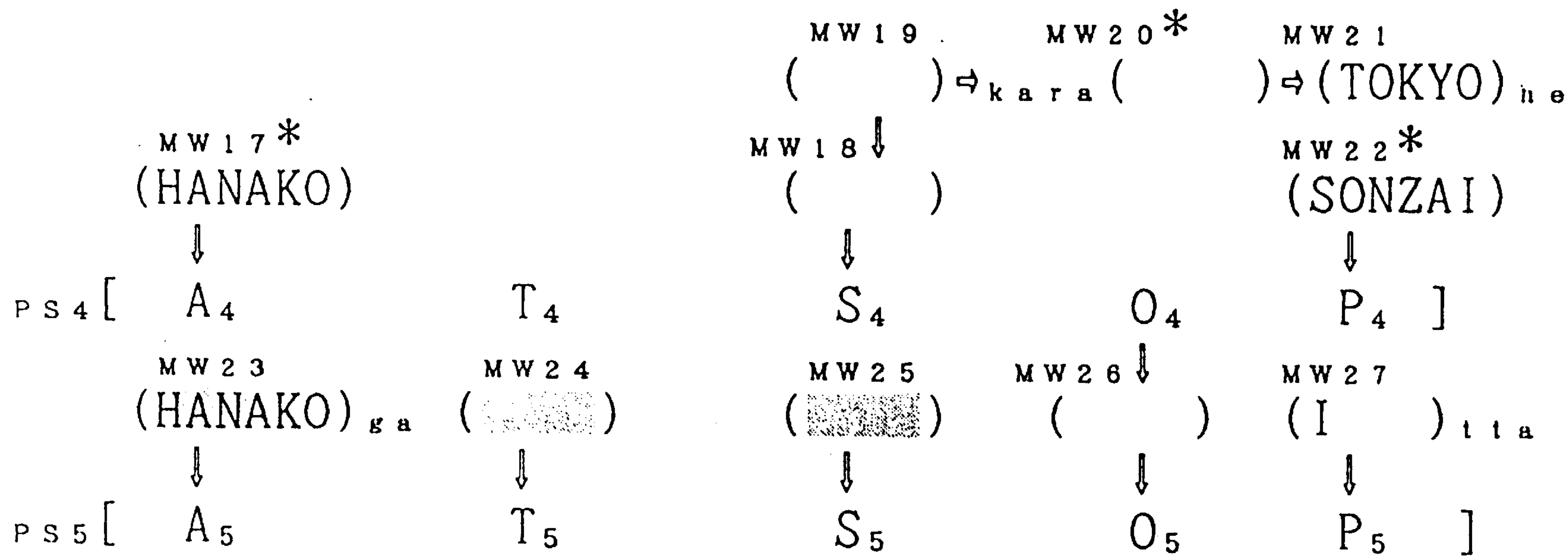

Fig.109( c )
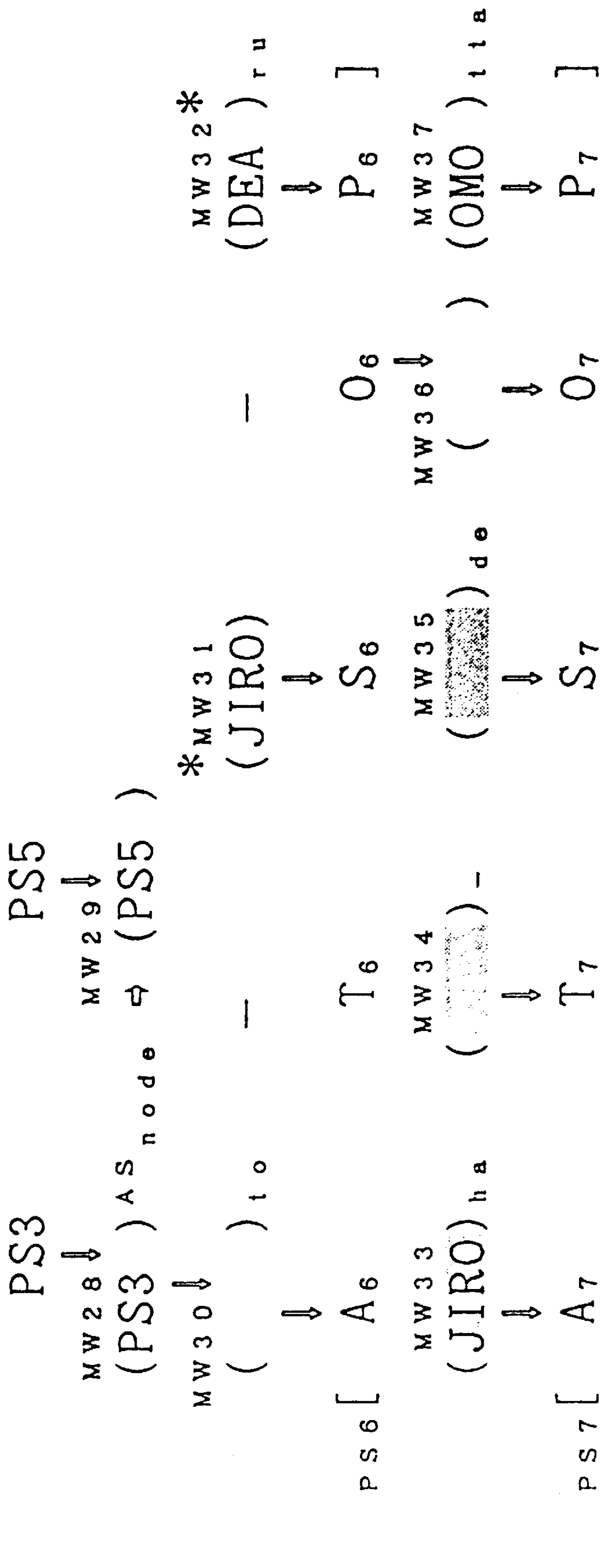

Fig.112

| stkp-wd | k2 | k1 | kjost |
|---|---|---|---|
| 1 | OKANE | wo | — |
| 2 | HANAKO | ni | — |
| 3 | TARO | ga | — |

Fig.113

| stlp-wd | k2 | k1 | kjost |
|---|---|---|---|
| 1 | MW29 | to | — |
| 2 | JIRO | ha | — |

Fig.114

| mk-no | LS1 | LS3 | LS4 | MKK | PSMWK | NO | WSNO | KNJJ |
|---|---|---|---|---|---|---|---|---|
| 0 | 11 | 8 | 0 | 22 | 0 | 0 | 0 | JIRO |
| 1 | 73 | 0 | 0 | 22 | 0 | 0 | 1 | ha |
| 2 | 22 | 0 | 5 | 22 | PS | 3 | 8 | P S 3 |
| 3 | 53 | 0 | 0 | 22 | 0 | 0 | 11 | node |
| 4 | 13 | 8 | 0 | 22 | 0 | 0 | 12 | HANAKO |
| 5 | 73 | 0 | 0 | 22 | 0 | 0 | 13 | ga |
| 6 | 11 | 0 | 0 | 22 | 0 | 0 | 14 | TOKKYO |
| 7 | 73 | 0 | 0 | 22 | 0 | 0 | 15 | he |
| 8 | 12 | 0 | 0 | 22 | 0 | 0 | 16 | I |
| 9 | 71 | 0 | 0 | 22 | 0 | 0 | 17 | tta |
| 10 | 81 | 0 | 0 | 22 | 0 | 0 | 18 | to |
| 11 | 12 | 1 | 5 | 22 | 0 | 0 | 19 | OMO |
| 12 | 71 | 0 | 0 | 22 | 0 | 0 | 20 | tta |
| 13 | 91 | 0 | 0 | end | 0 | 0 | 21 | ” ” |

Fig.115

| mk-no | LS1 | LS3 | LS4 | MKK | PSMWK | NO | WSNO | KNJJ |
|---|---|---|---|---|---|---|---|---|
| 0 | 11 | 8 | 0 | 22 | 0 | 0 | 0 | JIRO |
| 1 | 73 | 0 | 0 | 22 | 0 | 0 | 1 | ha |
| 2 | 22 | 0 | 5 | 22 | PS | 3 | 8 | P S 3 |
| 3 | 53 | 0 | 0 | 22 | 0 | 0 | 11 | node |
| 4 | 12 | 0 | 0 | 22 | PS | 5 | 16 | P S 5 |
| 5 | 81 | 0 | 0 | 22 | 0 | 0 | 18 | to |
| 6 | 12 | 1 | 5 | 22 | 0 | 0 | 19 | OMO |
| 7 | 71 | 0 | 0 | 22 | 0 | 0 | 20 | tta |
| 8 | 91 | 0 | 0 | end | 0 | 0 | 21 | ” ” |

Fig.116

| mk-no | LS1 | LS3 | LS4 | MKK | PSMWK | NO | WSNO | KNJJ |
|---|---|---|---|---|---|---|---|---|
| 0 | 11 | 8 | 0 | 22 | 0 | 0 | 0 | JIRO |
| 1 | 73 | 0 | 0 | 22 | 0 | 0 | 1 | ha |
| 2 | 22 | 0 | 5 | 22 | MW | 28 | 8 | M W 2 8 |
| 3 | 81 | 0 | 0 | 22 | 0 | 0 | 18 | to |
| 4 | 12 | 1 | 5 | 22 | 0 | 0 | 19 | OMO |
| 5 | 71 | 0 | 0 | 22 | 0 | 0 | 20 | tta |
| 6 | 91 | 0 | 0 | end | 0 | 0 | 21 | ” ” |

Fig.117

| mk-no | LS1 | LS3 | LS4 | MKK | PSMWK | NO | WSNO | KNJ |
|---|---|---|---|---|---|---|---|---|
| 0 | 11 | 8 | 0 | 22 | 0 | 0 | 0 | TARO |
| 1 | 73 | 0 | 0 | 22 | 0 | 0 | 1 | no |
| 2 | 11 | 8 | 0 | 22 | 0 | 0 | 2 | HANAKO |
| 3 | 73 | 0 | 0 | 22 | 0 | 0 | 3 | heno |
| 4 | 11 | 0 | 0 | 22 | 0 | 0 | 4 | BARA |
| 5 | 73 | 0 | 0 | 22 | 0 | 0 | 5 | no |
| 6 | 13 | 0 | 5 | 22 | 0 | 0 | 6 | PUREZENTO |
| 7 | 73 | 0 | 0 | 22 | 0 | 0 | 7 | ha |
| 8 | 12 | 0 | 0 | 22 | 0 | 0 | 8 | ” ” |
| 9 | 71 | 0 | 0 | 22 | 0 | 0 | 9 | ari |
| 10 | 91 | 0 | 0 | 22 | 0 | 0 | 10 | ma |
| 11 | 92 | 0 | 0 | end | 0 | 0 | 11 | sendeshita |

Fig.118

| mk-no | LS1 | LS3 | LS4 | MKK | PSMWK | NO | WSNO | KNJ |
|---|---|---|---|---|---|---|---|---|
| 0 | 11 | 0 | 5 | 22 | PS | 3 | 6 | P S 3 |
| 1 | 73 | 0 | 0 | 22 | 0 | 0 | 7 | ha |
| 2 | 12 | 0 | 0 | 22 | 0 | 0 | 8 | ” ” |
| 3 | 71 | 0 | 0 | 22 | 0 | 0 | 9 | ari |
| 4 | 91 | 0 | 0 | 22 | 0 | 0 | 10 | ma |
| 5 | 92 | 0 | 0 | end | 0 | 0 | 11 | sendeshita |

```
no -MK  -NTN -KY  -L -A -T -S -O -P -X-Y-Z-j1 -jntn-jn-jm-jost-j2-SC
 1 1000 0000 0000 10  1 00  2 00  6 0 0 0 0   0000 00 00 00   00 00
 2 0000 0000 0000 15  7  8  9 10 11 0 0 0 0   0000 00 00 00   00 00
 3 e000 0000 0000 17 12 13 14 15 16 0 0 0 0   0000 00 00 00   00 00
 4 a000 0111 0000 00 17 18 19 00 20 0 0 0 0   ma   sendeshita 00 00
```

(b)

```
no .MK  .BK  .LOG .KY  .B .N .L .MW.RP.mw.F.H.jr.jh.WD   .CNC.jt.jpu.jxp.jls.jlg.jgb.jcs.jos.jinx
 1 0001 000e 0000 0000 00 00  1 00 00 00 0 0 00 00 BARA 000 00 000 000 000 000 000 no  000  d07
 2 0003 001e 0000 0000 00 00  1  3 00 00 0 0 00 00 0000 000 00 000 000 000 000 000 000 000 0000
 3 0000 c001 0000 0000 00  4  2 00 12 00 0 0 00 00 TARO 000 00 000 000 000 000 000 karano  1807
 4 0000 e000 0000 0000  3  5 00 00 00 00 0 0 00 00 0000 000 00 000 000 000 000 wotooshitenol907
 5 0000 c000 0000 0000  4 00 00 00  7 00 0 0 00 00 HANAKO 0 00 000 000 000 000 000 heno 00 1a07
 6 0005 e00e 0000 0000 00 00  1 00 00 00 0 0 00 00 A    000 00 000 000 000 000 000 000 000 0000
 7 0001 000e 0000 0000 00 00  2 00 00 00 0 0 00 00 HANAKO 0 00 000 000 000 000 000 heno 00  f07
 8 0002 e00e 0000 0000 00 00  2 00 13 00 0 0 00 00 0000 000 00 000 000 000 000 000 000 000 0000
 9 0003 e00e 0000 0000 00 00  2 00 14 00 0 0 00 00 0000 000 00 000 000 000 000 000 000 000 0000
10 0004 00ee 0000 0000 00 00  2  1 00 00 0 0 00 00 0000 000 00 000 000 000 000 000 000 000 0000
11 0005 e00e 0000 0000 00 00  2 00 00 00 0 0 00 00 HOJI 000 00 000 000 000 000 000 000 000 0000
12 0001 000e 0000 0000 00 00  3 00 00 00 0 0 00 00 TARO 000 00 000 000 000 000 000 no  000  707
13 0002 000e 0000 0000 00 00  3 00 00 00 0 0 00 00 0000 000 00 000 000 000 000 000 no  000 1107
14 0003 000e 0000 0000 00 00  3 00 00 00 0 0 00 00 0000 000 00 000 000 000 000 000 deno 00 1507
15 0004 00ee 0000 0000 00 00  3  2 00 00 0 0 00 00 0000 000 00 000 000 000 000 000 000 000 0000
16 0005 000e 0000 0000 00 00  3 00 00 00 0 0 00 00 PUREZENTO 0 000 000 000 000 000 000 000 0000
17 0001 00ee 0000 0000 00 00  4  3 00 00 0 0 00 00 0000 000 00 000 000 000 000 000 ha  000  101
18 0002 000e 0000 0000 00 00  4 00 00 00 0 0 00 00 0000 000 00 000 000 000 000 000 000 000 1101
19 0003 000e 0000 0000 00 00  4 00 00 00 0 0 00 00 0000 000 00 000 000 000 000 000 000 000 1501
20 0005 000e 0000 0000 00 00  4 00 00 00 0 0 00 00 0000 000 00 000 000 000 000 ari 000 000 0000
```

Fig.122

| stkp-wd | k2 | k1 | kjost |
|---|---|---|---|
| 1 | BARA | no | — |
| 2 | HANAKO | heno | — |
| 3 | TARO | no | — |

```
no -MK  -NTN -KY  -L -A -T -S -O -P -X-Y-Z-j1 -jntn-jn-jm-jost-j2-SC
 1 1000 0000 0000 14  5 00  6 00 10 0 0 0 0  0000 00 00 00   00 00
 2 0000 0000 0000 19 11 12 13 14 15 0 0 0 0  0000 00 00 00   00 00
 3 e000 0110 0000 00 16 17 18 19 20 0 0 0 0  ma   shita 00   00 00
```

( b )

```
no .MK  .BK  .LOG .KY  .B .N .L .MW.RP.mw.F.H.jr.jh.WD   .CNC.jt.jpu.jxp.jls.jlg.jgb.jcs.jos.jinx
 1 0000 0001 OR   0000 00  2 16 00 00 00 0 0 00 00  TARO 0  00 000 000 000 ka  000 000 000 0000
 2 0000 0000 0000 0000  1 00 00 00 00 00 0 0 00 00  SABURO  00 000 000 000 000 000 000 000 0000
 3 0000 0001 AND  0000 00  4 11 00 00 00 0 0 00 00  HANAKO  00 000 000 000 to  000 000 000 0000
 4 0000 0000 0000 0000  3 00 00 00 00 00 0 0 00 00  AKIKO 0 00 000 000 000 000 000 000 000 0000
 5 0001 000e 0000 0000 00 00  1 00 00 00 0 0 00 00  BARA 00 00 000 000 000 000 000 wo  000  d01
 6 0003 001e 0000 0000 00 00  1  7 00 00 0 0 00 00 0000 000 00 000 000 000 000 000 000 000 0000
 7 0000 c001 0000 0000 00  8  6 00 16 00 0 0 00 00 0000 000 00 000 000 000 000 000 kara 00 1801
 8 0000 e000 0000 0000  7  9 00 00 00 00 0 0 00 00 0000 000 00 000 000 000 000 wotooshite 1901
 9 0000 c000 0000 0000  8 00 00 00 11 00 0 0 00 00 0000 000 00 000 000 000 000 000 he  000 1a01
10 0005 e000 0000 0000 00 00 00 00 00 00 0 0 00 00 A    000 00 000 000 000 000 000 000 000 0000
11 0001 001e 0000 0000 00 00  2 00 00 00 0 0 00 00 0000 000 00 000 000 000 000 000 ni  000  f01
12 0002 e00e 0000 0000 00 00  2 00 17 00 0 0 00 00 0000 000 00 000 000 000 000 000 000 000 0000
13 0003 e00e 0000 0000 00 00  2 00 18 00 0 0 00 00 0000 000 00 000 000 000 000 000 000 000 0000
14 0004 00ee 0000 0000 00 00  2  1 00 00 0 0 00 00 0000 000 00 000 000 000 000 000 000 000 0000
15 0005 e00e 0000 0000 00 00  2 00 00 00 0 0 00 00 HOJI 000 00 000 000 000 000 000 000 000 0000
16 0001 000e 0000 0000 00 00  3  1 00 00 0 0 00 00 0000 000 00 000 000 000 000 000 ga  000  701
17 0002 000e 0000 0000 00 00  3 00 00 00 0 0 00 00 0000 000 00 000 000 000 000 000 000 000 1101
18 0003 000e 0000 0000 00 00  3 00 00 00 0 0 00 00 0000 000 00 000 000 000 000 000 de  000 1501
19 0004 00ee 0000 0000 00 00  3  2 00 00 0 0 00 00 0000 000 00 000 000 000 000 000 000 000 0000
20 0005 000e 0000 0000 00 00  3 00 00 00 0 0 00 00 ATAE 000 00 000 000 000 000 000 000 000 0000
```

Fig.127( a )
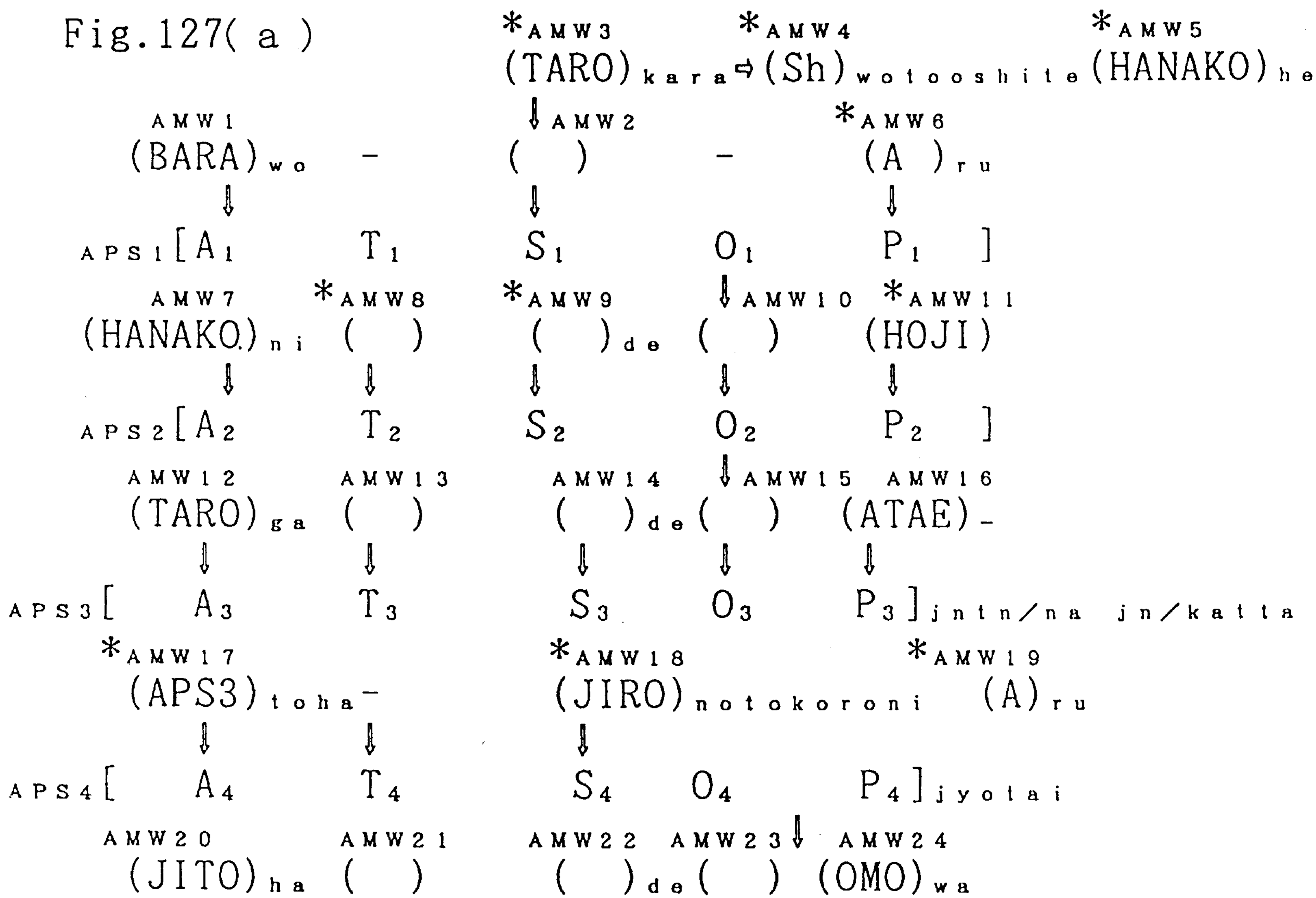

Fig.127( b )
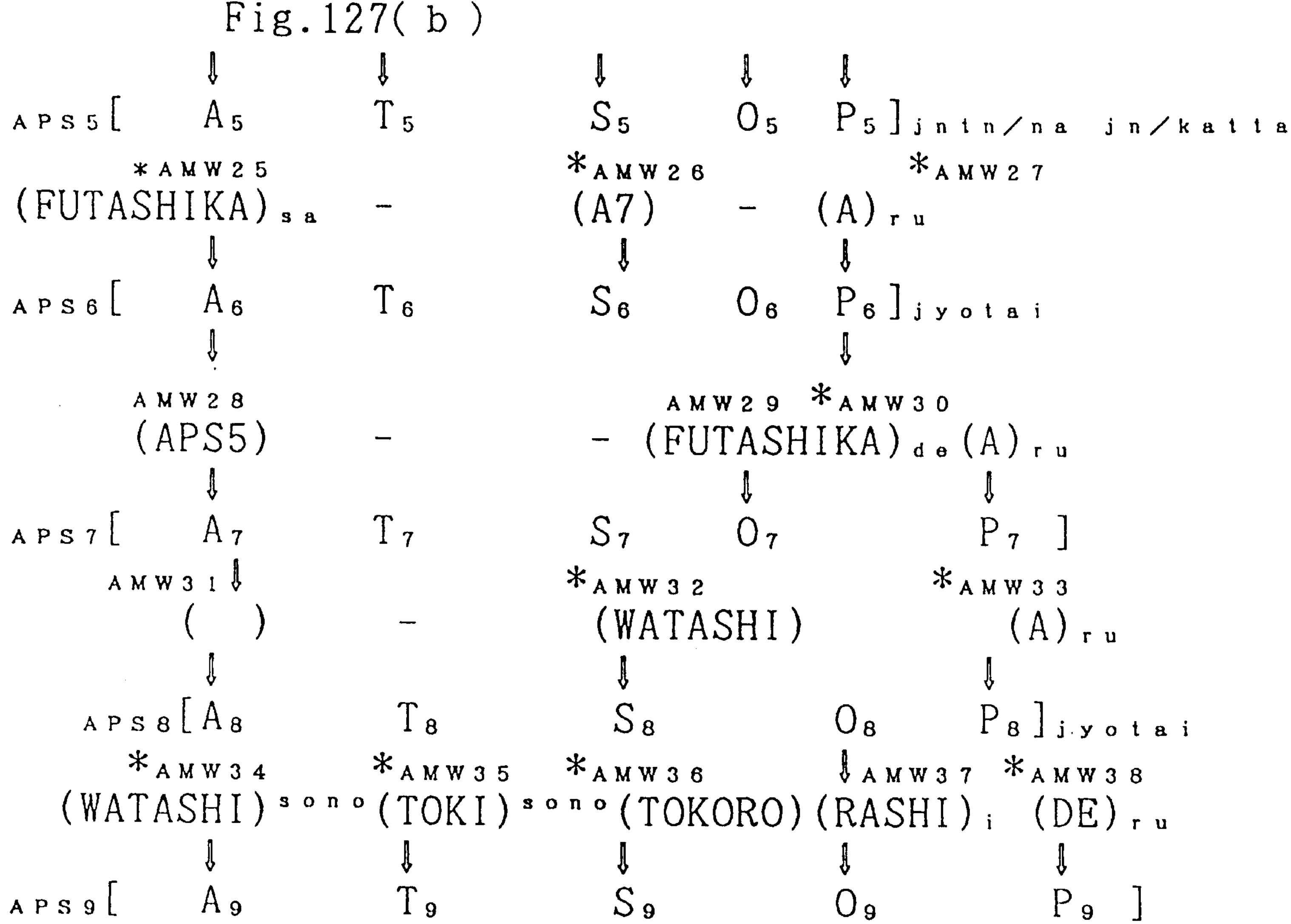

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 100e | 0000 | 0000 | 10 | 1 | 00 | 2 | 00 | 6 | 0 | 0 | 0 | 0 | 0000 | 00 | 00 | 00 | 00 | 00 |
| 2 | 000e | 0000 | 0000 | 15 | 7 | 8 | 9 | 10 | 11 | 0 | 0 | 0 | 0 | 0000 | 00 | 00 | 00 | 00 | 00 |
| 3 | e00e | 0011 | 0000 | 17 | 12 | 13 | 14 | 15 | 16 | 0 | 0 | 0 | 0 | na | kattato | | ha | 00 | 00 |
| 4 | 100e | 0000 | 0000 | 23 | 17 | 00 | 18 | 00 | 19 | 0 | 0 | 0 | 0 | 0000 | 00 | 00 | 00 | 00 | 00 |
| 5 | e00e | 0011 | 0000 | 28 | 20 | 21 | 22 | 23 | 24 | 0 | 0 | 0 | 0 | 0000 | 00 | 00 | 00 | 00 | 00 |
| 6 | 0000 | 0000 | 0000 | 29 | 25 | 00 | 26 | 00 | 27 | 0 | 0 | 0 | 0 | 0000 | 00 | 00 | 00 | 00 | 00 |
| 7 | 0000 | 0000 | 0000 | 31 | 28 | 00 | 00 | 29 | 30 | 0 | 0 | 0 | 0 | 0000 | 00 | 00 | 00 | 00 | 00 |
| 8 | 0000 | 0000 | 0000 | 37 | 31 | 00 | 32 | 00 | 33 | 0 | 0 | 0 | 0 | 0000 | 00 | 00 | 00 | 00 | 00 |
| 9 | 0000 | 0000 | 0000 | 00 | 34 | 35 | 36 | 37 | 38 | 0 | 0 | 0 | 0 | 0000 | 00 | yo | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | 000e | 0000 | 0000 | 00 | 00 | 1 | 00 | 00 | 00 | 0 | 0 | 00 | 00 | BARA | 000 | 00 | 000 | 000 | 000 | 000 | 000 | wo | 000 | d01 |
| 2 | 0003 | 001e | 0000 | 0000 | 00 | 00 | 1 | 3 | 00 | 00 | 0 | 0 | 00 | 00 | 0000 | 000 | 00 | 000 | 000 | 000 | 000 | 000 | 000 | 000 | 0000 |
| 3 | 0000 | 0001 | 0000 | 0000 | 00 | 4 | 2 | 00 | 12 | 00 | 0 | 0 | 00 | 00 | TARO | 000 | 00 | 000 | 000 | 000 | 000 | 000 | kara | 00 | 1801 |
| 4 | 0000 | e00e | 0000 | 0000 | 3 | 5 | 00 | 00 | 00 | 00 | 0 | 0 | 00 | 00 | 0000 | 000 | 00 | 000 | 000 | 000 | 000 | wotooshite | | | 1901 |
| 5 | 0000 | e00e | 0000 | 0000 | 4 | 00 | 00 | 00 | 7 | 00 | 0 | 0 | 00 | 00 | HANAKO | 0 | 00 | 000 | 000 | 000 | 000 | 000 | he | 000 | 1a01 |
| 6 | 0005 | e00e | 0000 | 0000 | 00 | 00 | 1 | 00 | 00 | 00 | 0 | 0 | 00 | 00 | A | 000 | 00 | 000 | 000 | 000 | 000 | 000 | 000 | 000 | 0000 |
| 7 | 0001 | 000e | 0000 | 0000 | 00 | 00 | 2 | 00 | 00 | 00 | 0 | 0 | 00 | 00 | HANAKO | 0 | 00 | 000 | 000 | 000 | 000 | 000 | ni | 000 | f01 |
| 8 | 0002 | 000e | 0000 | 0000 | 00 | 00 | 2 | 00 | 13 | 00 | 0 | 0 | 00 | 00 | 0000 | 000 | 00 | 000 | 000 | 000 | 000 | 000 | 000 | 000 | 1101 |
| 9 | 0003 | 000e | 0000 | 0000 | 00 | 00 | 2 | 00 | 14 | 00 | 0 | 0 | 00 | 00 | 0000 | 000 | 00 | 000 | 000 | 000 | 000 | 000 | de | 000 | 1501 |
| 10 | 0004 | 000e | 0000 | 0000 | 00 | 00 | 2 | 1 | 00 | 00 | 0 | 0 | 00 | 00 | 0000 | 000 | 00 | 000 | 000 | 000 | 000 | 000 | 000 | 000 | 0000 |
| 11 | 0005 | 00ee | 0000 | 0000 | 00 | 00 | 2 | 00 | 00 | 00 | 0 | 0 | 00 | 00 | HOJI | 000 | 00 | 000 | 000 | 000 | 000 | 000 | 000 | 000 | 0000 |
| 12 | 0001 | 000e | 0000 | 0000 | 00 | 00 | 3 | 00 | 00 | 00 | 0 | 0 | 00 | 00 | TARO | 000 | 00 | 000 | 000 | 000 | 000 | 000 | ga | 000 | 701 |
| 13 | 0002 | e00e | 0000 | 0000 | 00 | 00 | 3 | 00 | 21 | 00 | 0 | 0 | 00 | 00 | 0000 | 000 | 00 | 000 | 000 | 000 | 000 | 000 | 000 | 000 | 1101 |
| 14 | 0003 | e00e | 0000 | 0000 | 00 | 00 | 3 | 00 | 22 | 00 | 0 | 0 | 00 | 00 | 0000 | 000 | 00 | 000 | 000 | 000 | 000 | 000 | 000 | 000 | 1501 |
| 15 | 0000 | 00ee | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 0000 |

Fig.128-2

```
16 0005 0000 0000 0000 00 00  3  0 00 00 0 0 00 00 ATAE 000 00 000 000 000 000 000 000 000 0000
17 0001 a00e 0000 0000 00 00  4  3 00 00 0 0 00 00 0000 KANGAE 000 000 000 000 000 とは 000 c01
18 0003 e00e 0000 0000 00 00  4 00 20 00 0 0 00 00 0000 000 00 000 000 000 000 000 のところ000 1701
19 0005 e00e 0000 0000 00 00  4 00 00 00 0 0 00 00 0000 000 00 000 000 000 000 000 000 000 0000
20 0001 000e 0000 0000 00 00  5 00 00 00 0 0 00 00 JITO 000 00 000 000 000 000 000 は 000 701
21 0002 000e 0000 0000 00 00  5 00 00 00 0 0 00 00 0000 000 00 000 000 000 000 000 000 000 1101
22 0003 000e 0000 0000 00 00  5 00 00 00 0 0 00 00 0000 000 00 000 000 000 000 000 de 000 1501
23 0004 00ee 0000 0000 00 00  5  4 00 00 0 0 00 00 0000 000 00 000 000 000 000 000 000 000 0000
24 0005 000e 0000 0000 00 00  5 00 00 00 0 0 00 00 OMO  000 00 000 000 000 000 wa  000 000 0000
25 0001 e00e 0000 0000 00 00  6 00 00 00 0 0 FUTASHIKA  KANGAE 000 000 000 000 000 sa  000 0000
26 0003 e00e 0000 0000 00 00  6 00 28 00 0 0 00 00 0000 000 00 000 000 000 000 000 000 000 0000
27 0005 e00e 0000 0000 00 00  6 00 00 00 0 0 00 00 A    000 00 000 000 000 000 000 000 000 0000
28 0001 a00e 0000 0000 00 00  7  5 00 00 0 0 00 00 0000 000 00 000 000 000 000 000 000 000 0000
29 0004 e00e 0000 0000 00 00  7  6 00 00 0 0 FUTASHIKA  000 00 000 000 000 000 de  000 000 1001
30 0005 e00e 0000 0000 00 00  7 00 00 00 0 0 00 00 A    000 00 000 000 000 000 000 000 000 0000
31 0001 00ee 0000 0000 00 00  8  7 00 00 0 0 00 00 0000 KANGAE 000 000 000 000 000 000 000 0000
32 0003 e00e 0000 0000 00 00  8 00 34 00 0 0 00 00 WATASHI  00 000 000 000 000 000 000 000 0000
33 0005 e00e 0000 0000 00 00  8 00 00 00 0 0 00 00 A    000 00 000 000 000 000 ru  000 000 0000
34 0001 e00e 0000 0000 00 00  9 00 00 00 0 0 00 00 WATASHI  00 000 000 000 000 000 000 000 0000
35 0002 e00e 0000 0000 00 00  9 00 00 00 0 0 00 00 0000 000 00 000 000 000 000 000 000 000 0000
36 0003 e00e 0000 0000 00 00  9 00 00 00 0 0 00 00 0000 000 00 000 000 000 000 000 000 000 0000
37 0004 00ee 0000 0000 00 00  9  8 00 00 0 0 00 00 RASHI 00 00 000 000 000 000 i   000 000 0000
38 0005 e00e 0000 0000 00 00 09 00 00 00 0 0 00 00 DE   000 00 000 000 000 000 su  000 000 0000
```

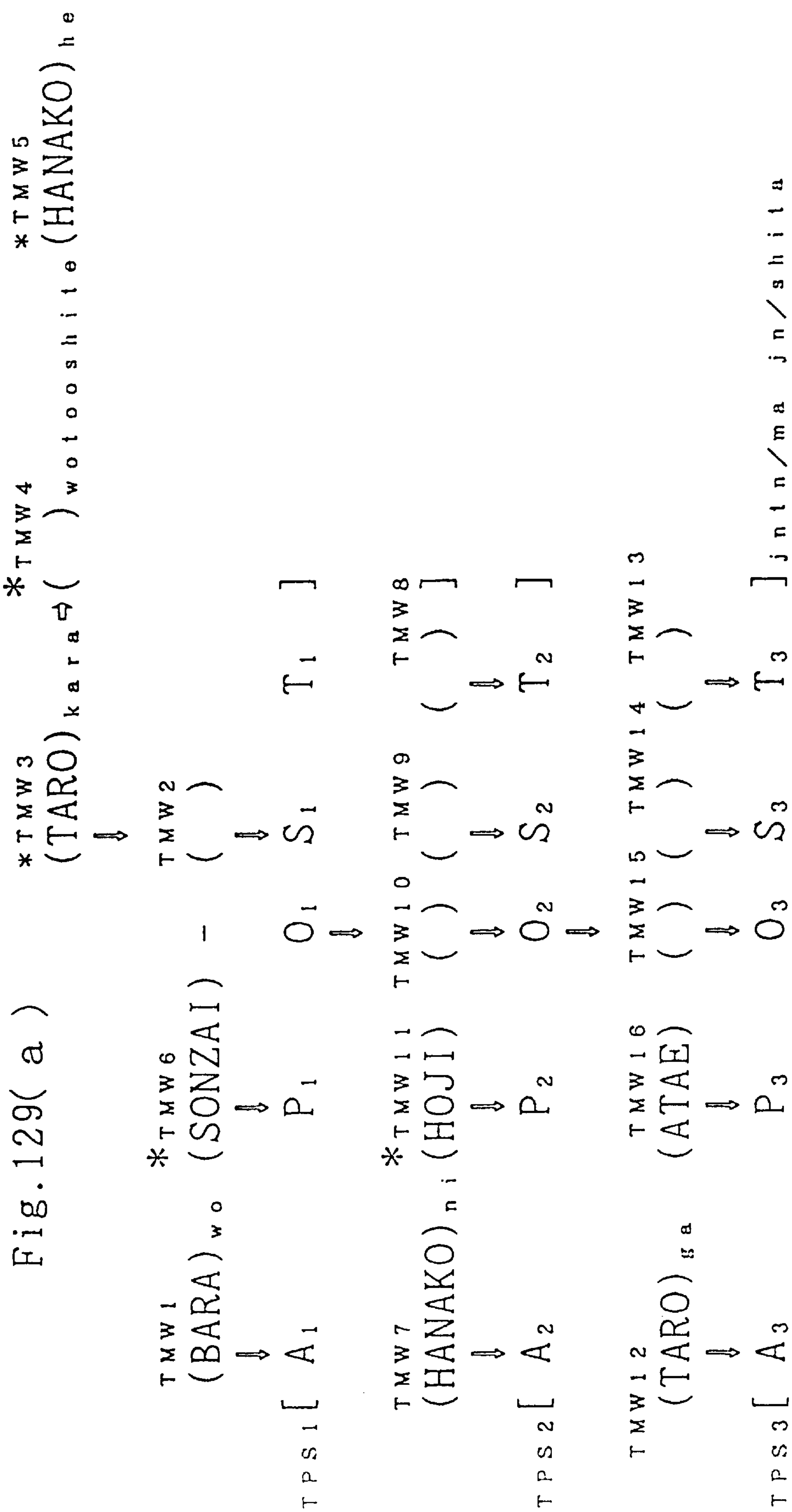
Fig.129( a )

Fig.129( b )
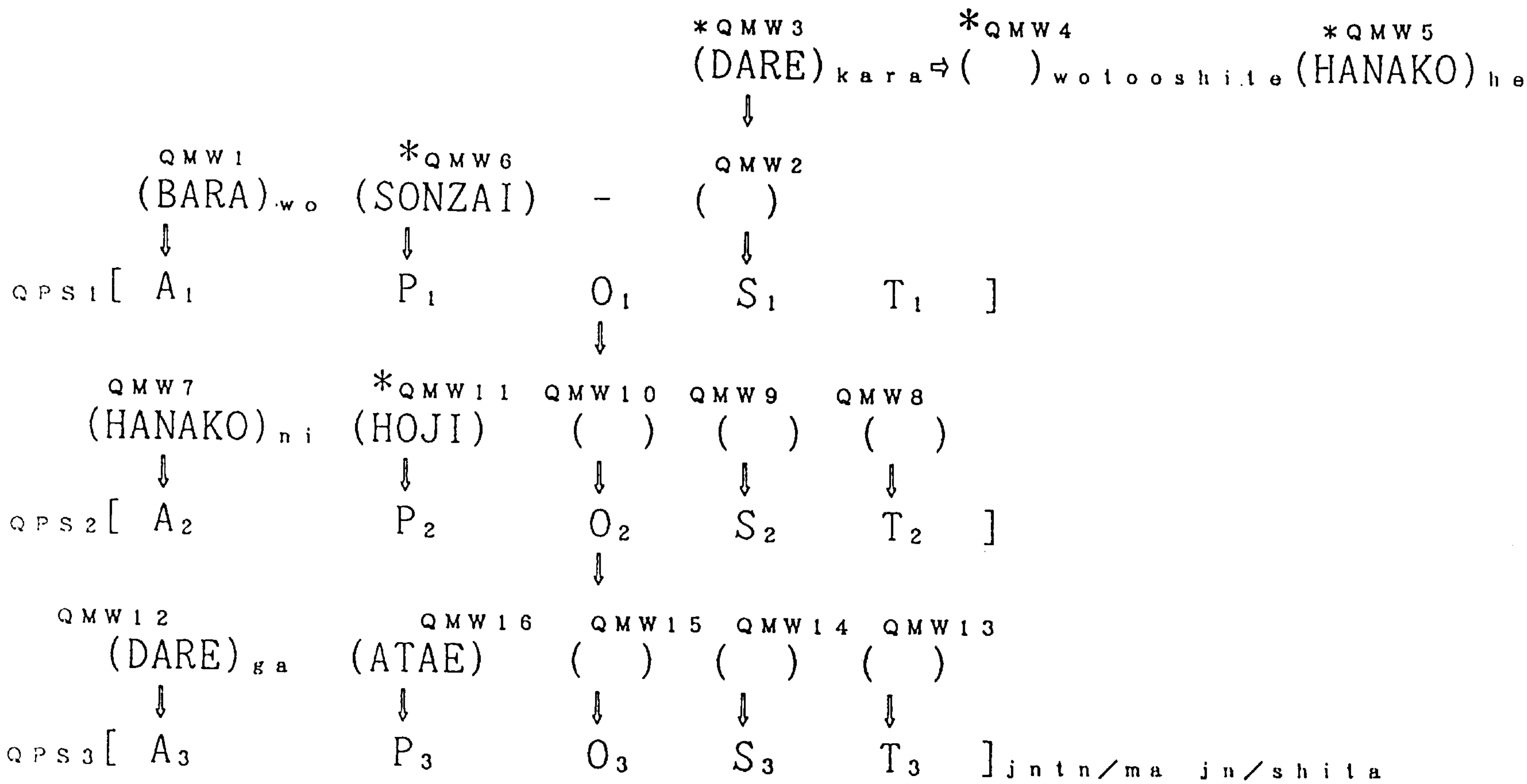

Figure 131:
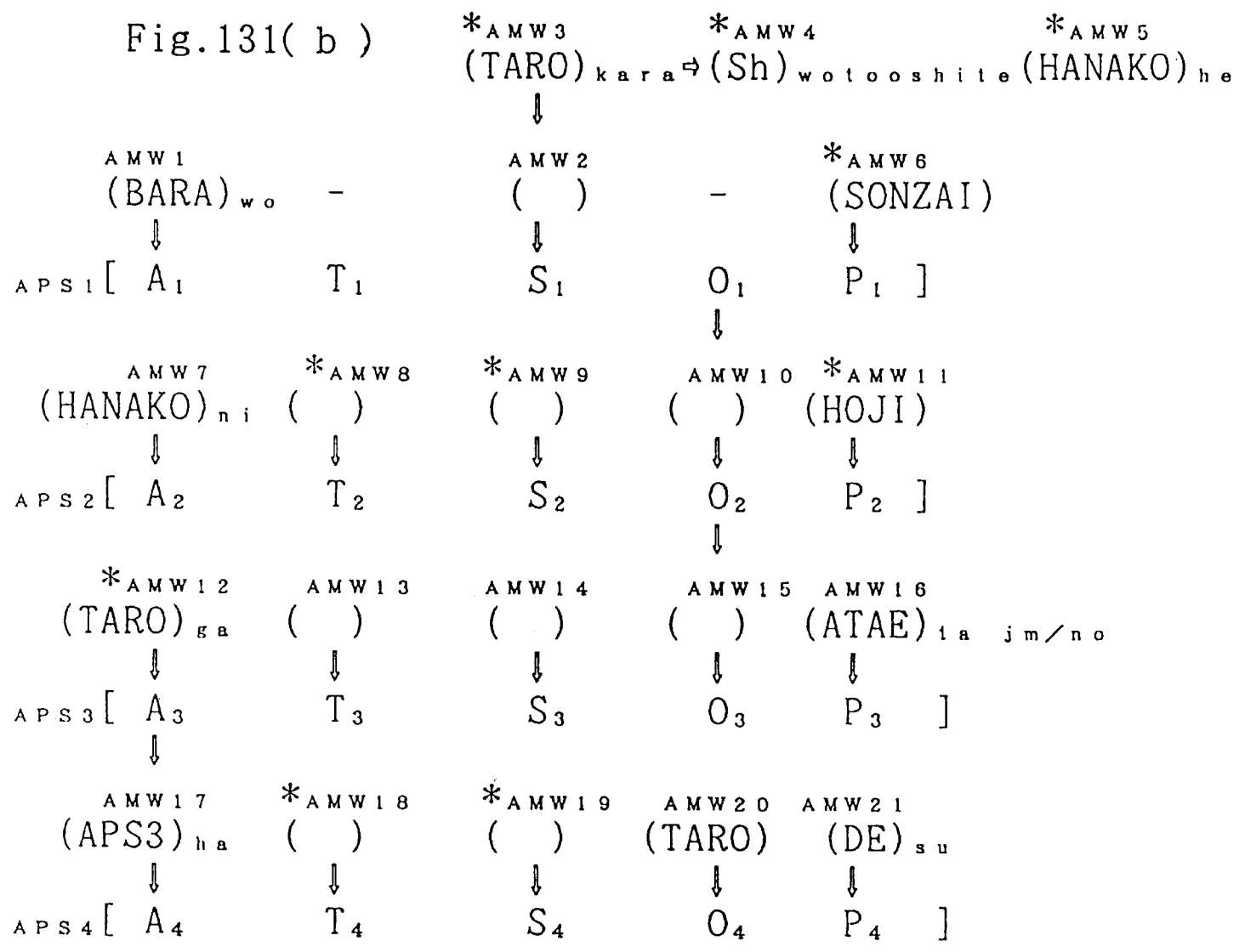

Fig.131( b )

*AMW3 (TARO) kara ⇨ *AMW4 (Sh) wotooshite *AMW5 (HANAKO) he

AMW1 (BARA) wo | - | AMW2 ( ) | - | *AMW6 (SONZAI)

APS1 [ $A_1$ $T_1$ $S_1$ $O_1$ $P_1$ ]

AMW7 (HANAKO) ni | *AMW8 ( ) | *AMW9 ( ) | AMW10 ( ) | *AMW11 (HOJI)

APS2 [ $A_2$ $T_2$ $S_2$ $O_2$ $P_2$ ]

*AMW12 (TARO) ga | AMW13 ( ) | AMW14 ( ) | AMW15 ( ) | AMW16 (ATAE) ta jm/no

APS3 [ $A_3$ $T_3$ $S_3$ $O_3$ $P_3$ ]

AMW17 (APS3) ha | *AMW18 ( ) | *AMW19 ( ) | AMW20 (TARO) | AMW21 (DE) su

APS4 [ $A_4$ $T_4$ $S_4$ $O_4$ $P_4$ ]

Fig.132

| | 1 | 2 | 3 | 4 | 5 | 6 | 7 | 8 | 9 | 10 |
|---|---|---|---|---|---|---|---|---|---|---|
| 1 | Y | K1 | A | P | S | O | P | *J | X | K2 |
| 2 | Y | K1 | A | X | T | S | 0 | P | *J | K2 |
| 3 | Y | K1 | A | *J | P | O | S | T | X | K2 |
| 4 | Y | K1 | A | T | S | P | *J | O | X | K2 |
| 5 | K1 | Y | A | T | S | O | P | *J | X | K2 |
| 6 | K1 | Y | S | A | P | *J | O | T | X | K2 |
| 7 | K1 | Y | A | T | S | O | X | P | *J | K2 |

Fig.136

| ntn-no | N T N | K Y | j n t n | j n | REMARKS |
|---|---|---|---|---|---|
| 0 | 0 0 0 0 | 0 1 f f | ” ” | ” ” | affirm, present |
| 1 | 0 0 0 1 | 0 5 1 3 | na | i | deny, present |
| 2 | 0 0 1 0 | 0 4 0 0 | ” ” | ” ” | affirm, past |
| 3 | 0 0 1 1 | 0 5 0 0 | na | katta | deny, past |
| 4 | 0 1 0 0 | 0 2 0 0 | ma | su | polite, affirm, present |
| 5 | 0 1 0 1 | 0 2 0 0 | ma | sen | polite, deny, present |
| 6 | 0 1 1 0 | 0 2 0 0 | ma | shita | polite, affirm past |
| 7 | 0 1 1 1 | 0 2 0 0 | ma | sendeshita | polite, deny past |
| 8 | 1 0 0 0 | 0 9 0 0 | ” ” | ” ” | affirm, order |
| 9 | 1 0 0 1 | 0 1 0 0 | ma | ” ” | deny, order |

| no | -MK | -NTN | -KY | -L | -A | -T | -S | -O | -P | -X | -Y | -Z | -j1 | -jntn | -jn | -jm | -jost | -j2 | -SC |
|---|---|---|---|---|---|---|---|---|---|---|---|---|---|---|---|---|---|---|---|
| 1 | 1000 | 0000 | 0000 | 10 | 1 | 00 | 2 | 00 | 6 | 0 | 0 | 0 | 0 | 0000 | 00 | 00 | 00 | 00 | 00 |
| 2 | 0000 | 0000 | 0000 | 15 | 7 | 8 | 9 | 10 | 11 | 0 | 0 | 0 | 0 | 0000 | 00 | 00 | 00 | 00 | 00 |
| 3 | e000 | 0010 | 0000 | 28 | 12 | 13 | 14 | 15 | 16 | 0 | 0 | 0 | 0 | 0000 | 00 | 00 | 00 | 00 | 00 |
| 4 | 1000 | 0000 | 0000 | 26 | 17 | 00 | 18 | 00 | 22 | 0 | 0 | 0 | 0 | 0000 | 00 | 00 | 00 | 00 | 00 |
| 5 | e000 | 0010 | 0000 | 29 | 23 | 24 | 25 | 26 | 27 | 0 | 0 | 0 | 0 | 0000 | 00 | 00 | 00 | 00 | 00 |

( b )

| no | .MK | .BK | .LOG | .KY | .B | .N | .L | .MW | .RP | .mw | .F | .H | .jr | .jh | .WD | .CNC | .jt | .jpu | .jxp | .jls | .jlg | .jgb | .jcs | .jos | .jinx |
|---|---|---|---|---|---|---|---|---|---|---|---|---|---|---|---|---|---|---|---|---|---|---|---|---|---|
| 1 | 0001 | 000e | 0000 | 0000 | 00 | 00 | 1 | 00 | 00 | 00 | 0 | 0 | 00 | 00 | 0000 | 000 | 00 | 000 | 000 | 000 | 000 | 000 | wo | 000 | d01 |
| 2 | 0003 | 001e | 0000 | 0000 | 00 | 00 | 1 | 3 | 00 | 00 | 0 | 0 | 00 | 00 | 0000 | 000 | 00 | 000 | 000 | 000 | 000 | 000 | kara | 000 | 0000 |
| 3 | 0000 | c001 | 0000 | 0000 | 00 | 4 | 2 | 00 | 12 | 00 | 0 | 0 | 00 | 00 | 0000 | 000 | 00 | 000 | 000 | 000 | 000 | wotooshite | | | 1801 |
| 4 | 0000 | e000 | 0000 | 0000 | 3 | 5 | 00 | 00 | 00 | 00 | 0 | 0 | 00 | 00 | 0000 | 000 | 00 | 000 | 000 | 000 | 000 | 000 | he | 000 | 1901 |
| 5 | 0000 | c000 | 0000 | 0000 | 4 | 00 | 00 | 00 | 7 | 00 | 0 | 0 | 00 | 00 | 0000 | 000 | 00 | 000 | 000 | 000 | 000 | 000 | ni | 000 | 1a01 |
| 6 | 0005 | e00e | 0000 | 0000 | 00 | 00 | 1 | 00 | 00 | 00 | 0 | 0 | 00 | 00 | SONZAI | 0 | 00 | 000 | 000 | 000 | 000 | 000 | 000 | 000 | 0000 |
| 7 | 0001 | 000e | 0000 | 0000 | 00 | 00 | 2 | 00 | 00 | 00 | 0 | 0 | 00 | 00 | 0000 | 000 | 00 | 000 | 000 | 000 | 000 | 000 | 000 | 000 | f01 |
| 8 | 0002 | e00e | 0000 | 0000 | 00 | 00 | 2 | 00 | 13 | 00 | 0 | 0 | 00 | 00 | 0000 | 000 | 00 | 000 | 000 | 000 | 000 | 000 | 000 | 000 | 1101 |
| 9 | 0003 | e00e | 0000 | 0000 | 00 | 00 | 2 | 00 | 14 | 00 | 0 | 0 | 00 | 00 | 0000 | 000 | 00 | 000 | 000 | 000 | 000 | 000 | 000 | 000 | 1501 |
| 10 | 0004 | 00ee | 0000 | 0000 | 00 | 00 | 2 | 1 | 00 | 00 | 0 | 0 | 00 | 00 | 0000 | 000 | 00 | 000 | 000 | 000 | 000 | 000 | 000 | 000 | 0000 |
| 11 | 0005 | e00e | 0000 | 0000 | 00 | 00 | 2 | 00 | 00 | 00 | 0 | 0 | 00 | 00 | HOJI | 000 | 00 | 000 | 000 | 000 | 000 | 000 | 000 | 000 | 0000 |
| 12 | 0001 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 701 |
| 13 | 0002 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1101 |
| 14 | 0003 | 000e | 0000 | 0000 | 00 | 00 | 3 | 00 | 00 | 00 | 0 | 0 | 00 | 00 | 0000 | 000 | 00 | 000 | 000 | 000 | 000 | 000 | 000 | 000 | 1501 |
| 15 | 0004 | 00ee | 0000 | 0000 | 00 | 00 | 3 | 2 | 00 | 00 | 0 | 0 | 00 | 00 | 0000 | 000 | 00 | 000 | 000 | 000 | 000 | 000 | 000 | 000 | 0000 |
| 16 | 0005 | 000e | 0000 | 0000 | 00 | 00 | 3 | 00 | 00 | 00 | 0 | 0 | 00 | 00 | ATAE | 000 | 00 | 000 | 000 | 000 | 000 | ru | 000 | 000 | 0000 |

Fig.138-2

```
17 0001 e00e 0000 0000 00 00  4 00 00 00 0 0 00 00 0000 000 00 000 000 000 000 000 000 000 0000
18 0003 001e 0000 0000 00 00  4 19 00 00 0 0 00 00 0000 000 00 000 000 000 000 000 000 000 0000
19 0000 0001 0000 0000 00 00 20 18 00 00 0 0 00 00 0000 000 00 000 000 000 000 000 kara000 1801
20 0000 e000 0000 0000 00 19 21 00 00 00 0 0 00 00 0000 000 00 000 000 000 000 wotooshite  1901
21 0000 0000 0000 0000 00 20 00 00 00 00 0 0 00 00 0000 000 00 000 000 000 000 000 he  000 1a01
22 0005 e00e 0000 0000 00 00  4 00 00 00 0 0 00 00 SONZAI 0 00 000 000 000 000 000 000 000 0000
23 0000 000e 0000 0000 00 00 00 00 00 00 0 0 00 00 0000 000 00 000 000 000 000 000 000 000  701
24 0000 0000 0000 0000 00 00 00 00 00 00 0 0 00 00 0000 000 00 000 000 000 000 000 000 000 1101
25 0000 0000 0000 0000 00 00 00 00 00 00 0 0 00 00 0000 000 00 000 000 000 000 000 000 000 1501
26 0000 0000 0000 0000 00 00 00 00 00 00 0 0 00 00 0000 000 00 000 000 000 000 000 000 000 0000
27 0000 0000 0000 0000 00 00 00 00 00 00 0 0 00 00 I    000 00 000 000 000 000 ku  000 000 0000
28 0000 00e1 0000 0000 00 29 30  3 00 00 0 0 00 00 0000 000 00 000 000 000 000 000 000 000 0000
29 0000 000e 0000 0000 28 00 00  5 00 00 0 0 00 00 0000 000 00 000 000 000 000 000 000 000 0000
```

Fig.139( a )
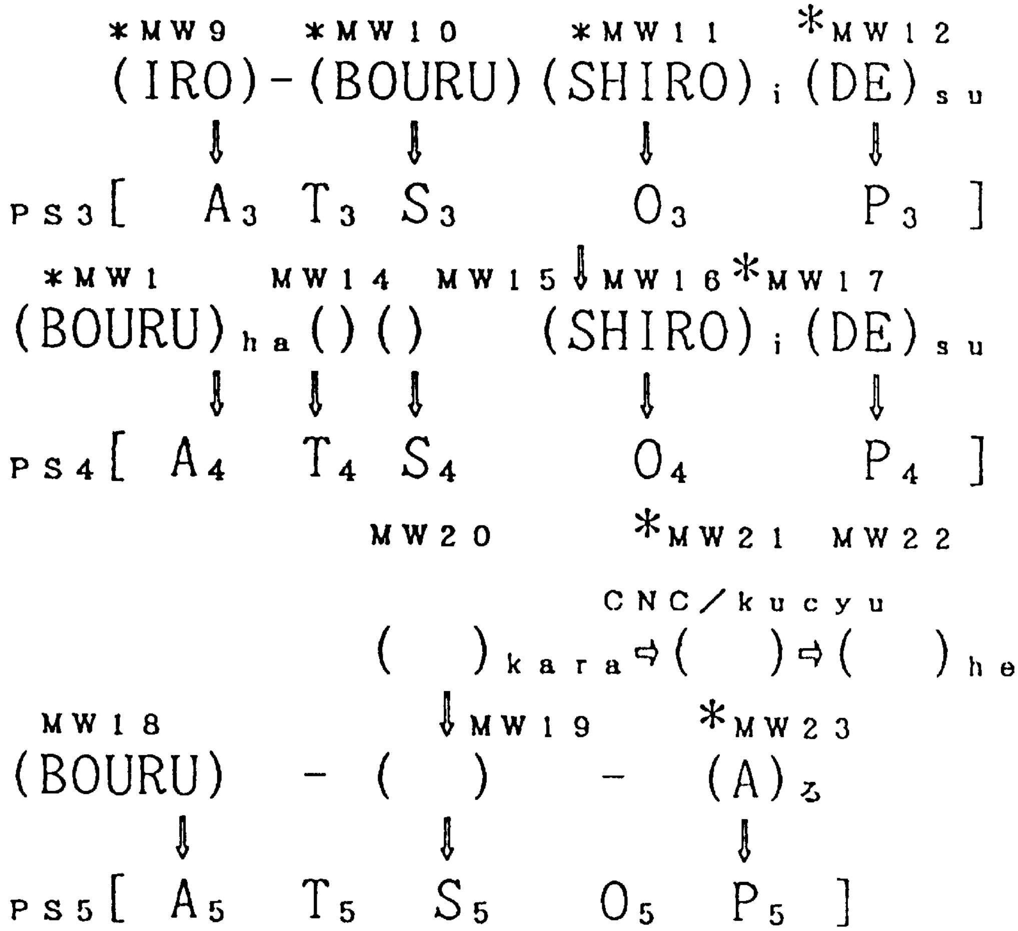

Fig.139( b )
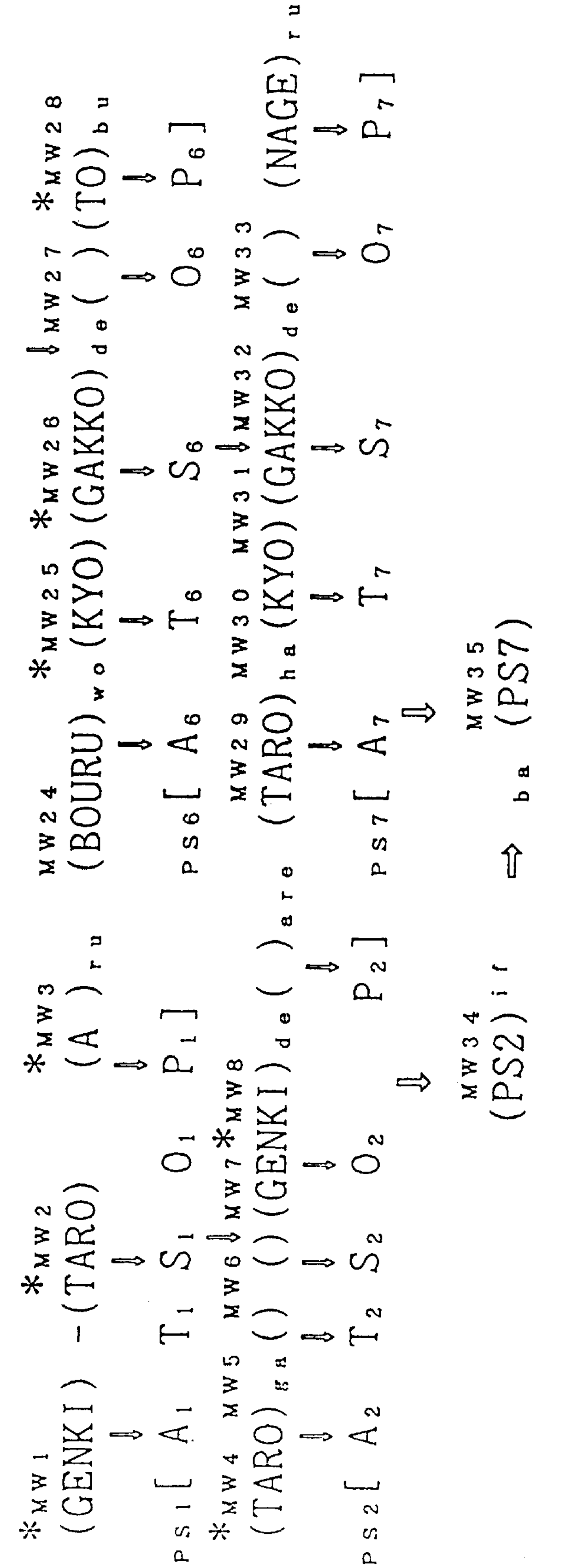

NATURAL LANGUAGE PROCESSING METHOD FOR CONVERTING A FIRST NATURAL LANGUAGE INTO A SECOND NATURAL LANGUAGE USING DATA STRUCTURES

BACKGROUND OF THE INVENTION

Human beings think and convey information to each other using natural languages. THerefore, the mechanisms for thinking and for conveying information and mutual intentions are contained within natural languages.

I hope to use computers t o improve human abilities to reason, question/answer, acquire knowledge, translate, and understand narratives by utilizing the thinking mechanisms and the information-conveying capacity of natural languages effectively.

Computers have limited functions, and therefore we cannot use natural languages directly on a computer. We must therefore convert natural languages into data structures suitable for computers in order to carry out intellectual processing.

This patent concerns a method of converting natural languages into data structures, methods of adding, filling in, deleting, and changing the data and performing questioning/answering using these data structures, and method of creating natural sentences in the languages of different nations.

SUMMARY OF TEH INVENTION

The natural-language processing method proposed in this patent application does not use natural languages directly. the natural languages are first converted into data structures which are universal and which are not related to separate human languages, but which accurately express the meaning of each natural language. Then, the various intellectual processes mentioned above can be carried out. Follow this, the processing results are re-converted into natural languages so that human beings can easily understand them.

A natural sentence has various basic characteristics, for example, the same meaning can be expressed in many ways using natural languages, and we must omit certain words which can be easily understood by a person being spoken to. Often, words are omitted form a natural sentence because they are assumed to be understood by human beings, but when that natural sentence is converted into a data sentence which will be described later, it turns out that on certain occasions they are essential for carrying out questioning/answering, reasoning, translation, or knowledge acquisition on the computer.

Questioning/answering and reasoning on a computer are usually performed using pattern-matching, although if various expressions are possible for one meaning, then when we carry out questioning/answering and reasoning regarding the content, we must compose all kinds of natural sentences which can be expressed, and must carry out pattern-matching using all of these sentences. Therefore, when we want to carry out questioning/answering and reasoning regarding a somewhat complicated natural sentence, we must create a huge quantity of natural sentences and perform pattern-matching for these sentences. This is actually impossible to do, so in order to avoid this problem, if various expressions are used but have the same meaning, they must really be a single data structure, and a mechanism which can easily fill in the word(s) omitted from an expression must be built into that data structure.

When converting a natural sentence into a data structure, analyses of sentence structure and meaning are carried out, as will be mentioned later. However, if the meaning of the sentence has not yet been finally determined, we must often carry out temporary processing; or, if we find later that we have misunderstood the meaning, we often must also change a part of the data structure during translation, because different languages have unique rules of expression. Also when doing questioning/answering, and when preparing an answer sentence from a text sentence or question sentence, we need to change, delete, transfer, or copy data structures.

As previously mentioned, in this patent application, when various expressions have the same single meaning, they are all converted into the same data structure, which is a universal data structure which has no relation to particular human languages. When we create natural sentences from this data structure, however, various natural sentences with the same meaning must be created.

Also, as previously mentioned, the words which are not expressed in the natural sentence are filled in later in he data structure, but sometimes we must prohibit the expression of a data structure with these words filled in. When creating a natural sentence, we also need to change the word order to stores a meaning or to change an imperative into a polite expression. Therefore, this data structure must make it possible to carry out these processes easily. The language structures of natural languages will be shown in the form of a multi-layered case-logic structure, as will be described later, in order to explain the language structure of a natural language. Diagrams have been prepared to ensure clarity. However, a data structure for computer use is needed for the actual storage of the letter line of a natural sentence in the computer. In order to make it easy to understand the language structure when it is shown in diagram form, the data structure for the computer corresponds with the language structure shown in the diagrams and the data structures for computer use have been divided into MW and PS. MW consists of the word information IMF-M-WD, which in turn consists of the elements WD and CNC, the particle information IMF-M-JO which consists of elements .jr, jh, .jt, .jpu, .jxp, .jls, jlg, .jgb, .jcs, .jos, and jinx, the combination information IMF-CO which consists of elements .B, .N, .L, .MW, F, H, MW, and .RP, and the language information IMF-M-MK which consists of elements .MK, .BK, LOG, and .KY. On the other hand, PS conists of the case information IMF-P-CA which consists of elements -A, -T, -S, -O, -P, and -X, which store the various cases such as the Agent Case (Case A), Time case (Case T), Space Case (Case S), Object Case (Case O), Predicate Case (Case P), and Auxiliary Case (Case X), the particle information IMF-P-JO which consists of elements -jntn, -jn, -jm, and -jost, and the language information IMF-P-MK which consists of elements -MK, -NTN, and -KY. When we actually carry out the natural language processing on the computer, and the data structure is divided into two parts, PS and MW, as mentioned above, programming becomes simpler, processing speed is improved, and highly complicated processing can be carried out, as will be shown later. Dividing the data structure into two parts, PS and MW, however, is not necessarily an essential condition for computer processing. The data structure of PS and that of MW are synthesized into a single data structure, the PSMW structure. The PSMW structure will be explained in detail near the end of this paper. However, to explain the relationship between the structure of a natural language and a data structure used for the computer, which corresponds to the natural language structure, the data structures, PS and MW are used here.

The following is a detailed explanation of the data structures, PS and MW.

As shown in FIG. 1, MW has many variables (elements). Each of the elements B (reads as "dot B"), .L, .N, .MW, F, and H, stores MW-NO, which is the number of MWs adjoining each element. The arrow (==>) symbol shows that the element has a partner to combine with, and that the direction of the partner for combination exists. MW has six combination "hands," as shown in FIG. 3. The element B (abbreviation of before) stores the number of MWs on the left side of the MW, and forms the relationship(s) of the combination(s) with the MW(s) on the left side of B. The element .N (abbreviation of next) stores the number of MWs on the right side of .N, to form the relationship(s)for these combination(s). The element MW stores the number of MWs adjoining the top of .MW, to form the combination relationships. The element F stores the number of MWs or PSs which will be connected to an adverbial phrase, and .H stores the number of PSs or MWs of the object(s) used when expressing real intention, or used metaphorically, to form the relationship(s) for each combination. The previously mentioned arrow "==>" symbol shows that an element has a combination partner. here, the arrow symbol "▒" will be used to make the relationships of the combinations between MWs or between PSs easy to see, using diagrams for better understanding. These will be described in detail later. However, the combination relationship in the horizontal direction, or, in other words, the "▒" arrow, shows a logical combination, and the combination relationship in the vertical direction, or, in other words, the "-->" arrow symbol, shows a case combination. When MW1, MW2, and MW3 have the combination relationships shown in FIG. 4, these combination relationships are formed by storing the MW number of the partner to be connected, shown by the "==>" arrow symbol in element .L, element .N, element B, and element MW as shown in FIG. 5. As shown in FIG. 6, the number of each combination partner, MW, is stored in each element in the computer. The number of each MW is stored in each of elements .B, .N, .L, and .MW. The partners to be connected with elements .MW and .L are either MW or PS, and it is necessary to classify these. The data stored in element BK is expressed as four digits in hexadecimal notation. When the first digit is "1", the combination partner of L will be MW, and when the first digit is "e", PS will be the combination partner for L. When the second digit is "1", MW will be the combination partner for MW, and when the second digit is "e", the combination partner will be PS. Therefore, the relationship for the combination shown in FIG. 4 can be expressed on the computer as shown in FIG. 6.

MW consists of particles in the information IMF-M-WD, which includes various elements as follows: Element .MK stores information regarding the designation of word order and word position from the viewpoint of language structure, and the varieties of removable cases. Element BK stores information which shows the classification of the types of partners to be connected with F, MW, and L, the establishment of insertion conditions, and the appropriateness of expressions. Element .LOG stores a variety of logic relationships; element .KY stores information regarding inflection, conjugation, and declention. Element .RP stores the number of each MW in which the same word is inserted, within the meaning frame IMI-FRM, as will be described later. Element .mw stores the number of preceeding MW(s) which already have stored word(s) regulated by the articles "ano" (that or "kono" (this) as in "ano Taro" (that Taro) or "kono bohru" (this ball). Element .WD which stores words, and element .CNC which regulated the concepts of the words to be inserted.

The paraticle information IMF-M-JO include various elemnts as follows: .jr stores articles. Element .jh stores prefixes. Element .jpu stores the plural particles used to express the plural, such as "tachi". Element .jxp stores the logic particles for expressing logical relationships, such as "igai" (there than), "dake" (only), and "nomi" (only). Element .jls stores the logic particles which express the logical relationships "to" (and) and "ya" (or). Element .jlg stores the logic particles which express the meaningful relationships "-ba" and "-node." Element .jos stores stress particle such as "koso" which emphasize meaning. Element .jgb stores the inflective suffix particles which show the suffixes which vary according to the verb. Element .jcs stores case particles; and element jinx stores the coordinates (jindx-x, jindx-y) in the table when case particles are designated using the case particle table JO-TBL.

FIG. 2 shows the data structure of PS. As will be described later, various case combinations are considered as follows: the Agent case (Case A, abbreviation of agent case), the Time case (Case T, abbreviation of time case), Space case (Case S, abbreviation of space case), Object case (Case O, abbreviation of object case), Predicate case (Case P, abbreviation of predicate case), Extra case (abbreviation of extra case), the Yes-No case (case Y, abbreviation of yes-no), and the Zentai case ("entire" case, Case Z, abbreviation of zentai). Therefore, the PS has the elements -A (read as "bar A"), -T, -S, -O, -P, -X, -Y, and -Z, for the purpose of storing the number of each MW that is a partner to be connected by the case combination. In addition to the above, PS has element -B which stores the number(s) of the MWs or PSs neighboring on its left side, element -N which stores the number of MWs or PSs neighboring on its right side, and element -L which stores the number(s) of the MWs or PSs neighboring below it. When the combination "hands" are shown using the arrow symbol, "-->" as previously mentioned, PS is seen to have 11 combination "hands" as shown in FIG. 8. In this patent application, element -N and element -B of PS are not used in order to simplify the explanation for the patent. In other words, the definition in this patent application states that only MWs are combined with each other as a logical combination, or, in other words, as a horizontal relationship, and that PS and MW or PS and PS are not connected by a logical combination. When we assume that MW1 of the data is vertically combined with Case A of PS1, MW2 is vertically combined with Case T, MW3 is vertically combined with Case S, MW4 is vertically combined with Case O, MW5 is vertically combined with Case P, MW6 is vertically combined with Case X, and PS1 vertically combined with MW7, as shown in FIG. 9, then PS and MW store the number of each combination partner in the corresponding element, as shown by the arrow symbol "-->". the PS1s of the combination partners and the varieties of their cases are stored in the element .L parts of MWs 1–6. Elements -A--X of PS1 store the numbers of MW, MW1–MW6 to be connected with. MW7 is stored in the element-L of PS1, to indicate that PS1 is vertically combined with MW7 which is located below PS1, and PSI is stored in element .MW in order to show that MW7 is vertically combined with the PS1 above MW7. As previously mentioned, the above combination relationship(s) can be described as shown in FIG. 10, using the arrow symbol "-->." Here, we understand that Cases A–X of the PS are vertically connected to MWs 1–6. In other words, they are connected by case combinations. MW1–MW6 are also connected to PS by case combinations, MW7 is connected to PS1 by a case combination, and PS1 is connected to MW7 by a case combination. When the above language structure is shown using the data structure on the computer, it will be as seen in FIG. 11. In FIG. 11, there is only one PS, but usually there are many PSs. Therefore, we will call this PS data group the "PS module," and call the group of MWs, the "MW module." Here, we have made the definition that the PS case connects only with MW by case combination, and that, therefore, each of the numbers stored in the elements L--X of the PS is the number of each individual MW. PS1 connects vertically to MW7, which is below PS1, and therefore, "7" is entered in element -L. The variety of the case combined with is indicated by the first digit of the four hexadecimal digits of element MK, as shown below.

Case A will be indicated by "1," Case T will be indicated by "2," Case S will be indicated by "3," Case O will be indicated by "4," Case P will be indicated by "5," Case X will be indicated by "6," Case Y will be indicated by "7," Case Z will be indicated by "E." Therefore, the MW module of MW1 becomes MK/0001 (The element is shown on the left side of /, and the data is shown on the right side of /.) BK/000e, and L/1, so we find from the above module that MW1 has a case combination relationship with Case A of PS1. MW7 is combined with the PS1 on top of MW7, and therefore, "1" is stored in element MW. In order to show that this "1" is the "1" of PS, "e" is entered as the second digit of the hexadecimal of element .BK. If this second digit is "1," it shows MW. The section indicated by is the section for data stored to construct the above-mentioned language structure. In contrast, the language structure shown in FIG. 10 can be expressed as shown in FIG. 11.

BRIEF DISCRIPTION OF THE DRAWINGS

FIG. 1 shows the elements of the data structure, MW.

FIG. 2 shows the elements of the data structure, PS.

Figure 3:
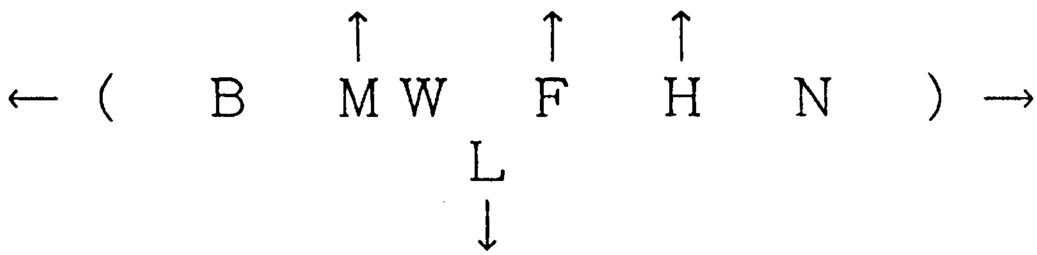
FIG. 3 shows the "combination hands" of the data structure, MW.
Figure 4:
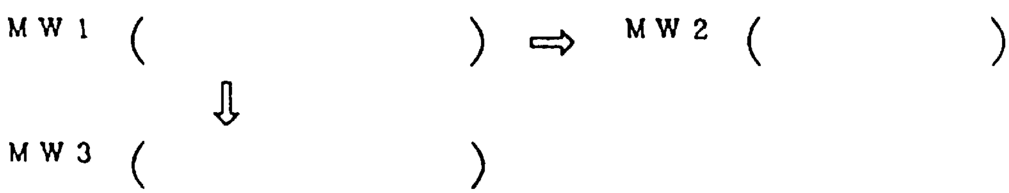

FIG. 4 uses a diagram to indicate that MW1 and MW2 are connected by a logical combination, and that MW1 and MW3 are connected by a case combination.

Figure 5:
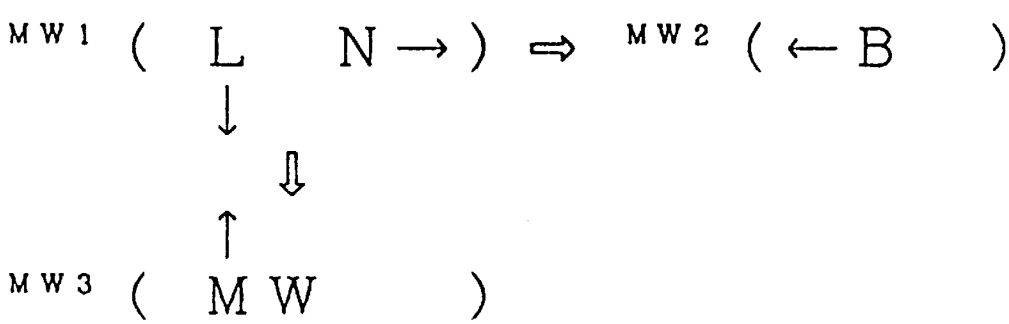

FIG. 5 shows the above combinations with their "combination hands".

Figure 7:
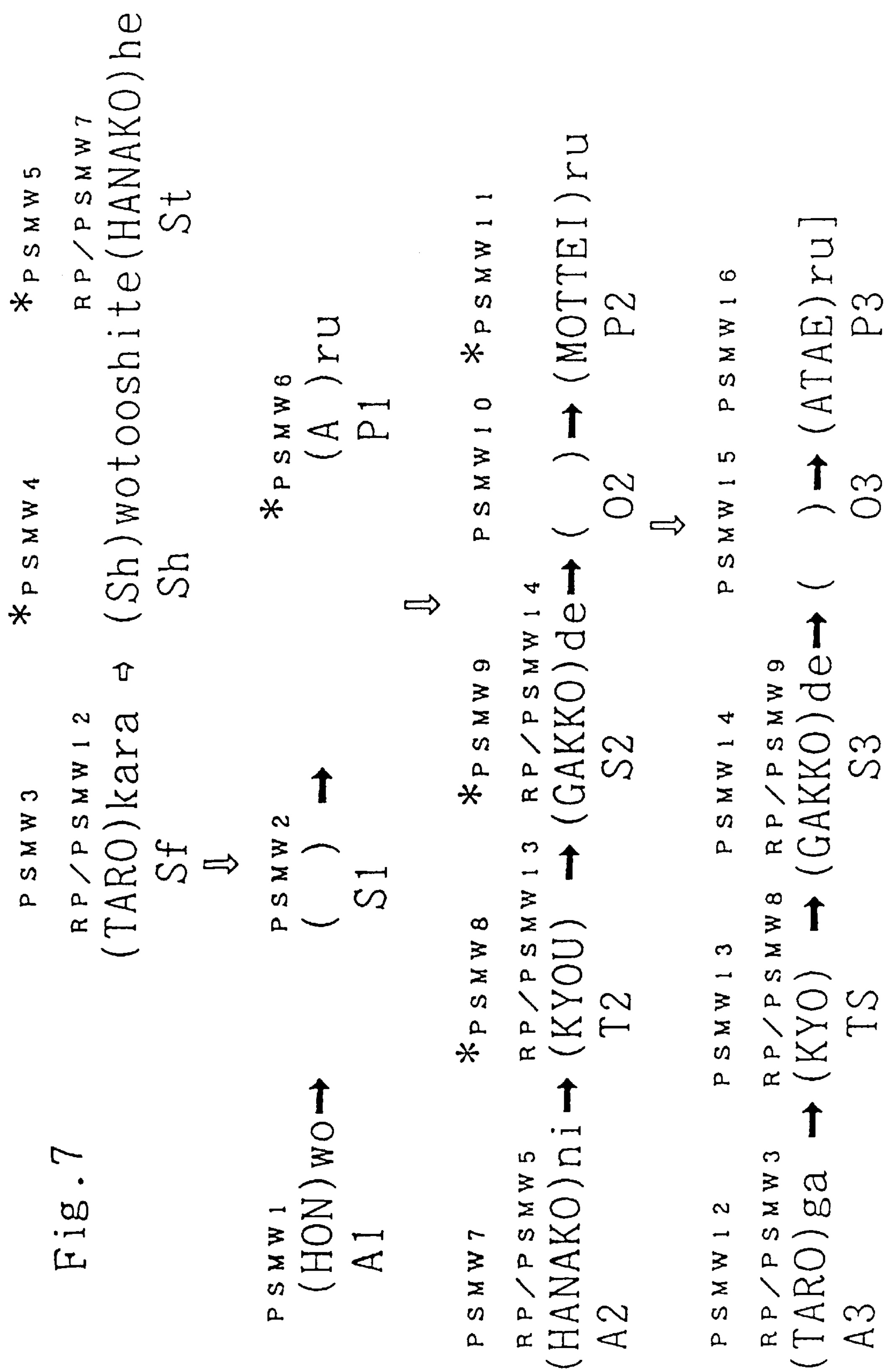

FIG. 6 uses a data sentence to show the relationships for the combinations indicated in FIG. 4, and FIG. 7 shows this by using a structural sentence.

Figure 8:
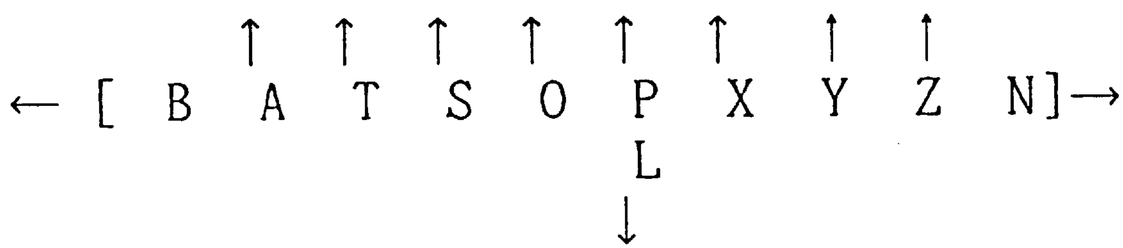

FIG. 8 shows the combination hands for the data structure, PS.

Figure 9:
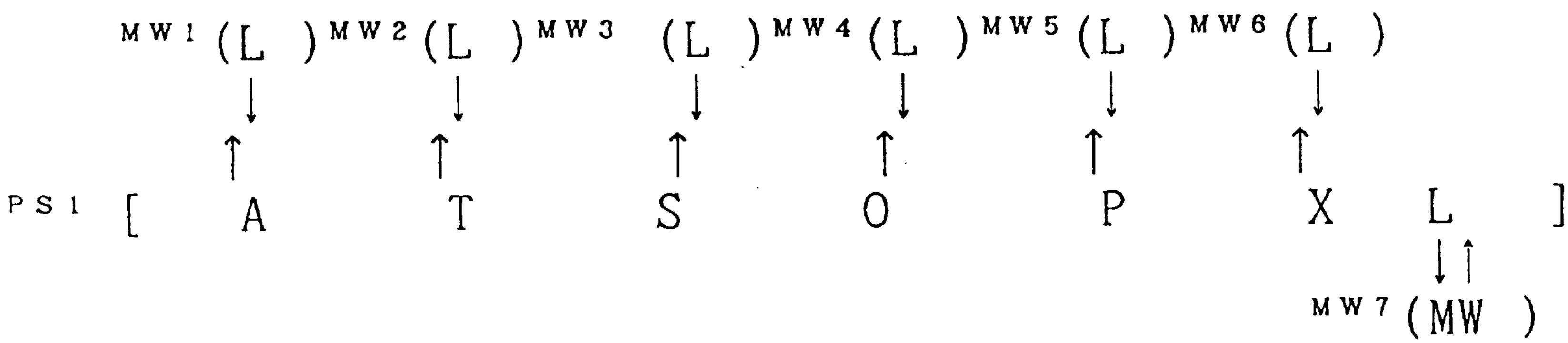
Figure 10:
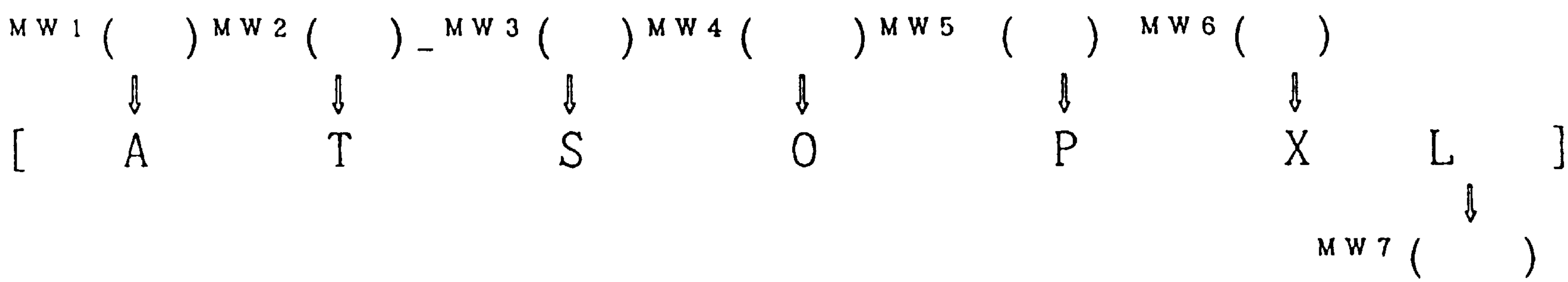

FIG. 9 shows the relationships between MW1–MW7 and PS1, using the combination hands, and FIG. 10 is a diagram showing the relationships between the combinations indicated in FIG. 9.

FIG. 11 uses a data sentence to show the relationships between the combinations shown in FIG. 10.

Figure 12:
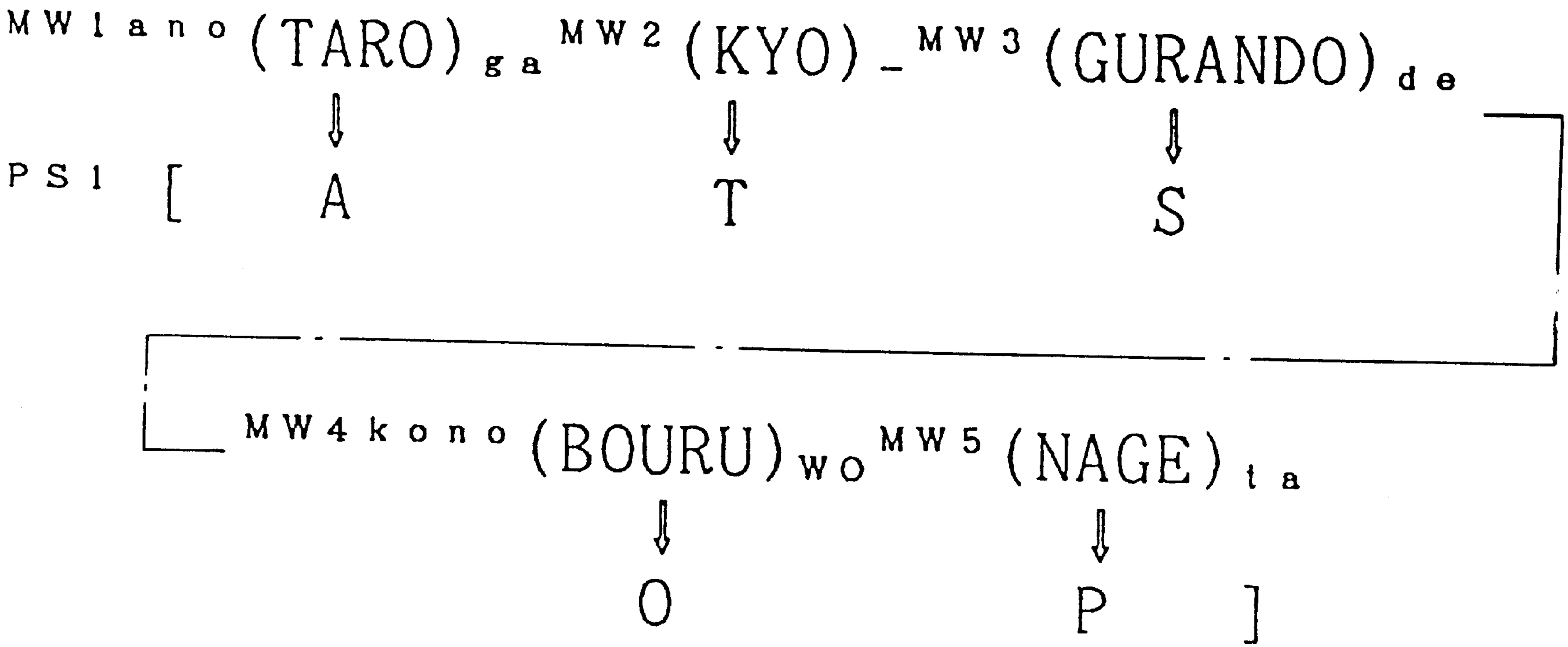

FIG. 12 presents the natural sentence, {ano Taro ga kyo gurando de kono bohru wo nage ta}, using a diagrammatic structural sentence; and FIG. 13 presents the natural sentence of FIG. 12, using a data sentence.

FIG. 14 shows the structural sentence when "Taro", "kyo", "gurando", "bohru", "nage", and "nage ta koto" are fetched from the natural sentence mentioned above.

FIG. 15 shows the natural sentence, {kyo gurando de bohru wo nage ta Taro} as a data sentence.

FIGS. 16–60 show the natural sentences as structural sentences.

FIG. 61 shows the PTN-TBL which lists where the meaning frames of words are stored.

FIG. 62 shows the PS modules of the meaning frame dictionary, and

FIG. 63 shows the MW modules of the meaning frames.

FIG. 64 shows the letter spelling dictionary, DIC-ST.

FIG. 65 shows the word dictionary, DIC-WD,

FIG. 66 lows the form dictionary, DIC-KT,

FIG. 67 shows the form processing dictionary, DIC-KTPROC.

FIGS. 68–73 show WS tables.

FIG. 74 shows an MK table.

FIG. 75 shows a meaning analysis ( ) program.

FIG. 76 shows the AND-OR relationship ( ) program in the "C" language format.

FIG. 77 shows a natural sentence using a structural sentence;

FIG. 78 shows the natural sentence described in FIG. 77 in a data sentence.

FIGS. 79 and 80 show MK table.

FIGS. 81 and 82 show the contents of the program in the "C" language format.

FIG. 83 shows the "words to be sought and case particles" table, KWDJO-TBL.

FIG. 84 shows the "words to be sought" table, KWD-TBL.

FIG. 85 shows the case particle table, JO-TBL.

Figure 86:
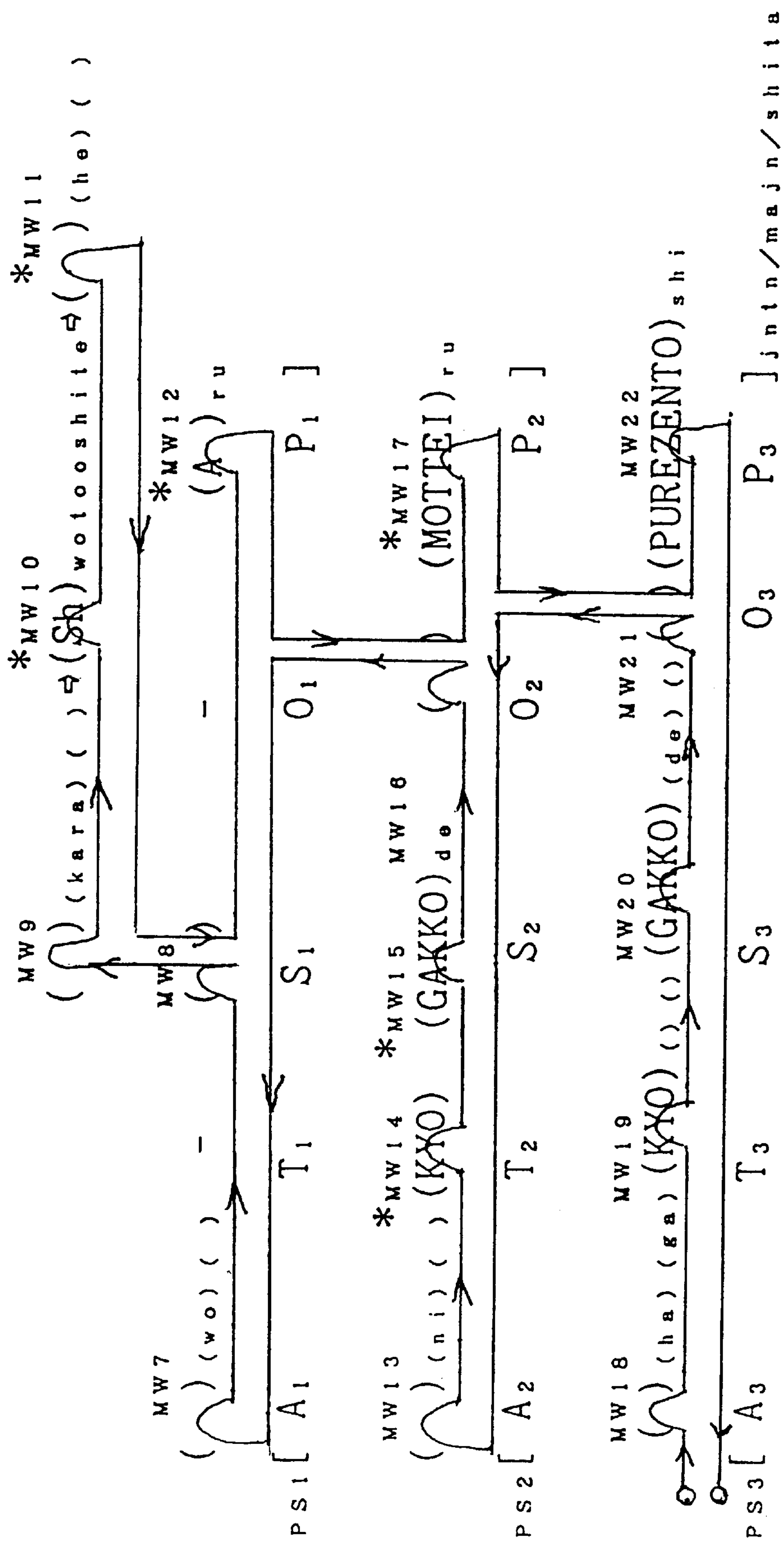

FIG. 86 shows a structural sentence and the search path, SR-PT in the sentence;

FIG. 87 shows this program in the "C" language format.

FIGS. 88–90 show MK tables.

FIG. 91 shows a program in the "C" language format.

FIG. 92 shows the natural sentence, {genki na Taro ga kyo gakko de shiroi bohru wo nage mashi ta}, in a data sentence.

Figure 93B:
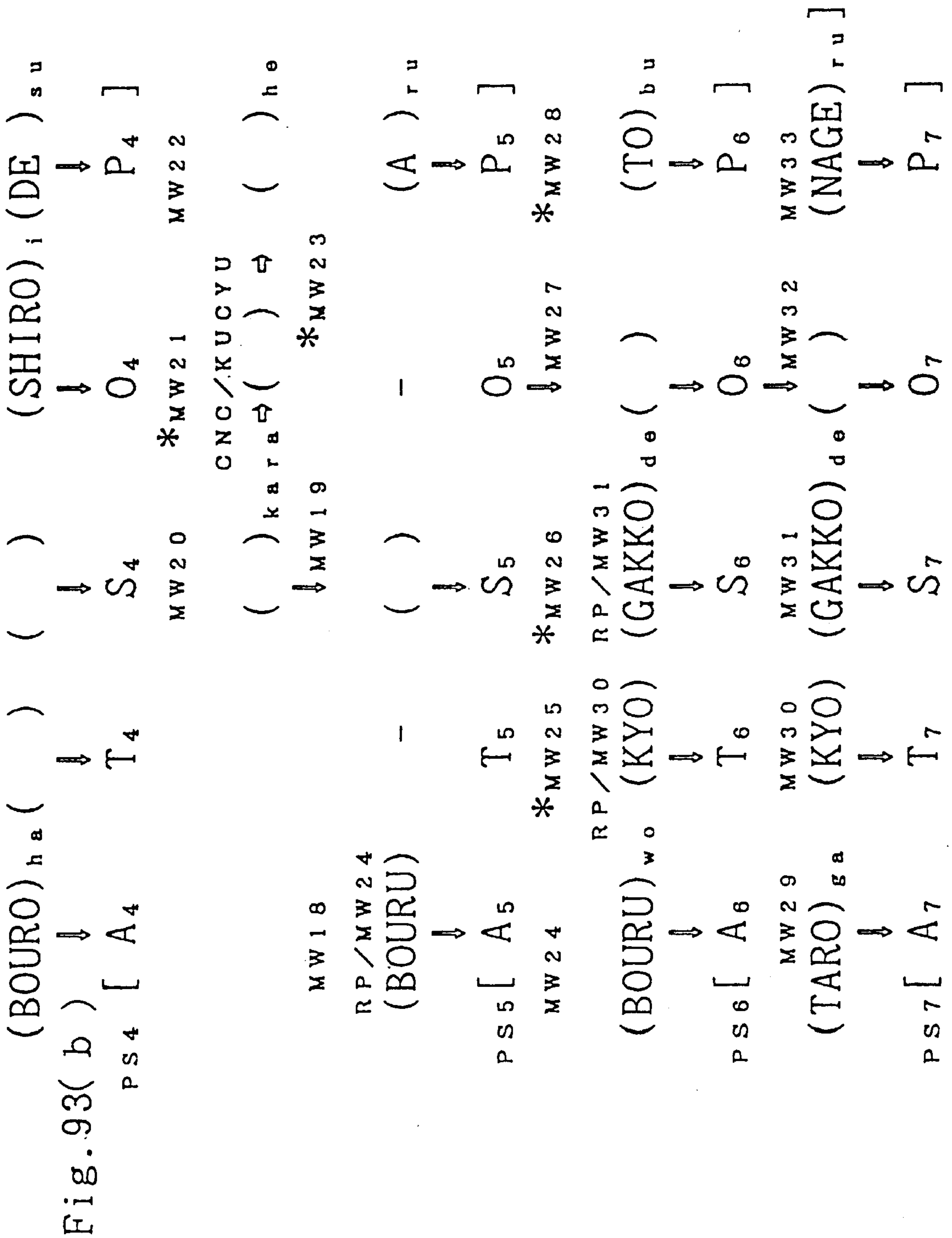

FIG. 93 shows the structural sentence for the above-mentioned natural sentence;

FIGS. 94 and 95 show the programs in the "C" language format.

Figure 96:
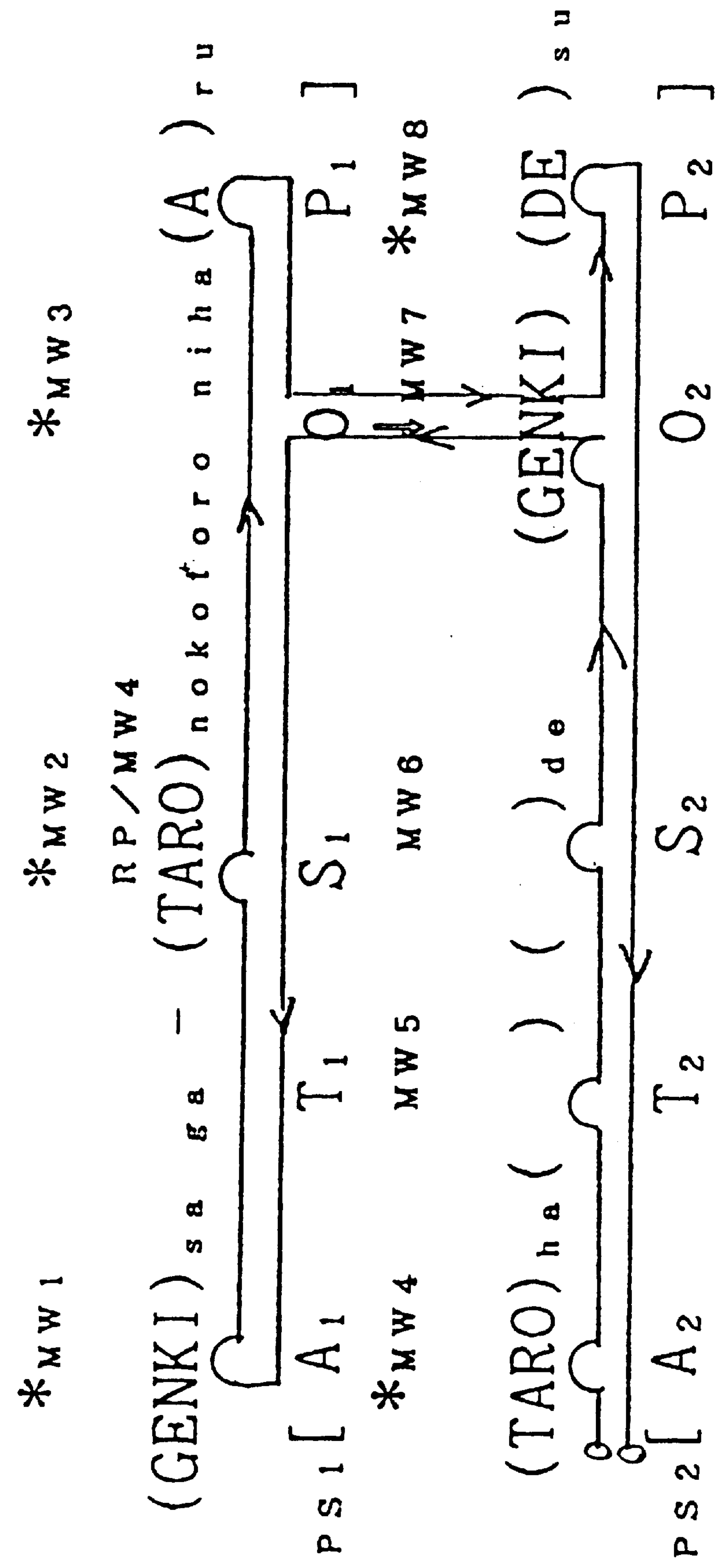

FIG. 96 shows the search path entered into the structural sentence.

FIGS. 97 and 98 show MI tables.

Figure 99B:
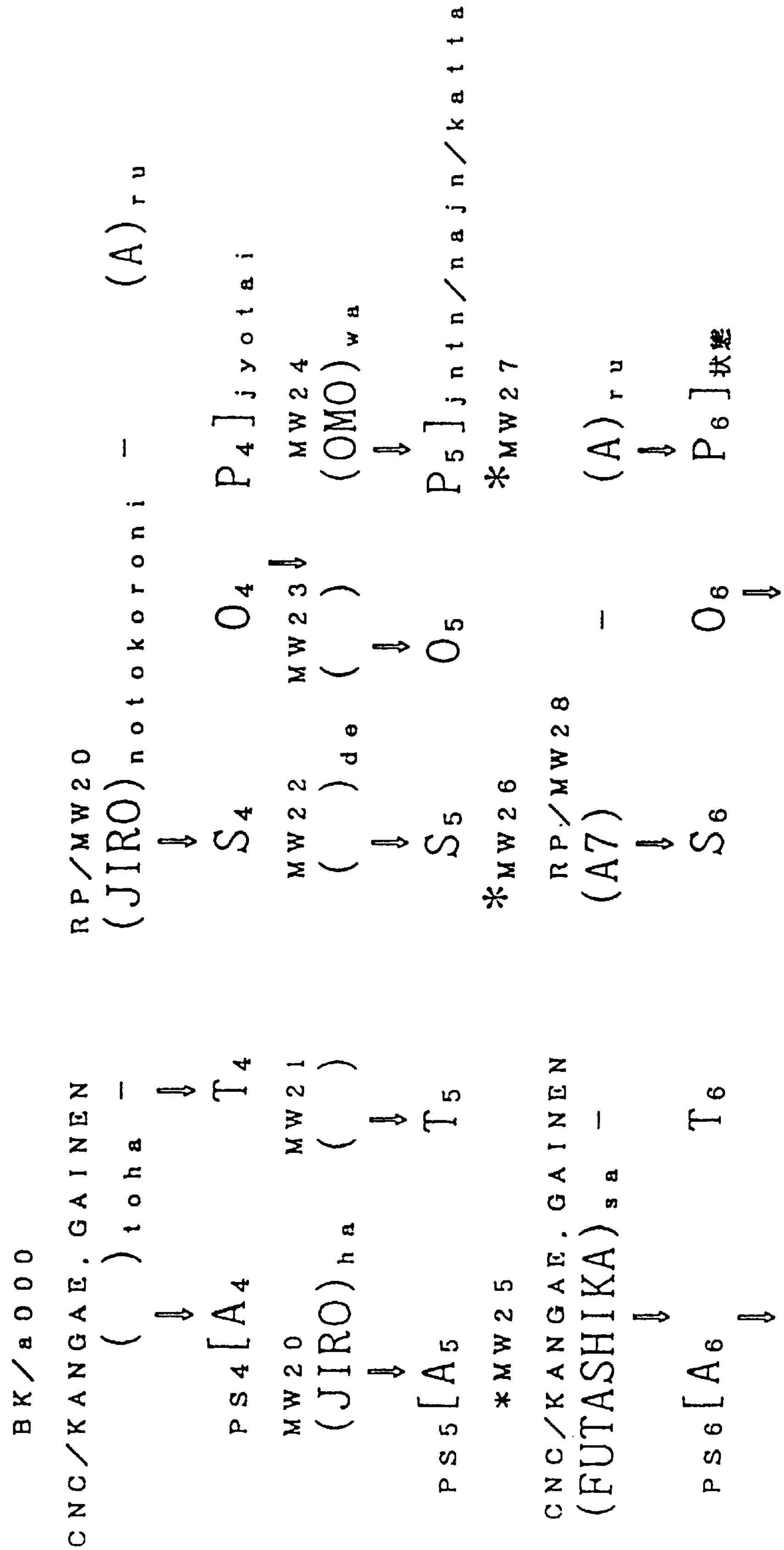
Figure 99C:
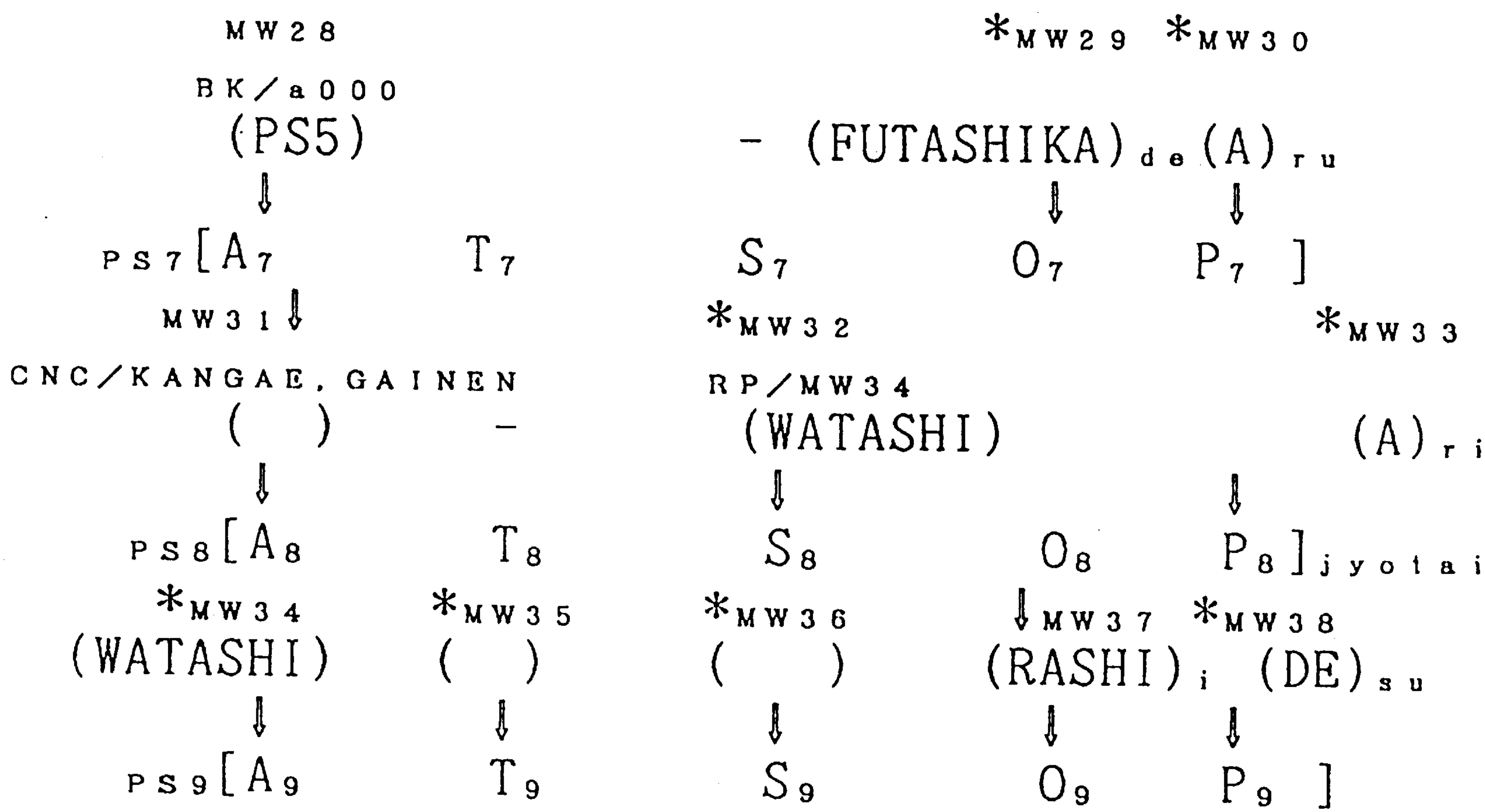

FIG. 99 shows the structural sentence for the natural sentence, {Jiro ha Taro ga Hankao ni bara wo atae na katta toha omo wa na katta rashii yo}, and FIG. 100 shows the data sentence for the natural sentence given in FIG. 99.

Figure 101:
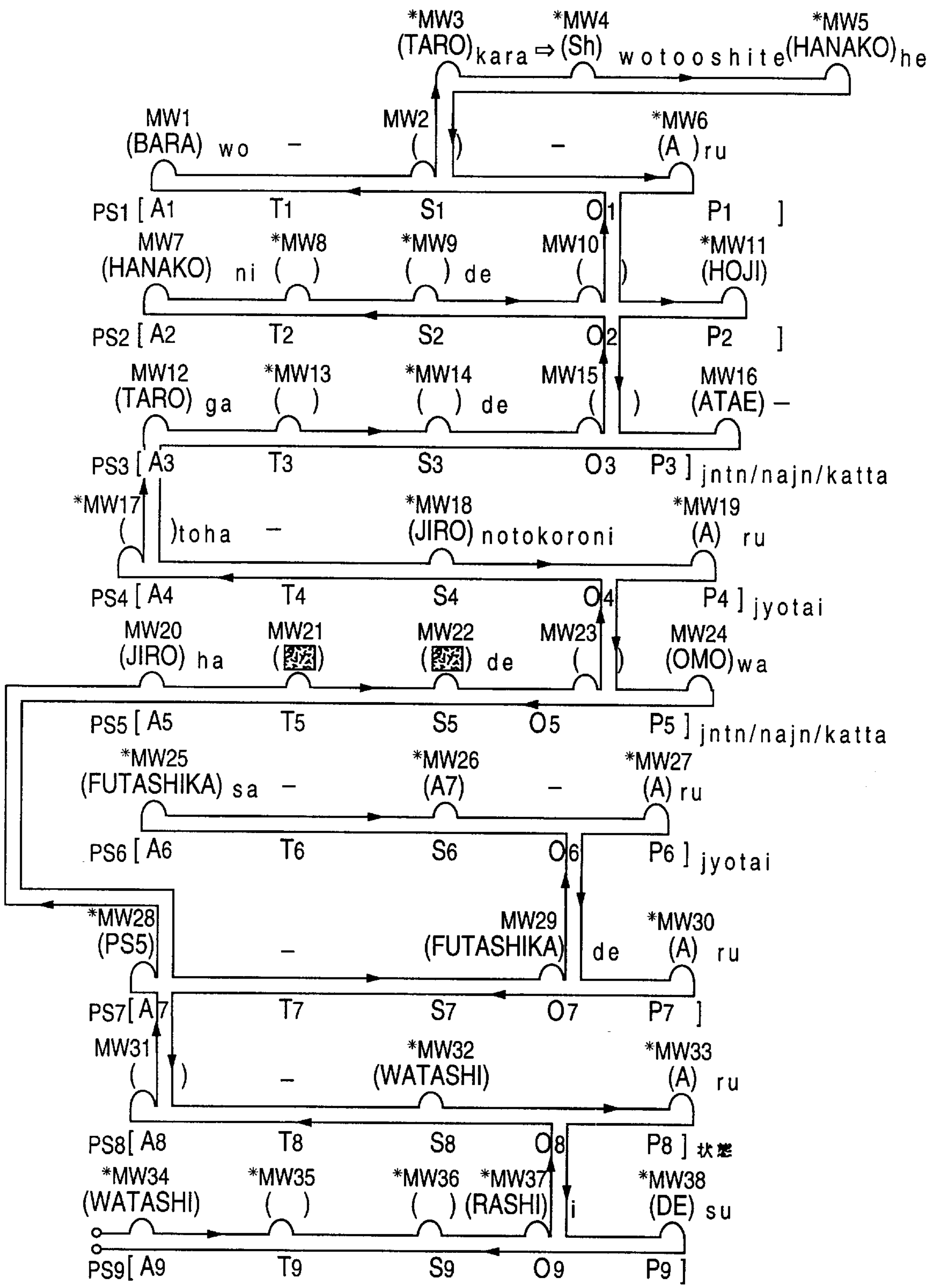

FIG. 101 shows the search path written in the structural sentence.

FIG. 102 shows the KWDJO-TBL, and

FIG. 103 shows the MK table.

Figure 105A:
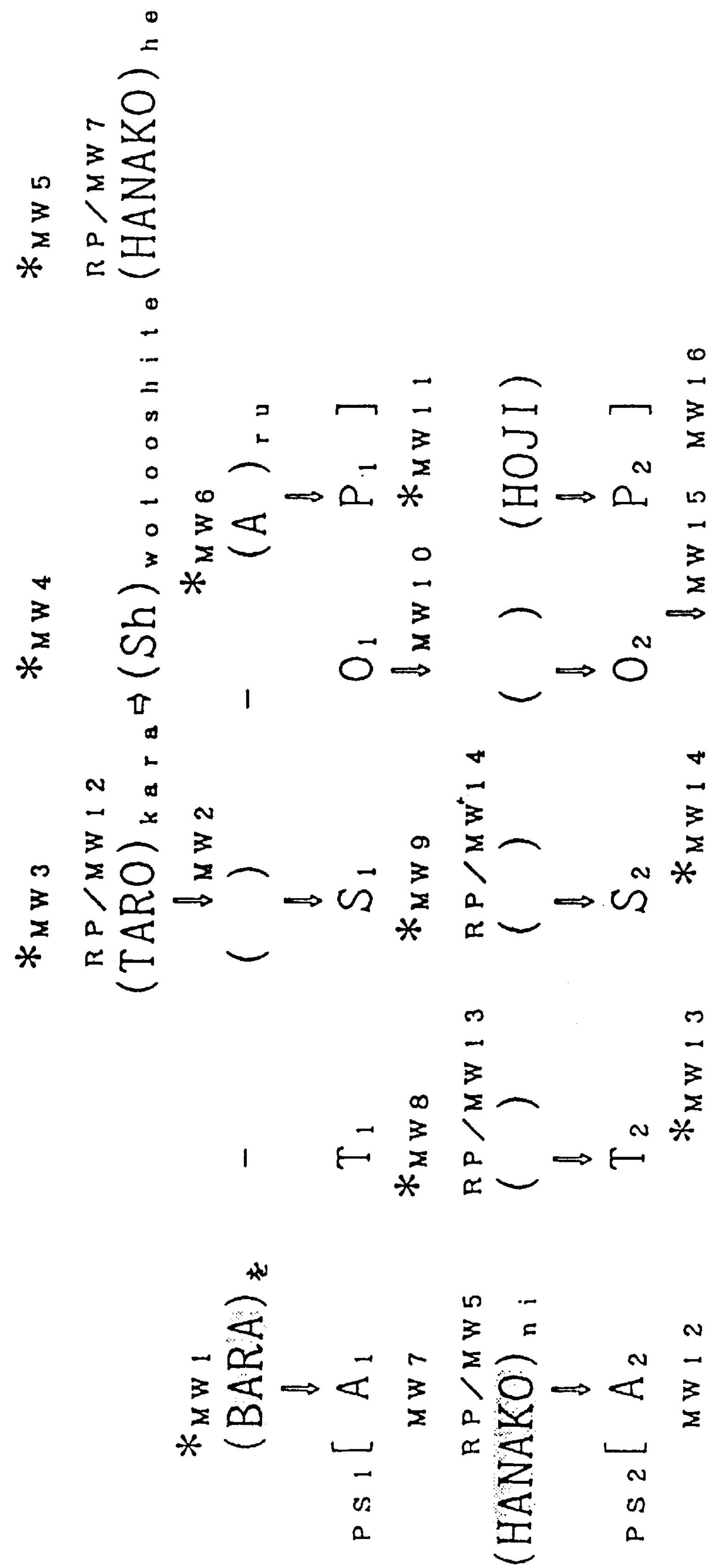
Figure 105B:
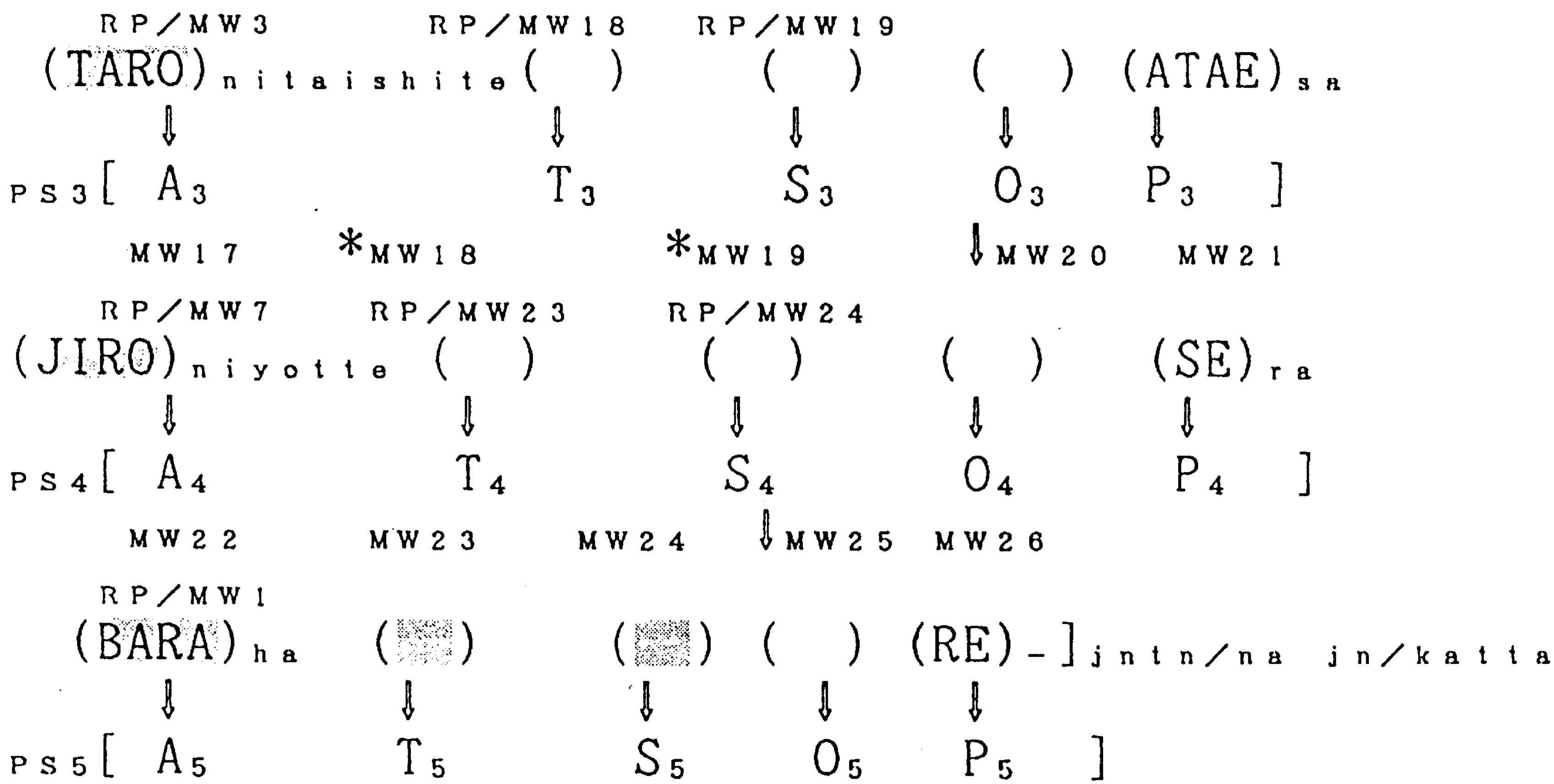

FIG. 104 shows the data sentence for the natural sentence, {bara ha Jiro ni yotte Taro ni taishite Hanako ni atae sase rare na katta}, and FIG. 105 shows its structural sentence. FIG. 106 shows the KWDJO-TBL, and FIG. 107 shows the MK table.

FIG. 108 shows the data sentence for the natural sentence, {Jiro ha Taro ga Hanako ni okane wo age ta node Hanako ga Tokyo e itta to omo tta}, and FIG. 109 shows its structural sentence.

Figure 110:
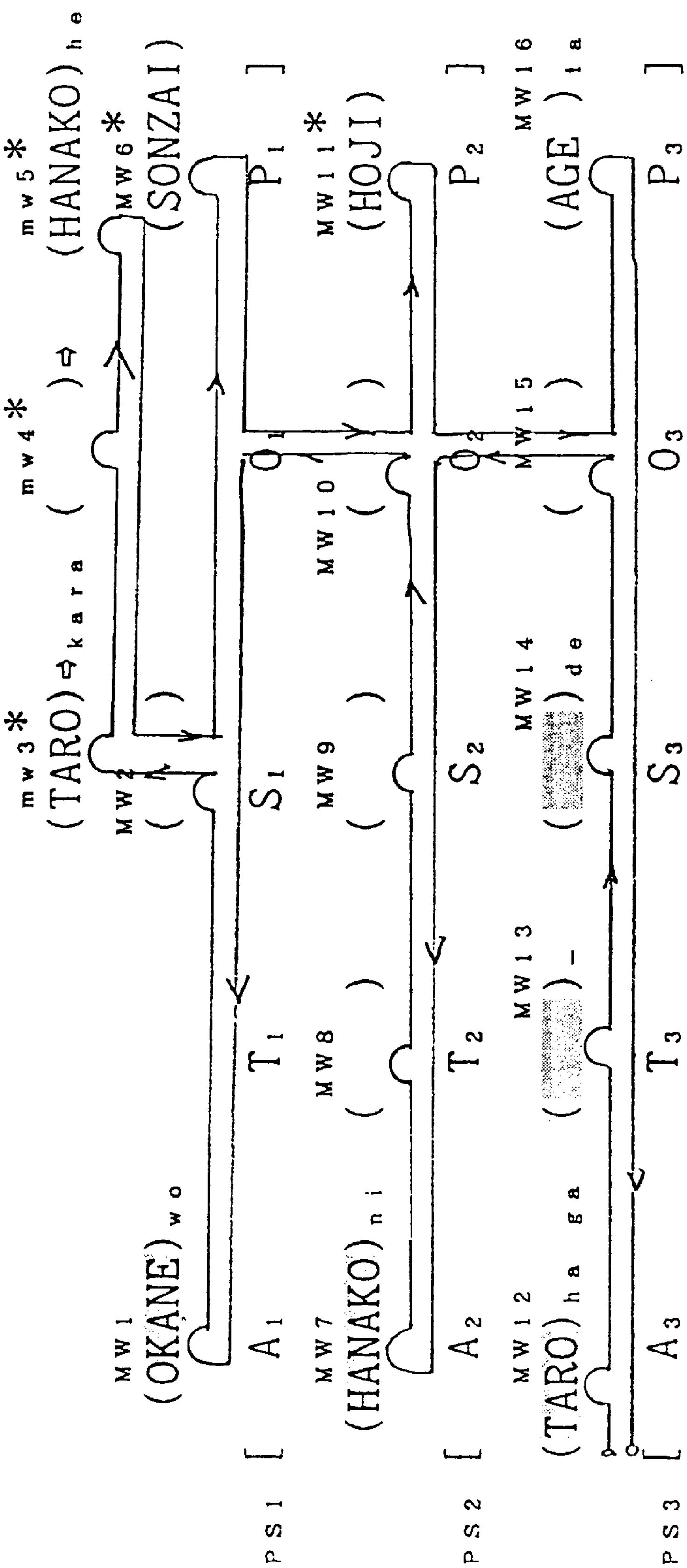
Figure 111:
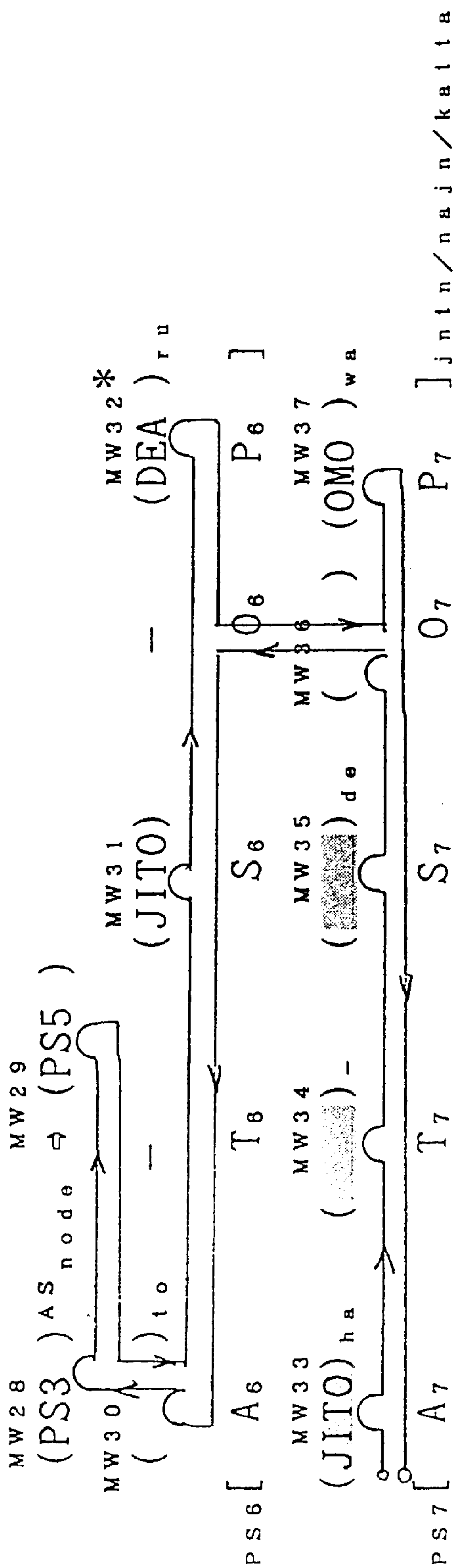

FIGS. 110 and 111 show the search path written in the structural sentence, FIGS. 112 and 113 show the KWDJO-TBL, and FIGS. 114–118 show the MK tables.

Figure 119:
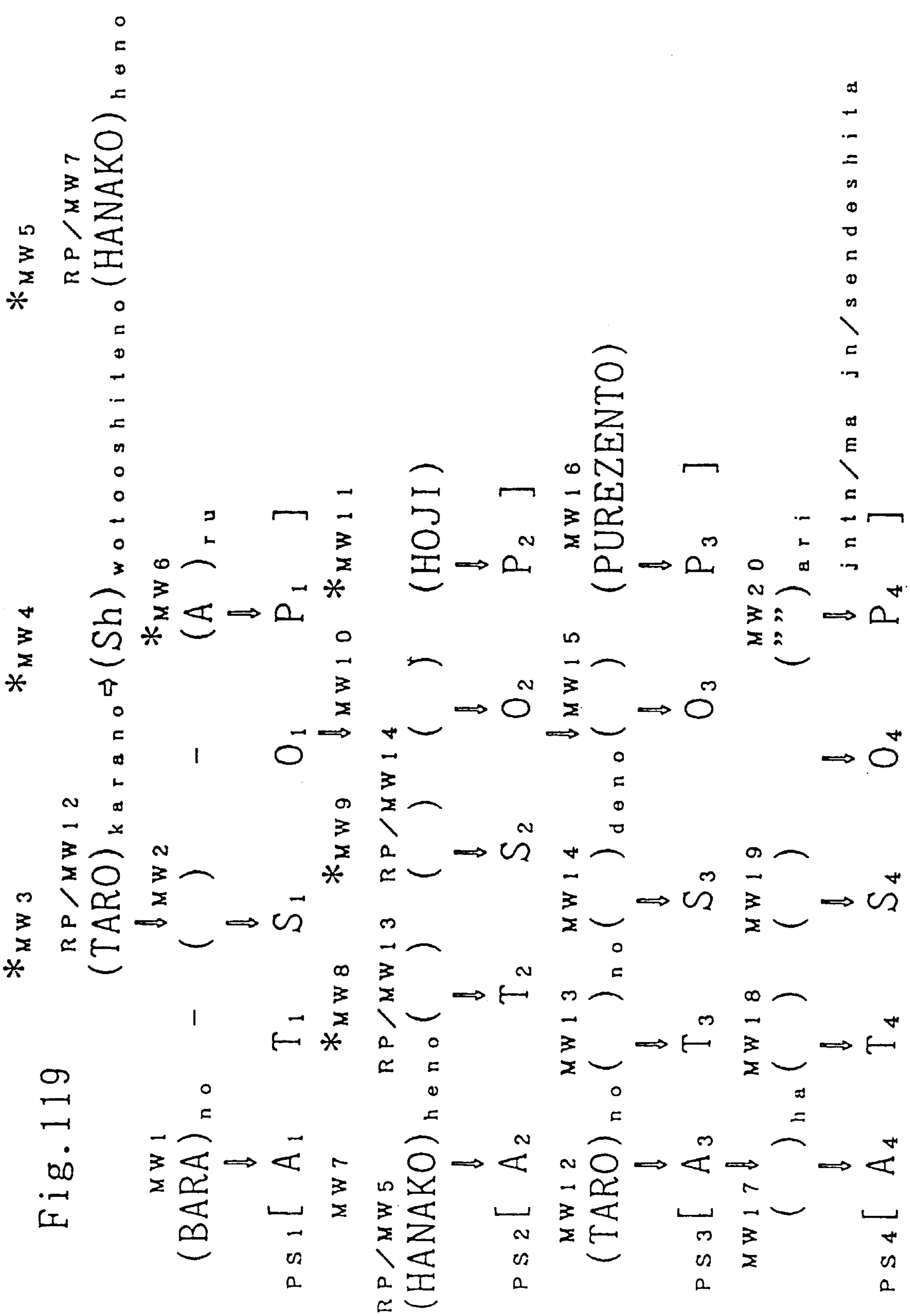

FIG. 119 shows the structural sentence for the natural sentence, {Taro no Hanako e no bara no purezento wa ari ma sen de shita}, and FIG. 120 shows the data sentence for this natural sentence.

Figure 121:
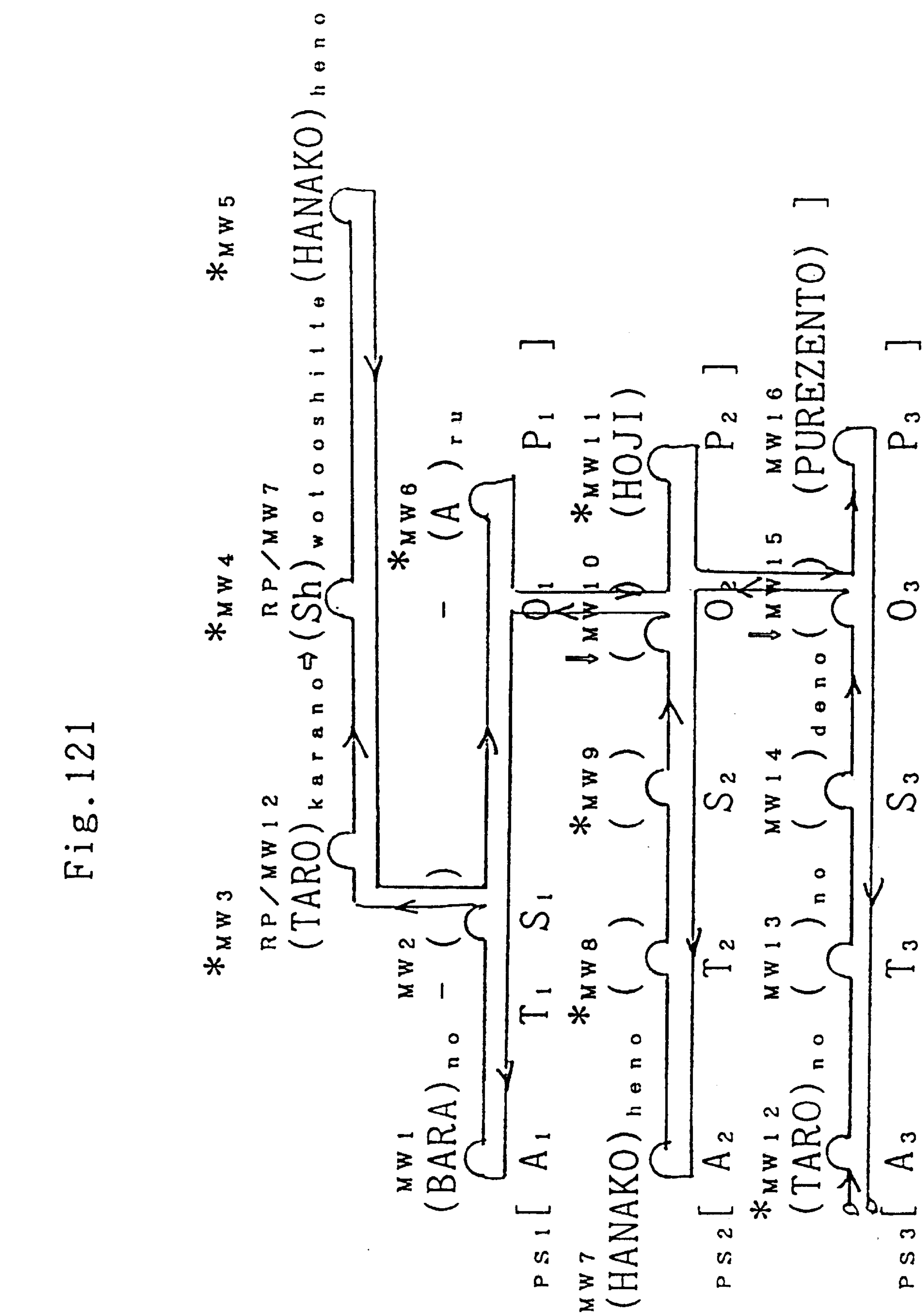

FIG. 121 shows the search path written in the above-mentioned structural sentence, and FIG. 122 show/the KWDJO-TBL.

Figure 123:
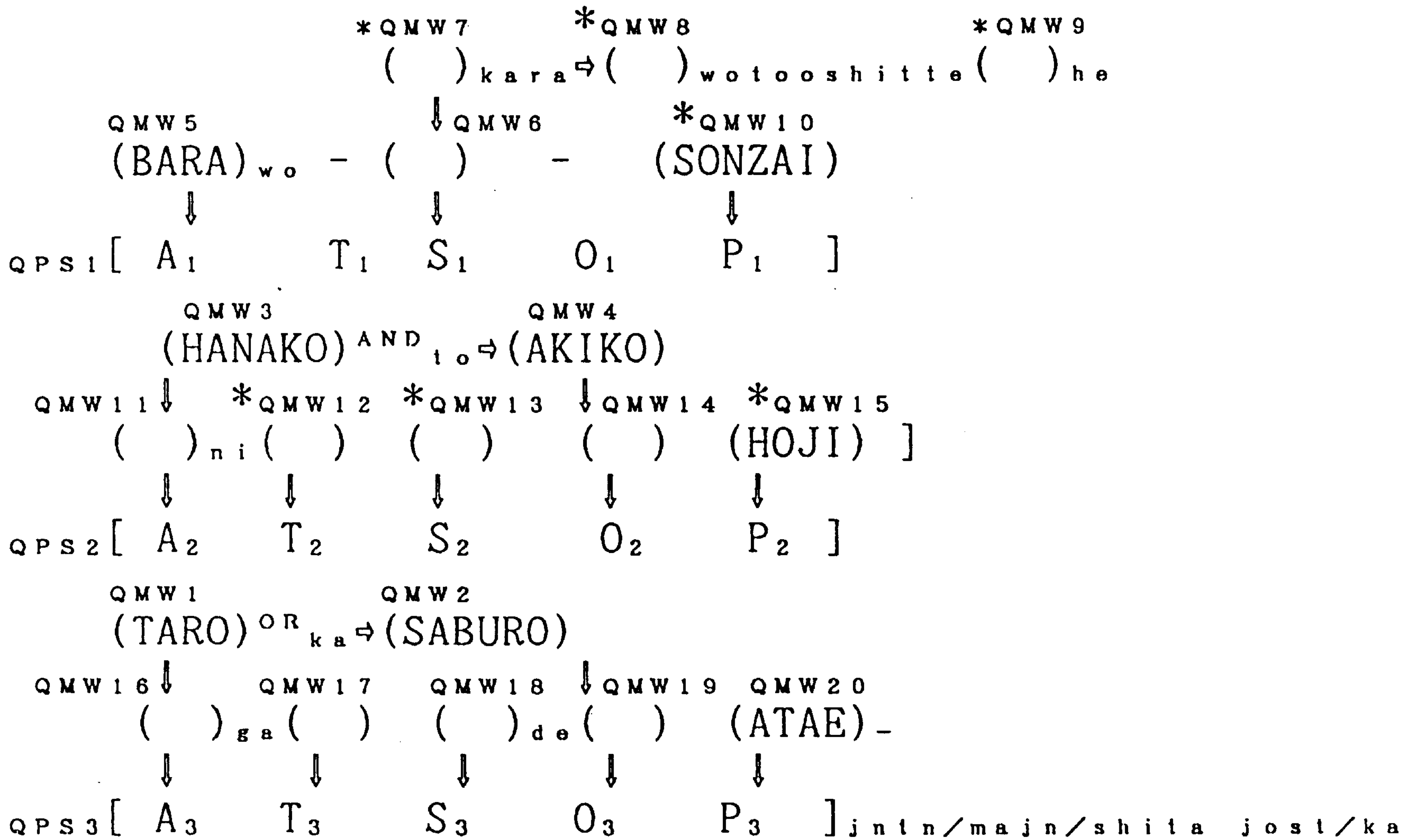

FIG. 123 shows the natural sentence, {Taro ka Saburo ga Hanko to Akiko ni bara wo ae ma shita ka?} in the structural sentence.

FIG. 124 shows the data sentence.

Figure 125:
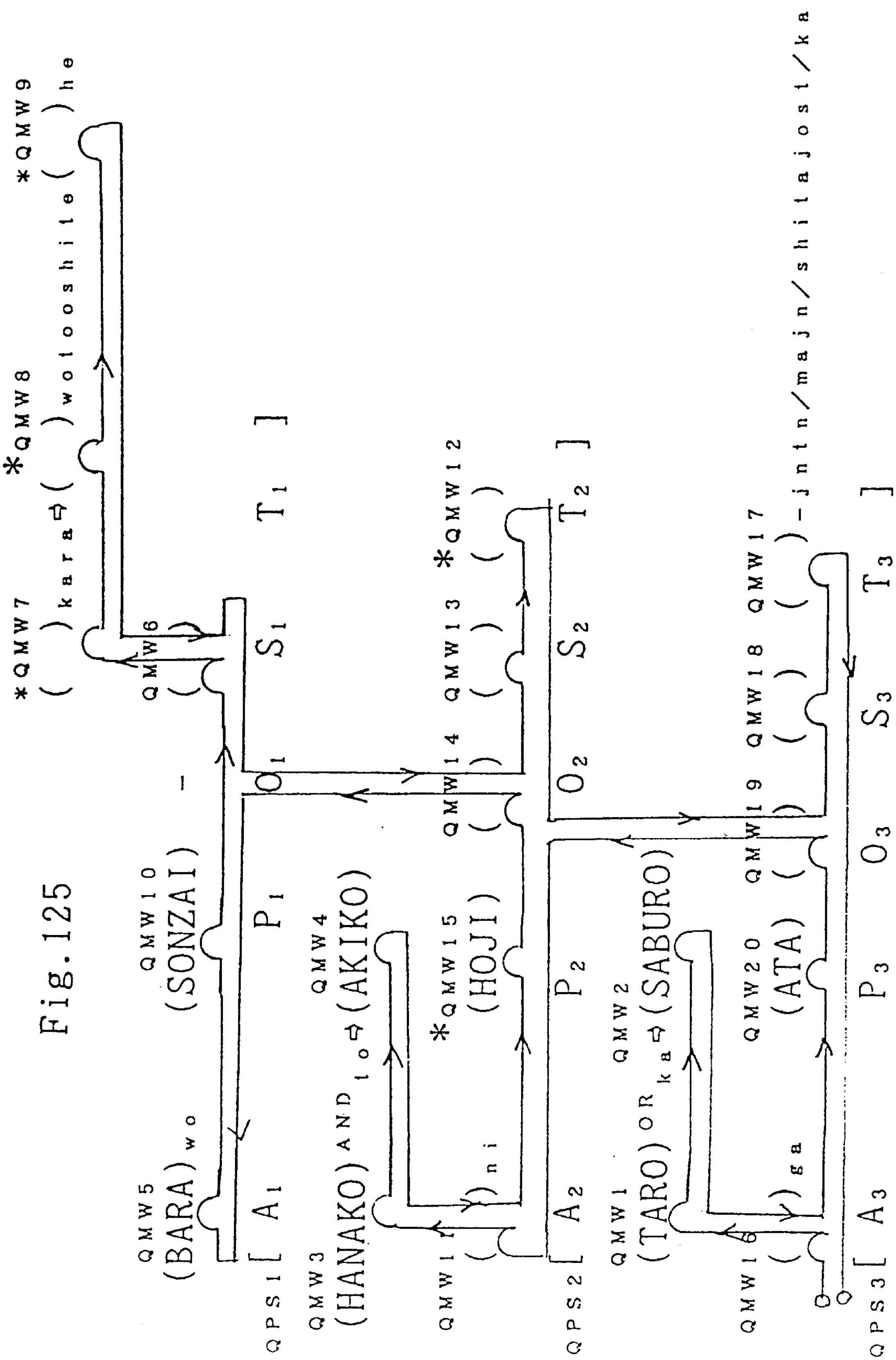

FIG. 125 shows the search path written in the structural sentence, and

Figure 126A:
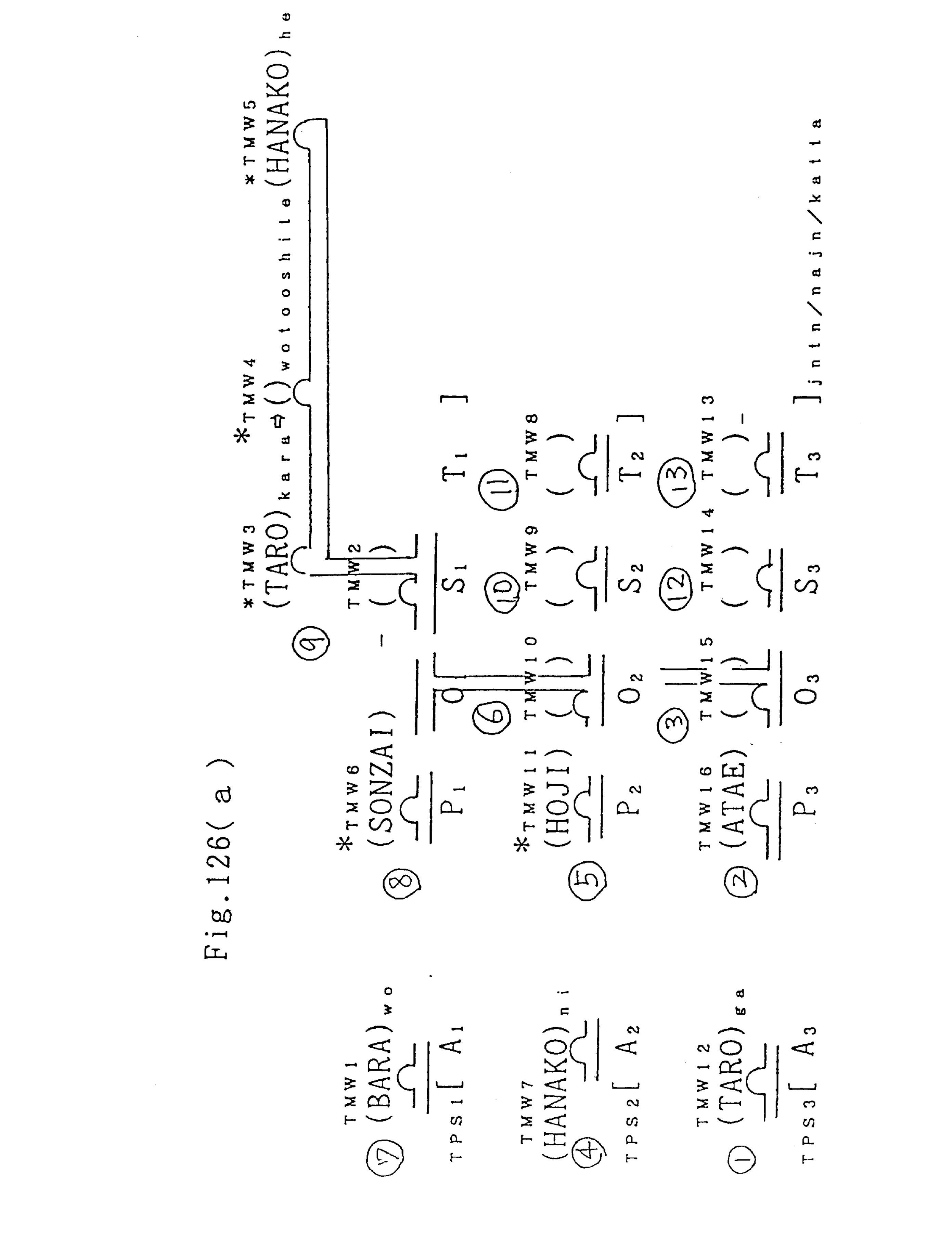
Figure 126B:
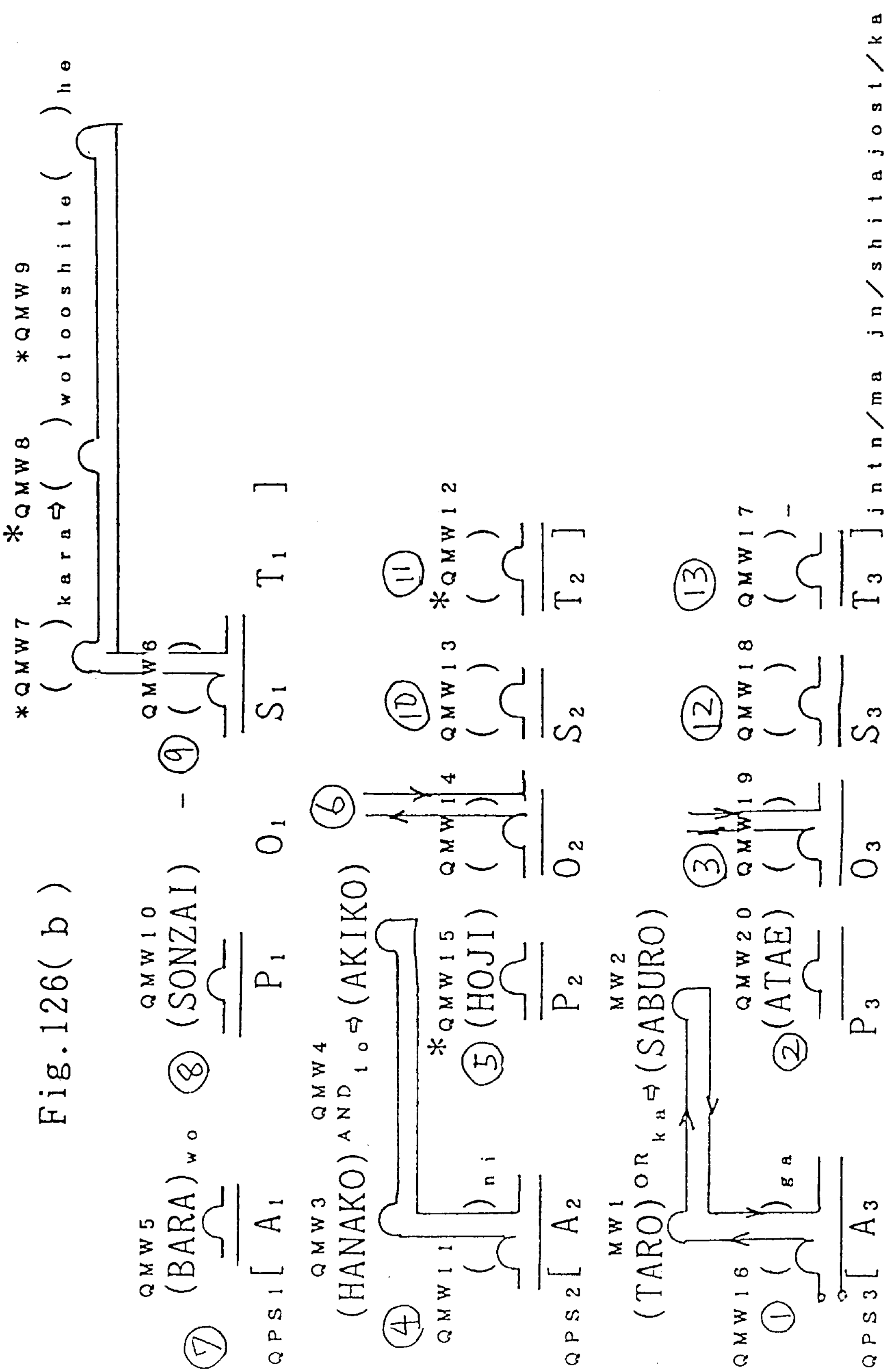

FIG. 126 shows the search path divided into short search sections.

FIG. 127 shows the structural sentence for the natural sentence, {Jiro ha taro ga Hanako ni bara wo atat na katta towa omo wa na katta rashii yo}, and FIG. 128 shows the data sentence for this natural sentence.

Figure 130:
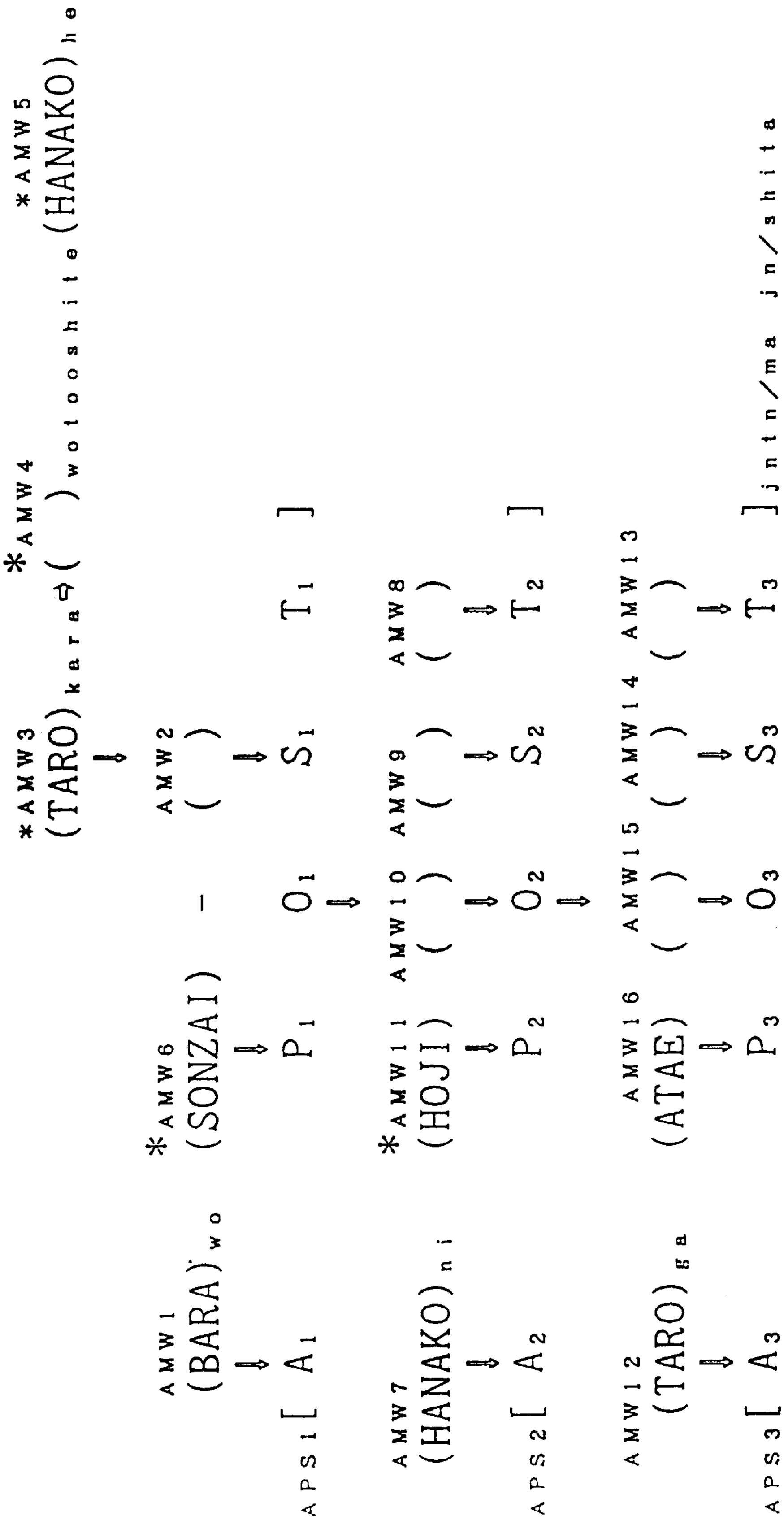
Figure 131A:
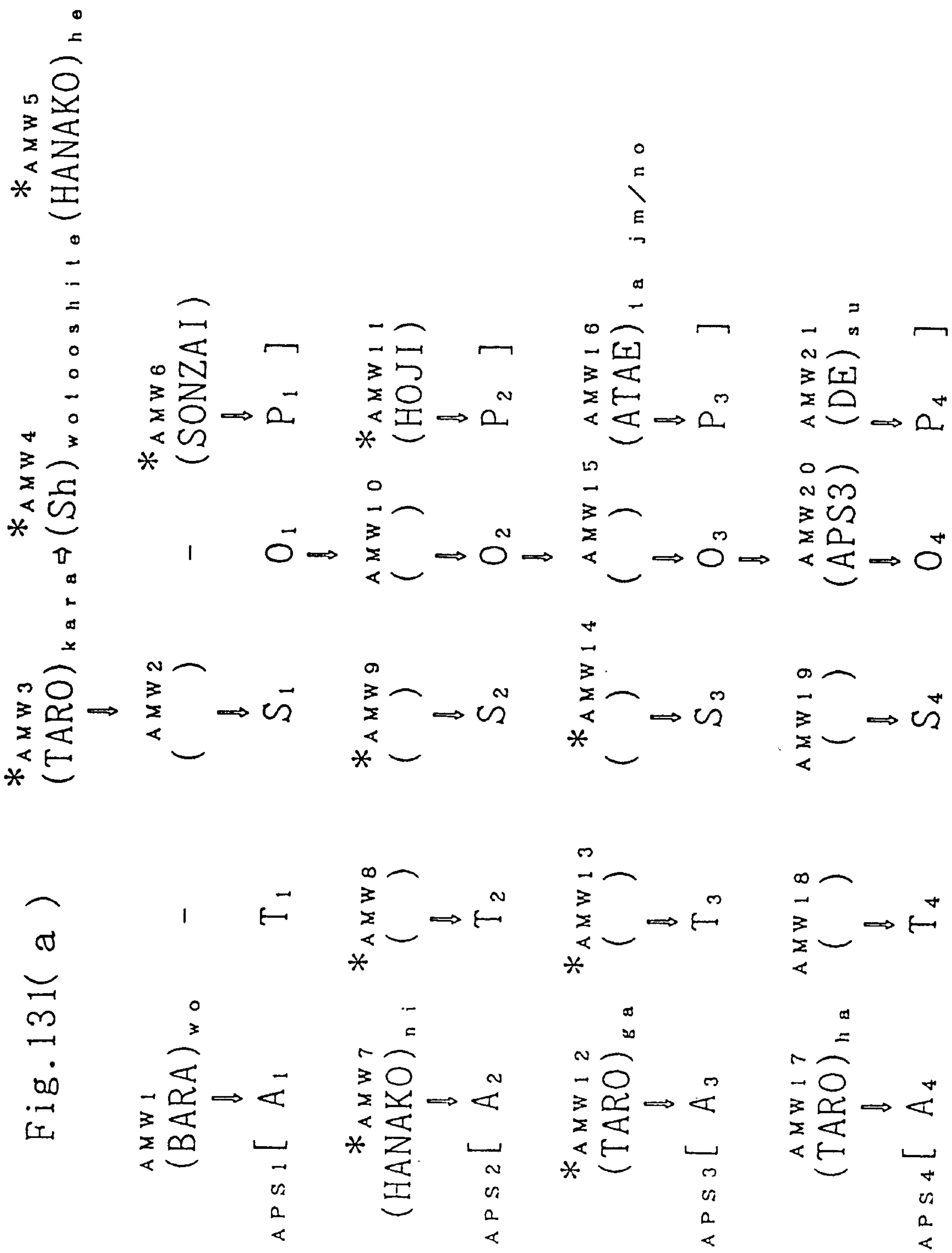

FIGS. 129–131 show the structural sentence.

FIG. 132 shows the word order table, SQ-TBL.

Figure 133:
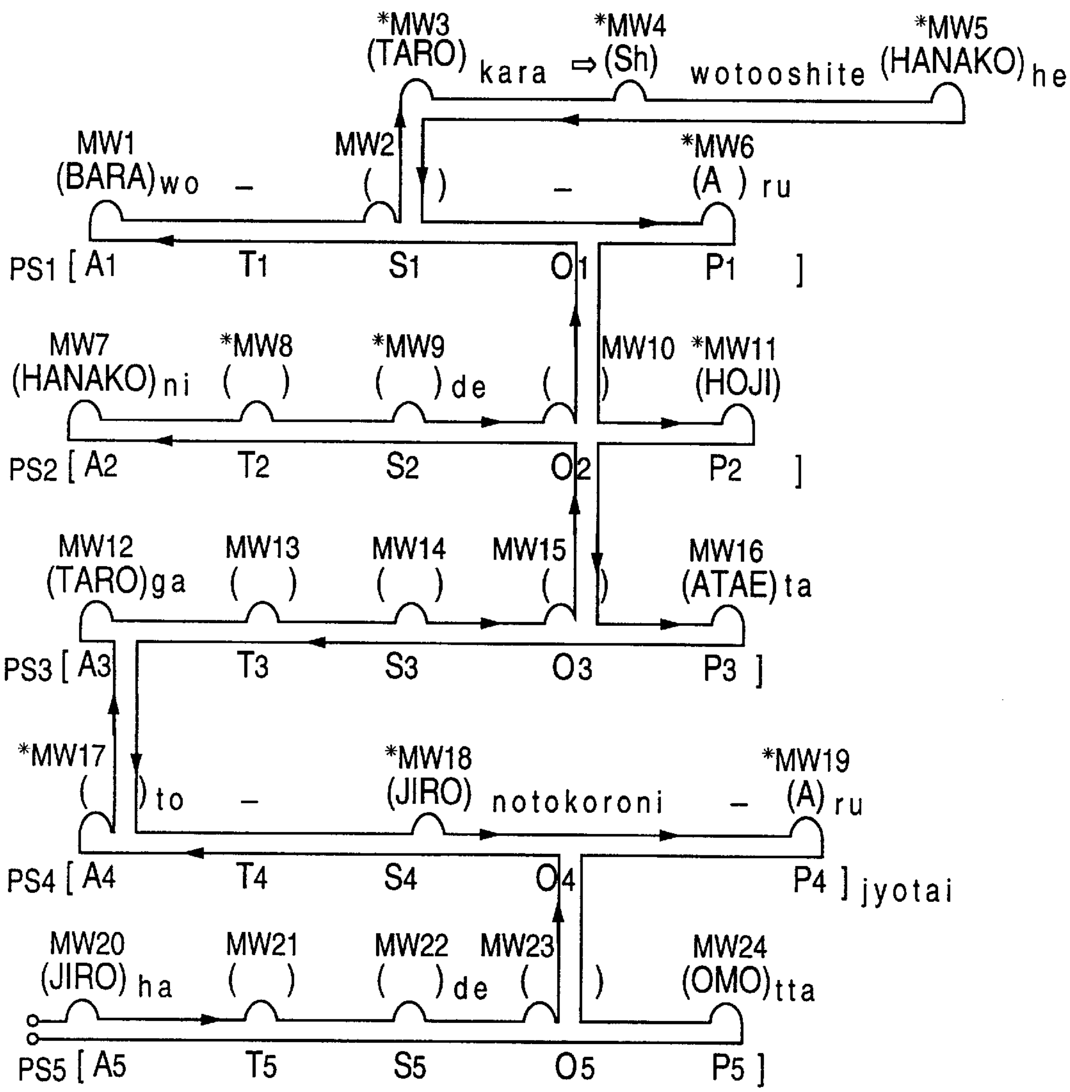
Figure 134:
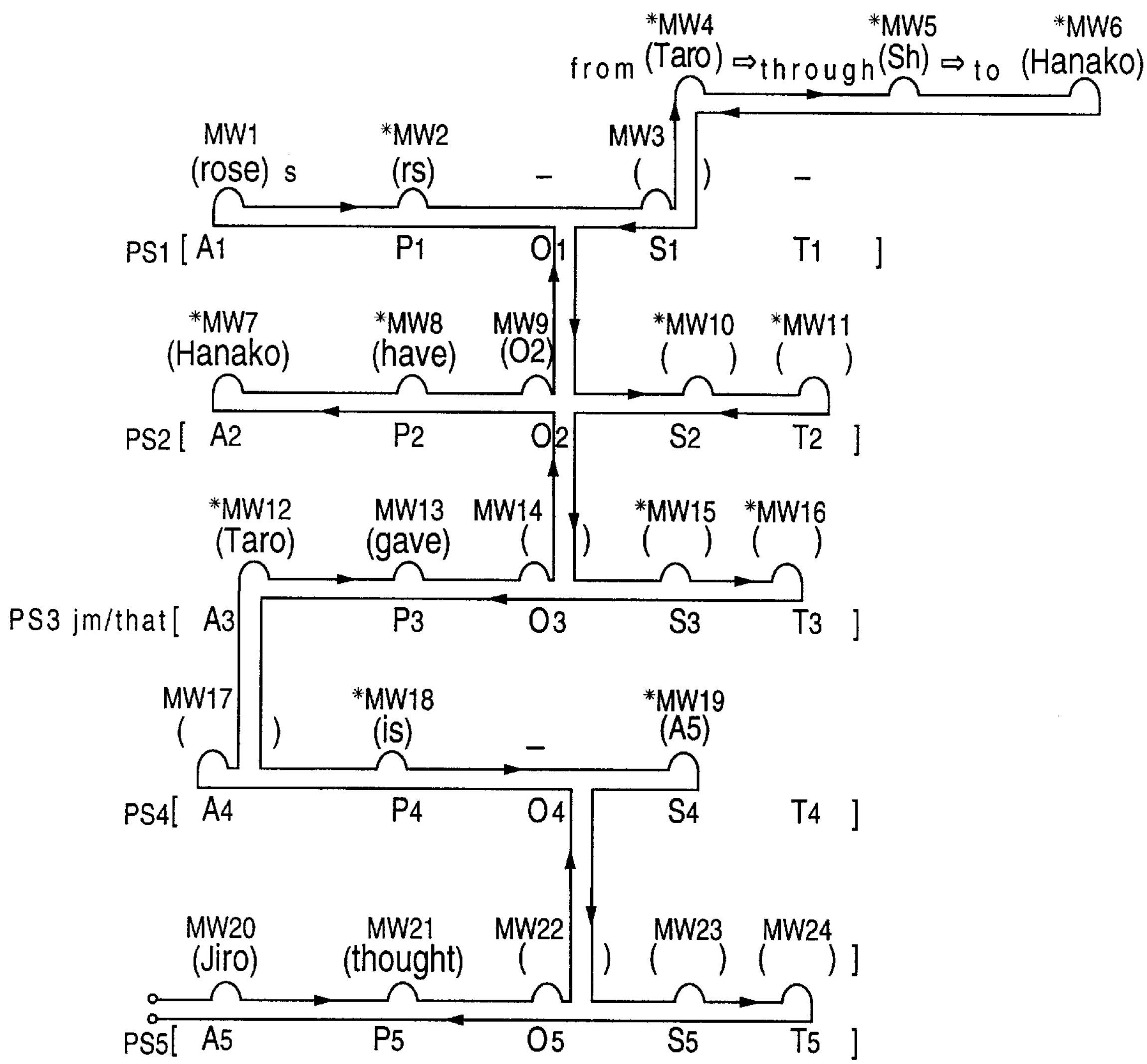

FIGS. 133 and 134 show the output paths written in the structural sentences.

Figure 135:
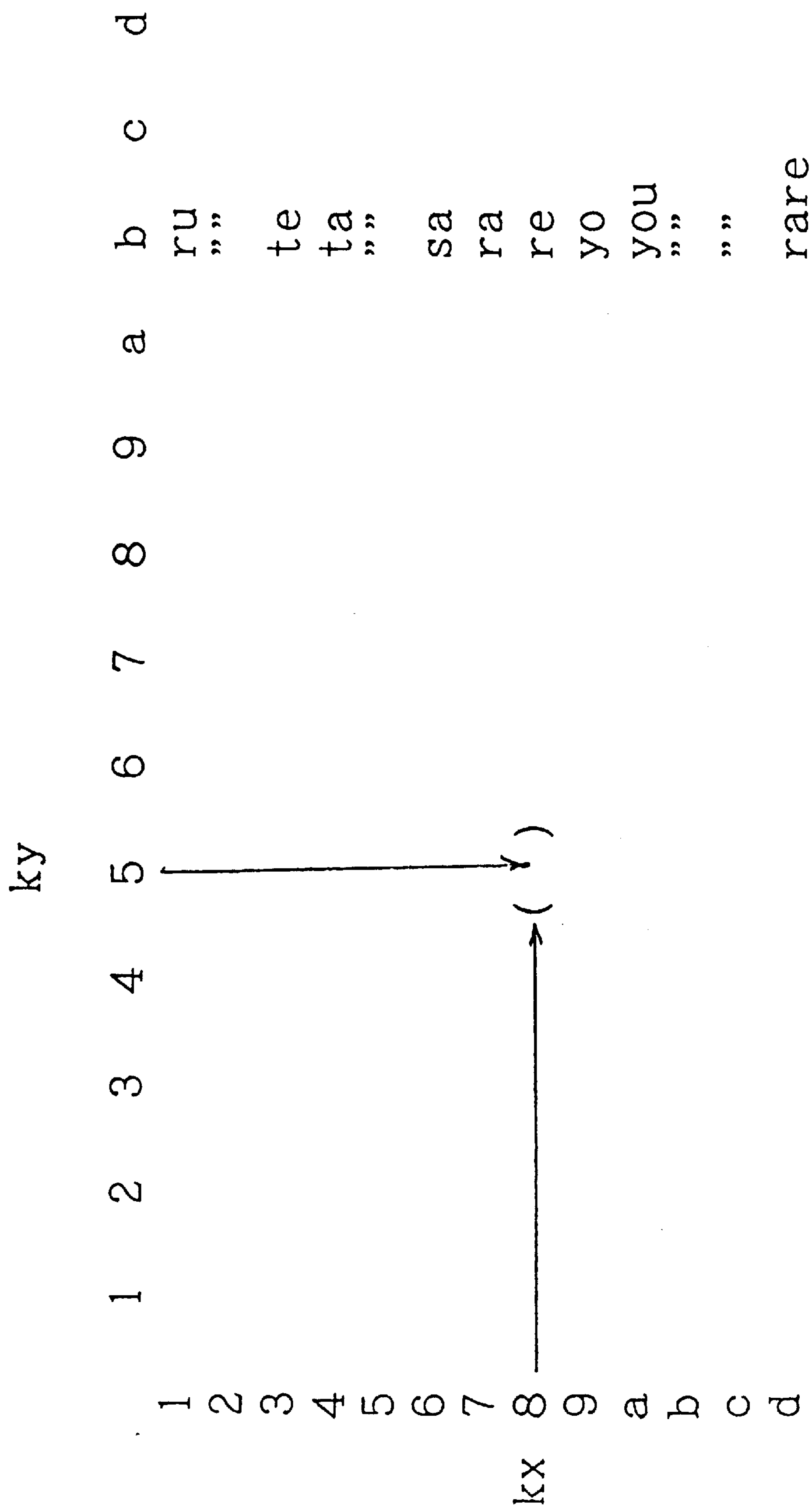

FIG. 135 shows the GOBI-TBL, which stores the suffix particles, jgb, which inflect according to the conjugation.

FIG. 136 shows the NTN-TBL, which stores tense negative particles.

Figure 137:
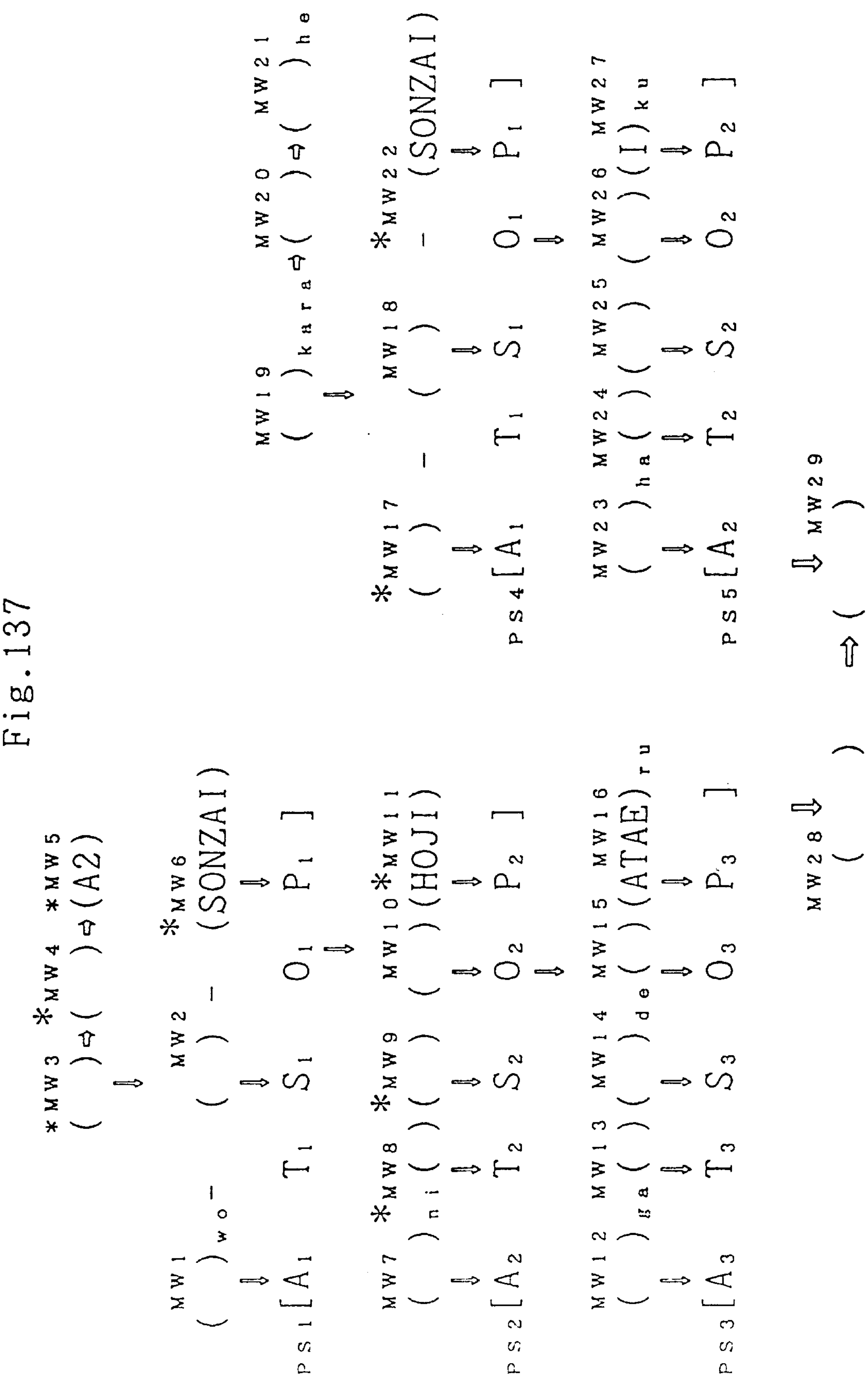

FIG. 137 shows a structural sentence, and

FIG. 138 shows its data sentence.

FIG. 139 shows the structural sentence for the natural sentence, {Taro ga genki de are ba Taro ha kyo gakko de shiroi bohru wo nage ru}.

Figure 140:
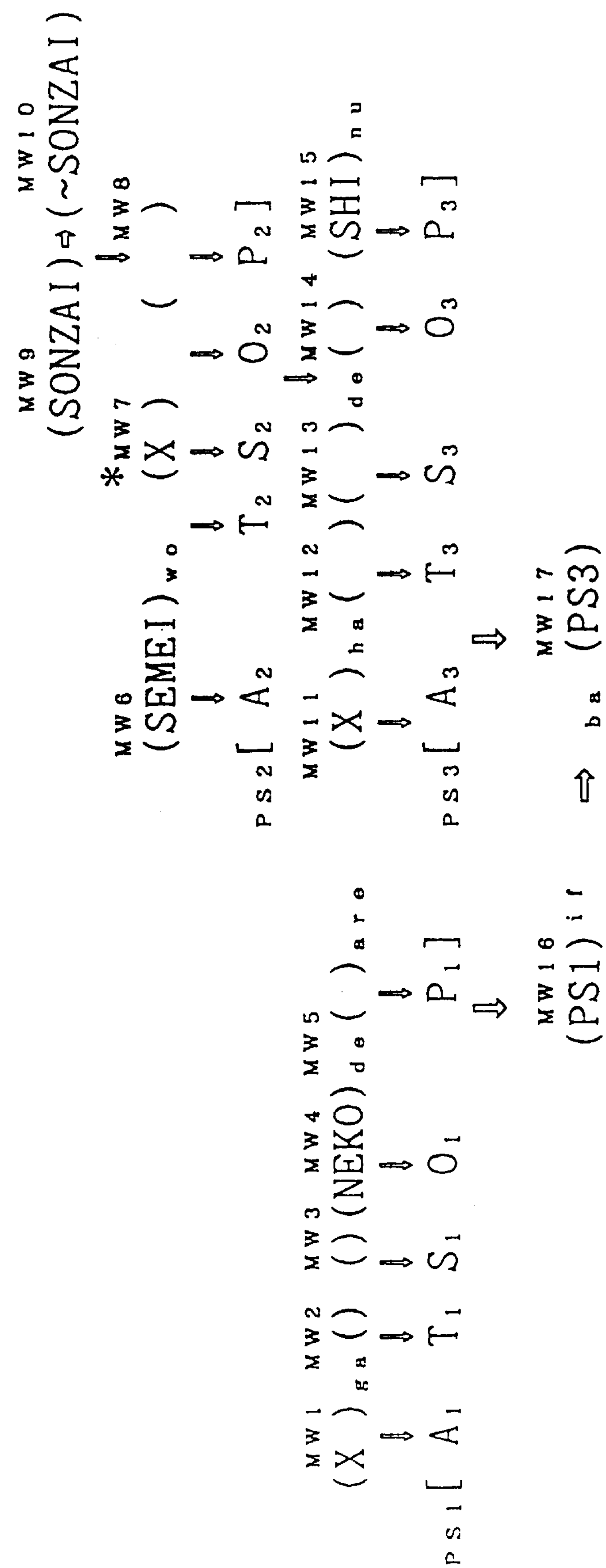

FIG. 140 shows the structural sentence for the natural sentence, {X ga neko de are ba X wa shinu}.

FIG. 7 shows the structural sentence for the natural sentence, {Taro ga kyo gakko de Hanako ni hon o atae ru}, using the PSMW data structure.

DISCRIPTION OF THE PREFERRED EMBODIMENTS

Before explaining the details of this patent, the basic ideas involved when handling a natural language according to this patent application will be explained. A word expresses a concept. For instance, each letter line, KNJ, such as "Taro" "kyo" (today), "gurando" (ground), "bohru" (ball) and "nage" (throw) can be considered to be a symbol or label assigned to each concept. Therefore, the individual word represents an individual concept. This word is stored in element .WD of the data structure MW, and the MW constitutes a new meaning by combining with a case from the data structure PS, which is called the primitive sentence (PS) as mentioned above—in other words, by combining with Case A, Case T, Case S, Case O, Case P, Case X, Case Y, or Case Z.

For instance, "Taro" is stored in element .WD of MW1, in the sentence, {Ano Taro ga kyo gurando de kono bohru o nege ta}, and this MW1 is combined with Case A of PS1. Each of the words, "kyo," "gurando," "bohru," and "nage" is stored in the individual element .WDs of MW2, MW3, MW4, and MW5, and these are connected to Case T, Case S, Case O and Case P of PS1, by case combination. FIG. 12 shows these as a diagram. The language structure of the above-mentioned natural sentence as explained here can be understood from this diagram. This language structure is actually stored in the computer using the data structure shown in FIG. 13.

In a natural sentence, each work is shown by spelling it in letters, such as "Taro." However, if each word is shown on the computer by spelling it out in letters, the computer would need a very large memory capacity. Therefore, a code number is used to represent each word.

In FIGS. 12 and 13, each of the letter lines, "Taro," "kyo," "bohru," and "nage" is entered in these diagrams without changing them into their individual code numbers. As already mentioned, however, these words are actually stored in the computer as their individual code numbers. The same process is used for particles, which will be described later. In FIG. 12, (Taro) shows that the word "Taro" is the MW inserted in element .WD. Case particles such as "ga," "de," and "o" are to be stored in element .jcs and the inflective suffix particles such as "ta" are to be stored in element .jgb. These particles are expressed using small letters to the lower right of the parentheses ( ), and articles such as "ano" and "kono" are expressed using small letters to the upper left of the parentheses ( ). In FIG. 13, these articles are stored in each individual element .jr.

The diagram in FIG. 12 shows the language structure of the natural sentence. I have therefore chosen to call this the "structural sentence." The diagram in FIG. 13 shows the expression of a natural sentence using the previously mentioned data structure. I have chosen to call this the "data sentence DT-S."

For the sentence to carry a complicated meaning, the operations of extracting only a single word from a sentence, and inserting that word in the following sentence, are considered in this patent application to be the operations shown below. For instance, when each of the individual words, "Taro," "kyo," "gurando," and "bohru" is extracted from the sentence {Taro ga kyo gurando de bohru o nage ta}, the following sentences result.

{kyo gurando de bohru wo nage ta Taro}

{Taro ga gurando de bohru wo nage ta kyo}

{Taro ga kyo bohru wo nage ta gurando}

{Taro ga kyo gurando de nage ta bohru}

As seen in FIG. 14, these are considered to be the sentences which were created by inserting the extracted words in the element .WD of the MW6 which was combined below PS1. IN this diagram, the letters spelling each word and the particles inserted in the MW(s) are aligned in the order of each case, ATSOP, that is, when this natural sentence is translated to a natural sentence, these will be as shown below.

{Taro ga kyo gurando de bohru wo nage ta Taro}

{Taro ga kyo gurando de bohru wo nage ta kyo}

{Taro ga kyo gurando de bohru wo nage ta gurando}

{Taro ga kyo gurando de bohru o nage ta bohru}

Each of the words, "Taro," "kyo," "gurando," and "bohru" appears twice in then same sentence, and the sentences become too complicated. Therefore, when the expression of the word preceding the two identical words is prohibited, these sentences will become the natural sentences shown below.

{Kyo gurando de bohru wo nage ta Taro}

{Taro ga gurando de bohru wo nage ta kyo}

{Taro ga kyo bohru o nage ta gurando}

{Taro ga kyo gurando de nage ta bohru}

Therefore, each sentence is considered to be constituted by the above process. In FIG. 14, prohibition of an expression is indicated by the asterisk "*" symbol. Here, "Taro," "kyo," and "gurando" are not considered to be moved from their positions in the first half of the sentence to the second half; it is considered that he expression of the words in the first half of the sentence is prohibited when creating the natural sentence form the structural sentence. It is not assumed that these words are not stored. These words are actually stored, but the expression of these words is considered to be prohibited. This is extremely important in this patent application. As will be described thoroughly later, when carrying out intellectual processing, such as questioning/answering, translation, reasoning, or acquisition of knowledge, pattern-matching is the main method used. This pattern-matching is carried out on the assumption that each word is a basic target and is used as a key word. Therefore, if these words are not inserted in each of the element .WDs of the MWs, accurate pattern-matching is not possible. As I will mention later, a natural sentence is expressed using only the minimum necessary number of words. Also, when the speaker considers that the person being spoken to can naturally understand some word, or considers that it is not particularly necessary to express some word, that word is not expressed. When pattern-matching is performed, though, the searching is done using these words as dependable keys, so that if these words are not shown in the sentence, accurate pattern-matching cannot be done. Therefore, in order to carry out accurate pattern-matching, the omitted words must be carefully filled in. In contrast, when creating a natural sentence from a structural sentence, if the words filled in when doing the pattern-matching in the natural sentence are expressed without modification, the same word can be expressed many times in one sentence, and the sentence becomes complicated. Therefore, we must decide which of the identical words is to be expressed, and must prohibit the expression of the rest of the words.

I have already mentioned the case of extracting a word and inserting it into the following sentence, although there are cases in which an entire sentence is sometimes handled like a single word.

{Taro ga kyo gurando de bohru wo nage ta koto}

This sentence is handled like a single word. I have named this "extraction of Case Z (Zentai case)." I previously described the extraction of each of "Taro," "kyo," "gurando," and "bohru," as extractions of Case A, Case T, Case S and case O. Therefore, I will refer to the extraction of an entire sentence in the same way as that of a single word, i.e., as the "extraction of Case Z (Zentai case)." Shown using a structural sentence, this will be as seen in FIG. 14 (f). In this case, nothing is stored in element .WD of MW6 which is combined below PS1. In element -jm of PS, "koto" is inserted as the particle which shows Case Z. However, I have defined that "koto" can be stored in element .WD of MW6 which is connected below PS1, or stored in Case Z as the word "koto" in phonic script or the word "koto" written using a Chinese character. ("koto" means "matter.")

The sentence {Taro no kyo no gurando deno bohru no nage} is considered as an example from which the Predicates case has been extracted. When this is shown as a structural sentence, it will appear as seen in FIG. 14 (e). This predicate is the central core of the sentence, and therefore, the case particles are assumed to have changed to "no" and "deno." This is different from the extraction of other cases. The meaning of the extracted Predicate case is similar to the meaning of the extracted Case Z, which explains why the entire sentence is handled like a single word. The extraction of Case Z, however, can be done for various expressions in the past tense and the negative tense, as well as for the polite expressions, however, the extraction of Case P cannot be done for polite expressions or for expressions in the past tense or negative tense. In FIG. 14 (e), the word "nage" is not inserted in the element -WD of MW6, but it is possible to insert this word, "nage," in MW6 and to prohibit its expression in MW5. FIG. 15 shows the data sentence DT-S for {Kyo gurando de bohru wo nage ta taro}

Prohibition of expression in the data sentence is expressed by entering "e" as the 4th digit of element BK, or in other words, by indicating it as e### (# shows that any numeral can be used). Therefore, "itsu" (when), "doko de" (where) and "nani" (what) are not described in the sentence {Taro ga nage ta} in which element BK is described as .BK/e### in order to prohibit the expression of the MW1 in which "Taro" is stored. In other words, no word is inserted in the element .WD of each MW to combined with Case T, Case S, and Case O. But it is possible to extract "toki" (time), "tokoro" (place) and "mono" (thing), as shown below.

{Taro ga nage ta toki}

{Taro ga nage ta tokoro}

{Taro ga nage ta mono}

These words are the ones which have been inserted in Case T, Case S, and Case O, with consideration of their meanings. We will therefore consider that these words were potentially inserted from the beginning, but were not expressed. When this is shown in the structural sentence, it will appear as seen in FIG. 16. In other words, the section shown by is considered as not being expressed. When the section identified by is expressed, the sentence will be as shown below.

{Hito ga toki tokoro de mono wo nage ta}

Here, the words used in the above sentence are those to be used to extract the cases. Therefore, when we convert these words into relative pronouns, for example, by changing "hito" (person) to "dareka" (who), "toki" (time) to "itsuka" (when), "tokoro" (place) to "dokoka" (where), and "mono" (thing) to "nanika" (what), then the sentence will be as shown below.

{Dareka ga itsuka dokoka de nanika wo nage ta}

That is, there is no word inserted in each MW to be combined with Case A, Case T, Case S, and Case O, in the {nage ta} sentence, so it is considered that nothing is expressed. However, we consider that the above-mentioned meaning is, in fact, potentially stipulated. When the words "Taro," "kyo," and "bohru" are expressed in a natural language, I consider that they can be clearly stipulated as "dareka" equals "Taro," "itsuka" equals "kyo," and "nanika" equals "bohru." When nothing is stored in the element -WD of each MW which is combined with these cases, it is NULL (in other words, it is "O"), but I consider that the above-mentioned meanings for "dareka," "itsuka," and "dokoka" are defined as default values. From here on, each word to be inserted in the element -WD of each MW which is combined with each of the cases, A, T, S, O, and P, will be expressed by attaching numerals to the symbol which shows the case as A1, T1, S1, O1, and P1.

The sentence,

{Genkina Taro ha kyo gurando de shiroi bohru wo nage ta} is considered to have been created by combining the following three sentences.

{Taro ha genki de aru} (ps-1)

{Taro ha kyo gurando de bohru we nage ta} (ps-2)

{Bohru ha shiroi} (ps-3)

Figure 17:
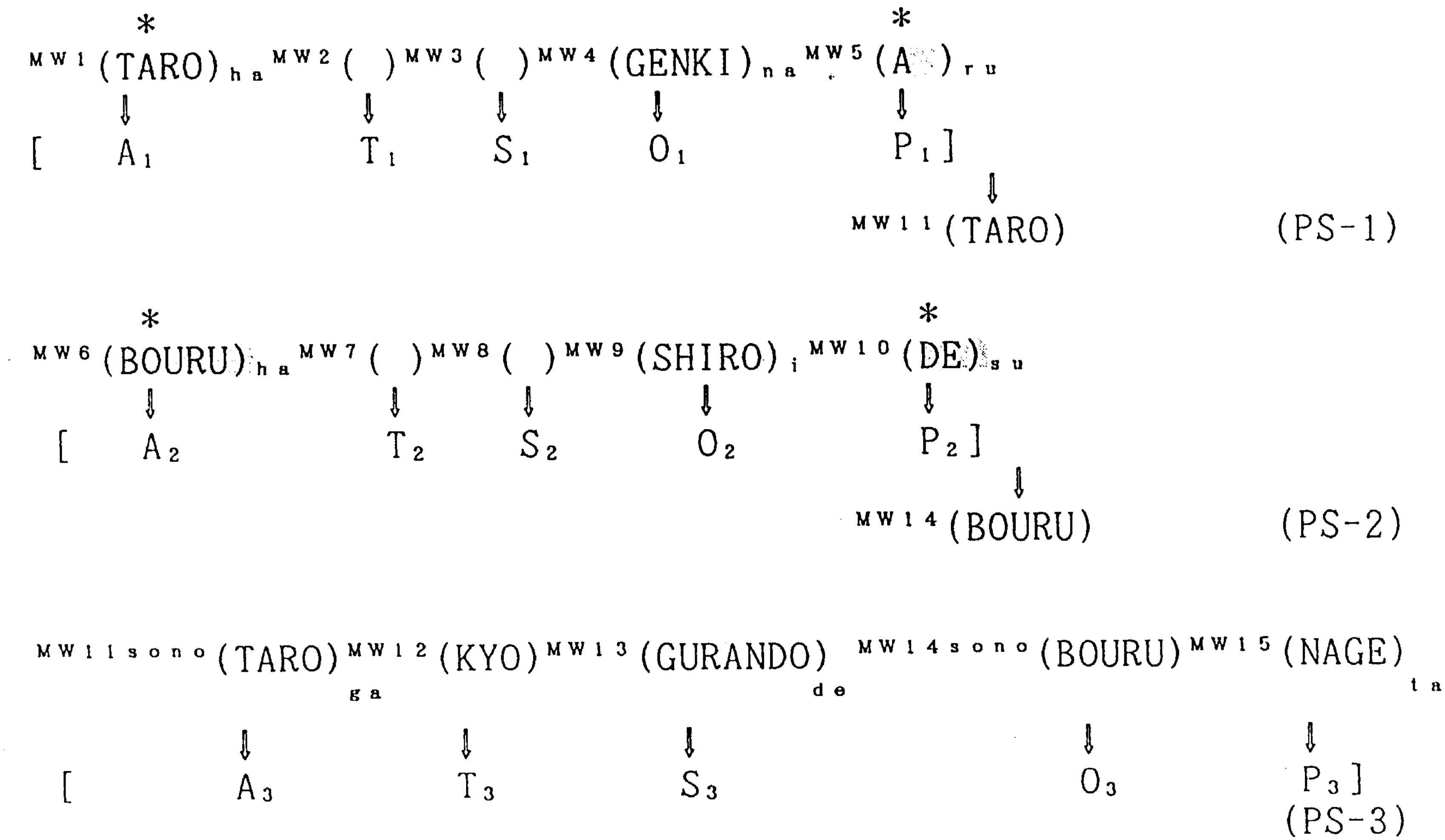

In other words, "Taro" is extracted from {Taro wa genki de aru}, and becomes {genkina Taro} as shown in (ps-1) in FIG. 17. In this case, the particle "de" of Case P will be changed to "na," and the expression of "aru" will be omitted. As shown in (ps-2), "bohru" is extracted from {bohru wa shiroi} and becomes {shiroi bohru}; "desu" is usually omitted.

Figure 18:
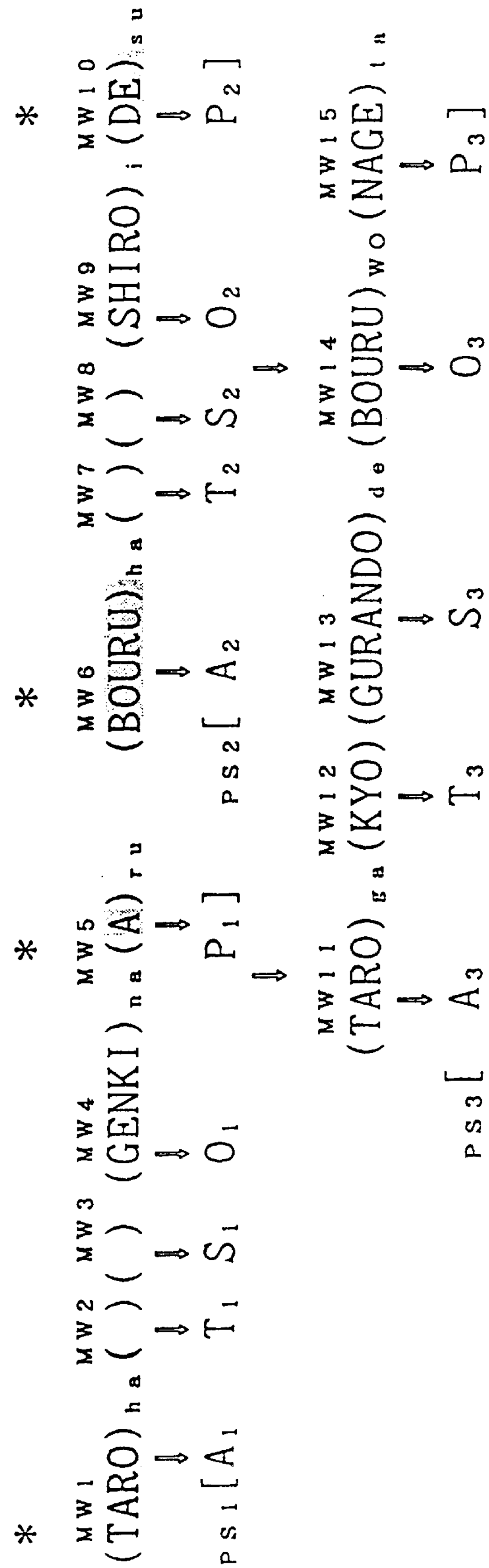

"Taro" and "bohru" in {Taro wa kyo gurando de bohru o nage ta} are replaced by the two above-mentioned phrases, "genki na Taro" and "shiroi bohru", and the sentences becomes {Genki na Taro ga kyo Gurando de shiroi bohru o nage ta}. When the sentence is shown as a structural sentence, it will be as seen in FIG. 18.

Figure 19:
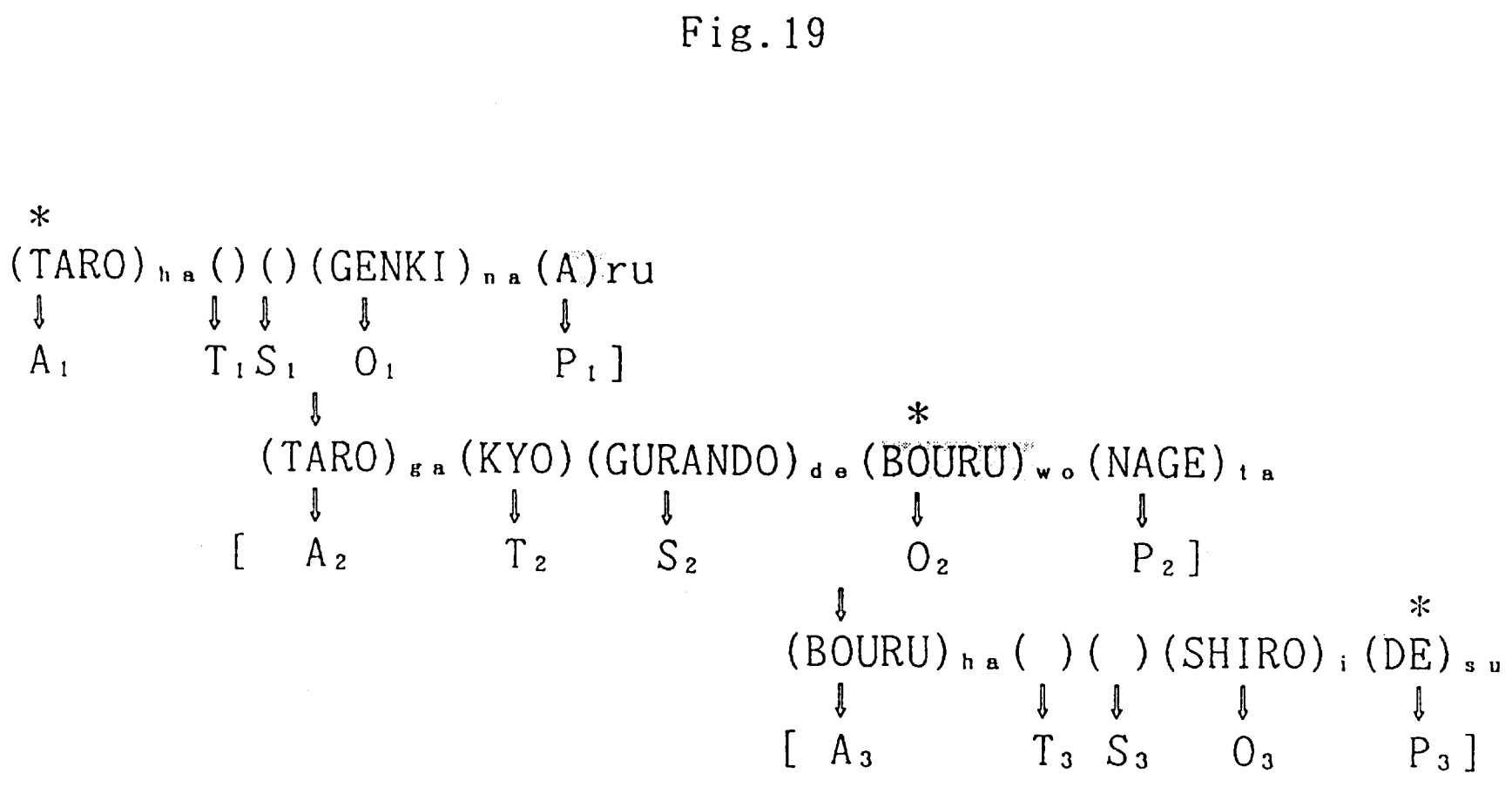

As shown in FIG. 19, "Taro" is extracted from {Taro wa genki de aru} and becomes {genki na Taro}. This is inserted in place of "Taro" in {Taro ga kyo gurando de bohru o nage ta}, then "bohru" is extracted from that sentences, which becomes {genki na taro ga kyo gurando de nage ta bohru}. Then this sentence is inserted in {bohru wa shiroi}, and becomes {genki na taro ga kyo gurando de nage ta bohru was shiroi}. As mentioned above, only one word is inserted into the structural sentence, but it can be extracted freely, and that extracted word can be inserted anywhere in the next sentence. The natural sentence is constituted in this way. The structural sentence is a universal language structure and can be used for any language. This structural sentence is applicable not only to Japanese but also to English, Chinese, and other languages. In other words, it is a common language structure applicable throughout the world. I am therefore constructing this language structure on a computer, and am using this structure to achieve translations, questioning/answering, knowledge acquisition, and reasoning.

Each of "nageru," "genki," and "shiroi" was handled as a single word in order to make it easy to understand the language structure, but, in fact, each of the words which expresses verb, adjective, and adjective verb, has its own proper meaning structure. Next, I will explain what kind of meaning structure each of these words possesses.

The natural sentence is constructed according to the previously explained process. A natural sentence, however, is ultimately a sentence which stipulates meaning. I'll explain here how the meaning is constructed in the natural sentence, using some examples.

Meaning is contained in the basic meaning unit, IMI. When some of these basic meaning units are put together, complex and subtle meanings can be constructed. First, I'll explain the basic meaning until, IMI. Let us consider the basic meaning units which are expressed by the following basic sentences, PS-E, PS-I, and PS-D.

PS-E corresponds to the natural sentence {-ga aru (there is-)} which expresses the existence. When this is expressed as a structural sentence, it will be as seen in FIG. 20 (*a*).

PS-I is the sentence which shows the state {-wa -de aru (-is)}, and its structural sentence is as shown in FIG. 20 (*b*). PS-D is the sentence which shows that a thing or object exerts a certain influence or produces a certain result on another thing or object. This is {-ga -o suru}. When this is shown as a structural sentence, it appears as in FIG. 20 (*c*). Previously, I mentioned that when nothing is stored in the element .WD of MW, "hito" (person), "mono" (thing or matter), "toki" (time), "dareka" (who), "nanika" (what) and "itsuka" (when) are stipulated as the default values. I have also already mentioned that A1, T1, S1, O1, and P1, are used as symbols, rather than using their content. When these symbols are used, PS-E will correspond to the following natural sentence.

{A1 ga jikan (time) T1 ni kukan (space) S1 de aru}

This sentence, PS-E, is customarily expressed by changing the word order, as shown below.

{Jikan T1 ni kukan S1 de A1 ga aru}

When the expressions in the above sentence are changed to other expressions, it will appear as shown below.

{tsuka (when) dokoka (where) ni nanika (what) ga aru}

When "ima" (now) is substituted for "itsuka," "koko" (here) is substituted for "dokoka," and "hon" (book) is substituted for "nanika," the sentence will be as shown below.

{Ima koko ni hon ga aru}. This sentence is shown by the structural sentence in FIG. 21 (*a*). As shown in FIG. 20 (*b*), PS-I will be, {A1 wa jikan T1 kukan S1 de O1 to iu jutai (condition) de aru}

When the conditions such that A1 is "Hanako," and O1 is "bijin" are assumed, PS-I will be as shown below.

{Hanako wa ima koko de bijin de aru}

When the above sentence is shown as a structural sentence, this will be as seen in FIG. 21 (*b*).

PS-D will be:

{A1 ga jikan T1 kukan S1 de O1 o suru}

When "Taro" is substituted for A1, and "sore" for O1, the sentence will be,

{Taro ga ima koko de sore o suru}

When the three basic sentences, PS-E, PS-I, and PS-D, are combined with each other, various meanings can be constructed. WIin the meaning of the sentence becomes complicated, however, the language structure gets more complicated, and becomes more difficult to understand. Therefore, I have made the language structure easier to understand by adopting a simplification method for the following case.

{Taro to Jiro ga bohru o nage ta}

Figure 22B:
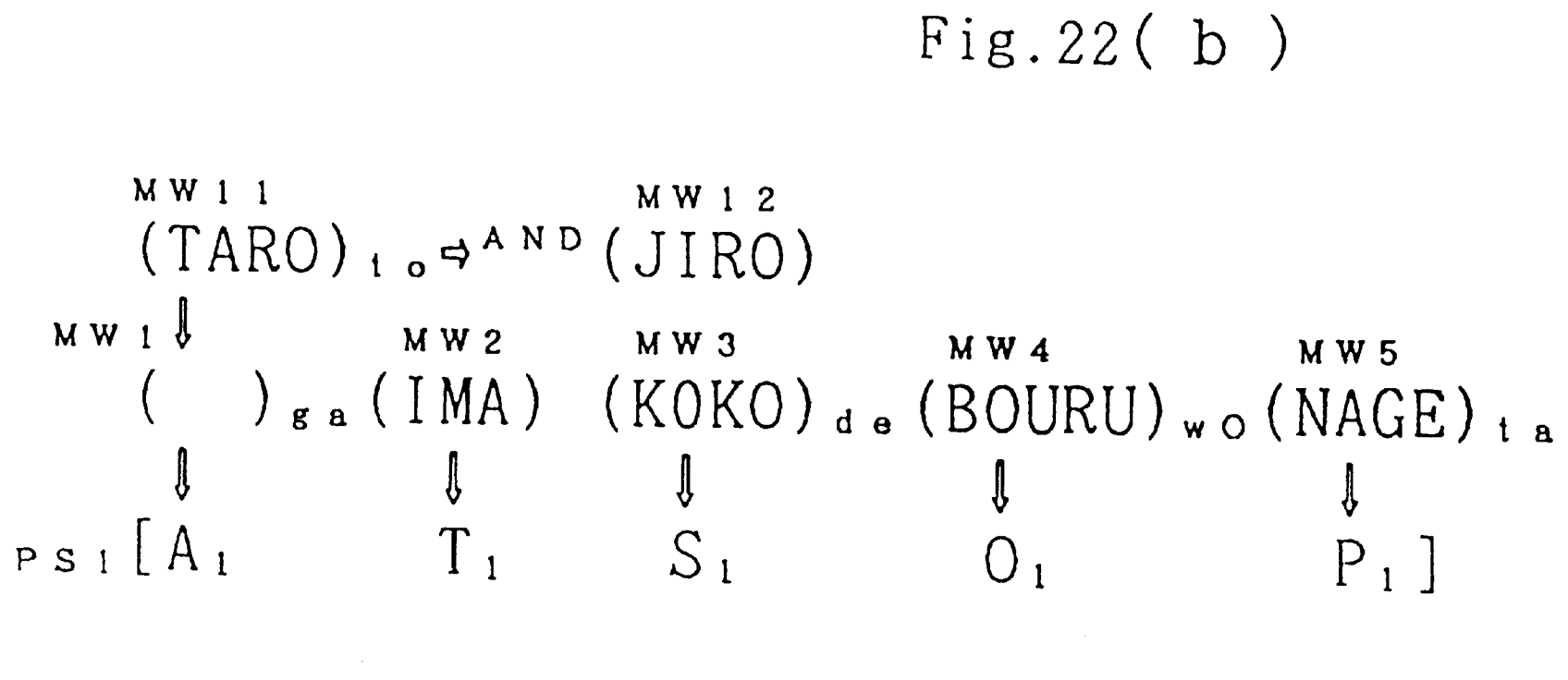

This sentence is considered to have the meanings, {Taro ga bohru o nage ta} and {Jiro mo bohru o nage ta}. When these are shown using structural sentences, they will be as shown in FIG. 22 (*a*).

"Soshite" is the "AND" logical relationship. The PS1, {Taro ga bohru o nage ta}, and the PS2, {Jiro ga bohru o nage ta} have a logical relationship which uses AND. Therefore, we set up MW11 below PS1 and MW12 below PS2, and combine these by the AND relationship, which is the language structure of the above-mentioned sentences. The logical relationship is shown using the arrow symbol, ▓. The variety of the logical relationship is shown above the ▓; in this case, it is AND, and the logic particle "soshite" is shown below the arrow. When PS1 and PS2 are compared, we see that they are completely the same except for the words stored in the element .WD of each MW which is combined with Case A. Therefore, the structural sentence will be described in simplified form as shown below. Insert "Taro" in MW11 and "Jiro" in MW12. These are combined above MW1 of Case A. (See FIG. 22 (*b*).) When the structural sentence is described in this way, the language structure can be written in simplified form, and can be understood by comparing (b) with (a). When the natural sentence is created from this structural sentence, using a method to be described later, it will be as shown below.

{Taro to Jiro ga bohru o nage ta}

In other words, the kind of sentence we generally use every day can be created form this structural sentence.

I have chosen to use this summarizing method for the relationships AND, OR, and THAN.

Figure 24A:
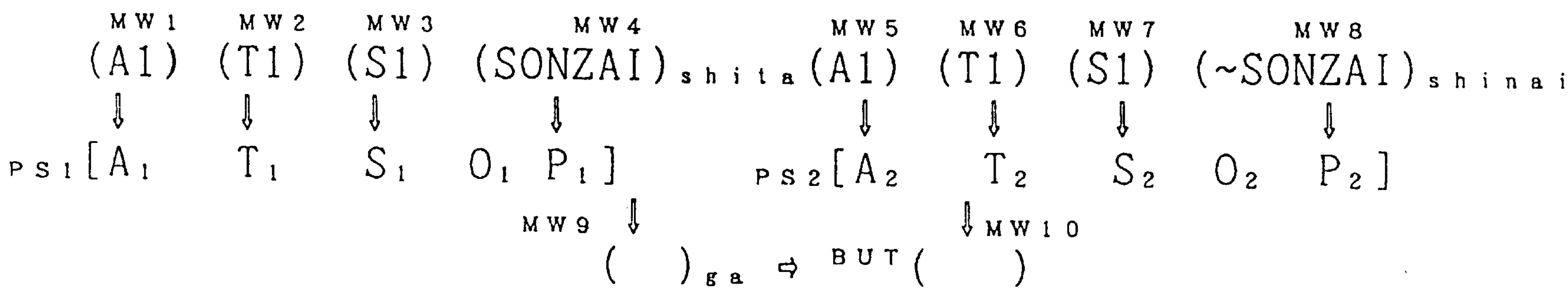
Figure 24B:
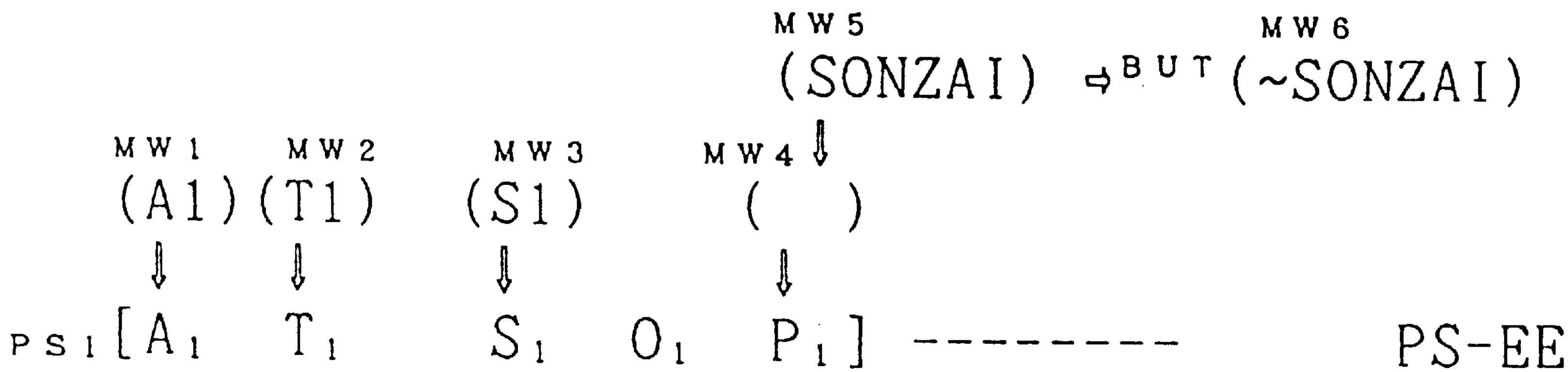

The three sentences, {A1 ga Sf no tokoro (place) ni aru}, {A1 ga Sh no tokoro ni aru}, and {A1 ga St no tokoro ni aru}, show that A1 was in Sf first, then existed in SH, and finally existed in ST. In other words, these sentences express the fact that A1 has moved from Sf through Sh to St. When the above sentences are described using structural sentences, these will be as shown in FIG. 23 (*a*). These sentences are completely the same except for each of the MWs which is combined with Case S. Therefore, when we describe the structural sentence as shown in FIG. 23 (*b*), the language structure becomes simple and can be easily understood. "Soshite" (then) shows the relationship between the change of the phenomenon involved and elapsed time; therefore, "soshite" is considered to be a kind of implied meaning of the logical relationship. The variety of this logical relationship is defined as THEN, and the particle is entered below the arrow ▓ symbol. This is determined as PS-SS. The meaning concept that a pre-existing thing is no longer existent, or that a thing which was previously nonexistent now exists, often appears in natural language. When this is shown using a structural sentence, it will be as shown in FIG. 24 (*a*). Denial of (sonzai (existence)) is shown by (-hitei (denial)). This will be described by adopting the summarizing method shown in FIG. 24 (*b*), and will be called PS-EE.

When Case O of PS-I is changed, it can express a change in the situation (condition).

When the sentence {A1 ga O1 de aru} sorekara (and) {A1 ga O2 de aru} is shown using a structural sentence, it will be as shown in FIG. 25 (*a*), and will be expressed by the simple structure shown in FIG. 25 (*b*). This is called PS-OO.

When the above-mentioned structural sentences and basic sentences, PS-E, PS-I, and PS-D, are combined, various meaning structures can be created. When PS-E is inserted in Case O of PS-D, this will have the structure shown in FIG. 26. When this structure is aligned according to its original order, it will be as shown below.

[(A2) ga (T2) (S2) de ([(A1) ga (T1) (S1) ni - (a)ru] jotai) ni (su)ru)]

When the above structural sentence is converted to a natural sentence, it will be as shown below.

{A2 ga jikan T2 kukan S2 de {A1 ga jikan T1 kukan S1 ni aru} jotai ni suru}.

When "A2" is changed to "Taro", "jikan T2" to "ima" (now), "kukan S2" to "koko" (here), "A1" to "hon" (book), and "kukan S1" to "tsukue" (desk), then the above sentence will be as shown below.

{Taro ga ima koko de {hon ga tsukue ni aru} jotai ni suru}. This structural sentence is as shown in (b).

When the word "oku" is substituted for - ni aru jotai ni suru", and "ga" of "hon ga" is changed to "o", then the above-mentioned natural sentence becomes the sentence shown below.

{Taro ha ima koko de hon wo tsukue ni oku}

From this sentence, in the structural sentence shown in (b), substitute "oku" for "suru" in Case $P_2$, change the particle "ya" in case $A_1$ to "o," and prohibit the expression of (a)ru and "jotai" in Case $P_1$, because these words are contained in the expression "oku." This will then give the structural sentence shown in (c), and the natural sentence shown above can be created from the structural sentence in (c).

When the word to be inserted in Case S can be a conceptual space, and not necessarily a physical space, and when "Taro" is inserted in Case S1, the meaning concept "Taro" will be "Taro no tokoro." When "no tokoro" is stored as a particle in Case S1, the structural sentence becomes as shown in FIG. 27. When PS1 is inserted on the upper level in Case $O_2$ of PS2 on the lower level, the --> mark is removed, and the MWs are lined up as they are, the sentence will be as shown below.

[(Taro) ga (ima) (koko) de ([(hon) ga - (Taro) no tokoro - (a)ru] jotai) ni (su) ru]

When [ ] and ( ) are removed, and the scope of Ps is bound by { }, the sentence will be as shown below.

{Taro ga ima koko de {hon ga Taro no tokoro ni aru} jotai ni suru}

The same word, Taro appears twice in the above sentence. Therefore, when the expressing of "Taro" in "Taro no tokoro" is prohibited, the word "motsu" is substituted for "-no tokoro ni aru jotai ni suru}", and the "pa" of "hon ga" is changed to "o," the structural sentence will be as shown in (b). Also, the expression of (a)ru in Case $P_1$ is prohibited. When a natural sentence is created from this structural sentence, it will be as shown below.

{Taro ga ima koko de hon wo motsu}

When the individual words on the structural sentence (b) are changed to symbols, the structural sentence will be as shown in (c). When we create a natural sentence from the structural sentence shown in (c), it will be {A2 ga jikan T2 kukan S2 de A1 wo motsu}. This is the same as {A2 ga {A1 o A2 jishin no tokoro ni aru} yo ni suru}. A2 appears twice in this sentence, and therefore the expression of Case S1 is prohibited, as shown in (c). The prohibition of expression is indicated by the symbol "*". In other words, I have made it a definition that {A2 ga - o A2 jishin no tokoro ni sonzai suru yo ni suru} expresses the meaning concept {A2 ga - o motsu}.

I have also formed the definition that A1 can be an idea or a concept instead of an object. In this case. ideas and concepts constitute a special content, and therefore it is necessary to stipulate or to indicate clearly that the word to be inserted is an ideal or concept. In order to make this stipulation, I have established element .CNC in MW. The symbol for the idea or concept is stored in this CNC, and is expressed using the symbol CNC/"kangae, gainen". Before inserting a word in the element .WD of the MW which has this designation, evaluate whether that word matches the content of the CNC. After it has passed the evaluation, that word is inserted into element .WD. This operation must be performed. Next, I considered the following sentence.

{A2 ga {A1 to iu kangae o A2 jishin ni sonzai suru} to iu jotai ni suru}

Figure 28B:
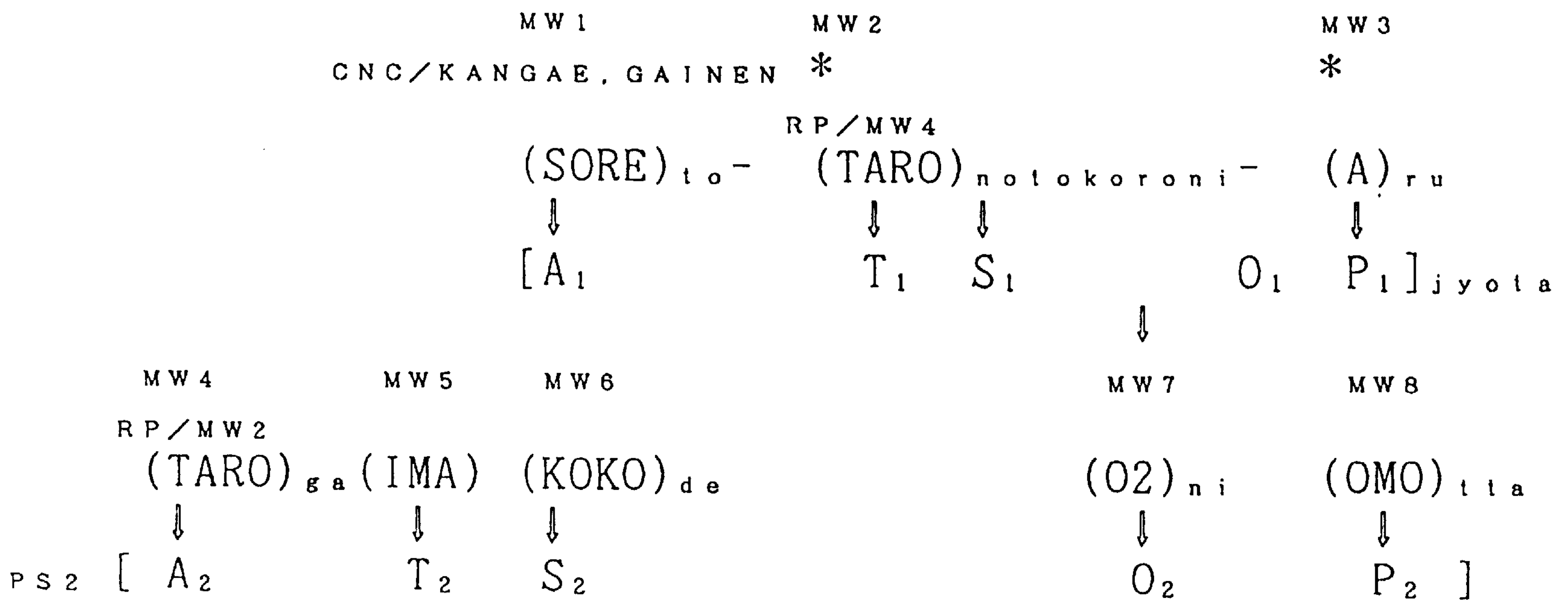
Figure 28C:
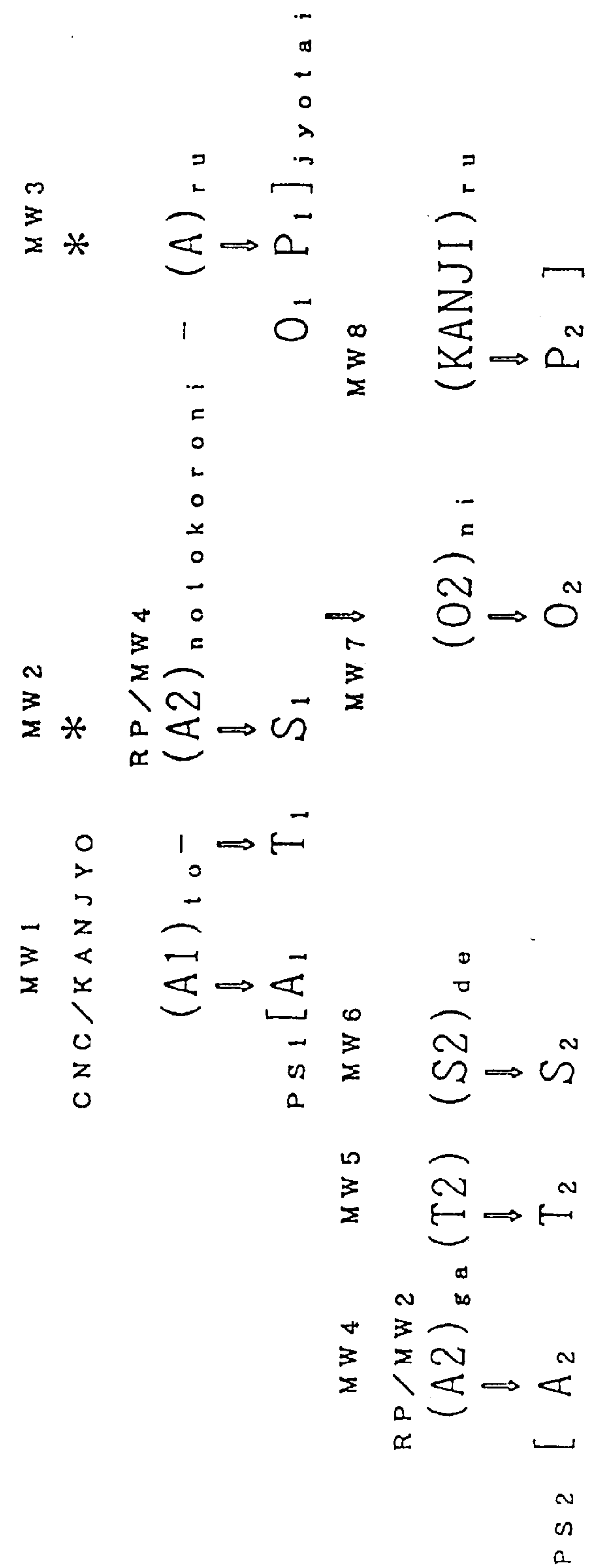

I have previously shown that {A2 ga - o A2 jishin ni sonzai suru to iu jotai ni suru} means {A2 ga - o motsu}. When "omou" is substituted, this becomes {A2 ga - o omou}. FIG. 28 shows this sentence using a structural sentence. As clearly shown in this structural sentence, {- o omou} is {- to iu kangae ga aru yo ni suru}, and becomes {- to iu kangae o motsu}. This is the meaning structure of the above-mentioned structural sentence.

The structural sentence, {Taro wa ima koko de sore to omotta} will be as shown in (b). From the word "omotta," we can assume that "sore" is a concept. Usually, the content which shows a concept such as {Hanako ga bijin de aru} is contained in "sore," and therefore the sentence will be {Taro wa ima koko de Hanako ga bijin de aru to omotta}. When "omou" is the word inserted in Case A1, Case A1 becomes "kangae, gainen," or, in other words, CNC/kangae, gainen. When this CNC/kangae, gainen becomes CNC/kanjo, the word will be "kanjiru," as shown in (c). "Omou" and "kanjiru" are completely the same except for CNC. In other words, {A2 ga {A2 jishin no naka ni A1 to iu kanjo ga sonzai suru} to iu jotai ni suru} becomes {A2 ga A1 o kanjiru}.

Figure 29B:
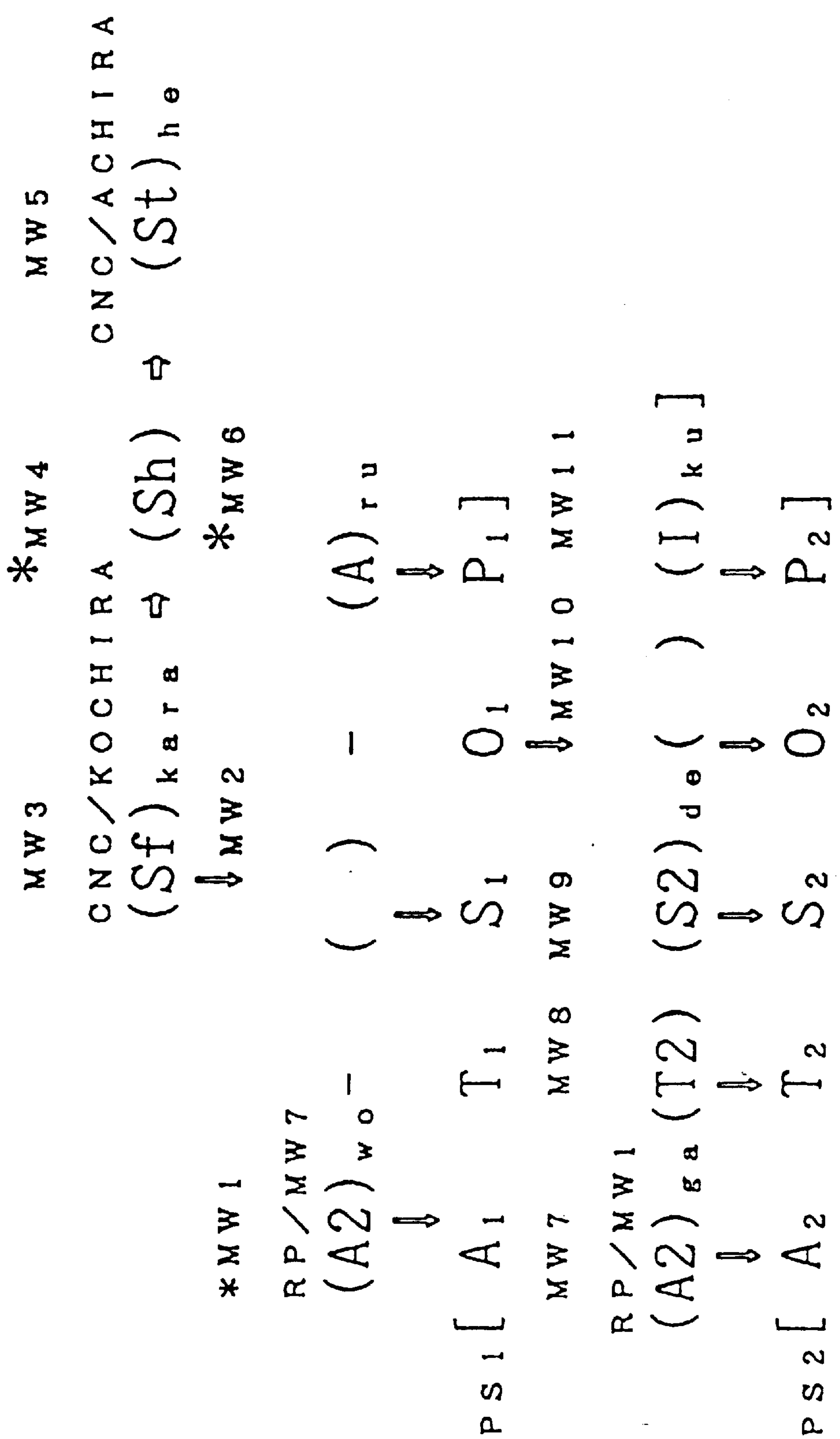

When we rigidly stipulate the difference between "suru" and "naru," we consider that "suru" (do) involves an action performed because of the will of A2, to invite such a situation, and "naru" is considered to mean that such a situation has occurred due to some force other than that of A2, even though it was not at the volition of A2. When the above definition is applied to the sample sentence above, linaru" can be used instead of "suru." I have previously explained PS-SS as the basic sentence which expresses the situation of an object which moves from (Sf) through (Sh) to (St). When PS-SS and PS-D are combined, the following meaning can be stipulated. FIG. 29 shows the structural sentence.

Previously, the space in the PS on the lower level, into which PS was to be inserted form the upper level, was shown by leaving an empty space, to make the order of the MWs clear when these were inserted into the PS (in other words, to show clearly the word order used when making the natural sentence). I think this case is mostly understandable by the explanations given so far, and therefore, from now on, I will show the PSs in vertical alignment, as seen in FIG. 29. When the structural sentence is translated into a natural sentence, and either no word is inserted in MW, or no MW is combined with the case, the word is not expressed in the natural sentence in either case; but when no word is inserted in the MW, and when no MW is combined with the case, the meanings these show are completely different. When the MW is combined with the case, and no word is inserted into the element .WD of that MW, some abstract content such as "hito" (person), "mono" (thing or matter), "toki" (time), or "tokoro" (place) is stipulate as the default value, as previously mentioned. When no MW is combined with the case, this shows that the content stipulated by the case is not in the meaning construct of the structural sentence.

There is no MW in Case $T_1$ of the PS1 in FIG. 29 because the content regarding time is not incorporated into PS1.

When MWs are aligned according to the structure of the structural sentence shown in FIG. 29, these will be as shown below.

[(A2) ga (T2) (S2) de ([(A1) o - ((Sf) kara (Sh) wo toshite (St) e (a)ru] jotai) ni (su)ru]

When the ( ) and [ ] are removed from the above sentence, and PS is shown using { }, the sentence will be as shown below.

{A2 ga jikan T2 kukan S2 de {A1 ga Sf kara Sh o toshite St ni aru} jotai ni suru}

PS1 shows that the situation of A1 was initially in Sf, then it passed through Sh and finally existed in St, and it also shows that the action was done by A2 in time T2 and space S2 in the situation shown above. "Hakobu" (carry) is stored in element .WD of the MW in Case P2. This means the allotting of a label or symbol expressed by the letter line KNJ of "hakobu" in the meaning structure shown in FIG. 29 (*a*). When the A in Case $A_1$ is A2, or in other words, the $A_1$ which is to be carrier, is actually $A_2$ itself, who carries the starting point Sf is "kochira" (here), which is the closest place, and the goal St is "Achira" (there). That is, when the action of moving oneself from the closest place to a distant place is defined as "yuku" (go), the structural sentence will be as shown in FIG. 29 (*b*). In order to stipulate Sf as "kochira" and St as "achira," CNC/kochira and CNC/achira are inserted into the structural sentence. If CNC/achira is inserted in Sf and CNC/kochira is inserted in St, meaning to move from far away to the closest place, it will therefore mean "kuru (come). When this is shown as a structural sentence, it will be as seen in FIG. 29 (*c*). The same word is inserted in each of the MWs of Case $A_1$ and Case $A_2$, and therefore, the expression of one of these must be prohibited. Basically, the one in the upper level has a less-important meaning, and therefore, I usually prohibit the expression of the MW on the upper level. The expression of MW in Case $A_1$ was prohibited for this reason. In the structural sentence, this is shown by the symbol *. When a word is inserted in MW of Case $A_2$, we must also insert the same word in MW of Case $A_1$. Therefore, in order to insert a word in MW7, we must set up element .RP, which stores the number of the partner MW, which in this example is MW7, in MW1 of Case A1. (See FIG. 29 (*b*).) After this process is finished, when there is a word inserted in MW7 of Case $A_2$, extract that word from MW7, and copy this word. Then you can store the word in MW1. This is the same as the word in MW7.

Figure 30:
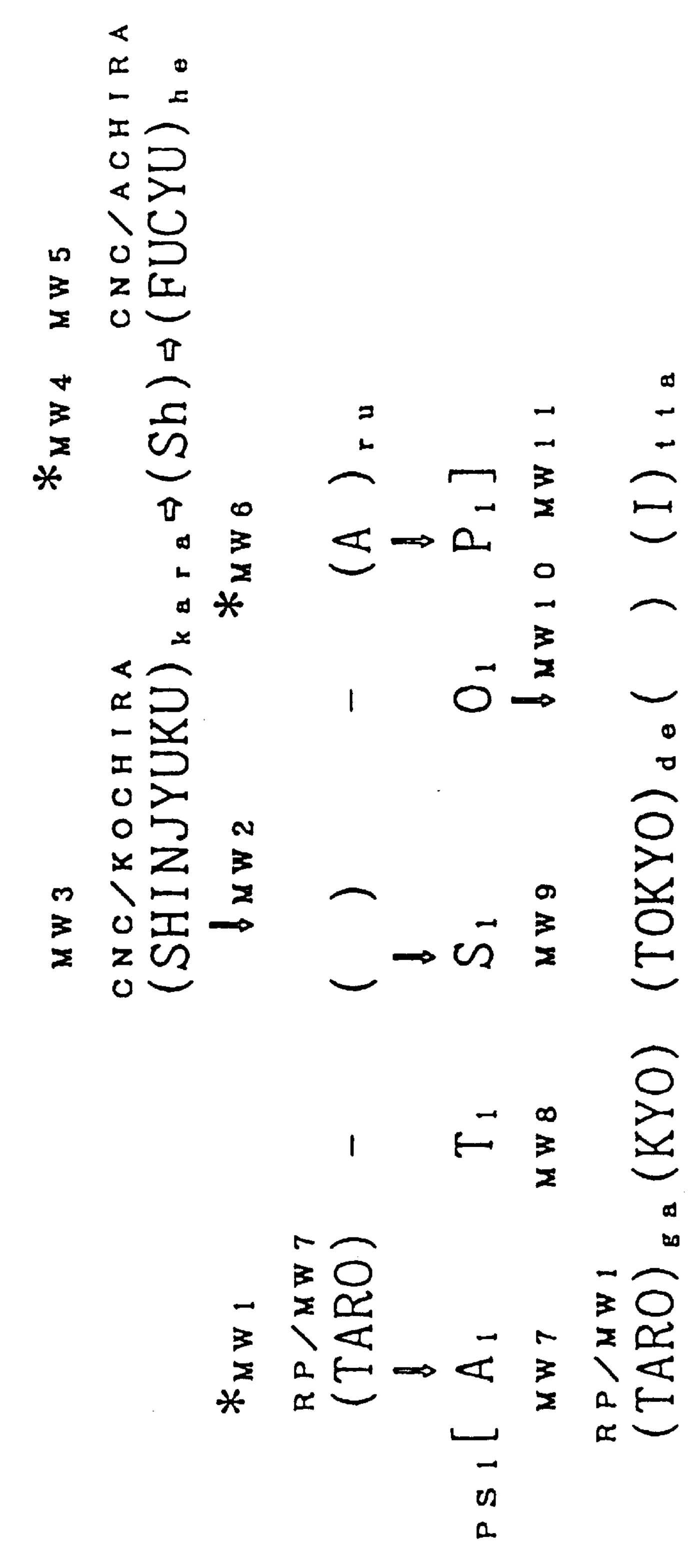

For instance, when the following s entence is shown by a structural sentence, it will be as shown in FIG. 30.

{Taro ga kyo Tokyo de Shinjuku kara Fuchu e itta}

The following shows the meaning of the structural sentence in FIG. 30. T he person who m oved from Shinjuku to Fuchu is Taro, and Taro made himself do this. Also, the time when T aro did t his is "kyo" (today), and the s ite where the action took place is "Tojkyo." Shinjuku is considered t o be closest t o Taro, and Fuchu is a place f ar away from Taro.

In FIG. 30, the word "n Taro," whi ch is inserted in the element WD of MW1, will not be insert ed i n the meaning analysis which will be described later. Element BP indicates that the word inserted in MW7 is to be copied, and therefore, the word in Element .WD of MW1 is inserted according to this indication.

Figure 31:
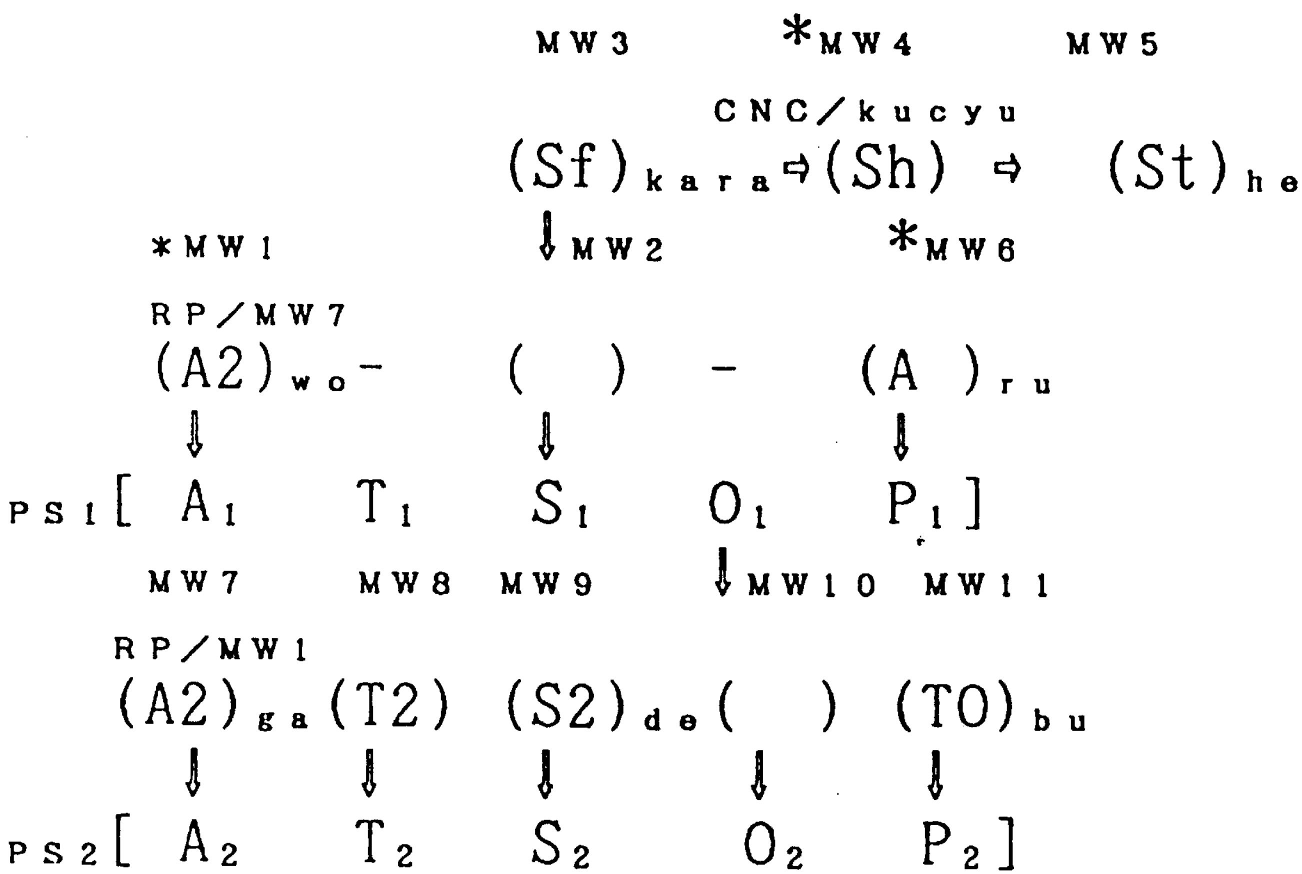

When an object moves from the starting point, Sf, to the goal, ST, and its passing point is in the air, the structural point will be as shown in FIG. 31. I entered CNC/kuuchu (in the air) to show that the passing point is in the air. The word "tobu" (fly) is stored in element .WD of MW11 of Case $P_2$ and this means that the word "tobu" was allotted as a label to the meaning structure shown by this structural sentence.

Figure 32:
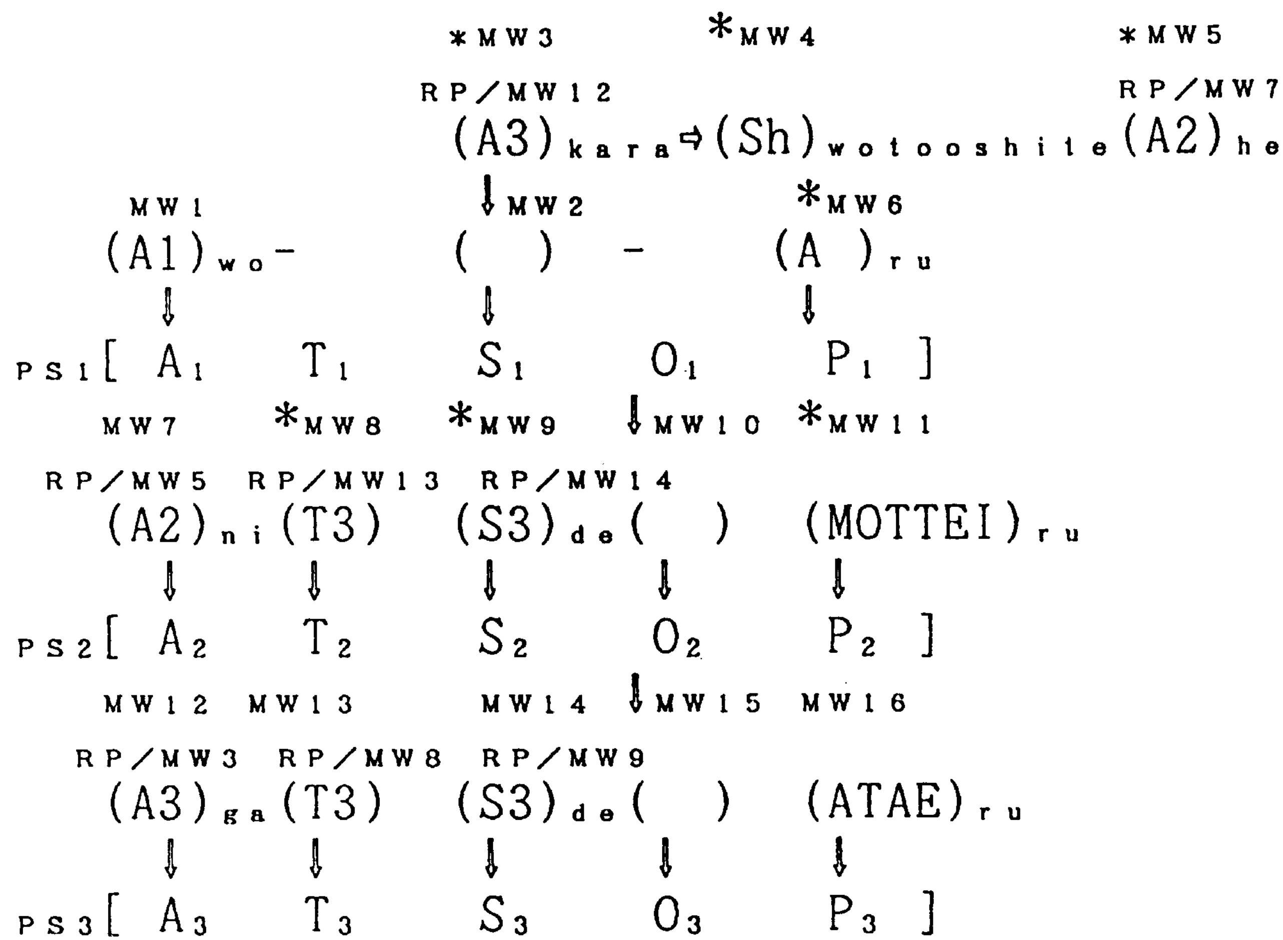

The meaning structure "ataeru" (give) is defined as shown in FIG. 32. When the meaning of the sentence {Taro ga kyo gakko de Hanako ni hon o ataeru} is analyzed, it will give the structural sentence shown in FIG. 33, as will be described later. I will explain the meaning structure of "ataeru" using this structural sentence. First, PS1 on the highest level shows that "hon" was initially in the place of "Taro" and that it passed through the passing point, Sf, and has finally moved to the place of "Hanako." Here, the passing point, Sh, has no function, but this passing point, SH has been defined according to the general concept of this patent. The PS2 under the highest level shows that "Hanako" is in a situation, "kyo" (today) at "gakko" (school). In other words, PS2 shows that Hanako is in a situation such that "hon" (book) is in the position of Hanako when the "hon" has moved. This is similar to the structural sentence shown in FIG. 27 which defined "motsu" (have). But "motsu" in FIG. 27 provides no description of the process through which "hon" has moved from "Taro" (intermediate point) (Hanako), and therefore, "motsu" in FIG. 27 has a meaning slightly different form "motsu" in FIG. 33. However, the essential part of the meaning, that "hon" is in the position of Hanako, is expressed in both structural sentences. Therefore, I have determined that this "motsu" can be stored in Case $P_2$ as "motte iru" (hold). PS3 on the lowest level defines that the action was done by Taro at time T3 (today) and in space S3 (school) to put Hanako in such a situation. I assumed that "ataeru" (give) is stored in the element .WD of the MW in Case $P_3$, to alot the word "ataeru" to the meaning structure which is expressed by this is entire structural sentence. When each MW is lined up according to the structure shown by the structural sentence in FIG. 32, it will be as shown below.

[(A3) ga (T3) (S3) de ([(A2) ni (T3) (S3) (A1) o - ((A3) kara (Sh) o toshite (A2) e) (a)ru]) (mottei)ru]) (atae)ru]

Here, it is determined that T3=T2, S3=S2, and the expression of T2 and S2 will be prohibited, for a reason to be described later.

The content "-(a)ru] (mottei)ru]"is contained in the word "ataeru." Therefore, this expressing is prohibited. When "Taro" is substituted for A3, "kyo" for T3 "Hanako" for A2, and "hon" for A1, the following sentence can be obtained from the structural sentence shown above.

[(Taro) ga (kyo) (gakko) de ([(Hanako) ni (kyo) (gakko) de ([(hon) o ((Taro) kara (Sh) o toshite (Hanako) e )])]) (atae ru]

When the ( ) and [ ] are removed from the above sentence, it will become as shown below.

{Taro ga kyo gakko de {Hanako ni kyo gakko de {hon o Taro kara Hanako e}} atae ru}

"Taro," "Hanako," "kyo," and "gakko" appear twice in the above sentence. Therefore, when we prohibit the expression of MW3, MW5, MW8, and MW9, which are MWs on the upper level, the sentence sill be as shown below:

{Taro ga kyo gakko de Hanako ni hon o atae ru}

Figure 33:
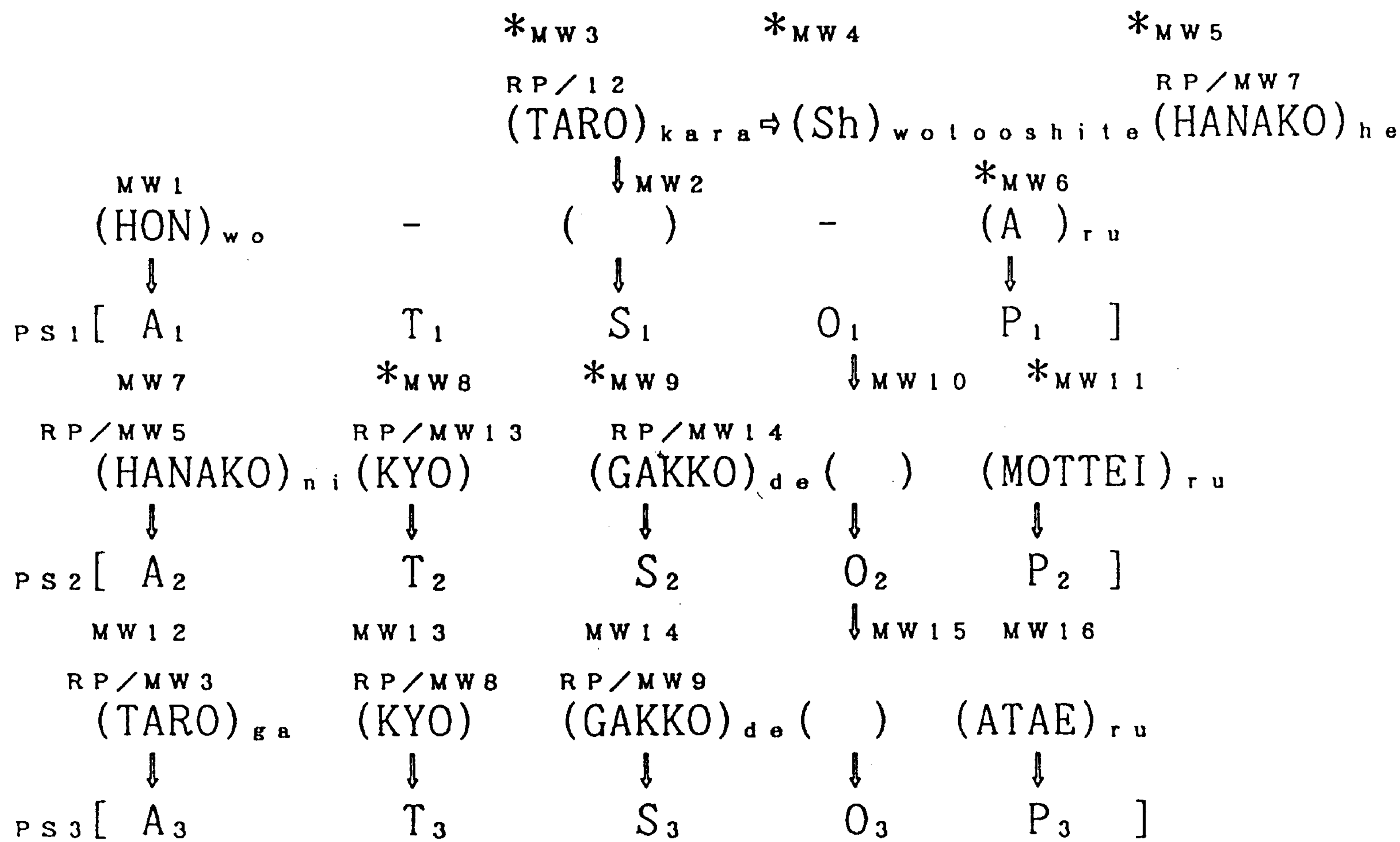
Figure 34:
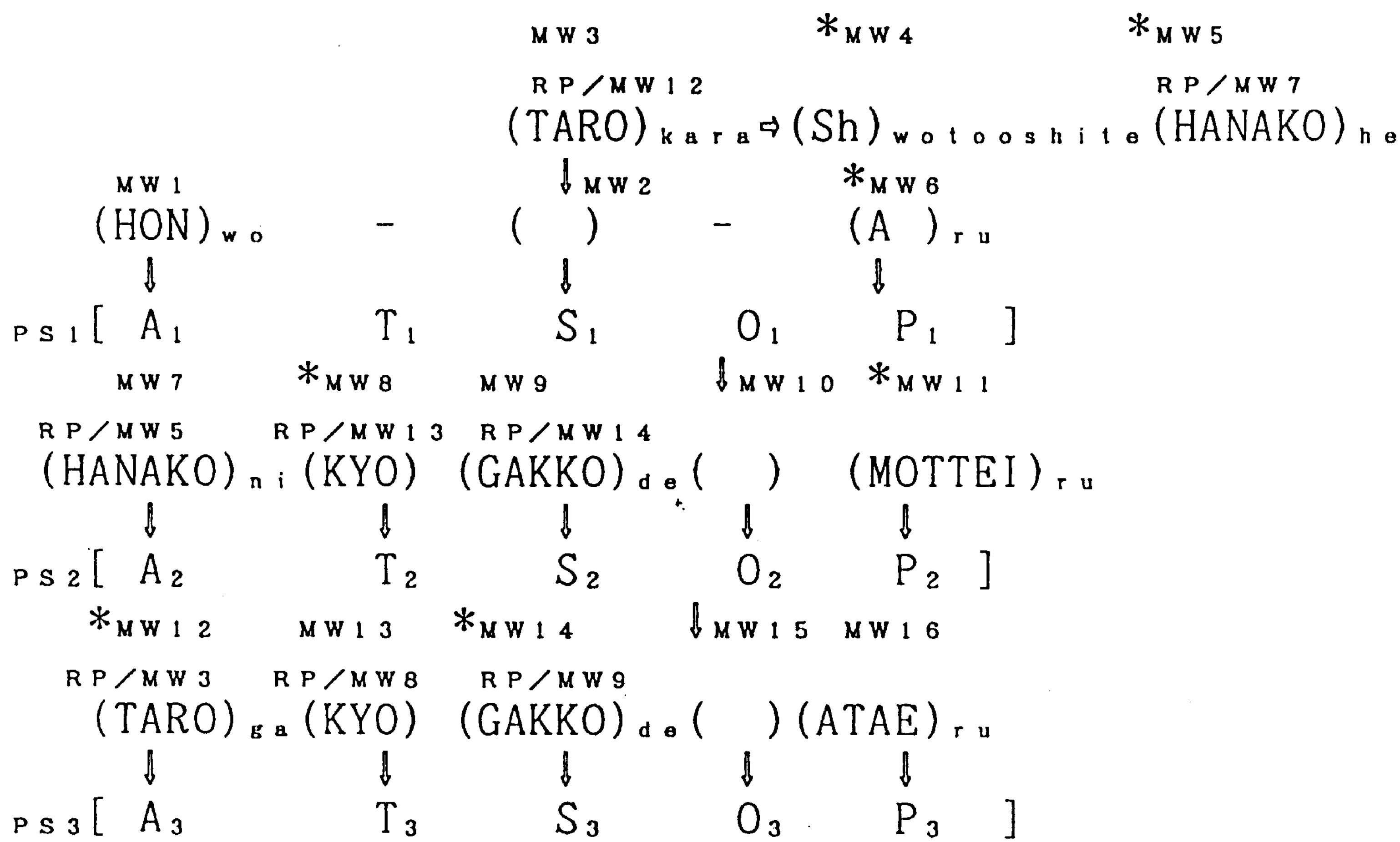

This sentence is shown by the structural sentence in FIG. 33. When we prohibit the expression of MW12 in which "Taro" is inserted, and instead, allow the expression of MW3, prohibit the expression of MW14 in which "gakko" is inserted, and allow the expression of MW9, the sentence will be as shown in FIG. 34. When a natural sentence is created from the structural sentence in FIG. 34 using the previously described method, it will be as shown below.

{Kyo Hanako ni gakko de hon o Taro kara atae ru}

As can be seen from the above results, the reason why the word order of the above sentence was changed is that the positions of the expression shown in MWs were changed. The positions of the individual words, such as "Taro" were not changed. Therefore, "Taro ga" has been changed to "Taro kara" because of the changes of the expressible MWs. One of the MWs in which the same word has been inserted, is stipulated, to make this expression possible, and the expression of the other MW(s) is prohibited. The MW which can be expressed, however, can sometimes be changed appropriately, as previously mentioned. Generally, during meaning analysis, a word cannot be directly inserted into an MW for which expression is prohibited. A word can be inserted in the MW for which expression was prohibited by copying the word which is inserted in the element .WD of the MW which can be expressed. The MW from which the word should be copied is shown by the element .RP, as previously mentioned. FIG. 32 and FIG. 33 both show RPs.

The expression of element .WD/"Taro" of MW3, element .WD/"Hanako" of MW5, "kyo" of MW8, and "gakko" of MW9, as shown in FIG. 33, is prohibited when meaning analysis is performed, and therefore these words cannot be in serted. These words were copied from the element .WDs of the MWs indicated by the element .RP.

Figure 35:
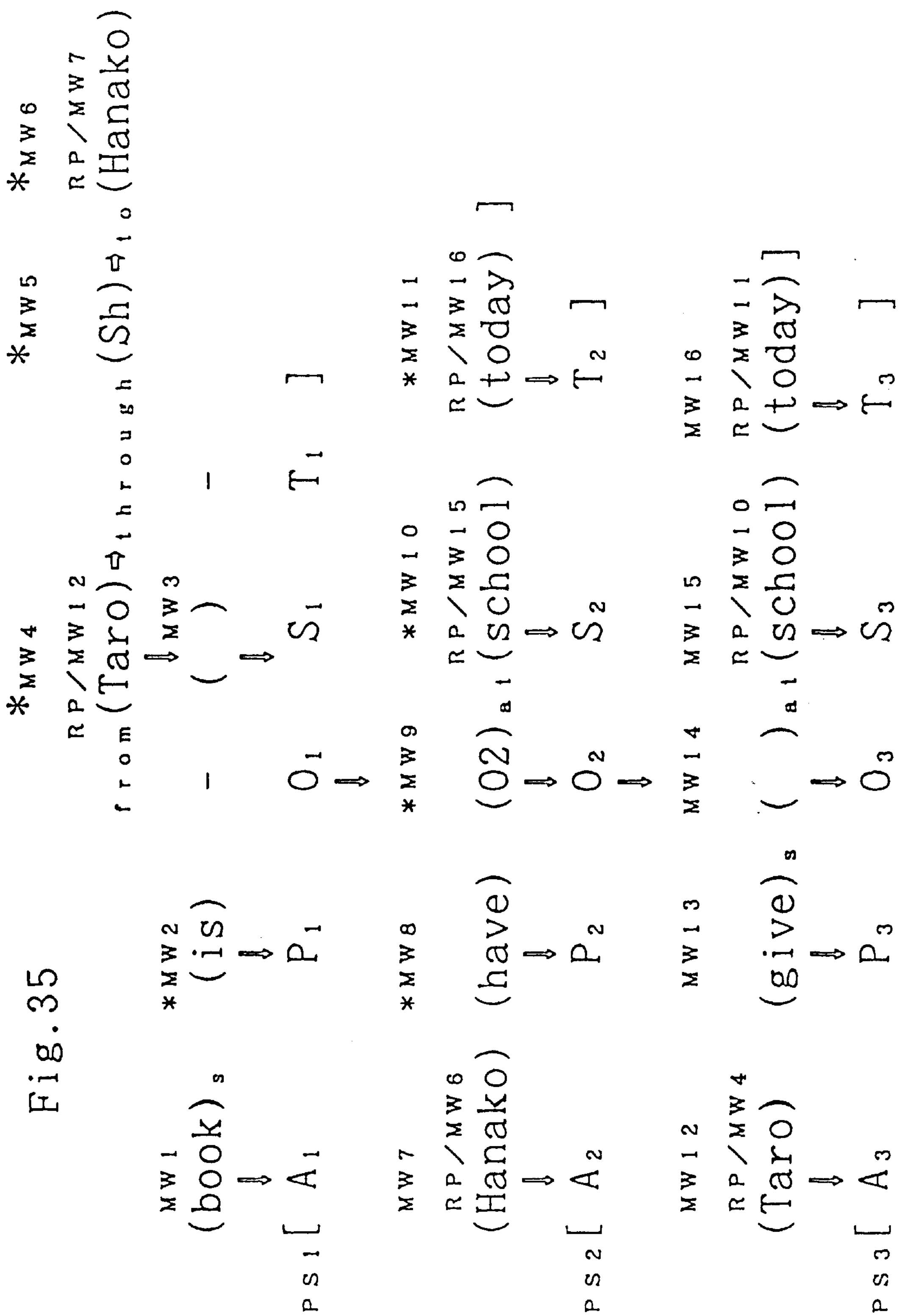

Here, the same words are inserted in T2 and T3 of Case T, and in S2 and S3 of Case S, but they do not necessarily have to be the same. Time T2 Space S2 spontaneously becomes the status "motte iru" (holding) and Time T3 and Space S3 creates the status "motte iru." Therefore, T2 and S2 are naturally different from T3 and S3. I do not consider, however, that people use the expression "motte iru" according to rigid stipulations of time and space relationships, and therefore the same words are inserted, as previously mentioned. As mentioned above, the same word is sometimes used many times in the structural sentence in order to clearly stipulate the meaning structure. However, when the natural sentence is expressed, a word can be used only once, and therefore the expression of other identical words has to be prohibited. When the MW which expresses the word is changed, as previously mentioned, the word order appears to be changed. This an also e said of sentences written in English. The order of the cases within PS, to create a natural sentence from a structural sentence, is ATSOP for Japanese, APOST for English, and ATSPO for Chinese. When converting the word order of the Japanese sentence shown in FIG. 32 to the English word order, APOST, it will be as shown in FIG. 35. Here, however, "from" is used as a substitute for the article "kara," "through" is used as the substitute for "o toushite," "to" is used as the substitute for "e," and "at" is used as the substitute for "de." In an English sentence, the particle (preposition) is placed before the word affected. Therefore, I have put the particle (preposition) ahead of the parentheses in FIG. 35. When the MWs are aligned according to the order shown by the structural sentence in FIG. 35, it will be as shown below.

[(A3) (P3) ([(A2) (P2) ([(A1) (P1) - (from (Sf) through (Sh) to (St))]) (S2) (T2)) (S3) (T3)]

When "give" is alloted for "ataeru," "Taro" for "Taro," "Hanako" for Hanako," "book" for "hon," "today" for "kyo," "school" for "gakko," "is" for "- de aru, "and "have" for "motte iru," in each of the element .WDs of these WDs, the result will be as shown below.

[(Taro) (give)s [(Hanako) (have) ([(book)s (is) - (from (Taro) through (Sh) to (Hanako))]) at (school) (today)) at (school) (today)]

When the ( ) and [ ] are removed from the above sentence, it will be as shown below. (I have also changed "books" to " book" and "gives" to "give".)

Taro gives Hanako have book$_s$ is $_{from}$ Taro $_{through}$ Sh $_{to}$ Hanako $_{at}$ school today $_{at}$ school today I consider that "have" and "is are both contained within the concept "give," a s I have explained in the case of the Japanese "ataeru, "and I have omitted both "is" and "have." Sh is also omitted. "School" and "today" appear twice in the sentence. Therefore, when "school" and "today" are omitted from S2 and T2 which are MWs on the upper level, the sentence will be as shown below.

Taro give$_s$ Hanako book$_{s\ from}$ Taro $_{to}$ Hanako $_{at}$ school today

"Taro" and "Hanako" also appear twice. Therefore, when we prohibit the expression of MW4 and MW6 on the upper level, the sentence will be as shown below.

Taro give$_s$ Hanako book$_{s\ at}$ school today

As in the case of the Japanese sentence, when the expre ssion of MW7 is prohibited and the expression of MW6 is made possible, the sentence will be as show n below. Taro gives books to Hanako at school today When similar processing is done for "Taro," the result will be as shown below gives books from Taro to Hanako at school today For an English sentence, the process of discriminating the variety of each case is done by word order, so that the Agent case (Case A) cannot be omitted. Therefore, the sentence shown above cannot be formed. If you wish to form the above sentence anyway, "from Taro" must be handled as the IF portion of IF-THEN, as shown below.

From Taro, he gives Hanako books at school today

When the expression of MW15 is prohibited and MW10 regarding "school" is allowed to be expressed, the word order of "today" and "school" appears to be switched, as shown below.

Taro gives Hanako books today at school.

As I previously explained regarding the Japanese sentence, the word order has not changed. Only the MWs to be expressed have been changed. In this patent, prepositions, the endings of plural words, and the conjugation of verbs in English are handled as kinds of particles. In an English sentence, the preposition is placed ahead of the ( ), and the conjugation of the verbs and the endings of plural words are shown after the ( ) to match the word order used in English.

In the meaning structure "ataeru" shown in FIG. 32, I have stipulated that the A1 which is to be moved is a concept. It was in the A3 position, then existed in the A2 position, and the word "oshieru" was allotted to give the structural sentence seen in FIG. 36.

Figure 36:
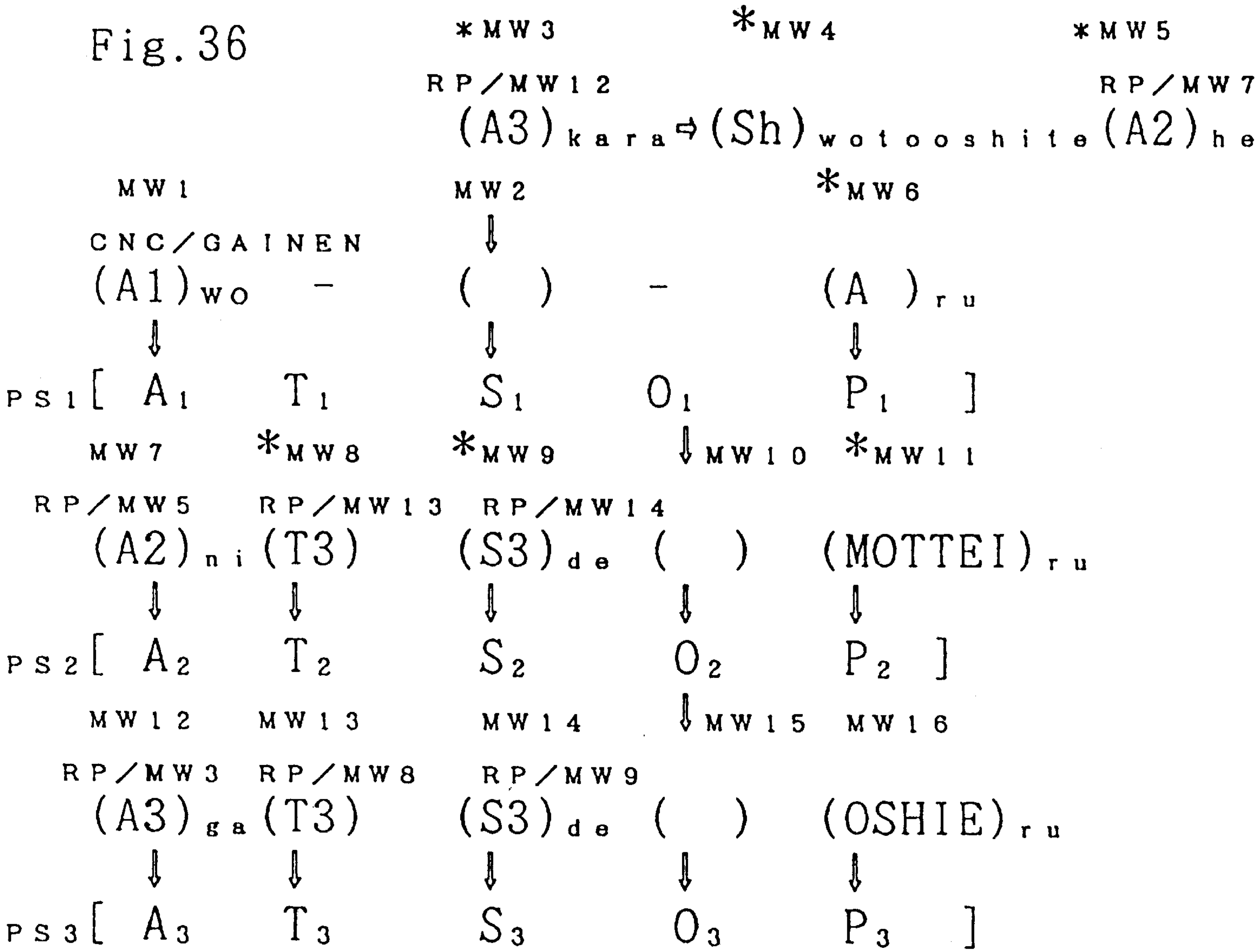
Figure 37:
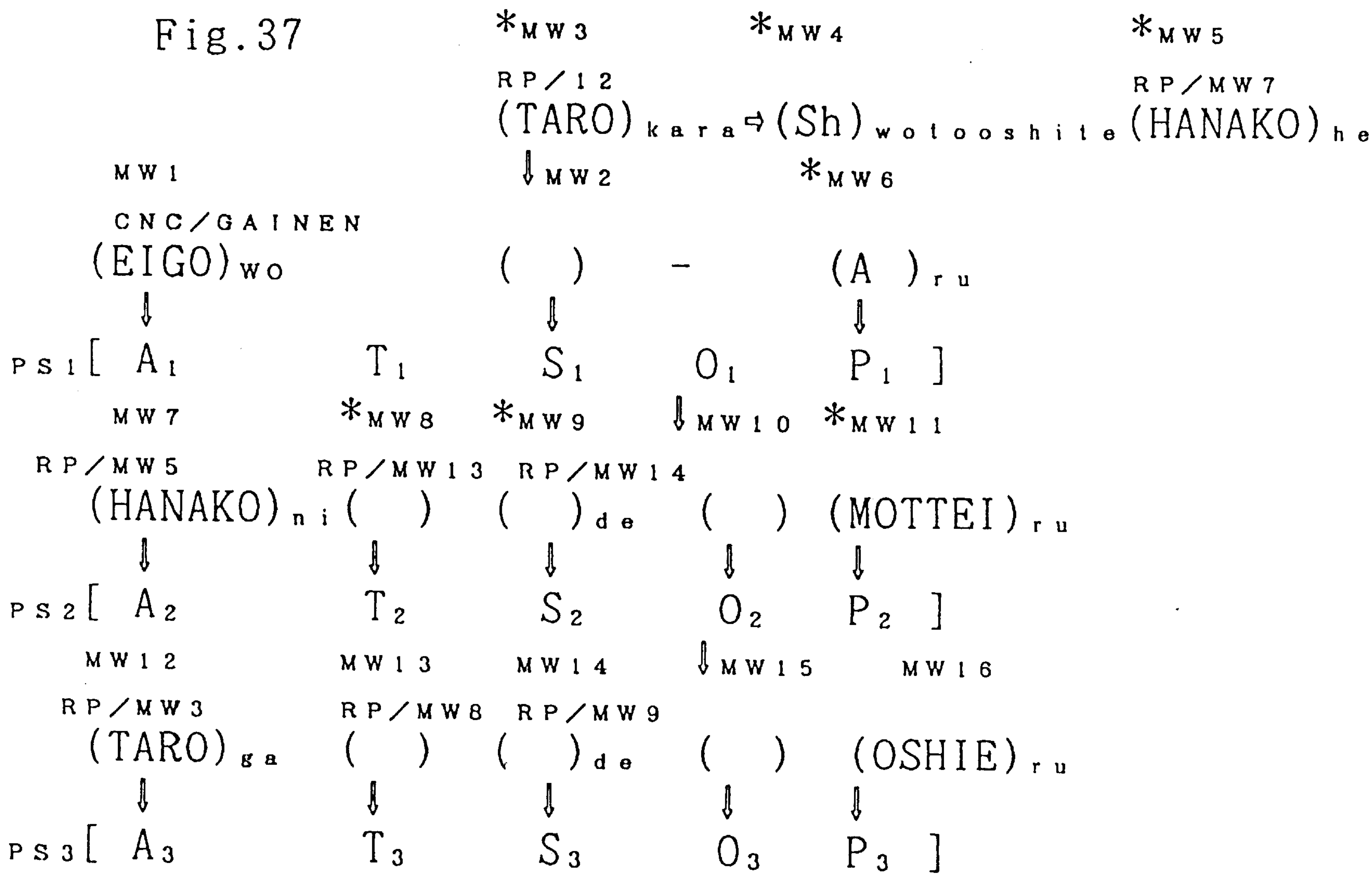

When the natural sentence {taro ga hanako ni eigo o oshieta} is inserted into the structural sentence in FIG. 36, it will be as seen in FIG. 37. When "eigo" (English) is interpreted in a broad sense, I consider that it falls into the category of a concept. Therefore, the meaning structure of the sentence will be that "eigo" was initially in the place of "Taro," and "Taro" created the situation which "Hanako" is in; that is, the situation in which "eigo" is in the place of "Hanako." When each word of the above sentence is lined up according to the state of the insertion of the MWs regarding the structural sentence in FIG. 36, it will be as shown below.

[(Taro) ga ( ) ( ) ([(Hanako) ni ( ) ( ) ([(eigo) o (Taro) kara (Sh) (Hanako) e) (a)ru]) (mottei)ru]) (oshie)ru]

When the expression of ( ) in which no word is inserted, as well as of (Sh), (a)ru, and (mottei)ru is prohibited, then the sentence will be as shown below.

{Taro ga Hanako ni eigo o oshieru}

This sentence has a meaning structure completely identical to the previously mentioned meaning structure of "ataeru." From these facts, the action which is stipulated as the concept of the action "ataeru" (give) will be "oshieru" (teach). In conventional English grammar. "Hanako" is the direct object and "eigo" is the indirect object, but in this grammar, A3 in Case A of PS (hereafter called ROOT PS) at the lowest level, is the Agent case, which is the same as in conventional grammar. However, what is called the direct object is A2 in Case A of the PS on the level above the ROOT PS, and what is called the indirect object will be A1 in Case A of the PS on the second level above ROOT PS.

Figure 38:
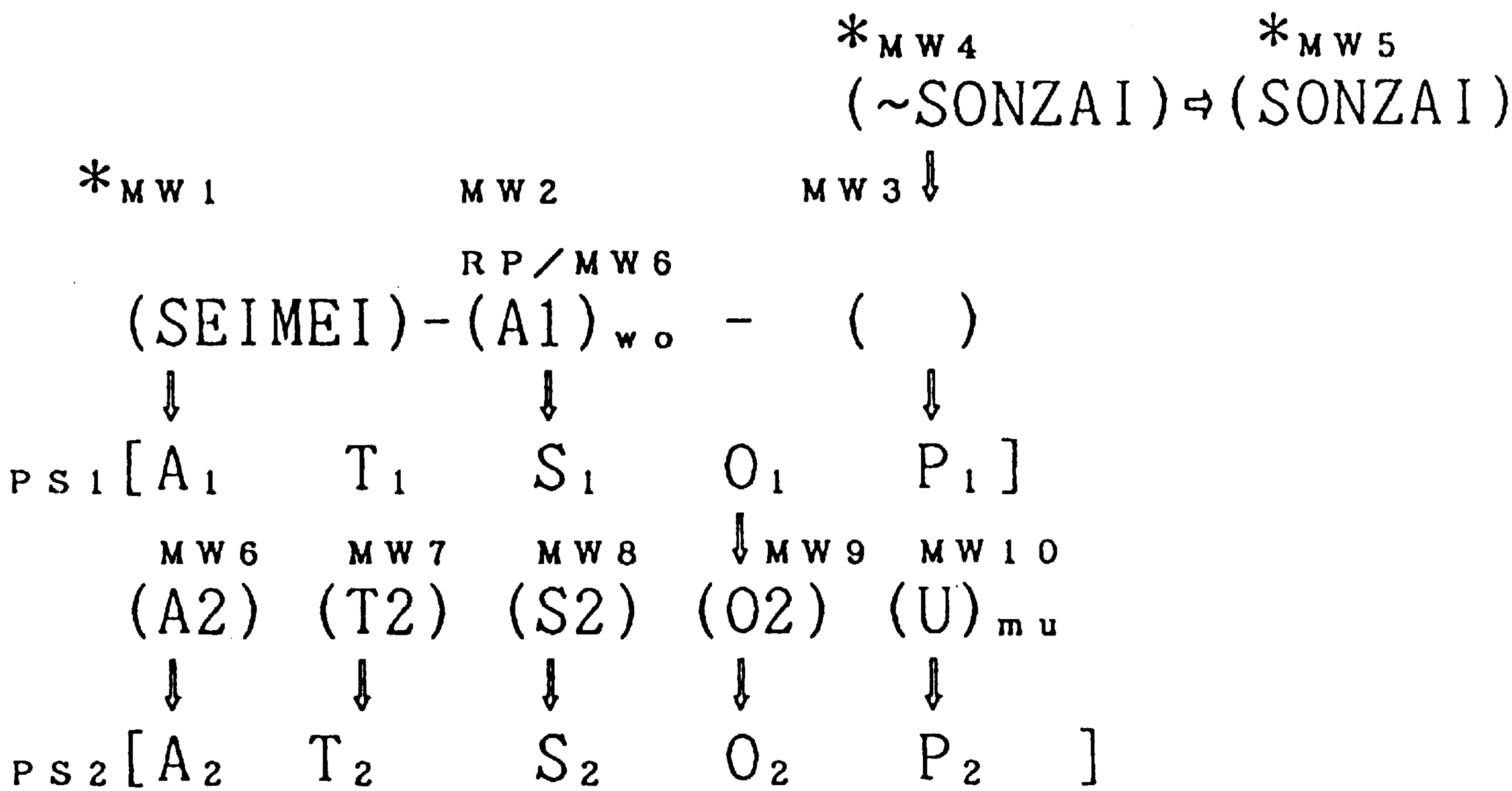
Figure 39:
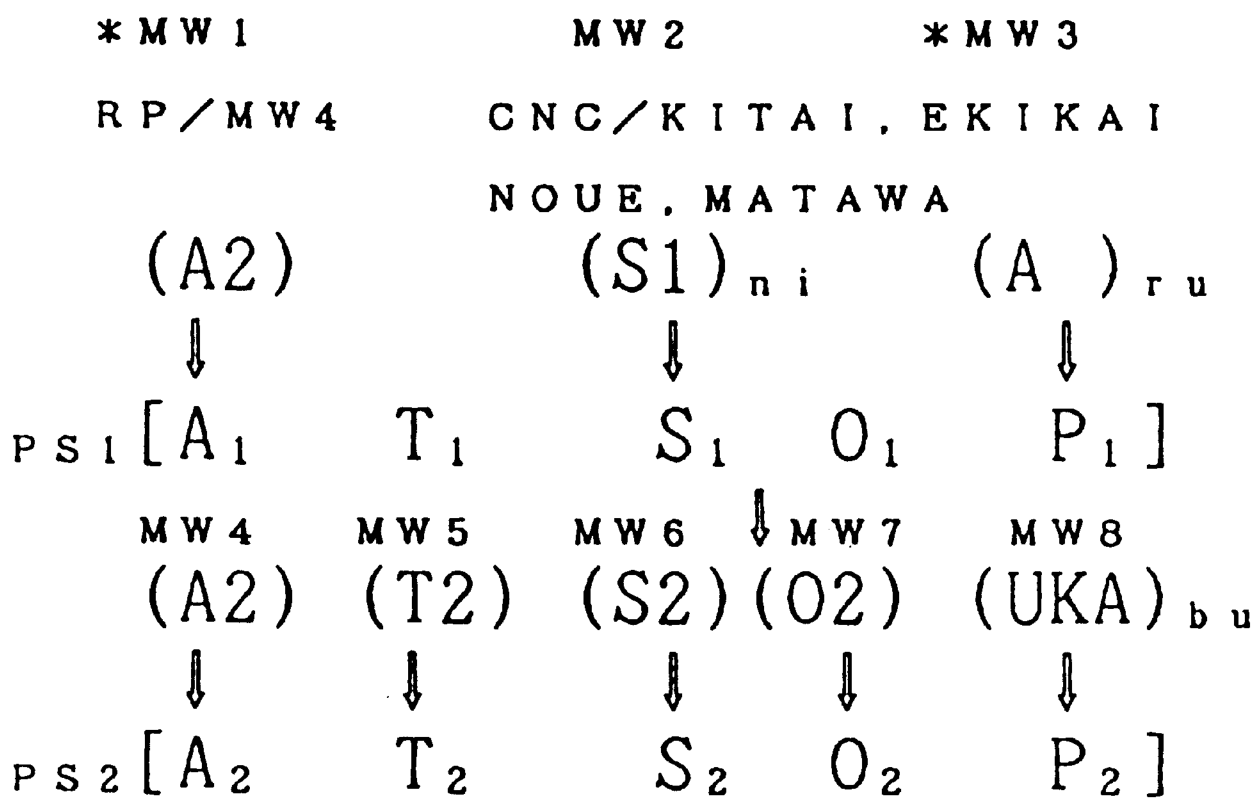

When PS-EE and PS-D are combined, this will be as shown in FIG. 38. THis diagram shows the process of change for a PS1 which initially existed and then later did not exist. I assume that A2 caused this change in PS2, by time T2 and space S2. When the item existing is "mono" (an object), or in other words, when it is considered to be CNC/MONO, this meaning structure is "tsukuru" (create), and when it is considered to be CNC/"seimei" (life), "tsukuru" will be "umu" (bear). When CNC/mono is changed to CNC/gainen (concept), the meaning structure will be "kangaeru" (think). In contrast, for something which has previously existed, but has become nonexistent, the meaning structure of CNC/mono will be "nakusu" (lose), the meaning structure of CNC/seimei will be "shinu" (die), and the meaning structure of CNC/gainen will be "wasureru" (forget). "Umu" was shown in FIG. 38. The meaning structure of words, particularly verbs, can be stipulated quite clearly, by clearly stipulating the content of the CNC, or, in other words, the relationship between one MW and another MW, the variety of cases which combine with each MW, and content to be inserted in each MW.

More varied meaning structures can be created by combining various PSs with various words stipulated by the above-mentioned process. Also, new words can be defined when a new word is allotted to the meaning constructed by the above process. For instance, "ukabu" (float) is assumed to have the meaning structure shown in FIG. 39. This is the meaning that {A2 itself is in a state of existence in or on a gas or liquid, in time T2 and space S2}. This is known as an intransitive verb.

The sentence {hana ga mizu ni ukabu} means {hana wa {hana ga mizu no ue ni aru} to iu jotai de aru}.

The causative expression, {- ni - o saseru}, will be actualized by the PS-D {- o suru} below the structural sentence of the subject sentence when this entire subject sentence is inserted in the Case O of PS-D.

Figure 40:
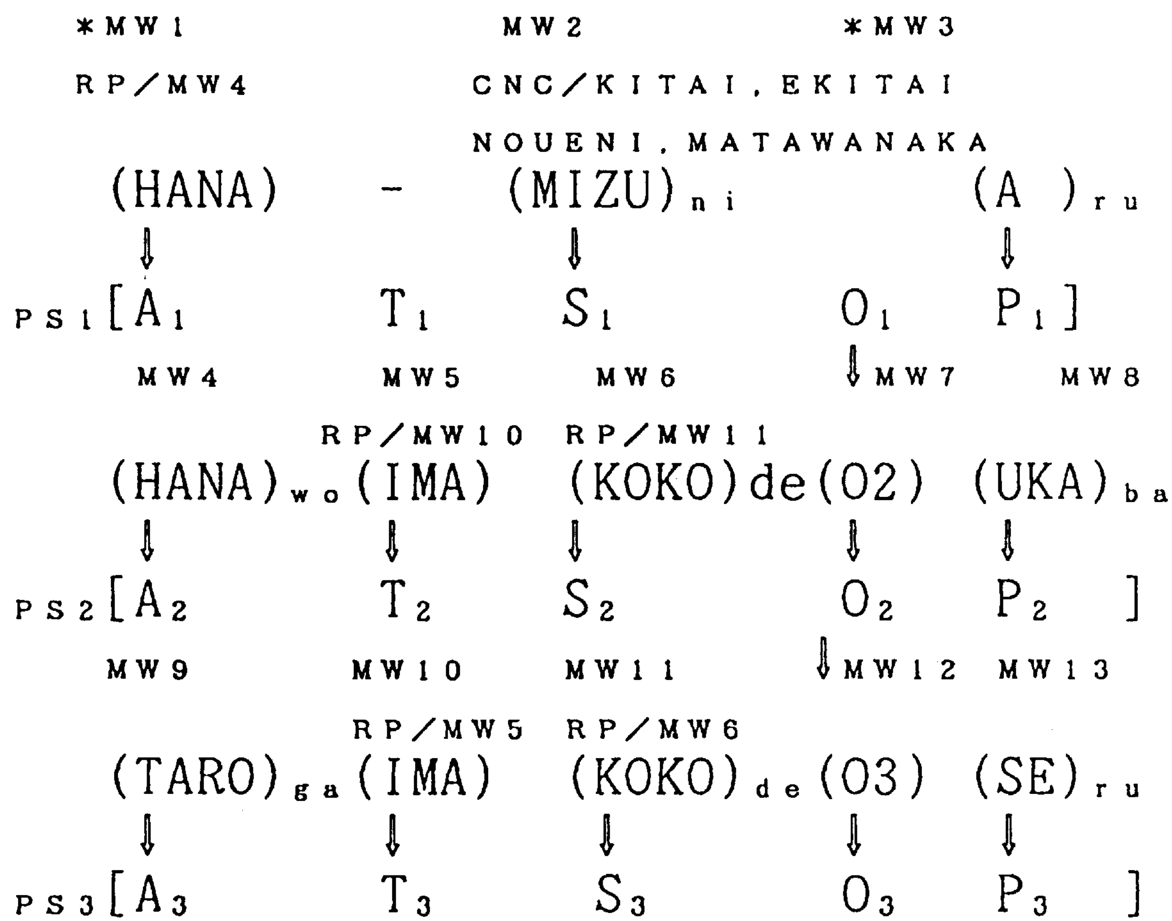

FIG. 40 shows the structural sentence in which saseru" has been combined with "ukabu." PS3, which contains {-saseru} is combined below in the subject sentence {hana ga ima koko de mizu ni ukabu}.

The meaning of this sentence becomes that A3 is done in Time T3 and Space S3 in the situation like this, by this combination with PS3. The WD to be inserted in the element .WD of MW in Case $P_3$ of PS3 was determined as "se." At this time, the particle of Case $A_2$ of "ukabu" is changed to "o, " and the conjunctive ending particle of the verb of Case P2 is changed to "ba." Also, when the causative verb "seru" of PS-D was combined with "ba," I assumed that T2=T3 and that S2=S3. When we assume that A3 is "Taro," T3 is "ima," and S3 is "koko," the natural sentence in FIG. 40 will be as shown below.

{Taro wa ima koko de hana o mizZu ni ukhaba seru}

I previously assumed that T2=T3 and S2=S3, but, strictly speaking, they do not necessarily have to be the same. However, I think that the expression of the causative verb does not actually express time and space rigidly. If I did not assume this, the number of cases in which a word can be inserted will be increased during meaning analysis, and therefore the meaning analysis would become ambiguous, as I will describe later. I have carried out the above-mentioned process here, but some words appear twice. Therefore, I consider the most important MW of the meaning is the MW at the lowest level, and I have designate the expression of T3 and S3 as possible, and prohibited the expression of T2 and S2.

Figure 41:
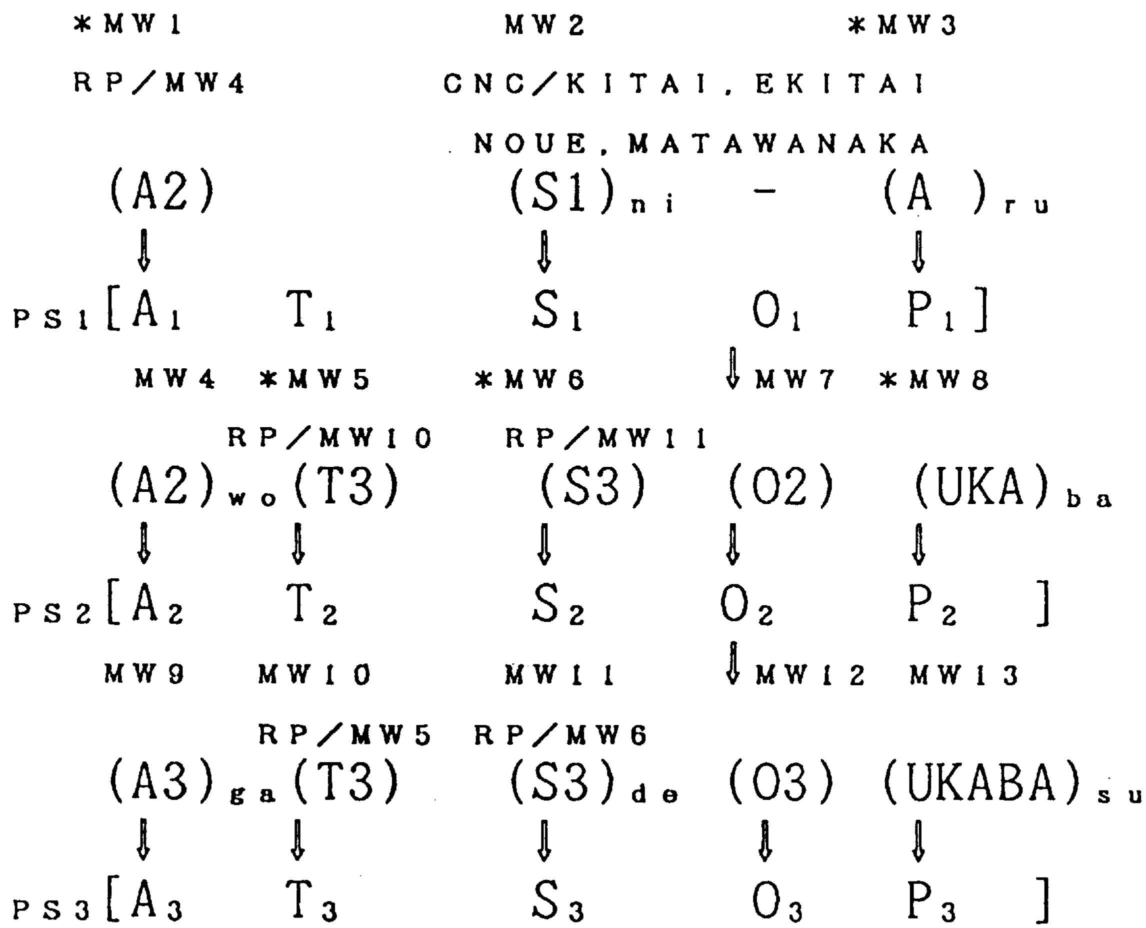

The meaning of "ukaba su" and the meaning of "ukaba seru" are considered to be the same, and the same meaning structure is applied to both these verbs. This structural sentence is shown in FIG. 41. In other words, I have decided to assume that "ukaba su" has been corrupted into a dialect form, "ukaba seru." One of the distinctive features of this patent is that it guarantees the same meaning structure for sentences which have the same meaning, whether the sentence was created using "ukaba seru" which was synthesized form "ukaba" and "- seru" or the sentence was prepared using the single word, "ukabasu."

Figure 42:
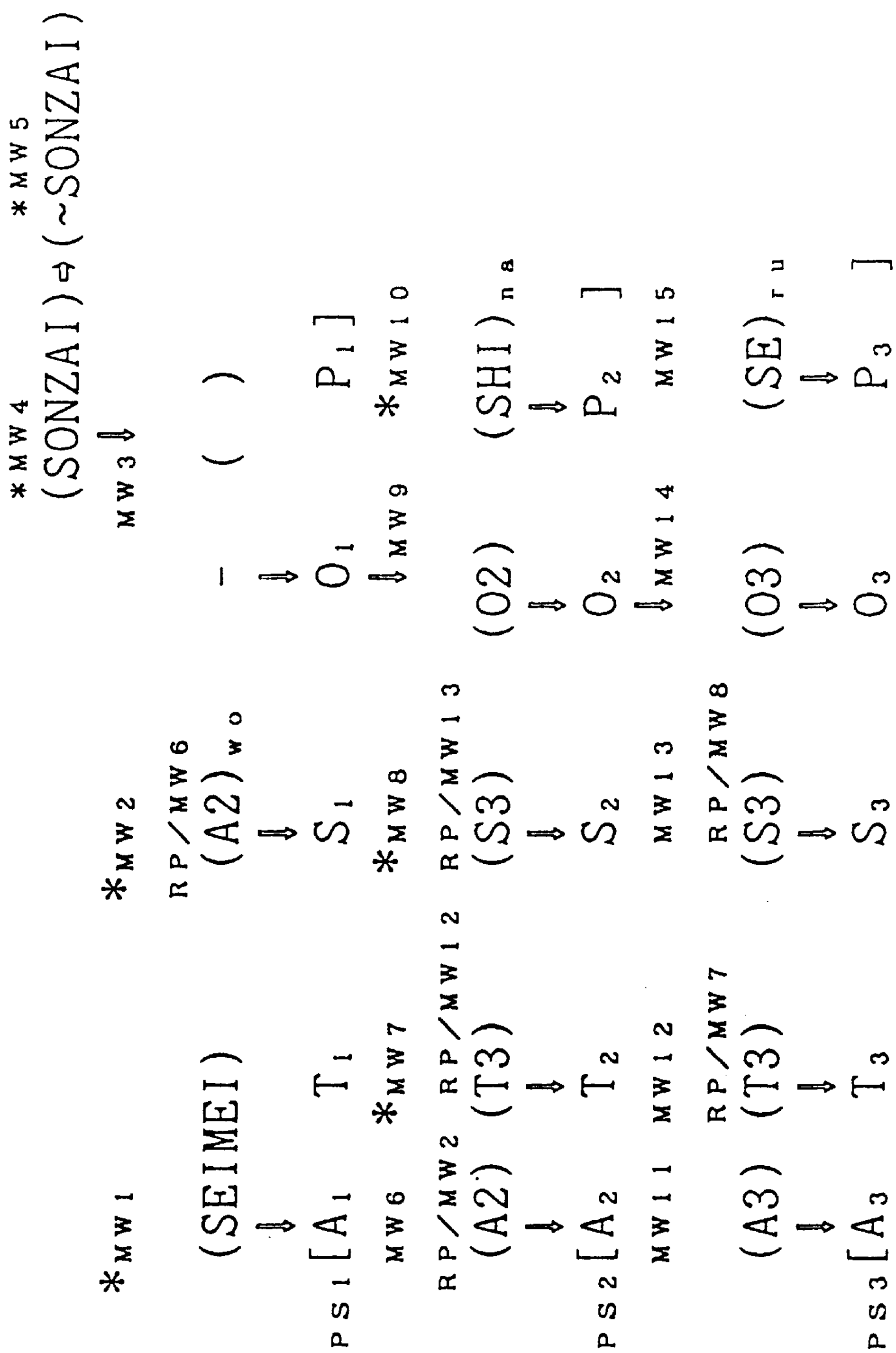
Figure 43:
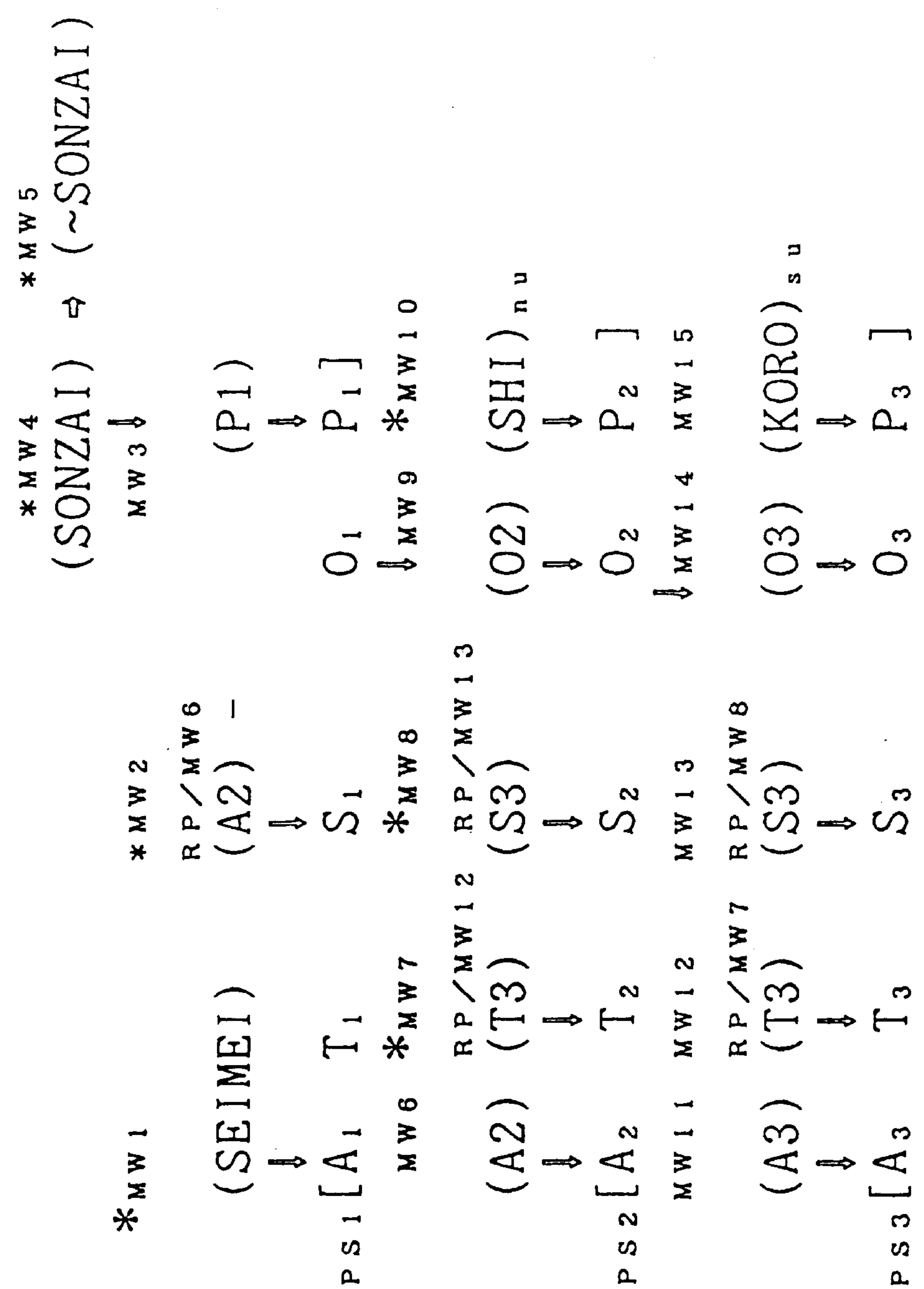

When "shinu" is changed to a causative verb, this will be {shina seru}, and its structural sentence will be created by combining the causative PS-D of {- seru} underneath {shinu}, as shown in FIG. 42. Strictly speaking, "korosu" (kill) and "shinaseru" (force to die, made - die), have different nuances, but I consider that the meaning structures of these two verbs are the same, and I have determined the meaning structure as shown in FIG. 42. When the word "korosu" is alloted as a label to the meaning structure "shinaseru," this will be as shown in FIG. 43. The meaning "shinu" is contained in the word "korosu," and therefore the expression of "shinu" in A2 was prohibited. The passive voice will be formed by setting up PS-1 to express the {-reru} portion of the passive verb, below the root PS or, in other words, by placing the PS at the lowest level of the structural sentence of the subject sentence, and by inserting the entire sentence into its O case. FIG. 44 shows the structural sentence for PS-1 of {-reru}. For the passive verb, T of the Time case and S of the Space case of the root PS of the subject sentence will be the same as TP of the Time case and SP of the Space case in this passive PS, just as for a causative verb. In order to do this, store the address of the other MW in the element, RP of each MW, and allow the expression of the Time case and SPace case of the PS to be at the lowest level (that is, the PS which has the highest order of priority). Then prohibit the expression of the Time case and Space case of the root PS of the relevant sentence.

{Taro ga kyo gakko de Hanako ni hon wo atae ta}

Figure 45:
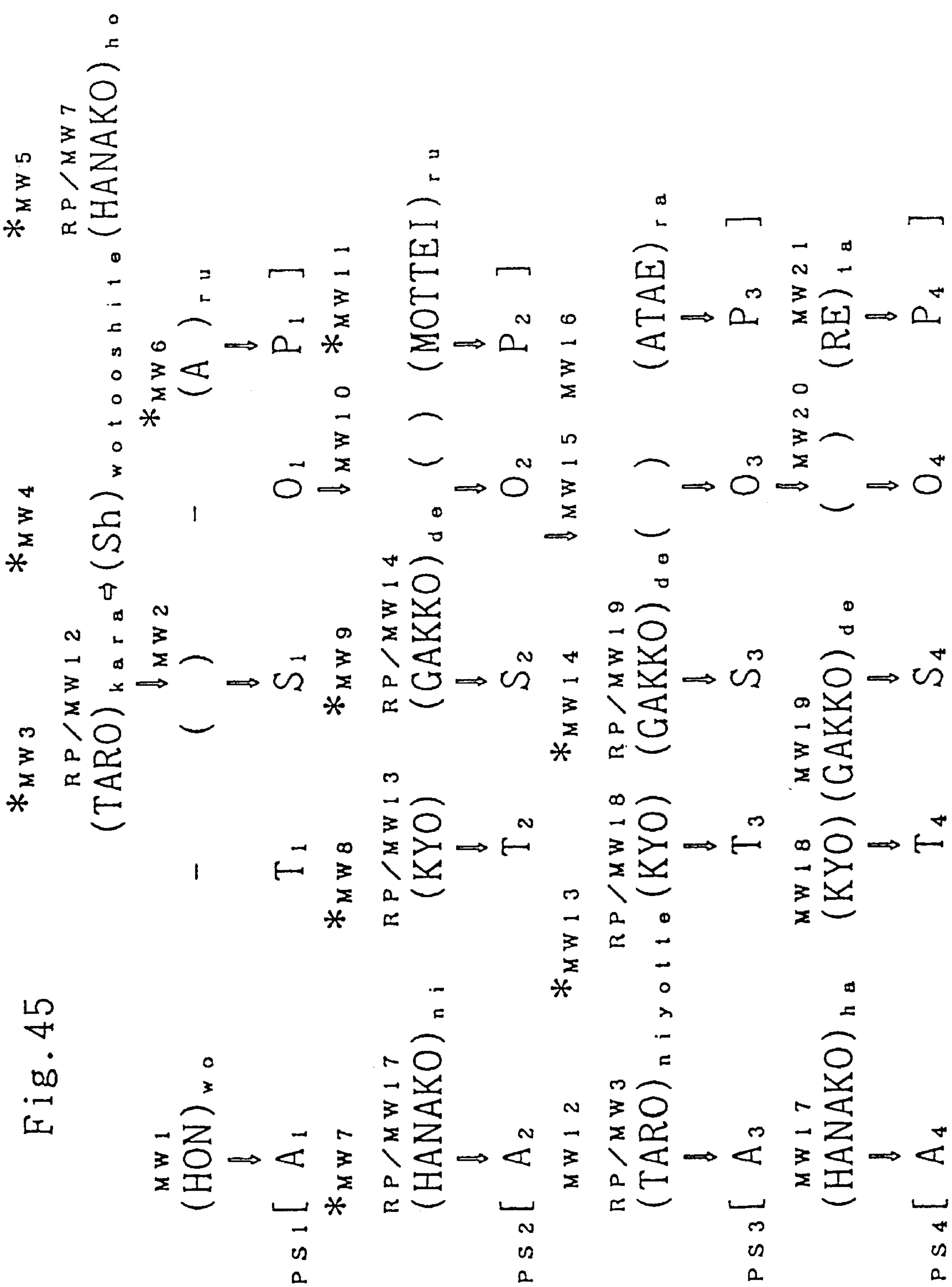

When the above sentence (FIG. 34) is changed into a passive sentence, its structural sentence will be as shown in FIG. 45, but the case particle in A3 will be changed to "ni - yotte." For the previously mentioned reason, T2=Ts T4 and S2=S3=S4. Therefore, every case except Case A is confirmed in the PS of the passive sentence. However, the problem is the word which is to be inserted in Case A. In the passive voice, I believe that the word to be inserted in Case A is the word which was previously inserted in the structural sentence of the relevant sentence, and was then taken out and inserted in Case A of this passive senence. As shown in FIG. 45, the words inserted in the "atae ru" structural sentence are the 5 words, "Taro," "kyo," "gakko," "Hanako," and "hon," All of these words can be inserted in Case A (A4) of the passive sentence, but the meaning will be completely different for the different cases of the original MW, as I will explain below.

Figure 46:
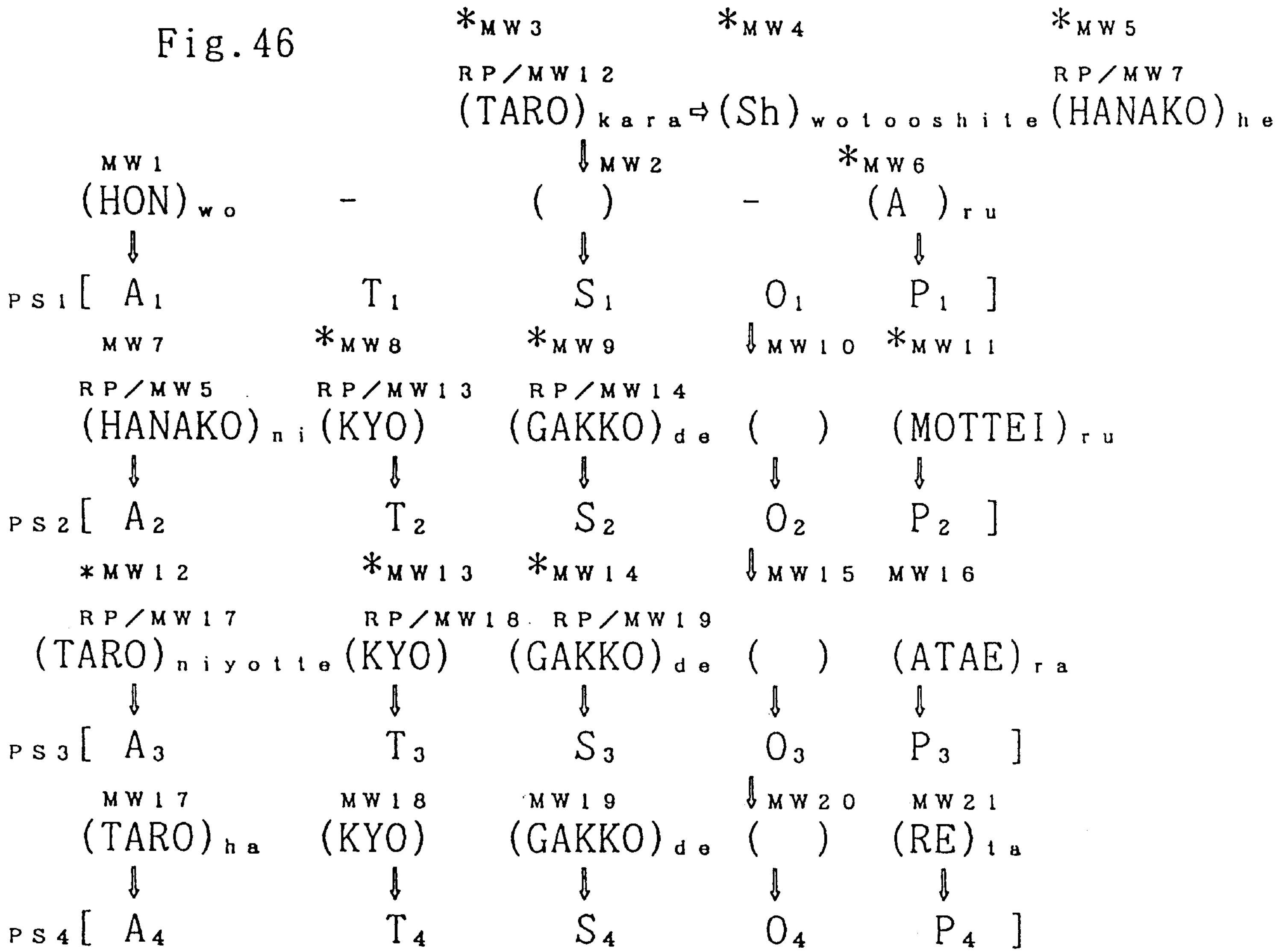
Figure 47:
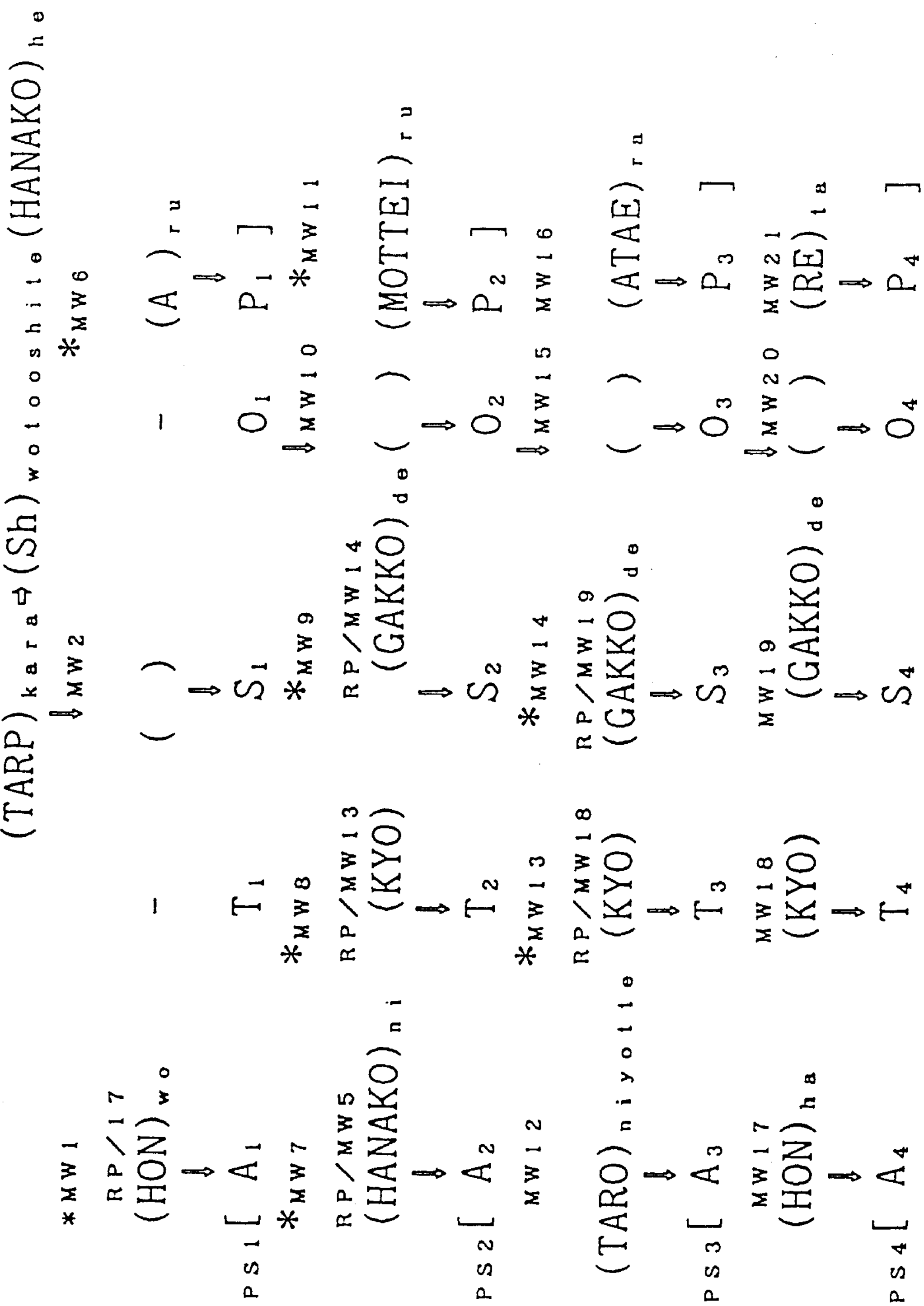

FIG. 45 shows the structural sentence when "Hanako" of Case $A_2$ is inserted in Case $A_4$, and FIG. 46 shows the structural sentence when "Taro" of Case $A_3$ is inserted in Case $A_4$. The sentence in FIG. 45 is as shown below, and it accurately expresses the passive voice.

{Hanako ha kyo gakko de Taro ni-yotte hon o atae rare ta}

The structur al s entence in FIG. 46, however, will be as shown below.

{Taro ha kyo gakko de Hanako ni hon wo atae rare ta}

This sentence is now in the polite form. Here, the exp r ession "(Taro) ni-yotte" has been prohibited.

If a a hon" is taken out of A1, this will be as shown in F ig. 47, and as shown below.

{Hon ha kyo gakko de Taro ni-yot te Hanako ni atae rare ta}

This sentence ca n be understood as the passive voice version of {Hon wa - ni atae rare ta}, and it can also be u nders tood as a potential, for example, as {Hon wa - ni ataeru koto ga deki ta}.

Figure 48:
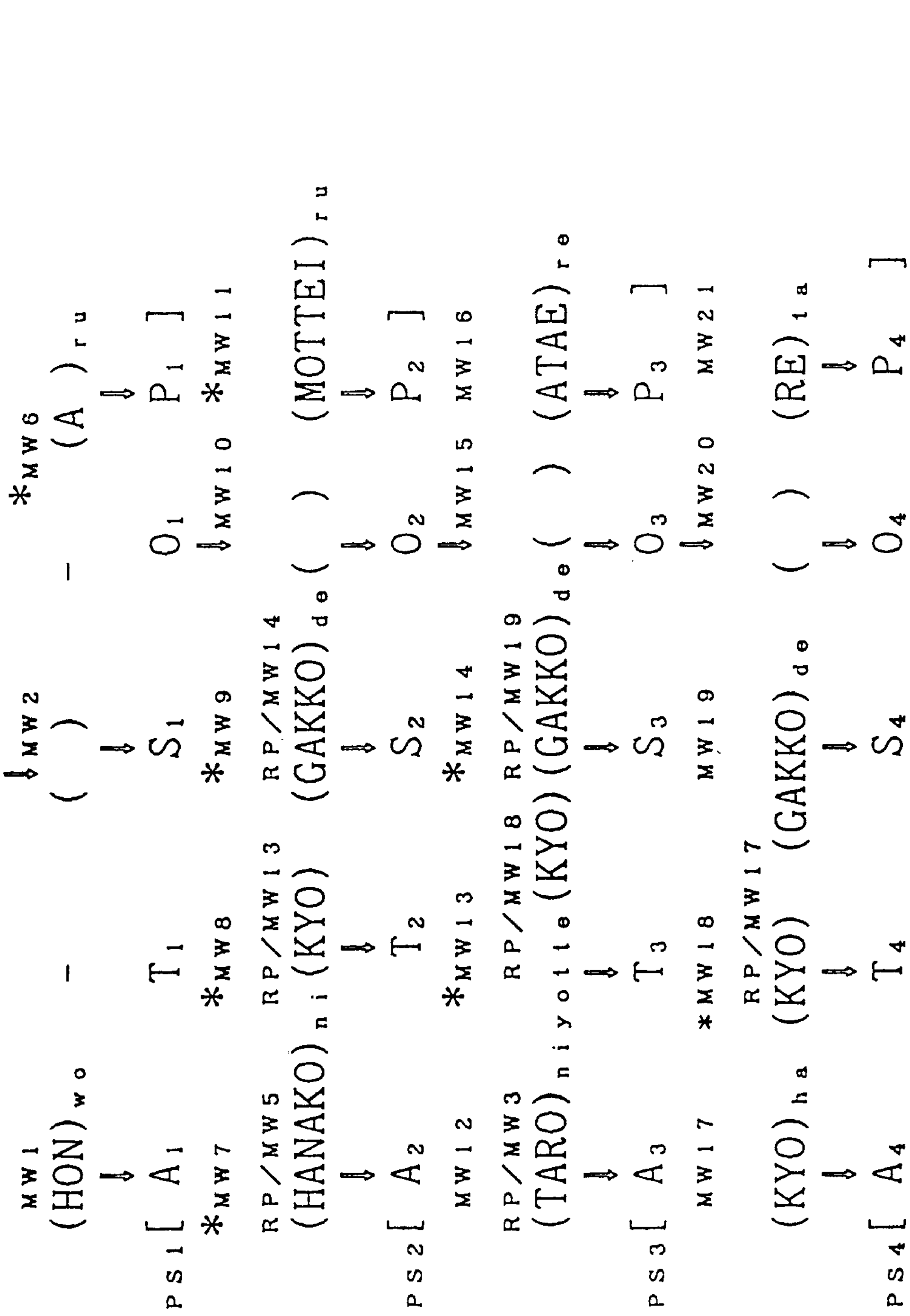

When "kyo" of T4 is taken out, this will be as shown in FIG. 48, and as shown below.

{Kyo wa gakko de Taro ni-yotte Hanako ni hon o atae rare ta}

This can be understood as showing the possibility of {Kyo wa - ataeru koto ga deki ta}. In FIG. 48, ckyols has appeared twice, and therefore the expression of one "kyo" must be prohibited. The lower-level PS shall be expressed preferentially, and if both word s are on the same level, the word which can be expressed is selected according to a fixed order. In this case, if it is assumed that the order is ATSOP, the left side in this order, in other words, MW17, will be preferentially selected as having the possibility of being expressed. The expression of all MWs other than MW17 has also been prohibited. In order to clarify the relationship between each MW which can be expressed and each MW for which expression is prohibited, it is necessary to store the address of each MW's partner in the element RP.

Natural sentence input can be separated into individual words, particles, and symbols by sentence-structure analysis, and can finally be converted to the language structure information IMF-LS. Meaning analysis is the operation of creating the meaning frame IMI-FRM, based on this language structure information, and inserting each word, particle, and symbol into this meaning frame. In the case of a passive sentence, the word WD inserted in Case A of the root PS, should be inserted in an MW somewhere in that structural sentence; therefore, we must check into which MW the word WD can be correctly inserted. There are many ways to check this. For instance, set an order of priority while searching the cases, search each empty case according to the order set, and insert the WD into each case according to the order in which the case was found. After that, search the original cases as accurately as possible, by checking the conception CNC of the word to be inserted into that WD, and the rationality of the meaning concept of the word. Before initiating the above process, however, we must minimize the number of cases into which the WD can be inserted, and for this reason, the expression of Case S and Case T except T4 and S4 has been prohibited.

I consider that the sentence {- ataeru rashii} is synthesized from the structural sentence for the {- ataeru} sentence, and the structural sentence for the {- rashii} sentence, as shown below.

Figure 49:
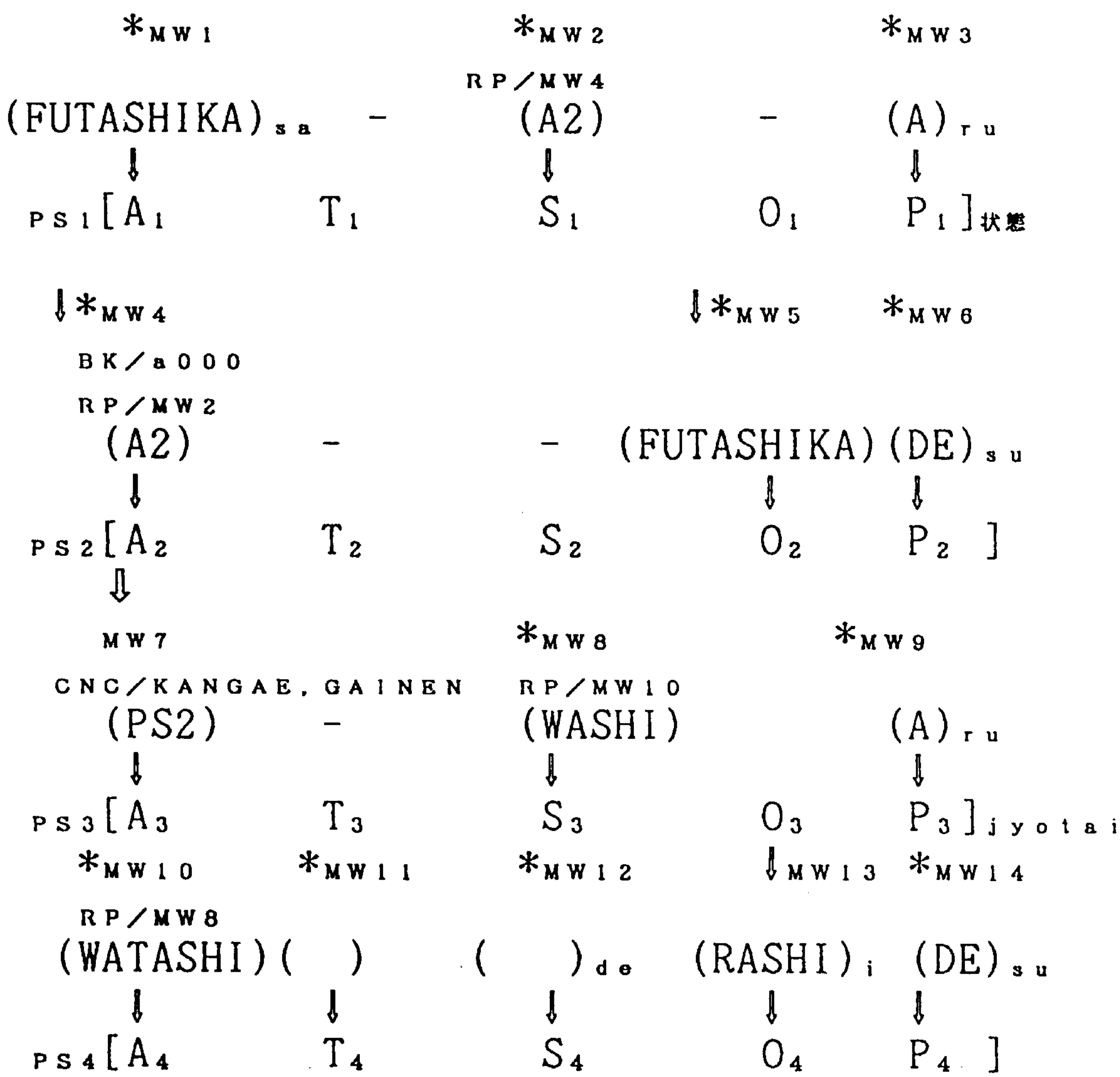

The {- rashii} sentence is assumed to have the meaning structure shown in FIG. 49. Four digits carrying hexadecimal data are stored in the element BK of the MW, and these two structural sentences are synthesized by inserting the entire sentence involved into the MW which has an "a" as its 4th digit of data. Even if the marker "a" is not attached, there is no other empty case except this one into which the sentence can be inserted, in the structural sentence for the {-rashii} sentence. Therefore, it is not particularly necessary to attach this marker; however, because this marker is also used elsewhere, it is used here as well.

The following reveals the meaning structure of the {-rashii}. The PS1 at the highest level means, {A2 (sentence concerned) has some uncertainty}. The PS2 below PS1 means {A2 (sentence concerned) is in a condition which has some uncertainty}. In other words, {A2 (the sentence concerned) is uncertain}. PS3 means {A4 (I) is (am) in the condition of having A3 (a certain idea)}. In other words, it means, {I am in the condition of having the idea that the sentence involved in uncertain}. PS4 means {in the above-mentioned condition at that time and in that place}. PS3 and PS4 have the same structural sentence, {- having the idea of -} or {think -}, as explained in FIG. 28. And A4 is the "speaker," that is, "watashi (I)," Therefore, PS3 and PS4 become, {I have the idea that -} or {I think that -}. Therefore, {- rashii} will have the same meaning as {I have the idea that - is uncertain} or {I think that - is uncertain). As a result, the word {-rashii} is considered to contain the meaning "Watashi ga (I)," and the expression "watashi (I)" is prohibited.

The sentence, {Taro ga kyo gakko de Hanako ni hon o atae ta rashii} is the sentence created via a combination, inserting the sentence {Taro ga kyo gakko de Hanako ni hon o atae ta} into the MW of the {- rashii} sentence marked by "a". FIG. 50 shows this structural sentence. It is possible to combine these 2 sentences by writing the number for PS3 into the element MW of MW20 which has "a" (as its first hexadecimal digit). The actual data is written by separating "PS" from "3." "e" is entered in the second-digit position of the element BK to show PS, and "3" is written in the element MW. If we rearrange all the MWs of this structural sentence according to their insertion order, it will be as shown below.
[(Watashi) ( ) ( ) ([([([(Taro) ga (kyo) (gakko) de (L (hanako) ni (kyo) (gakko) de ([(hon) o ((Taro) kara (Sh) o toshite (Hanako) e ) (a) ru ]) (motte i) ru]) ([(atae) ru (Futashika (uncertain) sa (A5) (a) ru] Futashika) de (a) ru (watashi) (a) rul rashi) i (de) su]

If the MWs marked by * are omitted, since their expression is prohibited, the sentence will be as shown below. [( ) ( ) ( ) ([([([(Taro) ga (kyo) (gakko) de ([(Hanako) ni ( ) ( ) ([(Hon) o (( ) ( ) ( )) ( ) ]) ]) (atae) rul ) ([( ) ( ) ( ) ]) ( ) ( ) ( ) ] rashi) i ( )]

If all of the parentheses ( ) and square brackets [ ] are removed, the sentence will be as shown below.

[
Taro ga kyo gakko de Hanako ni
hon o
atae ru rashi i
]

If the spaces are eliminated and the words are rearranged, the sentence will be as shown below.

{Taro ga kyo gakko de Hanako ni hon o atae ru rashi i} {atae ru rashi i} will be as shown below.

[
atae ru rashi i
]

As is evident, we can understand that quite a large portion of the structural sentence is not expressed. The portion which is not expressed was shown above by using spaces; however, when this structural sentence is converted to a natural sentence, all the spaces are omitted and the individual words are connected with each other. As a result, the necessary content is often not considered to be expressed accurately. However, as shown in FIG. 50, we can see that the meaning is, in fact, stipulated very accurately. Only the minimum information needed is expressed in the natural sentence, and all the lengthy, redundant, and unnecessary sections are completely omitted. The following three types of content are not expressed in the natural sentence. 1) A content which is clearly stipulated as a meaning structure, need not be expressed. "Prohibition of expression" is different from "not possible to be inserted" in the strictest sense of their meanings, but most of the time they are the same. Therefore, the prohibited expression of an MW is equivalent to an MW into which it is not possible to insert a word. 2) Even the expression of an MW into which a word can be inserted can be omitted if it can easily be understood by the listener. If the partner in conversation has already understood {Taro ga kyo gakko de Hanako ni hon o atae ru}, he/she will easily be able to understand "doko (somewhere/where)," "dare (someone/who)," and "nani (what)," so that these words can be omitted. When individuals who are familiar with the circumstances talk to each other, the content {Dare ka nani ka o atae ru rashi i) can be conveyed by the conversation mentioned above. 3) When the content is being expressed in an abstract way, without stipulating any concrete content, using such phrases as "dare ka," "nani ka," "itsu ka," "sono toki," and "soko de," nothing is entered into the MW as a default value. The problem, however, is the difficulty involved in finding out whether the content not expressed is 2) or 3). There is no method to assess this accurately, and therefore the words mentioned in 2) are searched by the method(s) which will be mentioned later. Thereafter, all the other words shall fall into the category of 3).

If the structural sentence from PS1 to PS4, shown in FIG. 50, is translated into a natural sentence, it will be as shown below.

{Taro ga kyo gakko de Hanako ni hon o ataeru to iu koto niwa futashikasa ga aru}

If the structural sentence from PS1–PS5 is translated into a natural sentence, it will be as shown below.

{Taro ga kyo gakko de Hanako ni hon o ataeru to iu koto wa futashika de aru}

If the structural sentence from PS1–PS 6 is translated into a natural sentence, it will be as shown below.

{Taro ga kyo gakko de Hanako ni hon o ataeru to iu futashika na kangae ga watashi ni aru}

If the structural sentence from PS1–PS7 is translated into a natural sentence, it will be as shown below.

{Watashi wa kono toki kono tokoro de Taro ga kyo gakko de Hanako ni hon o ataeru to iu futashika na kangae ga watashi jishin ni aru to iu jotai de aru}

As previously mentioned, the basic concept of this patent is that even if the expression of each of the sentences is different, as long as the meanings of the sentences are the same, the structural sentences will also be the same. This is always certain. Moreover, this certainty is applicable not only to Japanese but also to other languages; for instance, a similar certainty will be applicable to English as well. Until now, the data structures that have been constructed have the same meaning structures provided that the meanings of the sentences are the same, even though the expression of each individual sentence may be different within the scope of the Japanese Language. However, even in a linguistic system which is completely different from that of Japanese, such as, for example, English, when the meaning of the English sentence is the same as that of the Japanese sentence, the same meaning structure must be constructed. This is the basic concept of this patent.

{Taro wa kyo gakko de Hanako ni hon o atae ru koto ga deki ru}

Figure 51A:
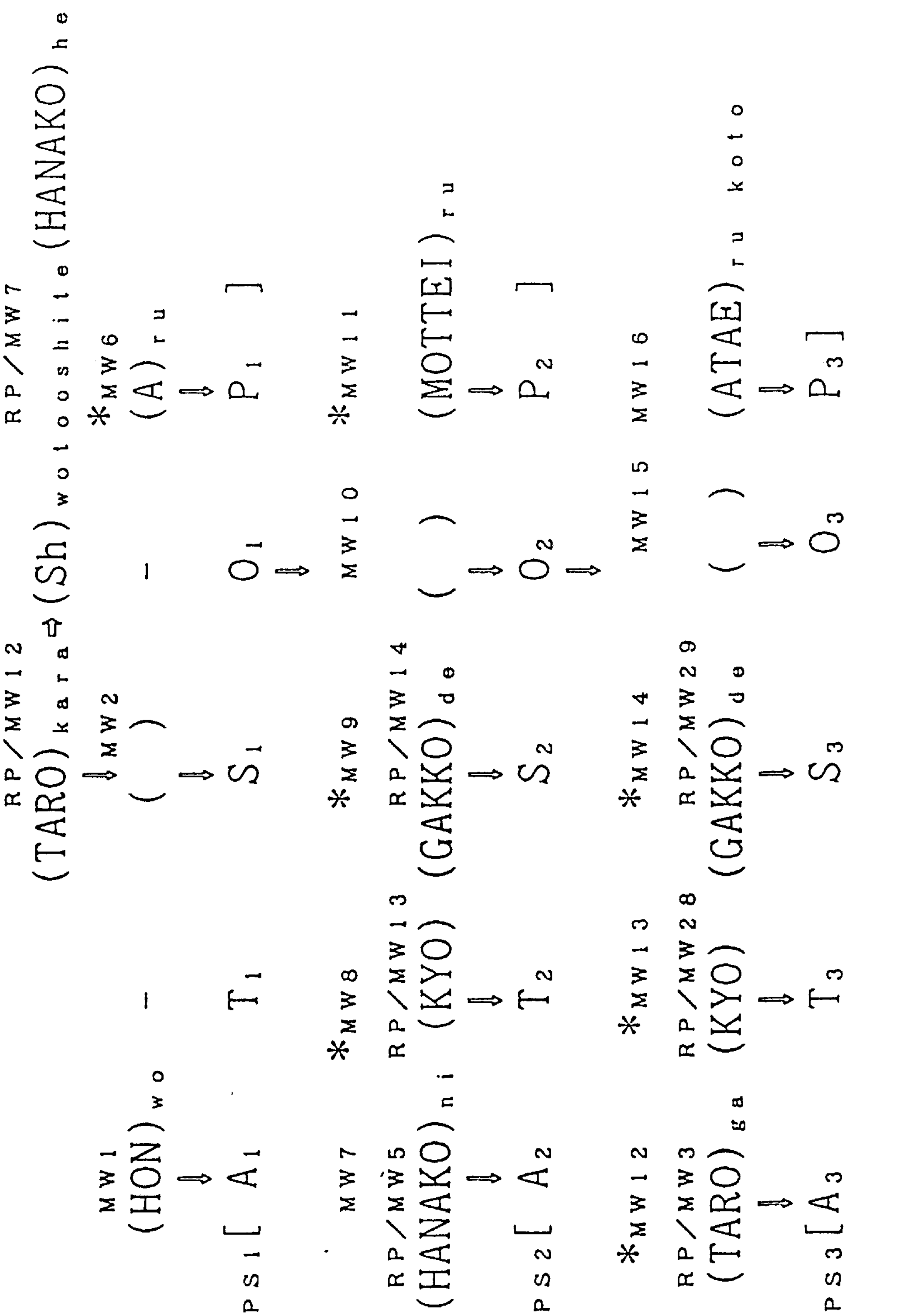

This sentence is considered to have been synthesized by combining the structural sentence for the {- atae ru} sentence, and another structural sentence for the {-deki ru} sentence, as shown in FIG. 51. If the above sentences are combined, there is an MW, identified by the marker "a", which shows the place for the combination in the {- deki ru} sentence, and the relevant sentence is inserted into this MW.

Figure 52:
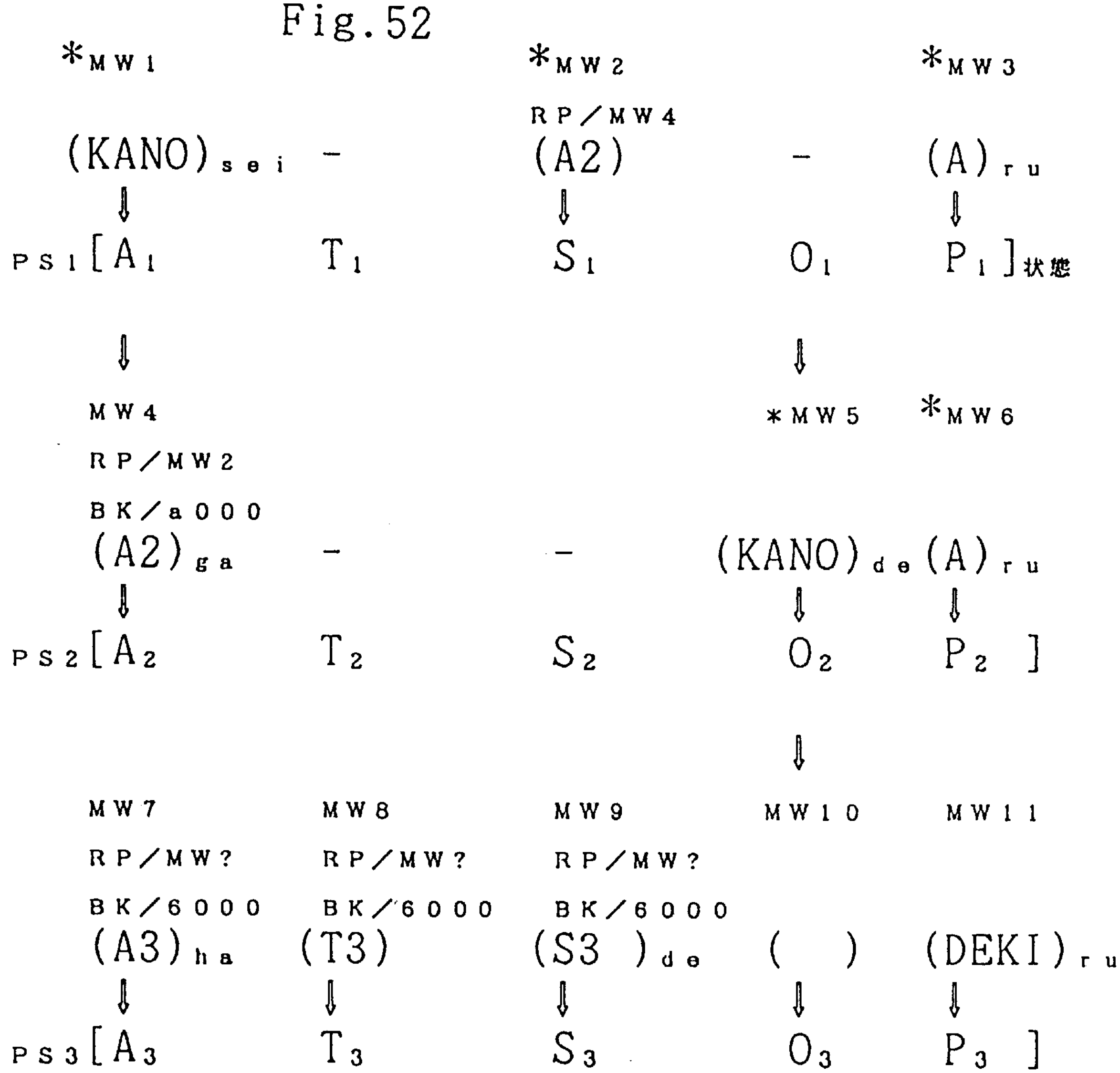

The {- deki ru} sentence has the meaning structure shown in FIG. 52. The sentence which can be combined is inserted into the MW in Case A2. This A2 will then be inserted into Case S1, and therefore PS1 shows that {There is a possibility for A2 (sentence to be inserted).}. PS1–PS2 show that {A2 is possible}. If the word inserted into the element .WD of Case A of the root PS of the sentence to be inserted is assumed to be inserted into the element .WD of Case A (MW7) of PS3, and Case T and Case S of the root PS of the sentence to be inserted, are assumed to be inserted into Time case T3 and Space case S3; then multiple MWs with the same content will be created. It is therefore necessary to allow the expression of only one of the MWs while prohibiting other expressions. If we prohibit of the expression of the MW of the root PS (PS at the bottom level of {- deki ru} which is the sentence to be inserted, "6" is entered as the 4th digit of the hexadecimal data of the element .BK. On the other hand, if we allow the expression of the MW of the root PS on the top level and prohibit the expression of the MW of the root PS on the bottom level, "9" will be entered as the 4th digit of the hexadecimal data of the element .BK, to indicate these prohibitions/allowances of expression. The 4th digit of the hexadecimal data for the element BK of the root PS of {- deki ru}, shown in FIG. 52, is "6, " and therefore the expression of Cases A, T, and S of the root PS of the sentence to be inserted is prohibited. PS3 shows that {A3 is such that the content of the sentence inserted is possible in Time case T3 and Space case S3.}

FIG. 51 shows the structural sentence of the following sentence.

{Taro ga kyo gakko de Kanako ni hon wo atae ru koto ga deki ru}

That is, the sentence, {Taro ga kyo gakko de Hanako ni hon o atae ru} (PS1- PS3) is inserted into MW20. When we insert the words from each element .WD of the Agent Case $A_3$, Time Case $T_3$, and Space Case $S_3$ of the root PS of the sentence to be inserted, into the element .WD of the Agent Case $A_6$, Time Case $T_6$ and Space Case S6 of the root PS of {-deki ru}, allow the expression of the words in the upper-level root PS, and allow the expression of the words in the bottom-level root PS, according to the BK instruction, the above-mentioned natural sentence can be created. Various natural sentences can be generated from this structural sentence. For instance, the natural sentence generated from the structural sentence from PS1 to PS5, shown in FIG. 51, will be as shown below.

{Taro ga kyo gakko de hanako ni hon wo atae ru koto ha kano de aru}

PS6 is not included in the structural sentence. Therefore, (Taro), (Hanako), and (gakko) appear only once, so the "*" marker is removed and the expression of MW12, MW13, and MW14 is allowed.

In order to translate this natural sentence into English, each word of the letter line KNJ in Japanese is converted to each word of the letter line in English, and each particle in Japanese is converted to the individual particle in English which corresponds to it. Then the word order is converted to a standard English word order, APOST. When this converted data is output, an English sentence is obtained.

FIG. 53 shows the structural sentence in English, which has been converted from the structural sentence in FIG. 51 to suit this purpose. If the individual MWs are arranged according to the order of each MW inserted, it will be as shown below.

The (deki)ru of $P_5$ was converted to (can), (kano) of $O_4$ was converted to (possible) and (kano) of $A_3$ was converted to (possible).

[(Taro)(can)([[([(Taro)(give)s([(Hanako)(have)([(book)s(is) from(Taro)through(sh)to(Hanako))])at(school)(today))at (sch ool)(today)])(is)(possible)])at(school)(today)]

If each word for which expression is prohibited is removed from the above sentence, it will be as shown below.

```
[(Taro)(can)([([(----)(give)s([(Hanako)(----)([(book)s(--)
----(Taro)-------(--)--(------))])--(------)(-----))--(--
---)(-----)])(--)(--------)])at(school)(today)]
```

If the parentheses ( ) and square brackets [ ] are removed from the above sentence, the result will be as shown below.

```
{-Taro--can-----------give-----Hanako---------book-s----
-----------------------------------------------------------
----------------------------at-school--today-}
```

After all the spaces are removed from the above sentence, the following natural sentence will result.

{Taro can give Hanako books at school today}

These processes are the same in the case of Japanese sentences.

Figure 54B:
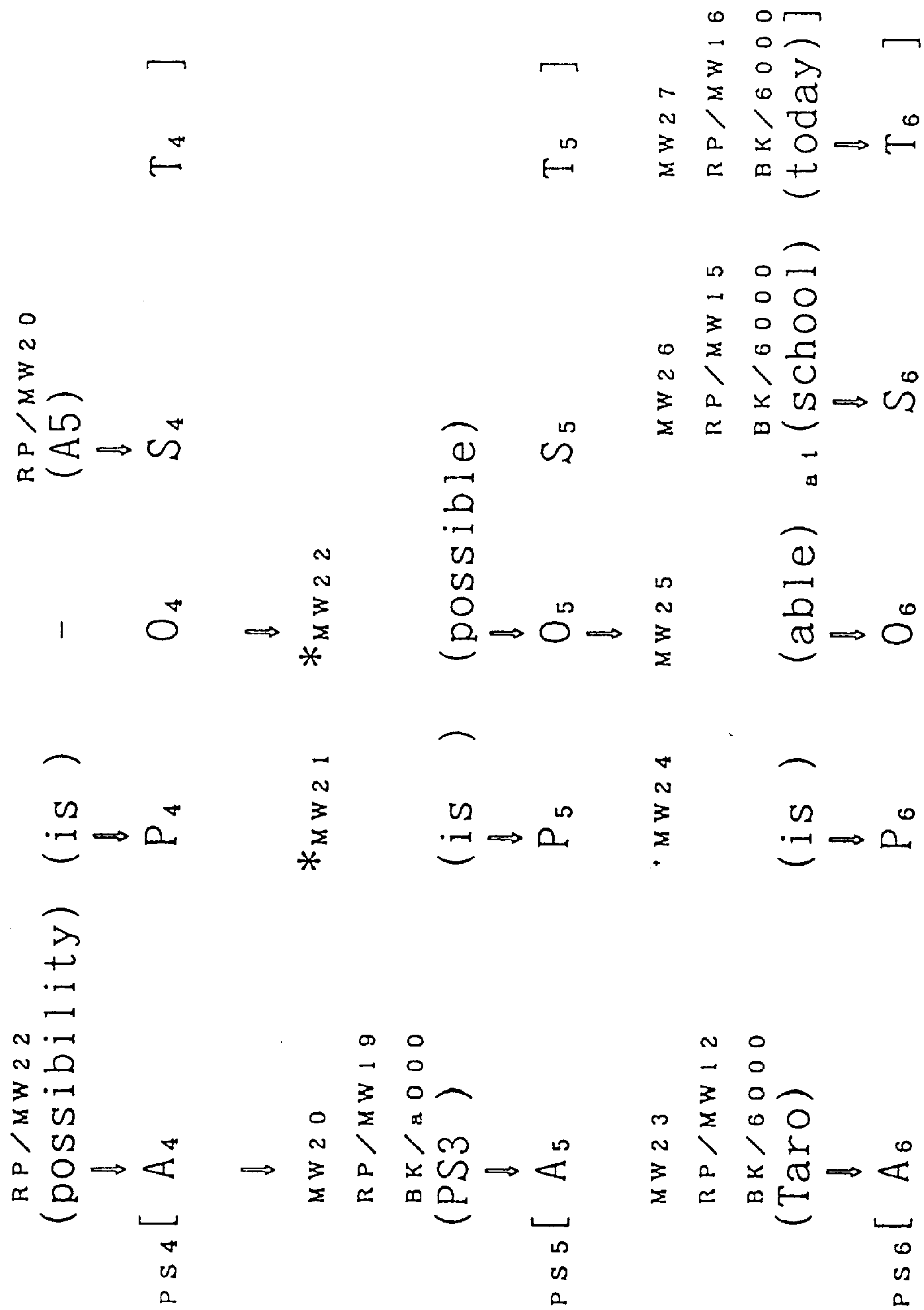

Case $P_6$ of the root PS in FIG. 53 is (can) and Case $O_6$ is ( ). Case $P_6$ can be changed to (is) or (a)ru, while Case $O_6$ can be changed to (able) or (kano)de, for the same reasons that apply to the process used for a Japanese sentence. FIG. 54 shows the structural sentence after the above-mentioned chan ges have been made. If a natural sentence is g ene rat ed from that structural sentence, it will be as shown below.

[(Taro)(is)(able[([(Taro)to(give)s([(Hanako)(have)([(book)s (is) from(Taro)through(sh)to(Hanako))])at(school)(today)) at(sch ool)(today)])(is)(possible)])at(school)(today)]

If words whose expression is prohibited, as well as paren theses and square brackets, are removed from the above sentence, it will be as shown below.

```
[Taro--is--able---------to-give-----Hanako---------book-s----
-------------------------------------------------------------
----------------------------at-school--today-}
```

Here, when the structural sentence on the top level is insert ed i nto PS3, "to" is added before P3 and entered as "to (give)"; however, if "can" comes before "to(give)", "to" is omitted.

If all the spaces are removed from th e above sentence, the foll owing natural sentence results.

{Taro is able to give Hanako books at school today}

Figure 56A:
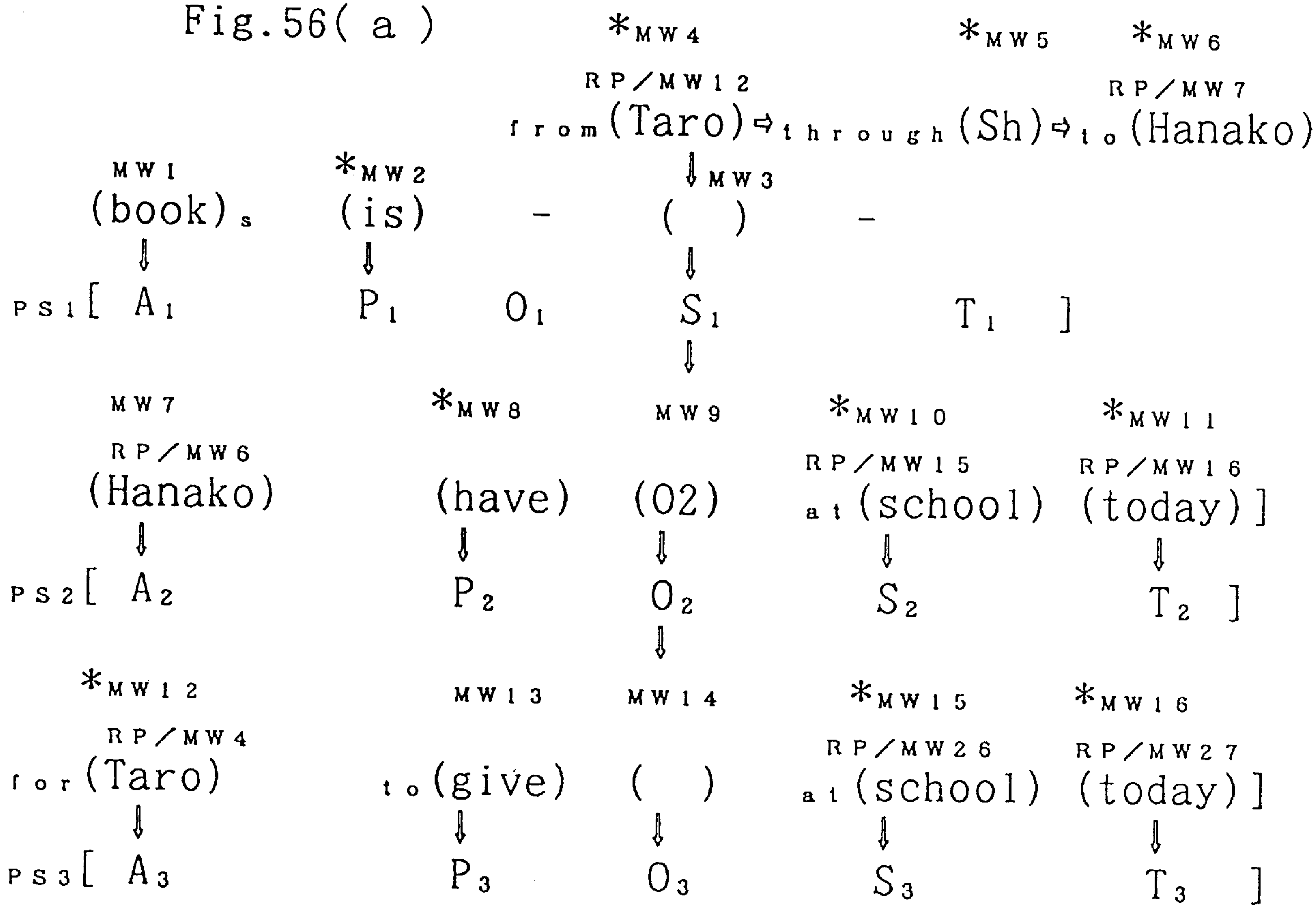

If the structural sentence from PSh to PS5 is converted to a natural sentence, it will be as shown below. Its structural sentence is shown in FIG. 56. The structural sentence does not include PS6; therefore the expression of (Taro), (school), and (today) in P3 must be expressed. It is characteristic of English that an entire sentence cannot be inserted into the Agent Case of the root PS. Therefore, (it) is formally placed in Case $A_5$, and the sentence is inserted into Case X. There are 2 ways to take out the Zentai (whole) Case from the English sentence; one is to use the "Zentai" particle jm, "that" as shown in FIG. 55, and the other is to use "for (A) to (P)" as shown in FIG. 56. Therefore, both methods are given here. If these are converted to natural sentences, they will be as shown below.

If the whole sentence is inserted into Case $A_5$ without using "it", it will generate the following two sentences. If "it" is used, the following two sentences can be obtained.

If the words whose expression is prohibited, as well as the parentheses and square brackets, are removed, the sentences become as shown below.

The various words referred to as "adjectives" have different meaning structures. A few major examples of these will be presented below.

Figure 57:
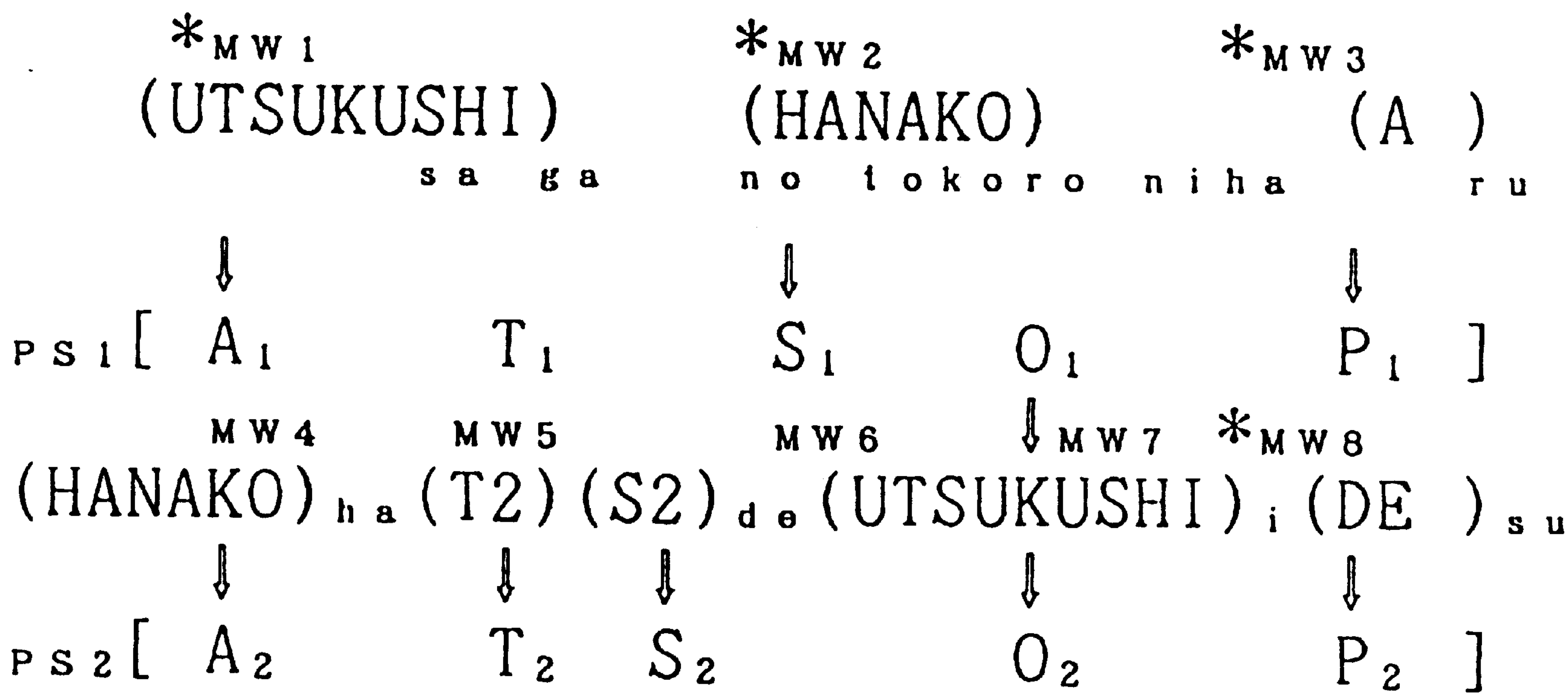

FIG. 57 shows the structural sentence of the sentence, (Hanako wa utsukushi i). This meaning structure consists of two PS levels. PS1 shows the meaning, (Hanako no tokoro ni wa utsukushi sa ga aru}. PS2 shows, {Hanako we sono youna jotai de aru}; that is, this meaning structure shows {Hanako wa {Ranako no tokoro ni utsukushi sa ga aru}to iu jotai de aru}. "Hanako" is inserted in $A_2$ and $S_1$, so that, when the expression of "Hanako" is prohibited in $S_1$ according to the order of priority, the meaning structure becomes {Hanako wa {utsukushi sa ga aru}to iu jotai de aru}. If "utsukushi il" is assigned to "utsukushi sa ga aru to iu jotai", the meaning structure becomes {Hanako wa utsukushi i de aru}. The adjective itself originally shows a condition or circumstance, and therefore, the expression "de aru" becomes redundant. Therefore, this is usually omitted in Japanese. If the expression of "de aru" is prohibited, the meaning structure will be, {Hanako wa utsukushi i}.

Figure 58:
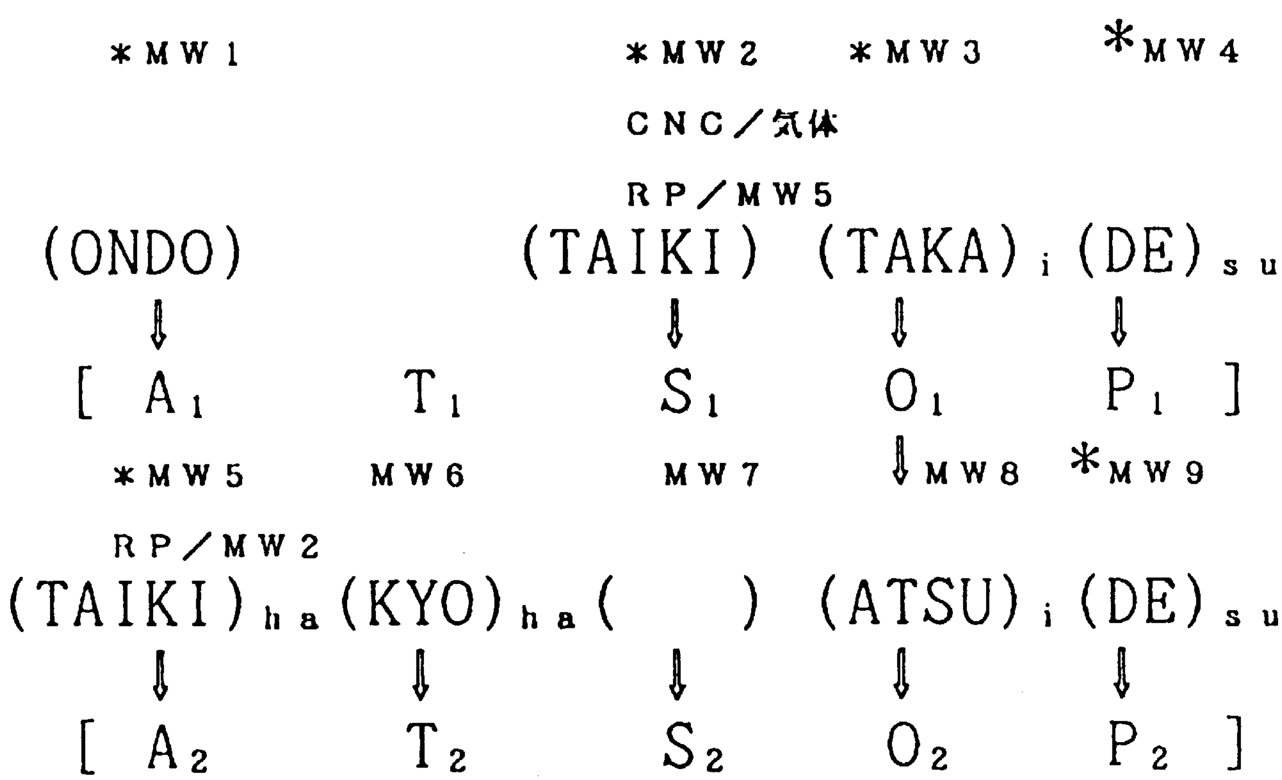

In Japanese, "atsui" can be written as 熱い or 暑い. 熱い shows that the temperature of a substance is high, and 暑い shows that the air temperature is high. FIGS. 58 and 59 illustrate these meaning structures. The same word, "atsui" is inserted in both Case $A_2$ and Case $S_1$. When the word is 熱い, however, it means the temperature a t a substance, and when the word is 暑い, it means the atmospheric temperature; so the content of each of these individual words is stipulated by entering "CNC/buttai (substance)" or "CNC/kitai (gas)" PSI shows that {A2 has a temperature, and that the temperature is high}; PS2 shows that {A2 is in such a condition}.

Figure 59:
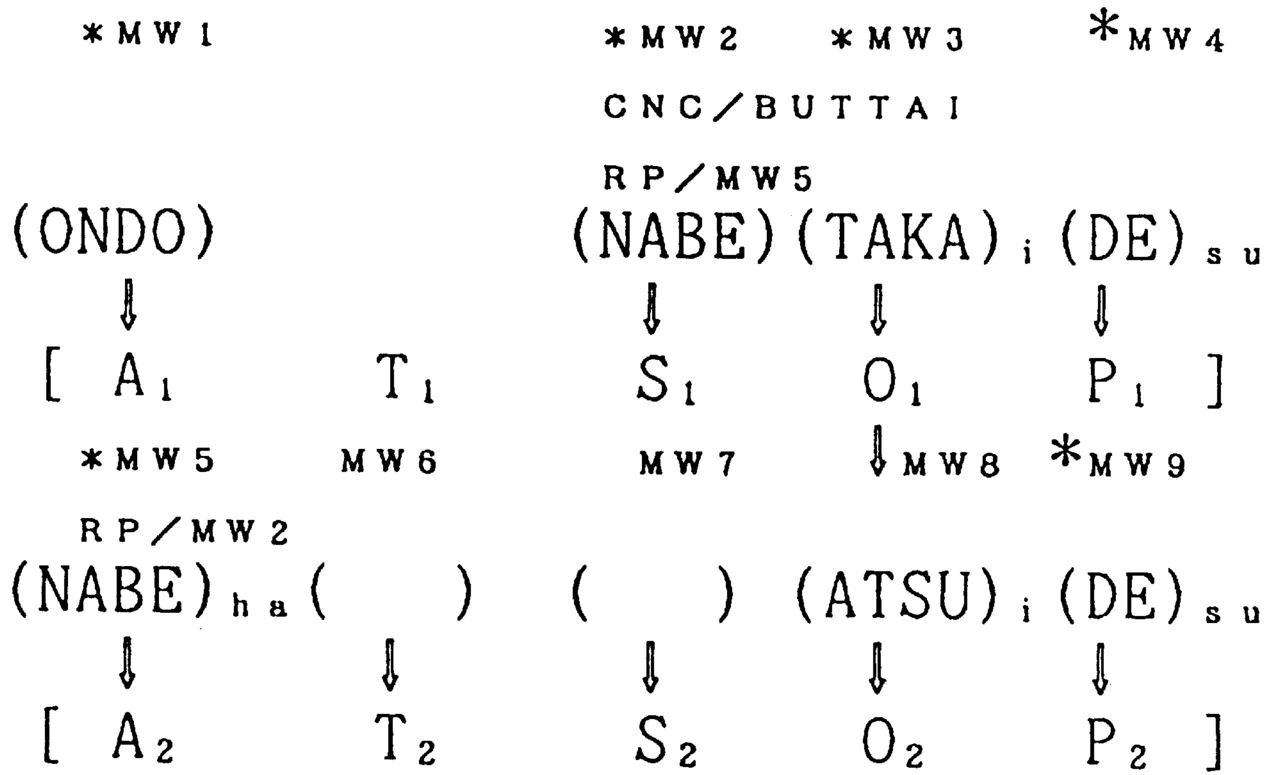

FIG. 59 shows the structural sentence {Nabe wa atsui}.

FIG. 58 shows the structural sentence {Nyo wa atsui}.

More accurately, the above sentence should be {Taiki wa kyo wa atsui (the air today is hot)}, however, {kyo wa atsui (Today is hot)} is the customary expression in daily use, Therefore, "taiki (air)" is considered to be omitted In English, "it" is used. The Agent Case cannot be omitted in (standard) English, and therefore, the omitted word, "it" is inserted into the sentence. If PS1 in FIG. 59 is translated into natural language, this will be, {Nabe dewa ondo ga takai (The temperature in the pot is high)}. If the word "atsui 熱い" is not used in PS1-PS2, it will be, {Nabe ha ondo ga takai (temperature of pot is high)}.

I have already explained using FIG. 27, that thc oicaning structure of {A2 ga {A2 jishin ni - ga aru} jotai ni suru} {to put A2 in the condition of (. . . is in A2 itself)} is the same as the meaning structure of {A2 ga . . . o motsu (A2 has . . . )}. When "aru" is used instead of "suru", the verb becomes "motte iru". If this is applied, the above sentence will be, {Nabe wa takai ondo o motte iru (the pot has a high temperature)}.

Given the above considerations, we can understand that the expression {Nabe wa atsui} includes the expressions {nabe dewa ondo ga takai (the temperature in the pot is high)}, {Nabe we ondo ga takai (the temperature of the pot is high)}, and {Nabe wa takai ondo o motte iru (the pot has a high temperature)}. If any one of these expressions is used, the meaning structure of the expression will be the same; therefore as will be mentioned later, when a question/answer text contains the sentence {Nabe wa atsui (the pot is hot)}, we can then answer {Hai, nabe wa ondo ga takai desu (yes, the temperature of pot is high)} in reply to the question, {Nabe dewa ondo ga takai desu ka? (Is the temperature of the pot high?)}.

Expressions such as {Nagasaki no Taro (Taro of/from/in Nagasaki)} and {Taro no otouto (Taro's younger brother)} often appear in natural sentences, and I consider that this type of expression has a meaning structure as shown in FIG. 60, where (a) shows that {Nagasaki niwa Taro ga iru (Taro is in Nagasaki)} refers to Taro and (b) shows that {Taro niwa otouto ga iru (Taro has a younger brother)} refers to the younger brother. That is, when Case A is extracted from PS-E which shows the existence of {- ga iru}, the sentence becomes as shown above. However, {otouto no Taro} is considered to have been extracted (Taro) from the sentence {Taro wa otouto de aru}. If this is shown using a structural sentence, it will be as seen in (c). In other words, Case A shall be regard to have been extracted from PS-I, which shows the condition {-wa -de aru (- is -)}. The sentence {A no B (B of A)} does not show that B of Case A was extracted either from PS-E or from PS-I. If A is a word which shows an attribute, such as {otouto (younger brother)}, it can be understood that A was extracted from PS-I, but there are many delicate expressions in natural sentences, and it is often impossible to judge their type. However, the expression {-no} is basically used for expressions that are quite vague, and therefore, when it is difficult to make a judgement about a word, the sentence shall be analyzed using PS-E. Then a method to increase the reliability of the analyzed result by engaging in reasoning, and then checking its rationality shall be used.

When Case P (Predicate case) is removed from the natural sentence {Ima koko ni hon ga sonzai suru}, it will be {ima koko deno hon no sonzai}, as previously explained. If this is shown with a structural sentence, it will be as given below.

```
(hon) no (ima) - (koko) deno - (sonzai)
[A         T          S          O   P]
                                     ( )
```

If the words "ima" and "koko" are removed, the sentence will then be as given below.

```
(hon) no (  ) - (  ) deno - (sonzai)
[A        T      S          O   P]
                                ( )
```

Consequently, the sentence will be {hon no sonzai}. In addition, if "hon" is removed, the structural sentence will be as given below.

```
(  ) no (  ) - (  ) deno - (sonzai)
[A       T      S       O   P]
                            ( )
```

and the expression becomes only {sonzai}. The phrase {hon no sonzai} is a concrete expression, but {sonzai} will be considered an abstract expression. The word (letter line) inserted into Case P is often the label used to represent this meaning frame. Given this fact, it shall be assumed that when a word is inserted into a MW other than Case P, it is a concrete expression, and when a word is inserted only in Case P, it is an abstract expression.

FIG. 32 shows the {ataeru} meaning structure. No word is inserted into this meaning structure, and therefore {ataeru} is considered to express an abstract meaning, which will be as given below. At first, {something (A1) existed someplace (A3)}, but at this moment, {something (A2) creates} the condition in which {something (A1) exists someplace (A2)}. In other words, the meaning structure {ataeru} consequently expresses the meaning that {something (A3) creates, at some time, someplace} the conditions that {something (A2) has something (A1)}; that is, {something (A3) ataeru (gives) something (A1) to something (A2) sometime and somewhere}. Here, the words "exist (sonzai)" and "has (motte iru)" are words which are not expressed in the natural sentence. (Particles and symbols of the MWs in which no word is inserted are usually not expressed.)

As previously mentioned, various meaning structures (concepts) are constructed by combining various basic sen tences, PSs, which are the basic meaning units, IMI; then a word (letter line) is alloted to each meaning structure as its label. The meaning structure (meaning concept) constructed in this way is called the "meaning frame", IMI-FRM. Then the meaning frames into which no word has yet been inserted, that is, the meaning frames which express abstract meaning concepts, are gathered to create a meaning frame dictionary, DIC-IMI.

The data structure, PS, of the meaning frame is stored in the DPS data area, and the data structure MW is stored in the DMW data area. The location of the meaning frame corresponding to each word is shown by the PTN table, PTN-TBL, provided in FIG. 61. We can understand that DPS is stored in the PTN table from dps-st to dps-ed, and that DMW is stored in the same table from dmw-st tp dmw-ed. A ptn-no is attached to each meaning frame, and the ptn-no is written into the element PTN of each word, WD. Therefore, when ptn-no is extracted from the element PTN of the word, WD, the meaning frame of the word can be read out from the PTM-TBL. FIGS. 62 and 63 show the meaning frames, using the data sentence DT-S. In this way, the meaning frame which stipulates the abstract meaning structure (concept) using word(s), particle(s), and symbol(s) which are not expressed in the natural sentence, is registered in the meaning frame dictionary, DIC-IMI, in advance. When a meaning analysis, which will be explained later, is carried out, this meaning frame is read out and the meaning frames are combined according to the language structure information, IMF-LS, which can be obtained as the result of analyzing the structure of a sentence; thereafter, the abstract meaning frame of the input natural sentence shall be constructed; then the words, particles and symbols of the input natural sentence are input, to specify the meaning in a concrete way. After the above process has been completed, the meaning of the input natural sentence can be accurately expressed on the computer. This is the basic theme of this patent (application).

When a natural sentence is input into the computer, the computer takes it as one letter line, KNJ, and checks each of the letter lines, one by one, beginning with the first letter line, to see whether or not these letter lines are registered in the word dictionary, DIC-WD (See FIG. 65.) and in the Keitai (form) dictionary, DIC-KT (See FIG. 66.). Then the analysis of the structure of the sentence shall be carried out by applying the following method.

First, check each letter line input, from the first letter line, to determine whether or not each letter line is registered in the letter line dictionary, DIC-ST, using the letter line dictionary DIC-ST (See FIG. 64.) which contains only the letter lines from the word dictionary, DIC-WD (See FIG. 65). If some of the letter lines are found to be registered, read out the language structure information, IMF-LS, such as LS, PTN, NTN, and LO, for the registered letter lines, and store the IMF-LS in the WS table. Then, check the letter lines that have been retrieved and the letter lines that are to be connected, using the form dictionary DIC-KT (See FIG. 66) for the rest of the letter lines that will be input after the retrieved letter lines have been removed from the total letter-line input. Certain letter lines and their connectable letter lines are entered in the form dictionary, DIC-KT. The letter lines in this dictionary are classified by their inflected forms as adjectives, verbs or adjectival verbs, and also by part of speech i.e. noun, auxiliary verb, etc. after they are retrieved from the word dictionary, DIC-WD. Retrieval is done using the form dictionary, DIC-KT; however, the classification names used to carry out such retrieval through the form dictionary, DIC-KT, are stored in the element KY of the word dictionary, DIC-WD. Therefore, read out these classification names, then start retrieval within the scope designated by these classification names. After the letter lines registered in the form dictionary, DIC-KT, have been found, and the retrieval has been successful, read out the language structure formation, IMF-LS, for these letter lines, and write the IMF-LS in the WS table. This language structure information, IMF-LS, however, is not recorded in the form dictionary, DIC-KT, but rather is entered in the Keitai (form) processing table, KT-PROC. The scope of the stored language structure information, IMF-LS, which corresponds to the retrieved letter line, KNJ, is stored in the element kt-ed and the element kt-st of the form dictionary DIC-KT. Therefore, the language structure information can be read out. Next, the letter line(s) which can be connected with the retrieved letter line is/are mentioned in the section of the classification names shown in the element ndiv of the form dictionary, so that retrieval is carried out within that scope. If this retrieval has been successful, retrieval is continued, again using the previously mentioned method, according to the classification names in the element ndiv represented by the retrieved letter line(s). Retrieval will be continued until the end of the element ndiv. When the ndiv has reached the end, there is no other letter line with which to connect. Therefore, the retrieval of the rest of the input letter lines will be continued by the previously mentioned method, after returning to the retrieval process using the letter line dictionary, DIC-ST, as shown at the beginning. If no more input letter lines remain, the analysis of the structure of the sentence has been completed. In this way, the natural sentence is converted to the WS table which is made up of language structure information, IMF-LS, and other factors for the next meaning analysis. The previously given analysis of the sentence structure will be explained more thoroughly using the following sentence as an illustration.

{Taro to Jiro wa Hanako tachi ni bara dake o purezento shi ma shita}

When the above sentence is input, whether or not each letter line, KNJ, is registered in the letter line dictionary, DIC-ST (See FIG. 64) shall first be checked, beginning with the first letter line of the natural sentence. FIG. 64 shows the letter line dictionary, DIC-ST, which is the minimum that is necessary for explanation here. Among the letter lines from the beginning of the above-mentioned natural sentence, "Taro" is registered in the letter line dictionary, DIC-ST, and therefore, if "Taro" is removed from the above natural sentence, it will be as shown below.

{to Jiro wa Hanako tachi ni bara dake o purezento shi ma shita}

The word which has the letter line, KNJ, for "Taro" in the letter line dictionary DIC-ST is WD-NO/1. Data regarding the "taro" of WD-NO/1 is mentioned in the word dictionary, DIC-WD. (See FIG. 65). Remove PTN, which shows the location (address) of the meaning frame, which will be explained later. The language structure information, IMF-LS, from the word dictionary, is stored with PTN in the WS table, shown in FIG. 68. Here, the language structure symbol, LS, of DIC-WD is shown by separating LS into 3 symbols, LS1, LS3, and LS4. LS, expressed in 4 hexadecimal digits, is divided into 3 parts; the first two digits referring to LS1, the third digit referring to LS3, and the final digit referring to LS4. The classification name for starting the retrieval process is shown in the element KY of the word dictionary, DIC-WD. This is required to start retrieval using the form dictionary, DIC-KT. The classification code for "Taro" is KT/ff20 (the last two digits are "div"), and therefore, we check to determine whether or not the letter line of the above-mentioned natural sentence (to Jiro wa - - - } is the letter line shown by the scope of div 20. As seen in FIG. 66, "to" is within this scope, and we can therefore retrieve "to". Both kt-st and kt-ed for "to" in DIC-KT are 179, and therefore, the language structure information, IMF-LS for this "to" can be extracted from kt-proc-no/179 in the form processing table, KT-PROC. (See FIG. 67.) The extracted IMF-LS is stored in the WS table. (See FIG. 68.) The language structure information, IMF-LS, including LS1, LS3, LS4, PTN, LOG, NTN, LOG, and KNJ, is stored in the WS table. As previously mentioned, LS was divided into 3 parts, LS1, LS3, and LS4. The ndiv for "to: in the form dictionary, DIC-KT, shows “end”; therefore, at this stage, we discontinue retrieval with the form dictionary, and start retrieval beginning with the rest of the letters of {Jiro wa Hanako tachi ni bara dake o purezento shi mashi ta} using the letter line dictionary DIC-ST shown in FIG. 64. “Jiro” is registered in this letter line dictionary, DIC-ST. “Jiro” is WD-NO/2. This language structure information, IMF-LS, is extracted from the word dictionary, DIC-WD, and is stored in the WS table. WD-NO2 is KT/ff20; therefore, retrieval using the form dictionary starts from div/20. We can retrieve “wa”; therefore, we read out the language structure information for “wa” from ktproc-no/249 of the form processing KT-PROC, and store the language structure information IMF-LS for “wa” in the WS table. We discontinue the retrieval of “wa” using the form dictionary, because “wa” is ndiv/end. Then, we begin again with the retrieval for the rest of the input letter lines {Hanako tachi ni bara dake o purezento shi mashi ta} by using the letter line dictionary, DIC-ST. “Hanako” is registered in this letter line dictionary. We store the language structure information IMF-LS for “Hanako” in the WS table, and carry out the retrieval regarding div/20 using the form dictionary. Here, we can retrieve “tachi.” We read out the language structure information for this “tachi” from ktproc-no/165 of the form processing table, KT-PROC, and store the read-out data in the WS table. Because “tachi” is ndiv/20, we once again retrieve the rest of the letter lines {ni bara dake o purezento shi mashi ta} by div/20 using the form dictionary. Then we can retrieve “ni”, read out the language structure information, IMF-LS, for “ni” from ktproc-no/254 in the form processing table KT-PROC, and store the read-out data in the WS table. Because ndiv of “ni” shows “end”, we once again discontinue the retrieval process with the form dictionary here, and start to retrieve the rest of the letter lines {bara dake o purezento shi mashi ta} using the letter line dictionary, DIC-ST. After “bara” is retrieved, its language structure information, IMF-LS, is stored in the WS table. Then, after “dake” is retrieved using the form dictionary in div/20, its language structure information IMF-LS is stored in the WS table. For “dake”, ndiv is 20; therefore, we restart retrieving the rest of the letter lines. After “o” is retrieved, we store its language structure information in the WS table. Because the ndiv of “o” is div/end, this means that retrieval using the form dictionary is completed. We then start to retrieve the rest of the letter lines {purezento shi ma shita}, using the letter line dictionary. After retrieving “purezento”, we store its language structure information in the WS table. Because the KT of “purezento” is c, we start to retrieve the rest of the letter lines {shi ma shita}, using div/c in the form dictionary. After “shi” is retrieved, we read out its language structure information from the form-processing table, and store its data in the WS table. The ndiv of “shi” is 5a, which means that we proceed with the retrieval of the rest of the letter lines {ma shita}, using div/5a. After successfully retrieving “ma”, we store its language structure information in the WS table. The ndiv of “ma” is 14; therefore, we retrieve the rest of the letter lines {shita} using div/14. After retrieving “shita” here, we store its language structure information in the WS table. The ndiv of “shita” is “end”: therefore we continue the retrieval process by using the letter line dictionary once again. However, at this time there is no remaining letter line, so the analysis of the structure of this sentence is completed. If the retrieval using the letter line dictionary and form dictionary has failed, it means that some letter line which is not registered in either dictionary is in the input natural sentence, and therefore the analysis of the structure of the sentence will stop at this point. This indicates that it is not possible to analyze the structure of the sentence.

Only the minimum necessary information on the previously mentioned letter line dictionary, word dictionary, form dictionary, and form processing table, are; however, they are quite voluminous and have complex structures. FIGS. 69–73 show the WS table converted to language structure information and dictionary information by analyzing the structures of the natural sentences shown below through the use of a similar method.

{Jiro wa Taro ga Hanako ni bara o atae na katta to wa omo wa na katta rashi i yo}

{Bara wa Jiro ni-yotte taro ni-taishite Hanako ni atae sa se ra re na katta}

{Jiro wa Taro ga Hanako ni okane o age ta node Hanako ga Tokyo e i tta to omo tta}

{Genki na taro ga kyo gakko de shiroi bohru o nage mashi ta}

{Taro no Hanako eno bara no purezento wa ari ma sende-shita}

As previously mentioned, analysis of the structure of a sentence converts the letter lines of the input natural sentence into language structure information lines, IMF-LSL, using the word dictionary, DIC-WD, and the form dictionary, DIC-KT. The meaning is analyzed by the method described below using the language structure information lines, IMF-LSL. The results of the meaning analysis are expressed by the PS data structure(s) and MW data structure (s) as the data sentence, DT-S. The MK table, MK-TBL, which stores the intermediary progress of the meaning analysis, is prepared from the WS table, which stores the language structure information lines, IMF-LSL; then the meaning is analyzed using this MK table. This will be explained below using a concrete example.

FIG. 68 shows the WS table which stores the language structure symbol lines, LSL, which were converted from the letter lines obtained by analyzing the structure of the natural sentence, {Taro to Jiro wa Hanako tachi ni kyo gakko de bara dake o purezento shi ma shita}. Elements LS1, LS3, and LS4 of this WS table are copied into elements LS1, LS3, and LS4 of the MK table. (FIG. 74) Then the number, WS-NO, of the WS table, is stored in the element WSNO of the MK table. After this process, the information regarding the word(s) can be extracted easily from the element WD in the WS table, which is obtained according to WSNO. In addition to element WSNO, the MK table contains elements MKK, PSMWK, and NO. The “end” marker, which indicates the final data, and the various items of data used to carry out a meaning analysis are stored in element MKK. FIG. 74 shows the MK table, MK-TBL, which was prepared by the above process. As I will explain more thoroughly later, the meaning analysis presented here as an example will not analyze the sentence one word at a time from its beginning. Rather, the meaning analysis will be carried out by applying various types of meaning analysis grammar, IMI-GRM, to the language structure information line, IMF-LSL; then, if there are any applicable rules, a meaning analysis will be carried out even for only a part of the sentence. The meaning analysis introduced here uses an active method to carry out the analysis, beginning with the sections which can be analyzed, as mentioned above. Therefore, even though the meaning of some part of the sentence has been determined, often the conformity of each section to the entire context may not be perfect; which means that this imperfect part remains in the MK table as an intermediary result. Meaning analysis is then carried out on this intermediary result, by using the meaning analysis of the other language structure symbol line(s), LSL.

FIG. 75 shows the program for the meaning analysis ( ), written in the C Language format. In the explanatory sentences which follow, ( ) will be added after the letter line, and each letter line will be underlined, to show that the letter line is the program or the function for carrying out various language processes, the detailed content of the meaning analysis grammar, IMI-GRM. This program consists of the following.

(1) AND-OR relationship( ): to check for the existence of the AND-OR logical relationship between words
(2) SINGULAR/PLURAL relationship( ): to check whether or not a noun is plural
(3) "NOMI"and "SHIKA"relationship( ) and XP relationship( ): to check among the various logical relationships for "nomi", "dake", "shika" and "sae" relationships
(4) VERB relationship( ): to detect each word equivalent to a verb, and to read out the meaning frame of that word, or to construct a larger meaning (IMI) frame, by combining a certain number of meaning (IMI) frames, and inserting the word(s) related to each meaning frame.
(5) INSERTION OF EXTRACTED WORDS relationship( ): searches for the word(s) considered to have originally been extracted from the meaning frame, and inserts each word into its original meaning frame.
(6) ADJECTIVAL VERB-RELATED relationship( ): carries out the necessary processing when an adjectival verb is found.
(7) ADJECTIVE-RELATED relationship( ): processes each adjective found.
(8) pimpp-RELATED relationship( ): carries out the required processing when there is an implicit relationship between PSs in the basic sentence.

These relationships are stored in the { } of the "while (1) { }". After this is:

(9) REDUCTION OF MK TABLE relationship( ) which reduces the MK Table.

After a meaning analysis ( ) has been executed, each function stored in the { } of this "while (1) { }"will be executed beginning from the top. After the processing involving these functions has been successfully completed, "1" returns to { }, and the function becomes >0. This "whole (1) { } program is stopped by a "break". At this time, the REDUCTION OF MT Table ( ) starts. This program removes data which is no longer needed in the MK table. Element MKK for the data which is no longer needed in the MK table, becomes "0". Therefore, this program identifies the MKK/0 data and removes it. It next eliminates vacant spaces and arranges all -the data together, renumbering the data in order.

After this, the function again enters into the { } of this "while (1) { }", and executes each of the functions in order beginning at the top. As I will mention later, grammar rules are stored in the "if (equation)" section of each function; therefore, after each grammar rule has been concluded, the function in the { } of the "if (equation) { } will be executed. If this has been successful, "1" returns, as previously mentioned. If the processing of all functions in the ( ) of "while ( ) { } of the meaninganalysis ( ) program has been attempted relative to the MK table, and no grammar rule can be applied, the meaning analysis has been completed. Therefore, return the function to "1", using "return (1)". This program will then be completed.

The meaning analysis ( ) program shown in FIG. 75 is arranged in order as shown below.

(1) AND-OR relationship ( )
(2) (Singular)/plural relationship ( )

However, it is not particularly necessary to arrange them in this order. What is important is the order used to carry out each function in order to execute an accurate meaning analysis. Therefore, various techniques can generally be used to do this.

After the above meaning analysis ( ) is executed, and MK table operations are carried out for the above-mentioned input natural sentence, the grammatical rules stored in the AND-OR relationship ( ) are concluded, and the AND-ORcombination ( ) is executed. FIG. 76 shows the content of the AND-OR relationship ( ) program in a "C" language format. The following rules are stored in the "if" (expression) which is in the { } of the "while (1) { }" of the AND-OR relationship ( ) program. The following section offers a simple explanation of the rules.

The "i"th element LS1 of the MK table is 0×11. (In the hexadecimal number, "11" shows a noun.) If this is written using the "C" language format, it will be MK[i].LS1==0×11. When the element LS1 in the MK table of the following "i+1" is a logic particle (written in the "C" language format, this is MK [i+1], then LS1==0×51. (* NOTE: 0×51 indicates a logic particle.) When the LS1 in the MK Table of the following [i+2] is a noun (MK[i+2] in the "C" language format), (then) LS1==0×11. In other words, this grammatical rule is applied to check whether the arrangement of the input natural sentence is : noun+logic particle+noun, in the element LS1 of the MK table. This grammatical rule determines whether or not this qualification will be concluded, regarding each item, one by one, from i=0 to mk=max. In FIG. 74, this grammatical rule, that is, this qualification, is concluded by i=0, and therefore, the program in { } or "if (expression) { }", or, in other words, the AND-OR combination ( ) is executed. FIG. 77 shows the structural sentence after the meaning analysis of this input natural sentence has been completed, and FIG. 78 shows the data sentence, DT-S.

The AND-OR combination ( ) executes the following processing. In the TMW data realm shown in FIG. 78, it ensures both TMW1 and TMW2, stores "Taro" in the element WD of TMW1, and stores "Jiro" in the element WD of TMW2. It then writes the "2" of TMW2 in the element N of TMW1, writes the "1" of TMW1 in the element B of TMW2, and writes "1000", a 4-digit hexadecimal number, in the element LOG of TMW1 to indicate that TMW1 and TMW2 are combined with "AND" of the logical relationship. The relationship, TMW1 (Taro) AND "to" ==> TMW2 (Jiro) is determined by these processes. (See FIG. 77.)

The relationship, TMW1 (Taro) AND "to" ==> TMW2 (Jiro), is already determined, but its meaning has not yet been determined in the context of the input natural sentence. In order to show this, the TMW1 on the left side will remain as a representative, and the rest of the TMWs will be removed from the MK table. "MW" will be stored in the element PSMWK of No. 0 MK in order to show that MW remains, and its number, tmw-no/1, will be written in the element NO. In order to execute this, it should be written in "C" language as shown in FIG. 76, and as shown below.

```
MK [i].PSMWK=MW:
MK [i].NO=tmw-no;
```

(Here, however, tmw-no is "1".)

To remove the first and second MKs, "0" is written in the element MKK of MK. If this is written in "C" language, it will be as shown below.

$MK\ [i+1].MKK=0;\ MK[i+2].\ MKK=0;$

After making the element MKK of MK "O", as shown above, and executing the Reduction of MK Table ( ) program in the Meaning Analysis ( ) program, the MK data which becomes MKK/O will be removed from the MK table. Then the vacant spaces between the data will be eliminated and each item of data will be renumbered. FIG. 79 shows the MK table after the above-mentioned processing has been completed.

After executing the AND-OR combination ( ), return to "1". This will complete this program. (This is written as "return(1);)" in "C" language.)

Then begin the Meaning analysis ( ) and process the data of the reduced MK table from the beginning with the functions in { } of "while (1) { }". The grammatical rule for the AND-OR relationship ( ) is not concluded by this MK table; therefore, execute the (Singular)/plural relationship( ) next.

The (Singular)/plural relationship ( ) is not illustrated. It has a grammatical rule that is used to check for the existence of the arrangement of language structure symbols, noun (0×11)+plural particle (0×42). As shown in FIG. 79, i=2 will be "Hanako tachi", that is, noun+plural particle, and Plural processing ( ) will be executed. Considering that "Hanako" and someone else equivalent to Hanako are there, they are in a "PU" relationship (plural relationship) similar to the AND relationship. The relationship shown by TMW3 (Hanako) PU tachi ==> TMW4*(soto) will be constructed as shown in FIG. 77 and in FIG. 78(*b*). In other words, store "Hanako" in the element .WD of MW3, store "tachi" in the element .jpu, store "10" (the logical relationship of the plural is shown by "10" of the 4-digit hexadecimal number) in element LOG, and store "4", which is the partner MW, in element N. Then to prohibit the expression "soto", store "soto" in the element .WD of MW4, store "e###" in the element BK, and store "3", which is the number of the partner MW3, in the element B. The process of describing the relationships in the above section has now been completed, but the meaning of that section in the input natural sentence has not yet been determined. Therefore, allow TMW3, in which "Hanako" is stored, to remain as the representative, and completely remove the remaining words from the MK table. To do this, as explained previously, store "MW" in the element PSWMK of MK, store "3" in the element NO of MK, and store "O" in the element MKK of the other MW(s).

The processing of this function for the AND-OR relationship( ) will be completed when you return (to) "1". Reduction of the MK Table ( ) is done to reduce the MK table, and to execute the processing of the function(s) in { } of the "while(1){ } of the Meaning analysis ( ).

There is nothing which falls under the grammatical rules in the AND-OR relationship ( ) and the (Singular)/plural relationship ( ); therefore, the XPrelationship ( ) grammatical rule will be applied. As can be seen from FIG. 79, when the XP relationship ( ) process of Noun (0×11)+XP logical particle (logical particle such as "dake", "nomi", "sae", "sura" and "shika", 0×43) has been concluded, the following processing is executed. Ensure TMW5 and TMW6 in the MW data realm, as shown in FIG. 77 and in FIG. 78(*b*), and store the TMW5 (bara)XPdake ==> TMW6* (igai) relationship, using the previously explained method. This shows that "bara" and "igai" have a "dake" logical relationship (XP relationship). As in the previous process, when only "bara" is left in the MK table, and the remaining words are removed, the MK table will be as shown in FIG. 80. The language structure symbol(s) shown by this MK table are equivalent to the natural sentence, {MW1 (Taro) wa kyo gakko de MW3 (Hanakao) ni MW5 (bara) o purezento shi ma shita}.

When Meaning analysis ( ) is executed again using this MK table, there is nothing corresponding to the grammatical rule shown by the qualification "if" of the AND-OR relationship( ); (Singular)/plural relationship ( ); and XPrelationship ( ); therefore, we "pass" on the Meaninganalysis ( ), waiting until later to complete it. However, the word "purezento", which is handled as a part of speech equivalent to a verb, is in the MK table. Therefore, Verbrelationship ( ); is executed. FIG. 81 shows the content of the Verb relationship ( ) program in "C" language. The grammatical rule for this function is stored in the qualification, "if (expression) { }, which checks for the existence of verbs (0×12) and parts of speech equivalent to verbs (0×13), from i=0 to i>mk-max. As shown in FIG. 80, a part of speech equivalent to a verb is discovered when i=6, so the program in the ( ) of "if (expression) { }" is executed. The LS1 which is next to the part of speech which is equivalent to a verb does not have 0×73, and therefore, the next process, Read out of IMI frame ( ); is executed. This process skips from WSNO/10 to the WS table shown in FIG. 68, reads out PTN/14 from the WS table, and locates the address of this meaning frame in the meaning frame dictionary from FIG. 61. It then reads out the meaning frame from the meaning frame dictionary shown in FIGS. 62 and 63. The PS data and MW data shown in FIG. 78 were copied from the DMW module in FIG. 62 and the DPS module shown in FIG. 63. The meaning frames for "purezento" are from 22 to 24 of the DPS module, and from 101 to 116 of the DMW module. The meaning frames from which "purezento" is read out, include PS 1 to PS 3 and MW 7 to MW 23. "Purezento" is stored in the element *WD of the MW in Case P of the root PS of these meaning frames.

Insertion of PS relationship particles ( ); is executed next. This program store the suffix particle jgb ("shi", here), of the verb, the tense-negative particle jntn ("ma" in this example) which expresses politeness, negativity and tense, the tense-negative-suffix particle jn ("shita" in this example) and the "zentai" (whole) particle jm, in each suitable location in the PS data and MW data in order to set the element MK of the MK tabel at "0", and also removes all stores particles from the MK table. In this MK table, the suffix particle jgb for verb conjugation is shown as "71" in the element LS1; the tense-negative particle, jntn, is shown as "91"; the tense-negative suffix particle, jn, is shown as "92", and the Zentai particle, jm, is shown as "81"; therefore, if these particles are present, they can be found easily. "shi" was stored in the element .jgb of MW22 of FIG. 78(*b*), "ma" was stored in the element -jntn, and "shita" was stored in the element -jn of TPS3.

If a part of speech equivalent to an auxiliary verb, and/or an auxiliary verb follows this verb, "while (1) { }", which is identified by the marker, /*B*/, will be executed to process these auxiliary verbs. The qualification, "if (expression) { }", which is in the above { }, is shown below.

$MK\ [k].LS1{=}{=}0{\times}16||MK[k].LS1{=}{=}0{\times}12)$

This shows that the "k"th word in the element LS1 of the MK table is 0×16 (auxiliary verb) or verb (0×12), in "C" language. This program will be thoroughly explained later.

In the example above, however, there is no auxiliary verb. Therefore, break (off) this program and pass through from the ( ) of this "while ( ) { }", and execute the next program, Insertion of word into IMI frame ( ). FIG. 82 shows this program. The number of the MK table in which the verb is located is stored in "kpbot", as shown in FIG. 80. Using this as the starting point, analyze the MK table in one direction (or in reverse). First, as shown in FIG. 80, if (*MK*[*k*].*LS*1==0×11¦¦*MK*[*k*].*LS*1==0×73¦¦*MK*[*k*].*LS*1==0×72)

As shown above, when there is a noun N (0×11), a case particle jcs (0×73), or a stress particle jost (0×72), the sentence in the { } of "if ( ) { }" will be analyzed. (In "C" language, "¦¦" shows the logical relationship, "OR".)

if(*MK*[*k*].*LS*1==0×72 *kpjost*=*k*--;

The above is in "C" language, and shows that if there is a stress particle jos (0×72), the number "k" showing where the stress particle exists, is stored in kpjost, and "k" is changed to "k−1". After this is done, if there is a noun, (0×11), no further processing shall be executed, as shown below in "C" language.

if(*MK*[*k*].*LS*1==0×11 *k*--;

and if(*MK*[*k*].*LS*1==0×73 && *MK*[*k*−1].*LS*1==0×11)

In the above case, in other words, when the sentence has become "noun+case particle", the number "k" showing where the case particle, jcs, is located, is stored in kpbl, and the number k−1 showing where the noun, N, is located, is also stored into kpb2 temporarily. The case particle has already been stored in advance, in MK[kpb1].WA. This case particle is therefore extracted and written in WAK, then the program, Is there only one case particle designated by WAK in the IMI frame ? ( ) checks to determine whether or not the case particle which was previously read out is in the "purezento" meaning frame. Then, the table KWDJO is prepared, to store the case particle which was confirmed in the meaning frame, and the noun which is the combination partner, that is, (noun+case particle). At this time, the stress particle, jos, is also stored in the table. The same word cannot be inserted twice into a meaning frame, (IMI), and therefore only one word which has a case particle, WAK, whose existence has already been confirmed, will be accepted.

The case particle checked first in this text sentence is "o" of "bara+o". If the case particle, "o," is in the meaning frame, the meaning analysis of the noun, case particle, and stress particle, is considered to be completed at this time, and these will be removed from the MK table. Therefore, the MK table will read as shown below.

*MK*[*kpbl*].*MKK*=0;

*MK*[*kpm*].*MKK*=0;

*MK*[*kpjost*].*MKK*=0;

Set "k−=2" as the "k" number, and move that 2 units in the reverse direction in the table MK, then execute the program in the { } of "while (1) { }". Repeat this process. When there are no more case particles to be inserted into the meaning frame, the "k" number of the MK table at this time will be stored in "kptop", and will be determined as the upper limit (kptop) of the scope within which words to be inserted into the meaning frame exist. FIG. 80 shows the position of kptop. In this test sentence, the KWDJO table will be as shown in FIG. 83. Then move "k" in the positive direction from kptop, the upper limit, or in other words, in the direction which increases the "k" number, to the base point, kpbot, selecting only the nouns from among the words which have not yet been analyzed (words for which element MK is "0"), and store these in the KWD table. This should be done only with nouns which have no case particle. FIG. 84 shows the KWD table. The word "kyo" is the only noun without a case particle in this text sentence. In this way, the noun+case particle combinations (KWDJO table) and the nouns alone (KWD table) which can be inserted into the meaning frames, are identified. The next problem is where these nouns and case particles will actually be inserted in the meaning frames. The next program inserts these nouns and case particles.

The Insertion of words and case particles of the word-case particle table ( ) program is used for nouns+case particles, and the Insertion of word of the word table ( ) program is used for words alone.

The KWDJO table and KWD table have been prepared so that the priority order can be freely selected when inserting each word. When selecting a word+case particle, the combination is extracted from the bottom of the KWDJO table for insertion, and the individual word for insertion is extracted from the top of the KWDJO table. A case which is stipulated within a language structure has its own proper case particle to express the case by its function and position. However, there is not only one case particle; there are often multiple case particles within a language structure. Also, when the language structure is changed by the synthesis of that language structure with another lan guage structure, the original function and position of the case in its original language structure is relatively changed in the total language structure, and therefore, such a case particle may sometimes change to express the changed function and position of the case.

As mentioned above, a proper case has a certain number of case particles, which are clearly stipulated by their positions and functions in the case language structure. Therefore, a case particle can be specified by describing the position and function of the case. In this patent application, each word is inserted into the meaning (IMI) frame, IMI-FRM, according to this basic theory. Using the form of a 4-digit hexadecimal, jindx-x and jindx-y are already stored in the element jinx of the meaning (IMI) frame, and its case particles are stipulated. The third and fourth digits of the 4-digit hexadecimal show jindx-y, while its first and second digits show ndx-x. FIG. 85 shows the case particle table, JO-TBL. In this table, two case particles are designated by the two positions, (jindx-x, jindx-y) and (jindx-x-1, jindx-y), in the JO table. A combination of noun+case particle is inserted into the meaning frame through the following method.

A searching path, SR-PT, is set up in the structural sentence which was converted from the input natural sentence, and each MW is traced along its searching path. When an MW is found into which insertion of a word is al lowed (which has a case particle the same as that of WAK) and into which no word has yet been inserted, a word is inserted into the element WD of that MW. This operation is carried out for all words in the KWDJO table.

The searching path, SR-PT, set up for the "purezento" meaning frame, is shown in FIG. 86, using a line marked by arrows. For the MW with case particles, two case particles are shown using ( ) ( ). The former ( ) shows the case particle at (jindx-x, jindx-y), while the latter shows the case particle at (jindx-x+1, jindx-y). Root PS (PS3) is given as the starting point, then the case selection order in the basic sentence PS is determined. Here, the order of cases has been determined as ATSOP. The order of cases in FIG. 86 has been arranged in the ATSOP order to make it easy to understand. When a search begins at the starting point, PS3, Case $A_3$ is selected first, then the search moves to its MW18. Then a check is run to see whether or not its case particle ( ) matches the case particle ( ) of WAK. If these case particles do not match, the search moves up to MW19 of Case $T_3$, and the same process is carried out again. When PS is combined with some case on the upper level, such as case $O_3$, the process moves to PS2 on the upper level, before moving to the adjacent Case $P_3$. The searching path shown in FIG. 86 can be set up using the above method. This search path is traced to search for an MW which has a case particle that is the same as that of WAK, and into which no word has yet been inserted. First, the case particle (jindx-x, jindx-y) is checked, and if the above-mentioned MW cannot be found on that path, the search traces the same path once again, and checks (jindx-x+1, jindx-y). If an MW satisfies the previously mentioned insertion conditions, insert the word into the element .WD of that MW, and insert the case particle, WAK, at this time into the element .jcs of that MW. This data can be inserted, as has been confirmed by the program : Is only one case particle designated by WAK present in the IMI-FRM ? ( ). Therefore, all of the nouns and case particles in the KWDJO table can supposedly be inserted.

FIG. 87 shows the program : Insertion of word-case particles of the word and case particle table ( ), written in the "C" language format. I have entered ms=jindx-x+1 in FIG. 87 because, if the Case particle search ( ) carried out for (jindx-x, jindx-y) has not been successful, this Case particle search ( ) will be done once again for (jindx-x+1, jindx-y). First, execute Case particle search( ) in the { } of "do { } while (jindx-x<=ms), and designate the starting point of the meaning (IMI) frame, IMI-FRM, by x=MK[kpnv].NO, as shown in FIG. 87, then execute the Set-upof searching path ( ) program. In the processing of the Set-up of searching path ( ), first designate the priority order of the cases in the PS of the basic sentence. Here, trace the cases in the order, APOST, to search for the case particle. The MW combined with Case A is designated by "nn=TPS [x]". Therefore, move to this MW from PS, and check for the existence of the case particle shown in WAK, using the Searching in MW ( ) program.

The first step in the Searching in MW ( ) program is to read out "jindx" from the element .jindx of that MW. Both "jindx-x" and "jindx-y" are stored in the element jindx. Fetch "jindx" from here, then fetch the case particle "wa", which is stored in the meaning (IMI) frame of the JO table, using wa=JO[jindx-y][jindx-x], if "wa" exists (if "wa" is not "O"). If the insertion of a word is allowed for that MW, and no word has yet been inserted, check the conformity of "wa" and "wak". If they match, complete the search, then carry out the search for the next word+case particle in the KWDJO table. If there is no case particle or if the insertion of a word is not allowed or if a word has already been inserted in the KWDJO table, move to the MW which is shown by the element .MW, and continue the search. An MW or a PS can be connected with an MW, but the procedure for setting up the search path will differ depending on whether an MW or a PS is connected. Therefore, execute the program, Judgement of whether branching is PS or MW ( ). If nothing is connected with the MW, (mw!=0), is shown. Then move to the MW which is indicated by "nt=MW[nn]". That is, move to the next MW on the right, and implement a search. When the Judgement of whether branching is PS or MA ( ) program is executed, and the branching is PS, (Branching is PS ( )>0), is shown. At this point, "xx" and "nnn" of the MW and PS numbers will be temporarily removed, as "xx=x; nnn=nn;" to enable the search to continue from this MW when the processing has returned to this point. Take out the previous PS and MW as "xx=x; nnn=nn;", and start the search again from that point. If the branching point is MW, (Branching is MW ( )>0)), read out the MW which is connected from this MW to the upper level, using nn=MW[nn].MW. Then return to that MW and carry out the search from there. At this time, the search path will also definitely return to this MW. Therefore, keep this MW and this PS temporarily, to enable the search to continue from this point. The search path is established by the above-mentioned method. While moving along this search path, find the MW on the path which has the same case particle letter line as that stored in the KWDJO table, and into which the insertion of a word is allowed (although no word has yet been inserted); then, insert the word and case particle into that MW. FIG. 77 shows, in a structural sentence, the results of an MW into which a word and case particle have been inserted via this process, while FIG. 78 shows these results in a data sentence.

When "c000" is entered in the element MK of the MW, the word which has the same content as the MW indicated by the element .RP, will be stored. Therefore, the same word will be inserted in both MWs, although the expression of the word which was first inserted is designated as available, and the expression of the word in the other MW is prohibited.

Words are inserted into only the KWD table by the Insertion of Word of Table word ( ) program, after the noun+case particle has been processed, tracing the same search path and search for an MW which is available for word insertion but into which no word has yet been inserted. Then, insert each word into each MW, in order, beginning with the MW which was found first.

I have already mentioned the method for checking (jindx-x, jindx-y) along the search path. In this case, if nothing is found, check for (jindx-x+1, jindx-y) once again, tracing the same search path, although it is possible to check for two case particles, (jindx-x, jindx-y) and (jindx-x+1, jindx-y), in the same search operation. The order of the cases in TPS here is determined as ATSOP. After an appropriate word order is selected, such as the standard APOST word order for English or the standard ATSPO word order for Chinese, according to the language structure of the natural sentence input, an accurate meaning analysis can be executed.

The sentence, {genki na Taro ga kyo gakko de shiroi bohru o nage ma shita}, is synthesized form 3 sentences, {Taro wa genki de aru}, {bohru wa shiroi}, and {Taro wa kyo gakko de bohru o nage ma shita}, as previously explained. Below, an explanation is provided for the meaning analysis of a synthesized sentence such as the one above.

When the structure of this input natural sentence is analyzed using the word dictionary, DIC-WD, and the form dictionary, DIC-KT, the result, as already mentioned, will be the WS table, which is shown in FIG. 73. FIG. 88 shows the MK table prepared from this WS table. When the Meaninganalysis ( ) program shown in FIG. 75 is executed for this MK table, there is no language structure symbol corresponding to the grammatical rules shown in the AND-OR relationship( ); (Singular)/plural relationship ( ); or XP relationship( ); and therefore none of these programs will be executed, although the "if (expression)" qualification when i=0 corresponds to the Adjectival verb relationship( ); program shown in FIG. 91. When this qualification is written in the "C" language format, it is as shown below.

if(*MK*[0].*LS*1==0×18 && *MK*[1].*LS*1==0×71 && *MK*[2].*LS*1==0×12)

That is, the grammatical rule, adjectival verb (0×18)+suffix particle (0×71)+verb (0×12) is concluded by "i=0", so that the program in the { } of "if (expression) { }" is executed. First, execute Readout of IMI frame ( );. As previously explained, this program reads out the number, WS-NO/0 in the WS table from i=0 in the MK Table shown in FIG. 88, and reads out PTN/22, which is the number of the IMI frame, from the WS Table in FIG. 73. Then, read out the IMI frames of the adjectival verb(s) to the PS data realm and the MW data realm, using the above mentioned numbers. The meaning frames read out are from PS1 to PS2, and from MW1 to MW8.

Next, insert "genki", which is an adjectival verb, into Case $O_2$, and insert "na", which is the suffix particle of the adjectival verb, into the element .jgb of MW7, as shown in FIG. 92, using the Insertion of adjectival verb and suffix particle ( ); program. This will complete the processing of "genki", "na", and " ". In order to remove these from the MK table, input the following data.

*MK*[*i*+1].*MKK*=0;*MK*[*i*+2].*MKK*=0;

The meaning analysis of this "genki na", that is, the meaning analysis up to this stage, has been completed, but the meaning of this section within the scope of the entire input sentence has not yet been determined. Therefore, to clearly show that the meaning of this section has not yet been determined, write "MK[i+2].NO=2" in tps-ed/2, which is the root PS, that is, the bottom PS of this meaning frame. Also, to show that it is a PS, first input "*MK*[*i*+2].*PSMWK*=*PS*", and then input "*MK*[*i*+2].*LS*1=0×22, and rewrite the content of the element .LS1 as "PS(0×22)". Then return to 1 using "return(1);". Processing therefore exit from the { } of "while (1) { }"of the Meaning analysis( ); program. After reducing the MK table, enter this { } again, and execute the Meaning analysis ( ); program from the beginning. FIG. 89 shows the MK table at this point. The Adjective relationship ( ); program, shown in FIG. 94, is executed next.

The "if (expression)" qualification can be applied when i=6; in the MK table in FIG. 89. Therefore, the program sentence in the { } of "if (expression) { }" can also be applied. First, read out the IMI frame of the adjective, to the PS data realm and the MW data realm, using the Readout of adjective frame ( ); program. The modules read out are PS3 to PS4, and MW9 to MW17, shown in FIG. 92.

Also, insert the adjective, "shiro" into the element .WD of MW16 of Case O4, and insert the suffix particle "i" of the adjective into the element .jgb of MW16, as shown in FIG. 92. To determine whether the analysis of "i" has been completed, create a setup as shown below.

*MK*[*i*+1].*MKK*=0;

Also, create a setup as shown below.

*MK*[*i*].*PSMWK*=*ps;*

*MK*[*i*].*NO*=*tps-ed;*

*MK*[*i*].*LS*1=0×22;

Store PS(0×22) in the element LS1, store "PS" in the element PSMWK in the MK table, and store tps-ed/4 in the element NO. "tps-ed" is the root PS of the IMI frame of the adjective. On this occasion, it is PS4. After the above, exit from "while (1) { }", using "return (1)". Then enter this program again, and execute the program from the beginning in the same way. The data which was set up as "MK[ ].MKK=0;" is removed from analysis when that word has been completed, then the MK table will be as shown in FIG. 90. When the Meaning analysis ( ) program is executed for this MK table, the result is as shown below and in the MK table in FIG. 90.

i=0; PS (0×22)+Noun (0×11)

Therefore, the grammatical rules in the Relationship ofinsertion of extracted words ( ); program, shown in FIG. 95, apply. When the arrangement of the language structure symbols is "(0×22)+Noun (0×11)", that noun is considered to be extracted from the frame represented by its PS. In {genki na Taro} and {shiroi bohru}, "Taro" and "bohru" are considered to have been extracted from the "?"positions of each of "{? wa genki de aru} Taro" and "{? wa shiroi}bohru", as previously explained. It is therefore necessary to process these nouns by inserting them into the meaning frames which are represented here by the root PS (PS2), thatis, the Relationship of insertion of extractedword ( ); program. Execute the program in the { } of this "if (expression) { }". The number of the root PS of the meaning frame into which the word is to be inserted is stored in the element NO in the MK table, and therefore, x=MK [i].NO;

The number of the root PS can be put into "x" via the above input (x=2, that is, PS2). This will be the starting point for the search of the meaning frame. Therefore, a search path which randomly designates the priority order is set up, and each MW on the search path is traced via the previously described method, searching for an MW into which a word can be inserted. This search path along the structural sentence of the {genki de aru} meaning frame is shown as a solid line in FIG. 96. When a search was done for MWs on this path into which a word could be inserted and into which no word had yet been inserted, MW4 was found first, and the word "Taro" was inserted into the element .WD of this MW4. To prohibit the expression of the word "Taro" in the element .WD in this MW when this structure is converted to a natural sentence, write "e###" in the element BK, as shown in FIG. 92. (# shows that any number can be applied, and "e###" shows that only the 4th digit from the right in this hexadecimal is designated, as "e".)

Usually words, particles and symbols have already been inserted into the meaning frames by the previously described method, and therefore, a word has to be inserted after finding a position into which nothing has yet been inserted. The position in which the word is to be inserted is the MW that is found first, and therefore the MW into which the word is to be inserted will be affected by the establishment of a search path, so the method used for setting up the path is important. Here, the order of cases in the PS are considered as ATSOP when setting up the search path; however, words, particles, and symbols cannot be inserted accurately into each position using this information alone. Therefore, I have used various procedures, such as attaching a priority order to each MW into which a word could be inserted, by setting up a search path with a variety of priority orders, selecting a suitable word for each MW with special characteristics, such as the Time Case and the Space Case. When the content of each word to be inserted is specified by CNC, each word is evaluated and selected using dictionary information about the word to be inserted, prior to inserting the word, or the content of each word is rationally assessed from the context before and after that word, and a judgement regarding the feasibility of insertion is made. Input K[i].MKK=0, and eliminate PS2. After this, input "return(1)", and exit from "while ( ) { }" of Meaning analysis ( ). If the Reductionof MK table ( ) program is execute, it will be as shown in FIG. 97-1, and the program will enter { }. The grammatical rule shown by the expression "if (expression)" of the Relationship of insertion of extracted words ( ); program can be also applied to i=5 (FIG. 97-1). Therefore, insert "bohru" into the "shiroi" meaning frame, using the same method as that has already been mentioned. After "bohru" has been inserted, remove PS4, which corresponds to "shiroi", in the same way as before, exit from this program using "return(1)", then execute the Reduction of MK table (); program. FIG. 97-2 shows the MK table. At this stage, the content of the MK table becomes the same as the content of {sono Taro ga kyo gakko de sono bohru o nage ma shita}. From this point, the meaning analysis will be the same as above. Consequently, FIG. 92 shows the results of the meaning analysis of the input sentence in a data sentence, while FIG. 93 shows the results of analysis of the input sentence in a structural sentence.

The "bohru" in MW10 and "Taro" in MW2, which are the words not inserted by the above-mentioned meaning analysis, were copied from MW13 and MW4, by the direction of element .RP.

The input sentence, {Jiro wa Taro ga Hanako ni bara o atae na katta to wa omo wa na katta rashi i yo} is considered to be the sentence created when the words and case particles "Jiro wa", "Taro ga", "Hanako ni" and "bara o" are inserted into the meaning frame, "atae ru to omou rashi i", which was created by synthesizing the "atae ru", "omou" and "rashi i" meaning frames. If the structure of the above-mentioned input sentence is analyzed, the WS table shown in FIG. 69 can be obtained. The MK table prepared from this WS table is shown in FIG. 98. When the Meaninganalysis ( ) program is executed, the verb (0×12) is in "i=8" in the MK table. Therefore, begin processing in the Verb relationship ( ) program (See FIG. 81.), and execute the program in the { } of the "if (expression) { }"of the Verb relationship ( ). First, the Read-out of IMI frame( ); is used for access to the "atae" meaning (IMI) frame: this is stored in the PS data realm and the MW data realm. As shown ni FIG. 100, the data from PS1 to PS3 and from MW1 to MW16 are (in) the PS and MW modules of the "atae" meaning (IMI) frame.

Then, using the Insertion of PS-related particles ( ); program, insert each particle related to a PS, such as the tense-negative particle "na", the tense-negative suffix particle "katta", the zentai (whole) particle "to" and the stress particle "wa" into each of the element .jgb, .jnth, .jn, .jm. and jost. (See FIG. 100 (*a*).) At this stage, the analyses of these words and particles are completed.

Then move to the execution of the next program in "while (1) { }", identified by "/*B*/" (See FIG. 81.) In the MK table, ".k" is the number at which any particle related to a PS becomes nonexistent. Here, the following will be concluded.

$$MK[k].LS1{=}{=}0{\times}16\ \&\&$$

$$MK[k].LS1{=}{=}0{\times}12$$

(Here, the hexadecimal "0×16" indicates the auxiliary verb, while the hexadecimal "0×12" shows the verb.)

Execute the Read-out of IMI frame ( ); program, and fetch the "omo" IMI frame from PTN/8. (See FIG. 61.) Then write in the "omo" meaning frame just after the end(s) of the PS data realm and the MW data realm. The PS module of the "omo" meaning frame is from PS4 to PS5, and the MW module of the "omo" meaning frame is from MW17 to MW24. Then insert the "atae ru" meaning frame into the "omo u" meaning frame, using the Combination of IMI frames ( ); program. This program sets up the search path in the "omo u" meaning frame, and while tracing each MW, searches for the MW into which the meaning frame can be inserted. When "a###" is written in the element BK of the MW ("#" indicates a random hexadecimal digit, and "a###" indicates that the 4th digit from the right in the hexadecimal is "a", while the other digits can be any numeral or letter) the word will be preferentially inserted into the element MW of that MW. If there is no MW with this marker, however, find an MW, on the search path, into which a word can be inserted, using the same method ordinarily used to insert an extracted word, and insert the word into the first MW found. In the "omo u" meaning frame, MW17 has "a###" in its element BK. Therefore, insert the "atae ru" meaning frame into the MW17. When combining these meaning frames, write in the PS3, which is the number of the root PS of the flatae ru" meaning frame, in the element *MW of MW17, and write "##e#" (with "e" entered as the second digit from the right in the hexadecimal) in the element .BK, to show the root PS. When the "omo u" and "atae" meaning frames are combined, the Time Cases (MW13 and MW21) and Space Cases (MW14 and MW22) are in the root PSs, PS3 and PS5, of both meaning frames, and therefore, the same word content will be inserted into both places, Case T and Case S; therefore, it is necessary to prohibit the expression of the word in either Case T or Case S, or else prohibit the insertion of the word into either Case T or Case S. Here, basically, we allow the expression of the root PS at the lower level, and prohibit the expression of the root PS at the upper level. Therefore, we write "e###", which is the marker showing that the expression is prohibited in the element .BK of MW14 in Case S and MW13 in Case T of the root PS on the upper level. If words are to be inserted into MW21 in Case T and MNW22 in Case S in the root PS on the lower level, write the number of MW21, in the element .RP of MW13 and write the number of MW22 in the element .RP of MW14, to maker it possible to insert the words into these MWs. The above-mentioned processing should be carried out if there has been no indication for the next process. Usually, however, the data which indicates the content of the processing is written in advance into each element BK of the MWs in Case A, Case T, and Case S, in the root PS on the lower level, identifying the type of processing. For instance, when "6###" is shown, it prohibits the expression of the cases on the upper level and allows the expression-of the cases on the lower level, and when "9###" is shown, the expression of the cases on the upper level is allowed and the expression of the cases on the lower level is prohibited. If the expression of either level of the MW has been prohibited, and a word has been inserted into the MW for which expression is allowed, write the number of the MW for which expression has been prohibited in the element .RP of the MW for which expression is allowed; or, write the number of the MW for which expression is allowed in the element .RP of the MW for which expression is prohibited to make it possible to insert the word which was inserted in the MW where expression is allowed in the MW for which expression is prohibited. The above processing can be carried out using the Combination of IMI frame ( ); program. After the above processing, the particles related to the "omo" PS, that is, the suffix particle "wa", the tense-negative particle "na", and the tense-negative suffix particle "katta", are fetched and inserted into element .jgb, element .jntn, and element .jn, of the root PS of the meaning frame, using the Insertion of PS-related particles ( ); program. FIG. 100 shows the results of the above processing. After this program has been executed, return to the starting point once more, and execute the program in the { } of "while (1) { }" seen in FIG. 81 (identified by the marker, "/*B*/"). Here again, the following will be concluded.

$MK[k].LS1==0\times16$ $MK[K].LS1==0\times12$

Execute the Read-out of IMI frame ( ); program, fetch the "rashi i" meaning frame, and write "rashi i" immediately after the synthesized "atae ru to omo u" meaning frame in the PS data realm and the MW data realm, as shown in FIG. 100. The PS module and the MW module of the "rashi i" meaning frame are form PS6 to PS9 and from MW25 to MW38. MW28, which has the data "a###" in its element BK, is in the "rashi i" meaning frame, and therefore, when the root PS, PS5, which is the synthesized "atae ru to omo u" meaning frame, is inserted into the element MW of this MW28, the two meaning frames are combined. This process can be realized using the Combination of IMI frames ( ) program. Immediately after that, insert "i", the adjective suffix particle, and the stress particle, jos/"yo", using the Insertion of PS-related particles ( ) program, as shown in FIG. 100. After this processing, $MK[k].LS1==0\times16$ $MK[k].LS1==0\times12$ are not concluded. Therefore, exit from this "while (1) { }", using "break";. Next, insert "Jiro ha", "Taro ga", Hanako ni", and "bara wo", into the "atae ru to omo u rashii" meaning frame, which had previously been synthesized by the above method using the Insertion of word(s)into IMI frame( ) program. FIG. 99 shows the structural sentence for the synthesized meaning frame that allows for easy understanding. FIG. 101 shows the search path, using case particles and solid lines. The places where insertion of a word is possible, obtained by the previously indicate method, are also simultaneously shown using shading (/////). Insertionof word(s) into IMI frame(s) ( ) has already been explained. Prepare table KWDJO for the nouns+case particles, (see FIG. 102) and table KWD for the nouns. Then, based on these tables, find the MWs into which a word can be inserted, along the above-mentioned search path. At this time, there is no word that does not have a case particle, and therefore, there is no available MW in the KWD table. (Not illustrated.) Insertion of words will start from the bottom of the KWDJO table. First, search for the MW in which the "ha" of "Jiro ha" is stored, follow this search path, and when MW20 is found, insert "Jiro ha". Each of the MWs for "Taro ga", "Hanako ni", and "bara wo" can easily be found by a similar method. FIG. 99 shows the results of the above-mentioned processing in a structural sentence, while FIG. 100 shows the results in a data sentence.

It has been already mentioned that the sentence, {bara wa Jiro ni yotte Taro ni taishite Hanako ni atae sa se rare na katta} has been created by the synthesis of the sentence {Taro ha Hanako ni bara wo atae ru}, with the causative sentence {Jiro wa sore wo sase ru} and the passive sentence, {bara wa sono yona jotai de aru}. Here, the meaning analysis of the synthesized sentence created by the above process will be described.

If the structure of this input sentence is analyzed, the WS table shown in FIG. 70 can be obtained. If the MK table is prepared on the basis of this WS table, it will be as shown in FIG. 103.

If the Meaning analysis ( ) program (see FIG. 75) is executed, it will be as shown below.

$MK[8].LS1==0\times12$ (verb), by $i=8$

Therefore, the Verb relationship ( ); program (see FIG. 75) will be executed. In the Verb relationship ( ); program, the meaning frame "atae ru" is read out from the meaning frame dictionary, DIC-IMI, by the Read-out of IMI frame ( ) program, and it is written into the PS data realm and the MW data realm. The PS modules and MW modules in this meaning frame are from PS1 to PS3, and from MW1 to MW16. (FIG. 104). Insert the suffix particle "jgb" for "sa" using the Insertion of PS-related particles ( ) program, then move to the program in the { } of "while (1) { }"(indicated by the marker, /*B*/). After processing this particle, it is necessary to process the auxiliary verb (0×16).

Using the Read-out of IMI frame(s) ( ); program, read out the causative meaning frame, "seru" from the meaning frame dictionary, and write it into the PS data realm and the MW data realm. The PS module and MW modules of this meaning frame are PS4, and MW17 to MW21, as shown in FIG. 104. Next, create the synthesized meaning frame "atae sa seru" by combining the "atae" meaning frame with the causative "seru" meaning frame using the Combination of IMIframes ( ); program. The content of the above process is identical to the previously explained content. However, if causative meaning frames are combined with passive meaning frames in the Japanese language, the case particle in the root PS, particularly the case particle of Case A of the meaning frame to be combined, will be changed as shown below. For instance, if {Taro ga Hanako ni bara o atae ta} is converted to the causative, it will be, {Jiro ga Taro ni taishite Hanako ni bara o atae sase ta} or {Jiro ga Taro ni Hanako ni bara o atae sase ta}. As mentioned above, the case particle(s) will be changed; for example, "Taro ga" will be changed to "Taro ni taishite" or "Taro ni". Therefore, when the meaning frame is changed to the causative, the case particle of the meaning frame must be changed. When a meaning frame is used individually, its case particle is indicated in advance by the element jinx, although the case particle will be changed when that frame is combined with another meaning frame. Therefore, the case particle must be changed when meaning frames are combined. In the program, Insertion of word(s) into IMI frame(s) ( ), the insertion of each word depends on the case particle of the meaning frame, and therefore, it is necessary to set up the case particles again so that they are the correct case particles in the Japanese language.

Various methods can be used to change the case particles of this meaning frame. The following method was used here. As seen in FIG. 85, the causative case particle is stored in the "jindx-y+1" position from the position in which that case particle is stored in the JO table, JO-TBL, where the case particles are stored. In Case A in the root PS of the "atae ru" meaning frame, "wa" and "ga" are designated as the case particles at (jindx-x/1, jindx-y/7) and (jindx-x+1/2, jindx-y/7) in the JO-TBL by the element .jindx of the MW. The case particles changed to causative forms are stored in the JO-TBL, where "jindx-y" is changed to "jindx-y+1". In other words, the causative case particles are stored at (jindx-x/1, jindx-y+1/8) and (jindx-x+1/2, jindx-y/8). Therefore, the "jindx-y" component of the element .jindx of the MW in Case $A_3$ must be changed by adding "+1". As has already been explained, the 4-digit hexadecimal is written in the element .jindx. The 4th and 3rd digits from the right show "jindx-y" and the second and first digits from the right show "jindx-x". Therefore, we need to add "+1" to this "jindx-y", that is, we must change (0701) to (0801). By this modification, "wa" and "ga" become "ni" and "nitaishite". The case particles must be changed when combining the causative and passive, and must also be changed during nominalization, which will be mentioned later. These changes will be executed using the Changing of case particles of IMI frame( ) program. In addition, the following processing will be carried out, prohibiting the expression of Case $S_3$ (MW14) and Case $T_3$ (MW13) in the root PS of the "atae ru" meaning frame to store MW18 and MW19, which are the MWs in Case $T_4$ and Case $S_4$ in each element .RP of MW13 and MW14 in Case $T_3$ and Case $S_3$, in order to copy the words which were inserted into Case $T_4$ (MW18) and Case $S_4$ (MW19) of the root PS of the meaning frame of the causative particle "seru". Then, the causative particle "seru" is inserted by using the Insertion of PS-related particles ( ) program, and "ra", which is the verb suffix particle, jgb, is inserted into the element .jgb in MW21. After this processing, return to the program in the { } of "while (1) { }" (identified by "/*B*/". At this time, the display will be as shown below.

$$MK[k].LS1{=}{=}0\times16||MK[k].LS1{=}{=}0\times12$$

Execute the program in the { } of "if (expression) { }". (0×16 represents an auxiliary verb.) Also, read out the passive word "reru" from the meaning frame, and write this "reru" into the PS data realm and the MW data realm. As shown in FIG. 104, the modules for this meaning frame are PS5 and MW22 to MW26. Thereafter, insert the "atae sa seru" meaning frame, which was synthesized by the above processing, into the meaning frame for the passive "reru". At this time, the expression of the Time Case and Space Case in PS4, which is the root PS for "atae sa seru", (this is the same as the root PS of the "reru" meaning frame) is prohibited, as previously mentioned. Change the case particle of the Agent Case (Case A) to the passive case particle. For the causative case particle, the data "jindx-y" in the element jinx was changed to "jindx-y+1", although the passive case particle is stored in the jindx-y+2 position in the JO table. In other words, "ni" and "ni yotte" are stored at (jindx-x/1, jindx-y+2/9) and (jindx-x+1/2, jindx-y+2/9). (See FIG. 85.) The jindx-y component of the element .jindx (0701) of MW17 in Case A of the root PS of the meaning frame to be inserted, is changed by adding "+2". (See FIG. 104 (*b*).)

After the above processing has been carried out using the Change of case particle(s) of IMI frame ( ); program (not illustrated), execute the program, Insertion of PS-related particle(s);, to insert the tense-negative particle "na" and the tense-negative suffix particle "katta" into the element -jntn and the element -jn in PS5, using the previously mentioned method. (See FIG. 104.) After this, exit from the "while (1) { )" program using "break", then execute the Insertion of word from IMI frame ( ) program.

The meaning frame which was synthesized by the above-mentioned processing also represents the meaning structure of the sentence, "atae sase rare ru". So that this may be understood easily, the sentence written using the structural sentence is shown in FIG. 105. In this diagram, the MWs required to explain the insertion of word(s), that is, only the MWs into which a word can be inserted, are shown by using the //// marker with the case particle. The KWDJO table in FIG. 106 is prepared using this program. At this time, there is no word in the KWD table (not illustrated). In this KWDJO table, each MW in which a case particle exists is sought along the designated search path. The search method has been already described, and therefore an explanation of it has been omitted here. As shown in FIG. 105, "bara" is inserted into MW22. In the same way, "Jiro ni yotte" is inserted into MW17, "Taro ni taishite" is inserted into MW12, and "Hanako ni" is inserted into MW7; however, only the word inserted in Case A of the meaning frame of the passive "re" is fetched from some case, and therefore, the origin of that word must be found. Words are already inserted in MW17, MW12, and MW7, and therefore the only vacant MW remaining is MW1. As a result, "bara" is inserted into MW1. As mentioned above, seemingly "bara" was originally in MW1 before being fetched and inserted into CAse A of the root PS of the "atae sase rare ru" meaning frame. However, the expression of MW1 is prohibited according to the basic idea that when the same words exist on both the upper and lower levels, the expression of the word on the lower level is allowed, and the expression of the word on the upper level is prohibited.

The sentences, {Taro ga Hanako ni o kane wo age ta} and {Hanako ga Tokyo e i tta} are combined by the implicative relationship, "node", and the resulting combined sentence is inserted into the sentence, {Jiro ga [illegible] to omo tta}, thereby creating the sentence, {Jiro ha Taro ga Hanako ni o kane wo age ta node Hanako ga Tokyo ni i tta to omo tta}, as previously mentioned. The meaning analysis of this type of sentence will be explained below.

When the structure of this input sentence is analyzed, the WS table shown in FIG. 71 can be obtained. The MK table prepared from this WS table is shown in FIG. 107. When the Meaning analysis ( ) program is executed in this MK table, as shown in FIG. 75, an i=8; MK[i].LS1==0×12 (verb) is obtained. Therefore, the Verb relationship ( ) program shown in FIG. 81 is executed. The "age ru" IMI frame (PTN/14) is fetched form the IMI frame dictionary using the Read-out of IMI frame ( ); program, and the PS modules (from PS1 to PS3) and the MW modules (from MW1 to MW16) are written into the PS data realm and the MW data realm, as shown ni FIG. 108. Next, using the Inserting ofPS-related particle ( ); program, the suffix particle jgb "ta" is inserted into the element .jgb of MW16, and the tense-negative particle jntn" " (" " indicates that there is no letter line) is inserted into the element -jntn in PS3. There is no letter line for the tense-negative particle, jntn; however, to input the data item "2" ("0010" in binary notation), which shows "kako" (past), into the element .NTN in PS3 at a later time, a column identified by "i=10" is set up in the WS table (see FIG. 71), and this data is written into that column. In this MK table (see FIG. 107) and the WS table (see FIG. 71), the above-mentioned operation is executed for the processing of the letter lines, as well as to enter the information and symbols needed to carry out the meaning analysis.

There is no auxiliary verb (0×16); therefore, the next program in the { } of "while (1) { }" (indicated by "/*B*/") is not executed.

However, the Insertion of word into IMI frame ( ); program (FIG. 82) is executed. This program has already been explained extensively. Therefore, not too much will be said about it here, except for the following. This program searches for the case particle which is the same as in the combination of the word+case particle in the IMI frame before "i=8", in which the verb (0×12) is stored, while tracing the designated search path. Even if various IMI frames are found, only one will be defined as being available for the insertion of a word and the suitable IMI frame will be registered in the KWDJO table. FIG. 110 shows the structural sentence for the "age ru" IMI frame. The search path is shown as a solid line in FIG. 110. Case particles are shown to the right of the MWs, and the results of the meaning analysis, which will be mentioned later, are also shown. As the diagram clearly indicates the "wo" of "okane wo", "ni" of "Hanako ni" and "ga" of "Taro ga" are in each IMI frame, and these frames are available for the insertion of words. Therefore, these registered in the KWDJO table. (See FIG. 112.) The "ha" of "Jiro wa", at 1=0 in the WS table in FIG. 107, is in the meaning frame, but "Taro" is already expected to be inserted into that MW12, and therefore no other word can be inserted in this MW12. Therefore, "Jiro wa" cannot be inserted into the "age ru" meaning frame, indicating that the scope of insertion into this IMI frame is from i=8 to i=2. The KWDJO table is as shown in FIG. 112. A detailed explanation has been omitted here, although the results of the meaning analysis are shown in /FIG. 109. This completes the meaning analysis of the sentence, {Taro ga Hanako ni okane wo age ta} although the analysis of the entire input sentence is yet to be completed. Therefore, to show that the completed meaning analysis results above will be processes via the following meaning analysis, the following program has been prepared.

*MK*[*i*].*PSMWK*=*ps*;

MK[i].NO=tps-ed;

Here, tps-ed is 3. Write the root PS (PS3) of this IMI frame in the position of the verb in the MK table—that is, at i=8. Then, exit from this <u>Verb relationship ( )</u>; program, using "return (1)". After inputting return "1", exit from the "while (1) { }"program of <u>Meaning analysis ()</u>.

In this way, all data for which processing has been completed will be remove using the <u>Reduction of MK table ( )</u>; program. After this, the MK table will be as show in FIG. 114. When the <u>Meaning analysis ( )</u> program (See FIG. 75) is executed, MK[8].LS1==0×12 (verb) is obtained in i=8. At this time, execute the <u>Verb relationship ( )</u>; program shown in FIG. 81. Read out the "iku" IMI frame from the IMI frame dictionary, using the <u>Read-out of IMI frame ( )</u>; program; write its PS modules (from PS4 to PS5) and MW modules (from MW17 to MW27) into the PS data realm and the MW data realm, and insert "2" into NTN, each element jgb "tta" jntn" "and NTN, using the <u>Insertion of PS-relatedparticles ( )</u> program. All data for which processing has been completed by the above-mentioned program will be removed later as MK[].MKK=0;. However, analysis of the meaning of the sentence {Hanako ga Tokyo e i tta} in the entire input sentence will not be completely finished. Therefore, register the root PS (PS5) of this sentence in the MK table. For that purpose, input the following.

*MK*[*i*].*PSMWK*=*ps*;

*MK*[*i*].*NO*=*tps-ed*;

At this time, "tps-ed" will be 5.

After all processed data is removed using the <u>Reductionof MK Table ( )</u> program, the MK table will be as shown in FIG. 115. If the <u>Meaning analysis ( )</u> program is execute, PS(0×22)+jimp(0×53)+PS(0×22) is obtained at i=2. Therefore, execute the <u>pimpp ( )</u> program (not illustrated). (0×22, that is, the 22 in the hexadecimal, shows PS as a part of speech and 0×53 shows an implicative logical particle.) The function of this program combines two sentences by an implicative relationship. When this is shown in a structural sentence, the following relationship is constructed for the combination. (FIG. 109)

MW28 (PS3) AS node ==> MW29 (PS5)

This is believed to mean that the sentence, {Taro ga Hanako ni okane wo atae ta} and the sentence, {Hanako ga Tokyo e itta} are combined by the implicative relationship, which shows cause and reason. If the logical particle used to show cause and reason is defined as "node", the sentence will be, {Taro ga Hanako ni okane wo atae ta} node {Hanako ga Tokyo e i tta}. To construct the above-mentioned relationship, set up two n ew data items, MW28 and MW29, in the MW data realm, and write the numbers of the partner MWs in element .B and element .N as shown in FIG. 108, that is, write "28" in the element B of MW29, and write "29" in the element .N of MW28. Also, write "AS" (code number, 0×8000), in element .LOG of MW28, and write "node" in the element .jlg of MW28, to indicate clearly that these MWs have been combined by the "AS" logical relationship. The relationships involved with the meaning of the above sentence have been determined by the above processing, but the meaning of the entir e input sentence is not yet defined. Therefore, leave only MW28, whi ch is at the extreme left end, to represent this sentence for the logical relationship. The remaining MWs will be removed from the MW table as data for which meaning has already been processed. Write MW28, which remains as a representative, in the 1=2 position, where PS3 was in the MK table. After that, the MK table will be as shown in FIG. 116.

Execute the <u>Verb relationship ( )</u> program. (FIG. 81) First, fetch the "omo u" meaning frame, using the <u>Read-outof IMI frame ( )</u> program, and, as shown in FIG. 108, write the PS module and the MW module of th e "omo u" IMI frame in the PS data realm (from PS6 to PS7) and the MW data realm (from MW30 to TMW37).

Using the <u>Inserting of PS-related particle(s) ( )</u>; insert "tta", which is the verb suffix particle. After this process, no data remains; therefore, move to the <u>Insertion of words into IMI frame ( )</u> program. FIG. 113 shows the KWDJO table prepared by this program. FIG. 111 shows the structural sentence of the "omo u" IMI frame. (The structural sentence shown, which includes the case particle(s), is in a state in which words have already been inserted by meaning analysis.) The search path is indicated by the solid line. The case particle, "to", is in the "omo u" IMI frame, and therefore, MW28 is inserted into that IMI frame, as shown in FIG. 111 or FIG. 109. The "ha" of "Jiro ha" is inserted into Case A of the root PS of "omo u". After this process has been completed, no data remains in the MK table, and the analysis of the input sentence is perfectly complete. The results of the meaning analysis are shown in the structural sentence in FIG. 109. in the case of the sentence, {Taro no Hanako e no bara no purezento wa arima sen deshita}, the entire sentence, {Taro wa Hanako ni bara o purezento shi ma shita} is handled as a single word. Therefore, it is safe to assume that {Taro ha Hanako ni bara wo purezento shi ma shita} has been converted to {Taro no Hanako e no purezento} and inserted into the sentence, {[illegible]arima sen deshita}. The above matter has been mentioned before, but the meaning analysis of this type of sentence will be explained below. FIG. 72 presents the analysis of the structure of the previous sentence. If the MK table is prepared from the WS table in FIG. 72, it will be as shown in FIG. 117. When the Meaning analysis ( ) program shown in FIG. 75 is execute for this MK table, MK[6].LS1==0×13 ("suru" verb) is obtained using i=6, and therefore, the program in the { } of "while (1)) }"of the Verb relationship ( ) program will be executed. The part of speech shown by 0×13 (the 13th part of the hexadecimal) is a word which can be either a noun or a verb, such as "kyoso suru" and "purezento suru". These are called "suru verbs".

Read out the "purezento" IMI frame (PTN/14) from the IMI frame dictionary, using the Read-out of IMI frame ( ); program, and write the PS module and MW module of the "purezento" IMI frame into the PS data realm (from PS1 to PS3) and the MW data realm (from MW1 to MW16), as shown in FIG. 120. The case particle is located next to the "suru" verb; that is, "suru verb" (0×13)+case particle (0×73). Therefore, execute the Change of case particle to nominalization( ) program, that is, the program in the { } of "if (MK[i+1].LS1==0×73){ }. This program changes the case particles, for example, from "ha" to "no", from "ni" to "eno" and from "wo" to "no", in order to make the entire "purezento" IMI frame function as a noun (word). The case particle, when it exists, is written in jindx-x (jindx-x is a variable, and its value is "7".) which is the JO table, JO-TBL, (see FIG. 85) of the case particle table. Therefore, the jindx-x (value) for all case particles in the IMI frame is defined as "7". (See FIG. 120.) In this way, the particles can be designated during nominalization. FIG. 121 shows the structural sentence with the "purezento" IMI frame and the changed case particle, and also indicates the search path, which will be mentioned later, as a solid line.

The Change of case particles for nominalization ( ); program (not illustrated) carries out the above process.

This MK table has no particles (0×16), and therefore the next program, Insertion of words into IMI frames ( ) will be executed. FIG. 122 shows the KWDJO table prepared here, in which the case particle, "no", is shown twice, and two MWs (MW1 and MW12) have "no" in their IMI frames. Therefore, it is not clear which "no" should be inserted where. Here, set the search priority order for each word to be sought in the KWDJO table, then set up a search path for which the priority order is designated, and find the MWs that contain the case particles being sought, along the path, using the method of inserting the words in the order in which each word was found. Here, the designation of the words to be sought starts from the bottom of the KWDJO table. First, when searching for the "no" of "Taro" no", MW12 is found on the path; therefore, insert "Taro" into the element .WD and "no" into the element .jgb. (See FIG. 120.) Next, the only case particle is "eno" of "Hanako eno", and therefore, the insertion of "eno" into MW7 is unconditionally determined. The next case particle, "no" of "bara no" is present in two places. "Taro" has already been inserted into MW12, however, and therefore there is no choice but to insert "no" into another place, that is, into MW1. As mentioned above, when the same case particles appear in two places, the case particle to be used will be determined by the order in the KWDJO table as well as the order on the search path. If the processing carried out to this point is shown as a natural sentence, it will be, {Taro no Haruko eno bara no purezento}, since the sentence, {Taro ga Hanako ni bara o purezento shita} is handled as a single word. If the input sentence is {bara no Hanako eno Taro no purezento}, and the meaning analysis of the input sentence is carried out using the same method, it will be {bara ga Hanako ni Taro wo purezento shita}. In order to ensure the correct meaning, {Taro ga Hanako ni bara wo purezento shita} even from the above sentence, check to make sure that "Taro" is a human being that can therefore be the subject of an action, and that "bara" is a thing that can be the subject of the movement or action. When these results are used, the accuracy of the meaning analysis can be increased to analyze the meaning of vague sentences, as shown above.

After the processing of "Taro no", "Hanako eno", "bara no", and "purezento" has been completed, processing to remove these words form the MK table is carried out. To insert the entire sentence above into the following sentence as a single word, write the following into the program, using i=6.

$$MK[i].PSMW+PS;$$

$$MK[1].NO=tps\text{-}ed;$$

"tps-ed" is the number of the root PS of the "purezento" IMI frame, which is "3" here. It shows that the meaning analysis of this sentence as an entire input sentence, has not yet been completed. PS3 remains in the MK table as a representative of the sentence. FIG. 118 shows this MK table, which means {PS3 ha ari ma sen de shita}. When the Meaning analysis ( ) program in FIG. 75 is execute for this MK table, the Verb relationship ( ) program in FIG. 81 is used. Therefore, execute this program. There is no letter line for i=2, but the PTN number is written into the WS table (FIG. 72), to enable the "ga aru" IMI frame, which is shown by PTN/1, to be read out. Therefore, read out the IMI frame from this PTN/1, using the Read-out of IMI frame( ); program. Write the PS module (PS4) into the PS data realm, and write the MW modules (from MW17 to MW20) into the MW data realm. Then write "ari" in the element .jgb of MW20, "ma" in the element -jntn of PS4, and "sen deshita" in the element -jn of PS4, using the Insertion of PS-relatedparticles ( ) program. After that, insert "PS3 ha" into MW17, which is the IMI frame in which "ha" is stored. Through this processing, all the data in the MW table is eliminated, the meaning analysis is completed, and the input natural data sentence is completely converter into a data sentence. Questioning/answering, knowledge acquisition, and translation can then be carried out using this data sentence, DT-S.

As previously mentioned, to process natural language using a computer, each natural sentence must be converted to a data sentence, DT-S. Using this data sentence, questioning/answering can easily be carried out using a computer, as shown by the following explanation. As will be mentioned later, when the text sentence and question sentence are simple, questioning/answering can be done very easily using the method in this patent application. Here, some text sentences which are quite difficult even for human beings to decide how to answer are explained, for example, the text sentence including the following sentence:

{Jiro ha Taro ga Hanako ni bara wo atae na katta toha omo wa na katta rashi i yo}

For this text sentence, if a question is created using the following sentence,

{Taro ka Saburo ga Hanako to Akiko ni bara o atae ma shita ka ?}

How to prepare the answer sentence will be explained below. Generally many sets of sentences are shown as text sentences, not just the one text sentence mentioned above. To simplify the explanation here, though, only the text sentence above is used. The data sentence, DT-S, for the text sentence above has already been presented in FIG. 100, to explain the meaning analysis procedure. FIG. 99 shows the structural sentence for the text sentence above; FIG. 123 shows the structural sentence for the question sentence above, and FIG. 124 shows the data sentence for the question sentence. Basically, pattern-matching for the text sentence is carried out using the question sentence as a template. The answer sentence is prepared centering on the sentence, from among the text sentences, which best matches the question sentence. Strictly speaking, pattern-matching can be divided into the following three stages:

1) Preliminary evaluation (preliminary investigation)
2) Rough pattern-matching, and
3) Specific pattern-matching.

The main difference between rough pattern-matching and specific pattern-matching is that specific pattern-matching rigorously checks the matching conditions covered by rough pattern-matching; therefore, these are not discussed here in detail.

The preliminary evaluation is carried out as shown below. First, determine the word to be searched in the question sentence, and check whether or not that word is in the text sentence. If that word is in the text sentence, check its location, and then check whether or not the case combined with the MW where that word exists is the same as that in the question sentence. (Hereinafter, each PS and MW in the text sentence will be abbreviated as TPS and TMW, each PS and MW in the question sentence will be abbreviated as QPS and QMW, and each PS and MW in the answer sentence will be abbreviated as APS and AMW.)

After the sentences have been subject to this preliminary evaluation, rough pattern-matching will be carried out. First, set up a search path, observing the priority order in the question sentence, and trace each QMW along the search path, to find each QMW into which a word is inserted, then prepare the Searched Word table, SRWD-TBL, by placing these in order. Various methods are used to establish a search path. In this case, the search path here has been set up using a solid line, as shown in FIG. 125, and the order for tracing cases in PS has been determined to be APOST. The search begins with the root PS according to the "up-right" rule. The "up-right" rule holds that when one MW is connected with another MW on the upper level, that is, when a data item is written in the element .MW, it is necessary to move up to the PS or MW on the upper level. If the MW is not connected with anything on the upper level, move to the MW which is connected on the MW's right side—that is, move to an MW which has a data item written in its element .N. This is the "up-right" rule. The SRWD-TBL of the question sentence retrieved using the above-mentioned search path, will be [Taro, Saburo, atae, Hanako, Akiko, bara]. The words listed first are considered to be more important. Check for the existence of each word in the text sentence, beginning with the word entered at the beginning of the SWRD-TBL; then, if there is a word, check the location of that word. Each word inserted in the test sentence can be checked, in order, from the beginning of the element .WD in the TMW data realm (See FIG. 100.) of the text sentence. The entries in the element .WDs in FIG. 100 are in Japanese so that they are easy to understand; however, for the computer, each word is actually encoded as a hexadecimal; for instance, "0xe451" is written into the compute for "Taro". In FIG. 100, "Taro" is detected in TMW3, and the preliminary evaluation is carried out not only to check for the existence of the same word, "Taro", in the text sentence, but also to check the conformity between the TPS case combined with the TMW in which the word "Taro" exists, and the QPS case, which is combined with this word in the question sentence. If each of the cases combined with that word is different, the meanings of the two sentences will be considered to be basically different. If the word is combined with different cases in the two sentences, pattern-matching processing must not be carried out. As shown in FIG. 99, the TMW3 case in which "Taro" was first found, is the Case S, and as shown in FIG. 123, the QMW1 case in the question sentence, in which "Taro", the word begin sought, is stored, is Case A. In the above example, the word "Taro" in these two sentences matches, but the cases are different. Therefore, the "Taro" in TMW3 will not pass this preliminary evaluation test. As shown in FIG. 99, another "Taro" was found in TMW12. This is Case A, and therefore it passes the preliminary evaluation. After confirming the conformity of the word and its cases in both sentences, we can start pattern-matching. Fetch the base PS (The root PS of the meaning frame is called the base PS) which is in the question sentence, and the base PS (BASE-PS) of the text sentence in which the word exists; then match the patterns of the question sentence and the text sentence using the base PS as the starting point. As mentioned in the Meaning analysis ( ) section, the natural sentence {atae ta to omo tta rashii} is synthesized by combining the IMI frames, "atae ta," "omotta" and "rashi i," which have been read out from the IMI frame dictionary. The upper limit of the scope of each IMI frame read out from the IMI frame dictionary is shown by the "1" used as the first digit of the hexadecimal (0×1###) in the element .MK in TPS, and its lower limit is shown by the "e" at the same location (0xee###). In FIG. 100, the " 1, " which is the 4th digits from the right in "100e" in the element .MK of TPS1, shows the upper limit of the "atae ru" IMI frame and "e", the 4th digit from the right in "eOOe" of the element .MK of TPS3, shows its lowest limit. (Base PS is TPS3.) The scope of the PS module and the MW module of the "atae ru" IMI frame can be recognized via this hexadecimal data. The "1" and "e" used as the 4th digit from the right in each element .MK shows that the TPS module of the "omo u" IMI frame is TPS4–TPS5, (Base PS is TPS5) and that the TPS module of the "rashii" IMI frame is TPS6–TPS9. (Base PS is TPS9.) The base PS in the structural sentence can be found at a glance. Pattern-matching is carried out using the IMI frame, which is registered in the IMI frame dictionary, as its basic unit. Therefore, the base PS of the IMI frame, in which that word exists, must be obtained. As shown in FIG. 123, the base PS of this question sentence, that is, the root PS of the IMI frame in which "Taro" exists, is QPS3. Moreover, the base PS of the text sentence will be TPS3, as shown in FIG. 99. Therefore, the question sentence is as shown below.

{Taro ka Jiro ga Hanako to Akiko ni bara wo atae ma shita ka ?}

The base PS of the text sentence corresponding to the above sentence is TPS3, and therefore, pattern-matching can be carried out between the question sentence and the following sentence:

{Taro ga Hanako ni bara wo atae na katta}

This is the rest of the text sentence, which remains after the sentence has been cut off above TPS3 of the base PS.

FIG. 126(*a*) shows the structural sentence for the text sentence, and FIG. 126(*b*)shows the structural sentence for the question sentence. The search paths are also shown in these diagrams. As will be mentioned later, the search paths are divided into certain short sections, and a number is attached to each section as shown. First, a search path with a designated priority order is set up for the question sentence, while an identical search path is simultaneously set up for the text sentence. The search for words in the text sentence will be advanced by being synchronized with the advancement of the search along the search path in the text sentence in order to check whether or not the words existing in the question sentence also exist in the text sentence. If some word exists in both sentences, the evaluation points will be according to the position of the TMW in which that word exists—that is, depending on the TPS number and the type of case, the conformity of the pattern-matching of the two sentences will be evaluated by the total number of evaluation points.

Before pattern-matching is carried out, the search path will be divided into a certain number of sections, and set up so that it is synchronized with the progress of the two searches. One case in a PS will be determined as the starting point of the search section, and when a PS such as, for example, {genki na Taro} is found in the search path, it will be taken as a dividing marker, and the section between one PS and the next will be denoted as the search section. As mentioned above, each base PS of the IMI frame in the question sentence and the text sentence will be extracted, and pattern-matching of the two IMI frames will be carried out. Each search section will then be set up in the same case in the base PS in the question sentence and the text sentence to check whether or not each word, which exists in the search section of the question sentence, also exists in the search section of the text sentence. For instance, the first section to be searched in the question sentence is shown below, as seen in FIG. 126 (*b*).

QMW1 (Taro ) ▒ QMW2 (Saburo)
▒
(1) QMW16 ( )

The starting point of the search section above is Case $A_3$ of QPS3. The search section of the text sentence, corresponding to the above-mentioned search section of the question sentence, is shown below. This uses Case $A_3$ in TPS3 as its starting point(shown in FIG. 126 (*a*).) The section number is (1).

TMW12 (Taro)
(1)

"Taro", which is the word being sought in the question sentence, is also in the text sentence. The evaluation points at this time are assumed, for the sake of this example, to be 5 points. Moreover, because "Saburo" in the question sentence is not in the text sentence, zero points are added to the evaluation points. The next search section on the search path is Section (2), which starts from Case $P_3$ of QPS3. This search section is as shown below QMW20 (atae)
(2)

The search section in the text sentence which corresponds to the above section, is the following section, (2), starting from Case $P_3$ of TPS3.

TMW16(atae)
(2)

"atae" also exists in the text sentence, and therefore if it is assumed that the evaluation points here are "4", there will be a total of 9 evaluation points for conformity. The next search section is section (3), which uses Case O3 as its starting point.

QMW19 ( )
(3)
TMW15 ( )
(3)

There are no words in these sections, and no evaluation is done. Therefore, the next search path is traced. The next search section in the question sentence will be the following section, (4), with the starting points of Case A2 in the previously mentioned QPS2 and Case $A_2$ in TPS2.

QMW3(Hanako) AND"to" ▒ (Akiko)
▒
(4) QMW11 ( )

and the search section, (4), in the text sentence is as shown below.

TMW11 (Hanako)
(3)

"Hanako" in the question sentence also exists in the text sentence, and therefore, it is considered that there are 5 evaluation points at this time,which means that there will be a total of 14 conformity evaluation points. When the conformity is evaluated for all the search sections in the search path using the above method, certain conformity evaluation points, which show the degree of pattern-matching of these two sentences, can be obtained. When such pattern-matching is carried out for all the words to be sought, and for all text sentences, the text sentence with the highest number of conformity evaluation points can be obtained. The prepared answer sentence is based mainly on this text sentence.

With the above processing, pattern-matching of the question sentence, {Taro ka Jiro ga Hanako to Akiko ni bara wo atae ma shita ka ?}, and the text sentence, {Taro ga Hanako ni bara wo atae na katta} is completed. After pattern-matching for all the text sentences and this question sentence has been carried out, the answer sentence will be prepared after referring to the evaluation points assigned to these pattern matches. The answer sentence, however, is generally prepared from the test sentence with the highest number of evaluation points. Here, it is assumed that the evaluation points of the above-mentioned text sentence were the highest. Therefore, the answer sentence is prepared using this text sentence.

The text sentence, {Taro ga Hanako ni bara wo atae na katta} is extracted from the sentence, {Jiro ha Taro ga Hanako ni bara wo atae na katta toha omo wa na katta rashii}. The content described in the text sentence is not {- atae na katta} : it is {- atae na katta towa omo wa na katta rashii}. Therefore, this entire sentence must be used to prepare the answer sentence. In preparing the answer sentence with this entire sentence, the PS at the lowest level of text sentence must be obtained. To do so, the search should be processed according to the "left-down" rule. The "left-down" rule first checks if there is another kind of PS or MW to the left of the PS or MW. If there is, it shows that there is a search path designated by the element .B (the numbers of element .B, except O, are identified as PS or MW). And if there is no PS or MW on the left, move to the neighboring PS or MW below, as designated by the element .L. Trace the element .L and the element .B of the TPS and TMW along the search path established by this rule, to obtain a PS which does not have a neighboring PS below it. The base PS of the text sentence which is designated in preparation for the answer sentence, is TPS3; however, PTS3 has no element B and its element .L is TMW17 as shown in FIG. 100, which means that the path moves to TMW17. The element .B of TMW17 is "0" and the element .L is TPS4 : therefore the search moves to TPS4. TPS4 has no element .B, and the element .L is TMW23 therefore the search moves to TMW23. The element .B of TMW23 is "0" and the element .L is TPS5; therefore, the search moves to TPS5. The element .B of TPS5 is "0" and the element *L is TMW28, so the search moves to TMW28. the element .B of TMW28 is "0" and the element .L is TPS7; therefore, the search moves to TPS7. The element .B of TPS7 is "0" and the element .L is TMW 31; therefore, the search moves to TMW31. The element .B of TMW31 is "0" and the element .L is TPS8; therefore, the search moves to TPS8. It also moves to TMW37 from TMW8, then moves to TPS9. No PS or MW is connected before or below TPS9; therefore, this will be the root PS, and the prepared answer sentence will be based on this root PS. This data sentence is copied once into the answer sentence area. The TPS module from TPS1–TPS9 and the TMW module from TMW1 to TMW38 are copied and defined as APS1–APS9 and AMW1-AMW38 respectively (See FIG. 128.). If this data sentence is converted into a natural sentence, it will be {Jiro ha Taro ga Hanako ni bara wo atae na katta toha omo wa na katta rashii}. (See FIG. 127.)

In other words, the person who is the subject is "Taro", not "Taro ka (or) Saburo", and the indirect object is "Hankao", not "Hanako to (and) Akiko". The answer sentence above provides the answers, {Jiro ha - atae na katta toha omo wa na katta rashii} to the question sentence {- atae ta ka ?}.

Assuming that the text sentence has the correct content, the above answer is correct.

Occasionally, various types of processing must be carried out on this data sentence, which is used for the answer sentence, in order to prepare this answer sentence. Therefore, a special answer-sentence area is established.

For instance, the fact that "bara" is given is already recognized by the speaker and the listener, and that fact is not considered as a topic of their conversation at this time.

{Taro ka Saburo ga Hanako to Akiko ni atae ma shita ka ?}

As shown above, sometimes the sentence does not express what was given. In such a case, it is possible to answer as shown below.

{Jiro ha Taro ga Hanako ni bara o atae na katta toha omo wa na katta rashii}although the "bara" fact is not considered to be a topic, and therefore, it is believed that it is sometimes better not to express "bara" in the answer sentence. On such an occasion, the expression "bara" can be prohibited, as shown below. As previously mentioned during the discussion on pattern-matching, the words of the question sentence and the words of the answer sentence correspond to each other; therefore, the position of the word in the answer sentence, which corresponds to the position of the word in the question sentence, can easily be recognized. If no word is inserted into the element .WD in the question sentence, that is, in the case of .WD/0, the AMW of the answer sentence which corresponds to it, can easily be obtained. When the expression of the AMW is prohibited, that is, when the 4th digit from the right (the first in the hexadecimal) for the element BK is set as "e" (0xe###), that word can be removed from the natural sentence through the above processing, and the previously mentioned natural sentence will be as shown below.

{Jiro ha taro ga Hanako ni atae na katta toha omo wa na katta rashii} and "bara" can easily be omitted.

Next, questioning/answering using a simple text sentence and a simple question sentence will be explained below. If the sentence, {Taro ga HAnako ni bara wo atae ma shita} is in the text sentence, and the question

{Taro ga Hanako ni bara wo atae ma sen de shita ka ?} has been asked, then the answer sentence will be as shown below.

{Iie, Taro ha Hanako ni bara wo atae ma shita}

A word such as "iie" (no) or "hai" (yes), which is not contained in the text sentence, must, however, be added to the answer sentence.

If an AMW is set up in Case Y in the root PS of the answer sentence, and "hai" or "iie" is written into the element .WD of that AMW, the above-mentioned answer sentence will result.

If the question sentence,

{Dare ga Hanako ni bara wo atae ma shita ka ?} is asked based on the text sentence,

{Taro ga Hanako ni bara wo atae ma shita}, pattern-matching of the question sentence with the text sentence will be carried out to find TMW12 in the text sentence which corresponds to QMW12, which contains the interrogative word "dare(who)". If "Taro", which is stored in the element .WD of TMW12 in the text sentence, is inserted into the element .WD in AMW12 in the answer sentence (FIG. 130) corresponding to the interrogative word "dare" stored in QMW12, the following answer sentence can be obtained.

{Taro ga Hanako ni bara wo atae ma shita}

Other than the above answer sentence, for instance, an answer sentence such as,

{Hanako ni bara wo atae ta noha Taro de aru} is also sometimes prepared in order to emphasize the word which corresponds to the word, "dare". Such an answer sentence can easily be prepare by the following process. That is as shown in FIG. 131 (*b*), combine PS-I (APS4) of {-ha - de aru} beneath the sentence {Taro ga Hanako ni bara wo atae ta}, then combine PS-I (APS4) with AMW17 in Case A of the above sentence, and insert "Taro" into element .WD of AMW20 of Case O. At this stage, "Taro: appears twice : therefore, prohibit the expression of "Taro" (AMW12) in the above sentence. If the data sentence is prepared by the above-mentioned processing, the answer sentence shown above can be obtained.

If "Taro", which is the word in AMW12, is inserted into the element .WD in Case A (AMW17), and the above sentence is inserted into the element MW of AMW20 in Case O, the result will be the structural sentence shown in FIG. 131 (*a*) and shown below.

{Taro ha Hanako ni bara wo atae ta no desu}

In the above structural sentence, "Taro" also appears twice, and therefore the expression of "Taro" in AMW12 in the upper level is prohibited. As mentioned above, it is often necessary to add various words, which are not in the text sentence, to the answer sentence or to delete some word(s)

from the sentence or sometimes to change the structure of the sentence. Therefore, the answer sentence area is intentionally set up for the above purposes.

It must be possible to create the natural sentence freely using any desired word order, in order to handle many different languages, and using freely synthesized meanings, in order to allow the creation of natural sentences that suit these meanings. In Japanese, in particular, it is necessary to be able to select the suffix particles in their appropriate inflective forms. I will explain these procedures here, starting with the method for creating the natural sentence using a random word order.

A PS or MW must be designated as the starting point, to prepare the natural sentence, then the natural sentence preparation path PR-PT can be set up from that starting point. This preparation path is established using the same method used to establish the search path. In the pattern-matching carried out for the previously mentioned questioning/answering, the search path was set up assuming that the priority order of the cases in the PSs of the basic sentence was APOST; however, the word order in the natural sentence preparation path will vary depending on whether the language is Japanese, English, or Chinese. Therefore, a preparation path which can prepare the natural sentence in the languages used by each nation must be established. The standard word order for cases in the PS of a basic sentence in Japanese is ATSOP, while in English, it is APOST, and in Chinese, ATSPO.

To prepare the natural sentence, the word order of the MWs must be stipulated as well as the PS word order. There are many ways to designate the PS and MW word orders. Here, however, the method which uses the PS word order table, and the method of designating the word order using an MW-related program are explained. A PS has Case X, Case Y, and Case Z, in addition to the above-mentioned ATSOP, and there are also various particles, jntn, jn, jm, jost, and symbols, j1 and j2. FIG. 132 (Natural sentence preparation word order table SQ-TBL), shows the word order for Japanese, including all the items mentioned above. Here, "*J" indicates that the particles will be output in the order, jntn, jn, jm, and jost. A special word order can easily be designated by registering it in this table. For instance, {anata, Taro ga Hanko ni bara wo atae ma shita yo} is sometimes changed to {Taro ga Hanako ni bara wo atae ma shita yo, anata}, in order to emphasize the meaning by changing the word order, in other words, moving "anata", which is inserted into the MW in Case Y. Also, various word orders are sometimes needed for different expressions. Therefore, by registering these different word orders, it becomes possible to cope with any kind of word order. The variable, sqx, which is on the horizontal axis in the SQ-TBL, shows the case-fetching order and a natural sentence is prepared according to this order. The variable, sqy, which is on the vertical axis, shows the word order designation number, which designates the word order. This number is stored as the third digit from the right if the hexadecimal numeral of the element .MK of the PS. Here, if this value is "0", the datum shows the default value, which is the standard word order. If a special word order is designated, the word order specification number will be written in this table. When preparing a natural sentence, read out the word order specification number, determined as "sqy" from the element .MK of the PS, and determine the output word order; then, fetch each word one by one, from sqx/1 to the end, and change into the letter lines. If the natural sentence is being generated in English or Chinese, the applicable natural sentence word-generation, word-order table, either SQ-TBL-E or SQ-TBL-C, must be prepared. The order of the MWs is different in each of the languages, Japanese, English, and Chinese; however, the word order of the MWs within the individual languages spoken in each nation does not change much. The MW word order can be specified by the table in the same way as the PS word order, although in this case, the MW word order is designated by the program. If a natural sentence is generate in Japanese, for instance, the data is output in the order: article jr, prefix jh, MW, F, word WD, suffix It, plural particle jpu, logical particle3 jxp, logical particle2 jls, word stress particle jos, logical particlel jig, case particle jcs, suffix particle jgb, and sentence stress particle jost.

Element MW, element F and element .H are used to generate the path. Thereafter, the generated path passes through MW, F, and H, and returns to this MW. After it returns to this point, the above-mentioned word WD, suffix jtl, - - - etc., are output immediately. Words, particles, and symbols were previously shown using letter lines in Japanese and English, in the data sentences and structural sentences, to make them easier to understand; however, these words, particles, and symbols are actually stored in the computer using code numbers for all of them. It is therefore necessary to convert these code numbers into letter lines. When the sentence is in Japanese, each word is converted from its code number to an individual letter line corresponding to the word, using the Japanese word dictionary, DIC-WD, and when the sentence is in English, each code number is converted into an individual English letter line using the English word dictionary, EDIC-WD. If the particles and symbols are mentioned in the word dictionaries, the word dictionary/dictionaries can be used to convert the code numbers into letter lines; however, if the particles and symbols are mentioned in the particle dictionaries, the code numbers will be converted to letter lines using all four dictionaries : the word dictionary for Japanese, DiC-WD, the word dictionary for English, EDIC-WD, the particle dictionary for Japanese, DIC-WA, and the particle dictionary for English, EDIC-WA.

FIG. 133 shows the generation path for the natural sentence,

{Jiro ha Taro ga Hanako ni bara wo atae ta to omo tta}, in Japanese. This sentence, when written in English, will be as shown in FIG. 134. The basic word order is different in English and Japanese; therefore, the Japanese sentence is illustrated in the order, ATSOP, and the English sentence appears in the order, APOST. The generation path is established with the root PS (PS5) as its starting point, and the natural sentence is generated along this path. First, "0xe431", which is entered in the element .WD of MW20, which is combined with Case A of PS5, is converted into a letter line. Then the word that has this code number is found in the word dictionary for Japanese, DIC-WD. When its element .knj is read out, its is "Jiro". Also, the element .jcs of MW20 is "1", and when this element .knj is checked using the particle dictionary DIC-WA, it is "ha". (Not illustrated.)

"Jiro ha" is therefore generated by this process. If the above-mentioned processing is carried out, following the natural generation path, the natural sentence shown below can be generated.

{Jiro ha Taro ga Hanako ni bara wo atae ta to omo tta}

The following sentence, in English, can be obtained from FIG. 134.

{Jiro thought that Taro gave Hanako roses}

The next section provides an explanation of the method of generating a natural sentence corresponding to the new meaning of a sentence which has been changed, particularly the method of selecting the inflection of suffix particles.

If the tense of the {atae ru} sentence is changed to the past tense, it will be {atae ta}; changed to the past negative tense, it will be {atae na katta}. In the past negative polite form, it will be {atae ma sen de shita}, while if the sentence is changed to the imperative, it will be {atae ro}. These natural sentences can be generated using the following method.

The Inflection suffix table, GOBI-TBL, is shown in FIG. 135. However, only a minimum of the suffix inflections needed for the explanation are mentioned here. All forms of the inflections of the suffix particle, jgb, and the tense negative suffix particle, jn, which can be taken by the various inflective forms, ky, are arranged vertically. If the inflective form, ky, and the inflection number, kx, are specified, the inflective suffix particle, jgb or jn, can be obtained from (kx, ky). FIG. 136 shows the NTN-TBL of tense negative particles, jntn and tense negative suffix particles, jn. The various states such as present tense/past tense, negative/affirmative, ordinary expression/polite expression, are shown in the NTN-TBL using 4 binary digits. The tense negative particle, jntn, and the tense negative suffix particle, jn, which correspond to these binary digits, are also shown. Details regarding these particles are given in the Remarks section of the table. The present is shown by "0000", the present negative is shown by "0001", the past is shown by "0010", the past negative is shown by "0011", and the polite present negative is expressed as "0100". As seen above, when the first digit from the right of the 4 binary digits is "1", it represents the negative, while "0" represents the affirmative. When the second digit from the right of the 4 binary digits is "1", it represents the past tense, while "0" represents the present tense. When the third digit from the right of the 4 binary digits is "1", it represents a polite expression, while if it is "0", it represents an ordinary expression. When the 4th digit from the right of the 4 binary digits is "1", it represents the imperative form, while if it is "0", it represents an ordinary expression which is not an imperative form. If these 4 binary digits are converted into decimal numerals, the results will be "ntn-no". Therefore, which of the expressions mentioned above are specified from either the NTN table or ntn-no can be recognized. "jntn" and "jn" are shown as natural sentences corresponding to these specifications, and therefore, when jntn and jn are obtained form NTN-TBL, the expressions corresponding to the above-mentioned specifications can be prepared. NTN-TBL also shows the inflection KY. The data from the 4-digit hexadecimal are written in KY. The first two digits are the inflection number, kx, while the last two digits are the inflective form, ky.

The structural sentence, {atae ru} is shown on the left in FIG. 137, and the {iku} structural sentence is shown on the right in FIG. 137. FIG. 138 shows the data sentences for {atae ru} and {iku}. A letter line which has no inflective changes is shown by ( ), while a letter line which has an inflective change (or changes) is shown by < >. The letter lines needed to generate a natural sentence from this structural sentence are shown below. (atae) <jgb>(jntn) <jn>For easy understanding, the name of each element is entered into each of the ( ) and < >.

The inflective change of the suffix particle is determined by the inflection information, KY, consisting of the word(s) or particle(s) located before and after that suffix particle or by the information which consists of a combination of the above-mentioned inflection information. The tense negative particle, jntn, indicating tense and negativity, and the tense negative suffix particle, jn, generally follow a word such as a verb. The jntn and jn are shown in the NTN-TBL, so that these can be fetched directly from this table. The suffix particle, <jgb>, located between (WD) and (jntn), is, however, determined according to both values (kx, ky), after "ky/0b" has been fetched from the inflection information KY/ff0b, "atae", located before the suffix particle, and "kx" has been fetched form the inflection information, NTN. This KY will be changed according to the content of the NTN in the NTN-TBL, as shown below.

If NTN is determined to be "0001" (negative present), jntn/"na" and jn/"i" are obtained from JO-TBL, so that jntn and jn are determined. However, jgb is determined by both inflection information items, "atae" and NTN/0001. The KY of NTN/0001 is "0513" and the KY of "atae" is "ff0b"; therefore, if ky/Ob is fetched from "atae" and kx/05 is fetched from NTN, jgb/" " can be obtained from (kx/05, ky/0b) in the JO-TBL. (ky/Ob shows that the value of the variable, ky, is "0b".) Therefore, the sentence will be as shown below.

(atae) <" ">(na) <i>

That is, it will be, {atae na i}. The " " indicates "Contains no letter line".

In NTN/1000 of the affirmative past, KY will be "0400". ky/Ob will be obtained from "atae" and kx/04 from NTN, and jgb/"ta" can be determined from (kx/04, ky/0b) in the JO-TBL. Therefore, the sentence will be as shown below.

(atae) <ta>(" ") <" ">, that is, {atae ta}

For the polite negative past (NTN/0111), KY will be "0200"; jgb/" " is determined from (kx/02, ky/0b) in JO-TBL, and jntn and in will be determined as "ma" and "sendeshita" from the JO-TBL. Therefore, the sentence will be as shown below.

(atae) <"">(ma) <sendeshita>, that is, {atae ma sendeshita}.

For the imperative negative present (NTN/1001), KY will be "0100" (KY/0100). Also, jgb/"ru" is determined from (kx/01, ky/0b) in the JO-TBL, so the sentence will be as shown below.

(atae) <ru> (na) <" ">, that is, {atae ru na}.

The sentences, {atae ta node i tta} and {atae na kereba iku} are generated when one sentence, {atae ru}, and another sentence, {iku}, are logically combined with the addition of the various meanings of each of the tenses, present, past, affirmative, negative, and ordinary or polite expressions. The next section explains how to select the suffix particles for the above sentence.

FIG. 137 shows the structural sentence for the sentence in which {atae ru} and another sentence, {iku}, have been logically combined. The following shows only the letter lines involved when the above structural sentence is converted into a natural sentence.

(atae) <jgb> <jntn) <jn> (jlg) (iku) <jgb> (jntn) <jn>

Inflection information, KY, for verbs and nouns, is shown as "ff##". The individual verb or noun does not affect any of the suffix particles (attached to other words) which come before it. Therefore, the above-mentioned kx/ff is used to give the indication regarding the inflection. (iku) does not affect < >, which is located before (iku). If the sentence from (iku) to the end is omitted, the sentence will be as shown below, (atae) <jgb> (jntn) <jn> (jlg);

therefore, only the above sentence must be considered. As previously mentioned, jgb will be determined by its verb, "atae", and by NTN. The logical particle, jlg, has its own particular inflection information, KY; therefore, jn will be determined by kx from this logical particle's own KY, and ky from the KY of NTN, as shown below.

For the negative past (NTN/0011), if the logical relationship is AS, which shows cause and reason, and the logical particle, jlg, is "node", the letter lines will be as shown below.

(atae) <" "> (na) <jn>(node)

<jn> is determined by ky/00 from KY/0500 of NTN/0011 of the preceding particle, jntn, and by kx/04 from KY/0400 of the following particle, jlg/"node", and is determined as (kx/04, ky/00). When either kx or ky is "0", jn will not be determined by the above data. That is, the letter lines will not be changed at all, but rather will remain as jn/"katta" of NTN/0011. Consequently, the letter lines will be as shown below.

(atae) <" "> (na) <katta> (node), that is, {atae na katta node).

For the affirmative present (NTN/01ff), however, when logical particle, jlg, is "ba" and the logical relationship is the subjunctive mood "if", the KY of "ba" is "0800". Therefore, using the previously mentioned method, the particle jn is determined to be jn/" ", from (kx/08, ky/ff), which means that the letter line will be, (atae) <ru >("-") <"-">(ba), that is, (atae ru ba);

however, there is no such expression. Therefore, it is understood that the "01ff" of "ff" indicates that jntn and jn of NTN are null, and that jlg acts directly on jgb, and jn is selected by applying the previous method. That is, (kx/0b, ky/08) is obtained from KY/0800 of (ba) of the logical particle and KY/ff0b of (atae), while jgb <re>is obtained from the JO-TBL, so that the letter line is consequently determined as shown below.

(atae) <re> (" ") <" "> (ba), that is, {atae re ba}.

Before obtaining the suffix particle jgb or jn, obtain the inflection information for the preceding word or particle, obtain ky from KY, and then obtain kx from the inflection in information, KY, of the following word or particle. the suffix particle, jgb or jn, is determined from the JO-TBL according to (kx, ky), which is a combination of the above information items. If KY is ##ff (KY/##ff), the inflection information regarding the preceding word or particle is nullified, and the inflection information, KY, for the word before the preceding word or particle, is used for the combination, the suffix particle must be changed. KY/ee## (kx/ee) shows an expression which is not used in the natural sentence. Here, if either kx or ky in (kx, ky) is "0", write the required indication to determine the suffix particle. For example, write that there is no change of letter lines in the inflection information, KY, and then select the suffix particle, jgb or jn, according to the above data to generate natural Japanese.

Sometimes the data structure is not separated into PS and MW, as will be explained below. PS and MW are unified in the data structure PSMW, and therefore PSMW will have both PS and MW elements. That is, PSMW has -WD and -CNC as elements of word information, IMF-P-WD: it has -jr, -jh, -jt, -jpu, -jxp, -jls, -jlg, -jgv, -jcs, -jos, -jinx, -jntn, -jn, -jm, and -jost as elements of particle information, IMF-P-JO; it has -B, -N, -L, -MW, -F, -H, -mw, and -RP as elements of the combination information, IMF-P-CO; it has -MK, -BK, -LOG, -KY, and -NTN, as elements of language information, IMF-P-MK; and it has -CASE as -the element of case information, IMF-P-CA. The case variety, such as the Agent Case (Case A), Time Case (Case T), Space Case (Case S), Object Case (Case O), Predicate Case (Case P), Auxiliary Case (Case X), Yes-No Case (Case Y), or the Zentai (whole) Case (Case Z), is written in this element -CASE.

FIG. 33 shows the structural sentence for the natural sentence, {Taro ga kyo gakko de Hanako ni hon wo atae ru}, using the compound MW and PS data structure. If this sentence is shown using only the PSMW data structure, it will be as shown in FIG. 7. At this time, the order of the cases between the PSMWs in the basic sentence PS is specified as ATSOP, and the sentence is illustrated according to this order, with the order of cases shown using the $symbol_2$ ==>, for clarification. The case variety is shown under the parentheses, and the relationships shown by the ==> symbols are stipulated by entering the number of each partner PSMW in the element -N and element -B. As mentioned above, when the data sentence DT-S uses only the PSMW data structure, the data structure becomes simple; however, the number of PSMW elements increases, and therefore a larger memory capacity is needed. Moreover, when translating from Japanese to English, the output order for the cases in the basic sentence must be changed from ATSOP to APOST. The order of cases, however, is stipulated by the data written in the element -N and element -B in the PSMW data structure, and therefore, to change the order of output of the cases, this data must be rewritten, a task requiring much labor and time. Regarding this point, if the PSs and MWs are placed separately in the data structure, the order of the cases can be changed easily using the program, as previously mentioned. Case order must be designated to establish the search path, and this processing can be done easily if this compound data structure is used. In processing a natural language, the order of the cases is changed often. Data regarding the combination information, IMF-P-CO, such as -MW, -L, -B, or -N, must be changed whenever the order of the cases is changed, and there is a possibility that multiple problems will occur, including the miswriting of data. Therefore, a compound data structure is far more advantageous for processing.

When there is a text sentence, for example, {Taro ga kyo gakko de Hanako ni hon wo atae ma shita}, and the question, {Dare ga Hanako ni hon wo atae ma shita ka?} is asked, this system can answer it correctly, using the simple natural sentences, {Taro ga kyo gakko de atae ma shita} and {Hanako ni-hon wo atae ta nowa Taro desu}. If the question, {Taro ka Saburo ga Hanako to Akiko ni bara wo atae ma shita ka ?} is asked, about the text sentence, {Jiro ha Taro ga Hanako ni bara wo atae na katta toha omo wa na katta rashii yo}, this system can quite answer delicate questions accurately, something which even human beings cannot do so easily, in the case of such text sentences as {Jiro ha taro ga Hanako ni atae na katta toha omo wanakatta rashii yo}, as previously mentioned.

This system accurately expresses the meaning of the natural sentence input into the computer, via processing which reaches meanings using various words, including those words which are not expressed in the natural sentence, from the previously constructed meaning frames in the meaning frame dictionary, DIC-IMI. The system constructs meaning structures which are expressed by the input natural sentence using data structures, by combining these meaning frames, and storing the words, particles, and symbols of the natural sentence, Therefore, this system can generate accurate answers for the question sentences, using words which are not expressed in the input sentence, as shown below.

As shown in FIG. 32, the {atae ru} meaning structure contains the meaning that {A1 was in the place A3} at the beginning, and that at this point in time, {A1 is in the place A2} or that {A2 has A1}. Therefore, if the text sentence is, {Taro ga kyo gakko de Hanako ni hon wo atae ta}, this system can answer accurately, {hai, Taro no tokoro ni ari masu}, and {hai, Hanako ha motto imasu} to the questions, {hon ha Taro no tokoro ni ari mashita ka?}, {hon wa Hanako no tokoro ni ari masuka?} and {Hanako ha hon wo motte imasu ka?}. Even if the words (letter lines), {-ga aru} and {-ga -o motte iru}, do not exist in the input natural sentence, {-ga - o atae ta}, these words {letter lines} are written into the data sentence in the computer, and therefore it is possible to answer accurately, as shown above.

The natural sentence, {-ga dekiru} is stored in the computer as, {-ga kano de aru} and {-niha kanosei ga aru}, as shown in FIGS. 52 and 51. The natural sentence, {Taro ha kyo gakko de Hanako ni hon o atae ru koto ga deki ru}, is stored in the computer as the structural sentence shown in FIG. 51, and therefore it is possible to answer accurately with fhai, Taro ga kyo gakko de Hanako ni hon wo atae ru koto ha kano desu}, and {hai, Taro ga kyo gakko de Hanako ni hon wo atae ru koto niha kanosei ga ari masu} in reply to the questions, {Taro ga kyo gakko de Hanako ni hon wo atae ru koto ha kano desu ka ?} and {Taro ga kyo gakko de Hanako ni hon wo atae ru koto niha kanosei ga ari masu ka?}.

FIG. 53 shows the above natural Japanese sentences in English. As previously mentioned, the words written in the data sentence are actually (expressed here as) numerical codes. The same numerical code is used for words that have the same meaning regardless of the different languages involved, whether Japanese, English, Chines or some other language. We can therefore assume that FIGS. 51 and 53 or the data sentences presented as the structural sentences in these diagrams, are almost the same. A Japanese sentence can basically be translated into an English sentence by fetching the English letter lines according to the individual code numbers; therefore, FIG. 51 can be used. However, for various reasons, including the fact that particles in Japanese do not correspond perfectly to prepositions in English, and that the inflection information, KY, for Japanese is slightly different from that for English, when a Japanese sentences is being converted to an English sentence, the data sentence for Japanese is actually converted into the data sentence for English. The data sentence for Japanese, though, has basically the same data content as the data sentence for English, (with the data necessary for carrying out pattern-matching) so that the data sentences for English and Japanese can be handled as the same data sentence. Therefore, after the text sentence has been written in Japanese, it is very easy to form questions in English, and answer in English or Japanese.

If the text sentence has been written in English, as shown below,

{Taro can give Hanako books at school today}, it is possible to pose a question in Japanese as follows:

{Taro ga kyo gakko de Hanako ni hon wo age ru koto ha kano desu ka ?} and it is also possible to answer in English as shown below.

{Yes, it is possible for Taro to give books to Hanako at school today}.

This can easily be understood from the previous explanations. Also, as already mentioned, for the text sentence {Taro can -}, using English, the question, {Is it possible that Taro -}, can be posed, and the answer, {Taro - is able to -}, can be given. When human beings acquire knowledge, they first set up a hypothesis by the inductive method, then they check the reality of that hypothesis by comparing it to the real world. If the hypothesis is true, they acquire it as knowledge. It is therefore necessary to set up a hypothesis in order to acquire some knowledge. This system can create a hypothetical sentence by changing part of the language structure of the natural sentence as shown below.

The next section explains {genki na Taro ga kyo gakko de shiroi bohru wo nage ru}, which is shown in FIG. 18, FIG. 92 (data sentence) and FIG. 93 (structural sentence).

Previously, an explanation was provided for how "Taro" was fetched form the sentence, {Taro ha genki de aru}, and combined with the "Taro" in the sentence, {Taro ga kyo gakko de shiroi bohru wo nage ru} via case combination to create the above-mentioned sentence. The next section will attempt to connect the sentence, {Taro ha genki de aru} with the sentence, {Taro ga kyo gakko de shiroi bohru wo nageru} via an implicative relationship. To generate this implicative relationship using the data sentence, MW34 and MW35 are newly set up, as shown in FIG. 139, and these two MWs are combined logically. It is necessary to insert the root PS (PS2) of {Taro ha genki de aru} into MW34, and to insert the root PS (PS7) of {Taro ga kyo gakko de shiroi bohru o nage ru} into MW35. At this time, in order to break off the case-combination relationship between {Taro wa genki de aru} and {Taro ga kyo gakko de shiroi bohru wo nage ru}, the element -L of PS2 is determined to be "0", then if the implicitive relationship is determined as the "if" of the subjunctive, and the logical particle, jlg, is determined to be "ba", the relationship for the combination in the sentence(s) will be as shown below.

MW34 (PS2)if ba ▦ MW35 (PS7)

If a natural sentence is generated from this structural sentence, it will be, {Taro ga genki de are ba, Taro ha kyo gakko de shiroi bohru wo nage ru}. If "X" is substituted for "Taro", based on the meaning that "Taro" is a person, the above sentence will be, {X ga genki de are ba, X ha kyo gakko de shiroi bohru wo nage ru}.

To use more abstract expressions in the above sentence, remove "kyo" and "gakko", then, if "itsuka" (some time) and "dokoka" (somewhere) are used as default values, instead of "kyo" and "gakko", the sentence will be, {X ga genki de are ba, X ha shiroi bohru o nage ru}.

If the above is actually done in reality when this sentence is written, it will become an item of knowledge, and if it is not actually done, the hypothesis will be discarded. If the implicative relationship is determined to be "as", which shows cause/reason, and the logical particle, jig, is determined to be "node", the sentence will be, {X ga genki de aru node, X ha shiroi bohru wo nage ru}.

If the implicative relationship is determined to be the "for" of the objective, and the logical particle, jlg, is determined to be tameni", the sentence will be, {X ga genki de aru tameni, X ha shiroi bohru wo nage ru}.

If the positions of the two sentences, {Taro wa genki de aru} and {Taro ha kyo gakko de shiroi bohru wo nage ru} relative to each other are switched, with the implicative relationship determined to be "if" in the subjunctive, and the logical particle, jlg, determined to be "ba", the structural sentence will be as shown below.

MW34 (PS7)if ba ▦ MW35 (PS2)

If a natural sentence is generated from the above structural sentence, it will be, {Taro ga kyo gakko de shiroi bohru wo nage re ba, Taro wa genki de aru}.

If the sentence, {Taro ha genki de aru} and the sentence, {bohru wa shiroi} are connected using the "AND" logical relationship, and the logical particle is determined to be "soshite", and these are connected to the sentence, {Taro ha kyo gakko de bohru wo nage ru} using the subjunctive "if" which indicates an implicative relationship, with the logical particle determined to be "ba", the structural sentences will be as shown below.

| |
|---|
| MW34 (PS2) AND soshite ▒ MW35 (PS4) |
| ▒ |
| MW36 ( ) IF ba ▒ MW37 (PS7) |

If a natural sentence is generated form this structural sentence, it will be,
{Taro ga genki de ari soshite bohru ga shiroi nara ba, Taro ha kyo gakko de bohru wo nage ru}.
If "X" is substituted for "Taro", and "kyo" and "gakko" are removed from the above sentence, the new sentence will be as shown below.
{X ga genki de ari bohru ga shiroi nara ba, X ha bohru wo nage ru}.
The sentence, {neko no Mike ga shinda} arises from the sentence {Mike wa neko de aru} and the sentence {Mike ga shinda}, as can be understood easily from the previous explanations. If these 2 sentences are connected using the subjunctive "if", which indicates an implicative relationship, and the logical particle, jlg, is determined to be "naraba", the sentence will be,
{Mike ga neko de aru nara ba, Mike ha shinda}.
If {shinda} is converted into the present tense, the sentence will then be,
{Mike ga neko de aru nara ba, Mike ha shinu}.
If "X" is substituted for "Mike", the sentence will be,
{X ga neko de aru nara ba, X ha shinu}.
If the above sentence is shown using a structural sentence, it will be as shown in FIG. 140.
If "dobutsu", the comprehensive concept which includes "neko" is substituted for "neko", the sentence will become,
{X ga dobutsu de aru nara ba, X ha shinu}.
This hypothesis has always been true in reality; therefore, the hypothesis can be recognized as correct knowledge or as a rule. The substitution of the comprehensive concept, "dobutsu" for "neko" is processed by changing the code number, which is very easy to do in this system.

As mentioned above, a hypothesis, which is the basis of knowledge acquisition, can be generated simply by changing the relationship between the combinations.

I claim:

1. A method of storing natural language in a computer and generating further natural language based on the stored natural language by the computer comprising the steps of:

preparing a word dictionary which stores language structure information defining individual function of letter series representing words;

preparing a configuration dictionary which stores language structure information defining mutual connecting relations of letter series representing particles and symbols;

preparing a meaning frame dictionary which stores meaning frames defining abstract meaning structures corresponding to letter series representing words;

preparing a meaning analysis grammar which commands mutual case coupling relations and mutual logical coupling relations between words, particles, symbols and the meaning frames corresponding to combinations of the language structure information and further commands insertion of the words, the particles and the symbols into the meaning frames;

performing a structure analysis on a natural sentence inputted by making use of the word dictionary and the configuration dictionary;

converting the letter series of the inputted natural sentence into a language structure information series;

subjecting the inputted natural sentence in the form of the language structure information series to the meaning analysis in such a manner that through application of the meaning analysis grammar to the language structure information series a single or a plurality of meaning frames are read out from the meaning frame dictionary in accordance with commands of the meaning analysis grammar;

synthesizing, when a plurality of meaning frames are read out, a meaning frame which defines an abstract meaning expressed by the inputted natural sentence by case coupling and/or logic coupling the meaning frames; and inserting words, particles and symbols into the meaning frames read out or the meaning frame synthesized to thereby determine and produce data sentence correctly expressing the meaning of the inputted natural sentence in the computer, whereby the language structure information series is converted into the data sentence in the form of data structure with a multi layered case-logic language structure.

2. A method according to claim 1, wherein the data structure includes at least, a first element which stores words, a second element which stores particles, a third element which stores symbols, a fourth element which stores the number of objective data structure to be connected by the case combination, a fifth element which stores the type of case combination, a sixth element which stores the number of objective data structure to be connected by the logical combination, and a seventh element which stores the type of logical combination;

the case logic structure, which determines the entire framework of the abstract meaning expressed by the natural sentence which has been input, is formed by storing the type of case combination between words expressed by the natural language inputted in the fifth element representing collection in the data structure which expresses the number of objective data structure to be connected by case combination in the fourth element of objective data structure to be connected by logical combination in the sixth element and type of logical combination in the seventh element; and storing the words, particles, and symbols of the natural sentence inputted, in the first element, element and third element in the case logical structure, to determine the meaning of the natural sentence inputted, whereby the meaning of the input natural sentence is accurately expressed in the computer, and natural language processing is easily performed by the computer.

3. A method according to claim 2, wherein the data structure further comprises an eighth element which stores the number of the data structure to be connected by case combination and an ninth element which stores the number of the data structure to be connected by logic combination.

4. A method according to claim 1, wherein a minimum meaning unit including at least six cases of Case A an agent case, Case T a time case, Case S a space case, Case O an object case, Case P a predicate case and Case X an auxiliary case defined by the data structure, which includes a first element which stores words, a second element which stores particles, a third element which stores symbols, a fourth element which stores data commanding prohibition of outputting the stored word in a natural sentence, a fifth element which stores number of object data structure in which the same word is to be inserted, a sixth element which stores data defining the content of the word to be stored, a seventh element which stores number of object data structure to be connected by case combination, an eighth element which stores a type of the case combination, a ninth element which stores number of object data structure to be connected by logic combination and a tenth element which stores a type of logic combination; whereby more complicated meaning structures are constructed by connecting single or multiple minimum meaning units by case combination or by logic combination, to form the meaning frames which express an abstract meaning.

5. A method according to claim 4, wherein the data structure further comprises an eleventh element which stores the number of the data structure to be connected by case combination and a twelfth element which stores the number of the data structure to be connected by logic combination.

6. A method according to claim 1, wherein the data structure includes first data structure and the second data structure, and the first data structure includes at least a first element which stores words, a second element which stores particles, a third element which stores symbols, a fourth element which stores the data commanding prohibition of outputting of the stored word in a natural sentence, a fifth element which stores number of the first data structure in which the same word is to be inserted, a sixth element which stores the data defining the content of the word to be stored, a seventh element which stores the number of the first data structure or the number of the second data structure to be connected by case combination, an eighth element which stores a type of case combination, a ninth element which stores the number of data structure to be connected by logic combination, and a tenth element which stores a type of the logic combination;

the second data structure includes at least a eleventh element which stores particles, a twelfth element which stores symbols, a thirteenth element which stores the number of the first data structure connected as Case A (agent case), a fourteenth element which stores the number of data structure MW connected as Case T (time case), a fifteenth element which stores the number of the first data structure connected as Case S (space case), a sixteenth element which stores the number of the first data structure connected as Case O (object case), a seventeenth element which stores number of data structure connected as Case P (predicate case), and an eighteenth element which stores number of the first data structure connected as Case X (auxiliary case).

7. A method according to claim 1, wherein when words and particles are inserted into the meaning frame which is read from the meaning frame dictionary, or inserted into the synthesized meaning frame, and when the arrangement in the language structure information contains word+particle in the language structure information series, then data structure, in which the same particle is set, is searched for by tracing a searching path in the meaning frame which is set according to the designated order of priority, and the word and the particle are respectively inserted into first element and second element of the searched for data structure.

8. A method according to claim 7, wherein particles in the meaning frame which was called up from the meaning frame dictionary or in the synthesized meaning frame are set to permit alternation whereby input natural sentences having a variety of expressions are stored in the form of the data structure.

9. A method according to claim 7, wherein a plurality of case particles designated in the meaning frame are stored in a third element of the data structure for the meaning frame via the coordinates in a case particle table which stores a group of case particles.

10. A method according to claim 1, wherein, when word is inserted into the meaning frame which was read out from the meaning frame dictionary or into the synthesized meaning frame, data structure, in which word has not yet been inserted into the element, is searched for by tracing a search path in the meaning frame which is set up according to the designated order of priority and then the word is inserted into the element in the searched for data structure.

11. A method according to claim 1, wherein when words and particles are inserted into the meaning frame which is read out from the meaning frame dictionary or inserted into the synthesized meaning frames a predetermined range in the language structure information series defined by starting point and ending point is designated in advance in which range there exists the word possibly inserted in the meaning frame, whereby words not related to the insertion into the meaning frame are eliminated and only the words related to the meaning frame are correctly inserted.

12. A method according to claim 11, wherein the word+particle in the predetermined range containing possible insertable word are inserted starting from the word at the ending point ending to the word at the starting point in such a manner that data structure, in which the same particle is set, is searched for by tracing a searching path in the meaning frame which is set according to the designated order of priority, and the word and the particle are respectively inserted into a first element and a second element of the searched for data structure and the remaining words in the predetermined range are further inserted starting from the word at the starting point ending to the word at the ending point in such a manner that data structure, in which word has not yet been inserted into the element, is searched for by tracing a search path in the meaning frame which is set up according to the designated order of priority and then the word is inserted into the element in the searched for data structure.

13. A method according to claim 1, wherein the data sentence includes a question data sentence which was converted from a natural sentence which was input as a question sentence, and a text data sentence converted from a natural sentence which was input as a text sentence, a base point for starting search in the question data sentence in the form of data structure, and a base point for starting search in the text data sentence in the form of data structure are provided, individual search paths are set up from the search start base point for the question data sentence, and from the search start base point for the text data sentence, the respective search paths are divided into a plurality of search sections defining as a search section starting point at a data structure at the search starting base point or a data structure representing the case of a primary sentence in the search path and defining as a search section ending point at a data structure of which connected upper level data structure is a primary sentence when a data structure to be connected in the upper level is designated in a first element-MW of the data structure at the search section starting point or at a data structure at which no data structures to be connected upper level and to right side via a second element are designated, the respective divided search sections for the question data sentence and the text data sentence are traced along the respective search paths if a word, which exists in the divided search section of the question data sentence, also exists in the divided search section of the text data sentence which corresponds to the divided search section of the question data sentence, the divided search section of the text data sentence is assigned an evaluation point based on the case of the data structure in which the word exists, and on the position of the word in language structure, then the evaluation points for all the divided search sections are totalled, and the conformity of pattern-matching between the question data sentence and the text data sentence is evaluated on the basis of the total number of evaluation points.

14. A method according to claim 1, wherein the data sentence includes a question data sentence [QDT-S]] converted from a natural sentence which was input as a question sentence and a text data sentence [TDT-S]] converted from a set of natural sentences which was input as a text sentence, a search path established in the question data sentence [QDT-S]] by designating the case selection order in the primary sentence, as well as the selection order of data structure to be connected in the data structure, is traced to discover the words WD which have been inserted into a first elements of the data structure, the discovered words are arranged in order of discovery as searched-for words [RWD, then existence of searching words in the set of the text data sentences]], which are similar to the searched-for word is checked according to the discovery order, if a searching word exists, a preliminary evaluation is carried out to check the conformity between the type of case in the primary sentence in the question data sentence to which the searched-for word is connected via a case combination, and the type of case in the primary sentence in the text data sentence to which the searching word SWD is connected via case combination, after passing the above preliminary evaluation, the primary sentence of the question data sentence is determined to be the search start base point for the question data sentence; and the primary sentence in the text data sentence is determined to be the search start base point for the text data sentence, pattern-matching evaluation is performed for all the text data sentences which have passed the preliminary evaluation in such a manner that a base point for starting search in the question data sentence in the form of data structure, and a base point for starting search in the text data sentence in the form of data structure are provided, individual search paths are set up from the search start base point for the question data sentence, and from the search start base point for the text data sentence, the respective search paths are divided into a plurality of search sections defining as a search section starting point at a data structure at the search starting base point or a data structure representing the case of the primary sentence in the search path and defining as a search section ending point at a data structure of which connected upper level data structure is a primary sentence when a data structure is be connected in upper level to designated in a first element of the data structure at the search section starting point or at a data structure at which no data structures to be connected upper level and to right side via a second element are designated, the respective divided search sections for the question data sentence and the text data sentence are traced along the respective search paths if a word, which exists in the divided search section of the question data sentence, also exists in the divided search section of the text data sentence which corresponds to the divided search section of the question data sentence, the divided search section of the text data sentence is assigned an evaluation point based on the case of the data structure in which the word exists, and on the position of the word in language structures then the evaluation points for all the divided search sections are totalled, and then the text data sentences which have passed the preliminary evaluation are then ranked according to the evaluation points which represent the conformity of the pattern-matching.

15. A method according to claim 14, wherein an answer sentence is prepared based on the text data sentence which has the highest number of evaluation points.

16. A method according to claim 1, wherein when outputting a series of letters of a natural language while tracing the produced data sentence in the form of data structure along an output path established by designating the case selection order in primary sentences and the selection order of data structure to be connected in the data structure, the output order of the series of letters of words, particles and symbols in the data structure is designated, whereby a multiplicity of natural languages having a variety of word orders are produced based on the data sentence stored.

17. A method according to claim 16, wherein further preparing an inflective suffix particle table which contains inflective suffix particles defined by two coordinates, and also a tense negative suffix particle table which stores the tense negative particles and the tense-negative suffix particles and the two coordinates corresponding to various expressions including past, present, affirmative, negative and polite expressions, and when there is an inflective suffix or inflective tense negative suffix particle between two expressive and non-inflective words or tense negative particles, coordinate which is stored in a first element of the data structure in which the preceding word exists or coordinate which is determined from the tense negative suffix particle table by using a second element of the data structure in which the tense negative particle exists, is obtained, and further a coordinate which is stored in the first element of the data structure in which the following word exists or a coordinate which is determined from the tense negative suffix particle table by using the second element of the data structure in which the tense negative particle exists. then the inflective suffix particle or the tense negative suffix particle is determined based on the obtained two coordinates by using the inflective suffix particle table whereby a natural sentence is generated.

* * * * *